（12) United States Patent
Ode

(10) Patent No.: US 10,701,604 B2
(45) Date of Patent: Jun. 30, 2020

(54) RADIO COMMUNICATION SYSTEM, RADIO BASE STATION APPARATUS, TERMINAL APPARATUS, AND RADIO COMMUNICATION METHOD

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/806,639

(22) Filed: Nov. 8, 2017

(65) Prior Publication Data

US 2018/0070274 A1 Mar. 8, 2018

Related U.S. Application Data

(63) Continuation of application No. PCT/JP2015/064108, filed on May 15, 2015.

(51) Int. Cl.
*H04W 36/08* (2009.01)
*H04W 8/22* (2009.01)
(Continued)

(52) U.S. Cl.
CPC ............ *H04W 36/08* (2013.01); *H04L 5/001* (2013.01); *H04L 5/0053* (2013.01);
(Continued)

(58) Field of Classification Search
CPC ..... H04W 36/08; H04W 36/06; H04W 8/005; H04W 8/22; H04W 36/0066;
(Continued)

(56) References Cited

U.S. PATENT DOCUMENTS

2008/0020779 A1 1/2008 Ode et al.
2012/0122409 A1* 5/2012 Ode ..................... H04W 8/22
455/71
(Continued)

FOREIGN PATENT DOCUMENTS

JP 2013-9291 A 1/2013
JP 2014-131201 A 7/2014
(Continued)

OTHER PUBLICATIONS

Notification of Reasons for Refusal issued by the Japan Patent Office for corresponding Japanese Patent Application No. 2017-518639, dated Oct. 9, 2018, with an English translation.
(Continued)

*Primary Examiner* — Dady Chery
(74) *Attorney, Agent, or Firm* — Myers Wolin, LLC

(57) ABSTRACT

A radio communication system including: a base station apparatus; and a terminal apparatus, wherein radio communication is performed between the base station apparatus and the terminal apparatus, and the base station apparatus or the terminal apparatus includes: a controller configured to identify a category of the terminal apparatus classified according to performance or capability of the terminal apparatus, based on at least one of first information and second information, the first information including the performance or capability of the terminal apparatus with respect to a non-orthogonal multiple access scheme, the second information including the performance or capability of the terminal apparatus with respect to an orthogonal multiple access scheme.

18 Claims, 95 Drawing Sheets

RADIO COMMUNICATION SYSTEM 10

(51) Int. Cl.
*H04L 5/00* (2006.01)
*H04W 36/06* (2009.01)
*H04W 8/00* (2009.01)
*H04W 72/12* (2009.01)
*H04W 76/20* (2018.01)
*H04W 88/10* (2009.01)
*H04W 36/00* (2009.01)
*H04W 16/14* (2009.01)
*H04W 88/06* (2009.01)

(52) U.S. Cl.
CPC .......... *H04W 8/005* (2013.01); *H04W 8/22* (2013.01); *H04W 36/06* (2013.01); *H04W 16/14* (2013.01); *H04W 36/0066* (2013.01); *H04W 72/1231* (2013.01); *H04W 76/20* (2018.02); *H04W 88/06* (2013.01); *H04W 88/10* (2013.01)

(58) Field of Classification Search
CPC . H04W 72/1231; H04W 16/14; H04W 88/10; H04W 76/20; H04W 88/06; H04L 5/001; H04L 5/0053
See application file for complete search history.

(56) References Cited

U.S. PATENT DOCUMENTS

| | | | |
|---|---|---|---|
| 2012/0282864 A1 | 11/2012 | Konstantinos et al. | |
| 2014/0050279 A1* | 2/2014 | Kishiyama | H04J 11/004 375/285 |
| 2014/0254559 A1 | 9/2014 | Tie et al. | |
| 2014/0256336 A1 | 9/2014 | Manssour et al. | |
| 2015/0043540 A1* | 2/2015 | Nikopour | H04J 11/00 370/335 |
| 2015/0156050 A1 | 6/2015 | Nishimoto et al. | |
| 2015/0349866 A1 | 12/2015 | Benjebbour et al. | |
| 2015/0358064 A1* | 12/2015 | Benjebbour | H04B 7/0452 370/329 |
| 2016/0037460 A1 | 2/2016 | Benjebbour et al. | |
| 2016/0088537 A1 | 3/2016 | Uchino et al. | |
| 2016/0119778 A1 | 4/2016 | Uchino et al. | |
| 2016/0174230 A1* | 6/2016 | Benjebbour | H04W 52/346 370/329 |
| 2016/0205695 A1* | 7/2016 | Kishiyama | H04W 72/082 370/315 |
| 2016/0219529 A1 | 7/2016 | Benjebbour et al. | |

FOREIGN PATENT DOCUMENTS

| | | |
|---|---|---|
| JP | 2014-131202 A | 7/2014 |
| JP | 2014-519235 A | 8/2014 |
| JP | 2014-204277 A | 10/2014 |
| JP | 2014-220689 A | 11/2014 |
| JP | 2014-236353 A | 12/2014 |
| JP | 2015-12458 A | 1/2015 |
| JP | 2015-41941 A | 3/2015 |
| JP | 2015-50575 A | 3/2015 |
| WO | 2006/075372 A1 | 7/2006 |
| WO | 2012/042626 A1 | 4/2012 |
| WO | 2014/030501 A1 | 2/2014 |
| WO | 2015/025847 A1 | 2/2015 |

OTHER PUBLICATIONS

Communication pursuant to Article 94(3) EPC issued by the European Patent Office for corresponding European Patent Application No. 15 892 530.5-1214, dated Oct. 24, 2018.
NTT DOCOMO, Inc, "Justification for NOMA in New Study on Enhanced MU-MIMO and Network Assisted Interference Cancellation", 3GPP TSG-RAN Meeting #65, RP-141165, Edinburgh, Scotland, Sep. 9-12, 2014.
Yuya Saito et al.,"Non-orthogonal multiple access (NOMA) for cellular future radio access.", In Vehicular Technology Conference (VTC Spring), 2013 IEEE 77th., IEEE, May 6, 2013, pp. 1-5.
International Search Report issued for corresponding International Patent Application No. PCT/JP2015/064108, dated Aug. 4, 2015, with an English translation.
Written Opinion of the International Searching Authority issued for corresponding International Patent Application No. PCT/JP2015/064108, dated Aug. 4, 2015, with an English translation.
Extended European search report with supplementary European search report and the European search opinion issued by the European Patent Office for corresponding European Patent Application No. 15892530.5-1214, dated Mar. 7, 2018.
Notification of Reasons for Refusal issued by the Japan Patent Office for corresponding Japanese Patent Application No. 2017-518639, dated May 21, 2019, with an English translation.
Communication pursuant to Article 94(3) EPC issued for corresponding European Patent Application No. 15892530.5, dated Jul. 30, 2019.
First Notification of Office Action issued by the China National Intellectual Property Administration for corresponding Chinese Patent Application No. 201580080029.8, dated Mar. 31, 2020, with English translation.

\* cited by examiner

FIG. 74

| UE category | Maximum number of DL-SCH transport block bits received within a TTI | Maximum number of bits of a DL-SCH transport block received within a TTI | Total number of soft channel bits | Maximum number of supported layers for spatial multiplexing in DL | Supported modulations | Aggregated cell operation | Aggregated Transmission Bandwidth [N_RB] | Multiple Access |
|---|---|---|---|---|---|---|---|---|
| Category 1 | 51024 | 51024 | 1237248 | 2 | QPSK | Not applicable | ≤ 100 | Orthogonal |
| Category 2 | 102048 | 75376 | 1237248 | 2 | QPSK,16QAM | Not applicable | ≤ 200 | Orthogonal |
| Category 3 | 299552 | 149776 | 3667200 | 4 | QPSK | applicable | ≤ 200 | Orthogonal |
| Category 4 | 2998560 | 299856 | 35982720 | 8 | QPSK,16QAM | applicable | ≤ 400 | Orthogonal |
| Category 5 | 51024 | 51024 | 1237248 | 2 | QPSK | Not applicable | ≤ 100 | Non-Orthogonal |
| Category 6 | 102048 | 75376 | 1237248 | 2 | QPSK,16QAM | Not applicable | ≤ 200 | Non-Orthogonal |
| Category 7 | 299552 | 149776 | 3667200 | 4 | QPSK | applicable | ≤ 200 | Non-Orthogonal |
| Category 8 | 2998560 | 299856 | 35982720 | 8 | QPSK,16QAM | applicable | ≤ 400 | Non-Orthogonal |
| Category 9 | 51024 | 51024 | 1237248 | 2 | QPSK | Not applicable | ≤ 100 | Orthogonal, Non-Orthogonal |
| Category 10 | 102048 | 75376 | 1237248 | 2 | QPSK,16QAM | Not applicable | ≤ 200 | Orthogonal, Non-Orthogonal |
| Category 11 | 299552 | 149776 | 3667200 | 4 | QPSK | applicable | ≤ 200 | Orthogonal, Non-Orthogonal |
| Category 12 | 2998560 | 299856 | 35982720 | 8 | QPSK,16QAM | applicable | ≤ 400 | Orthogonal, Non-Orthogonal |

FIG. 75

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL | Multiple Access |
|---|---|---|---|---|---|
| Category 0 (Note 2) | 1000 | 1000 | 25344 | 1 | Orthogonal |
| Category 1 | 10296 | 10296 | 250368 | 1 | Orthogonal |
| Category 2 | 51024 | 51024 | 1237248 | 2 | Orthogonal |
| Category 3 | 102048 | 75376 | 1237248 | 2 | Orthogonal |
| Category 4 | 150752 | 75376 | 1827072 | 2 | Non-Orthogonal |
| Category 5 | 299552 | 149776 | 3667200 | 4 | Non-Orthogonal |
| Category 6 | 301504 | 149776 (4 layers) 75376 (2 layers) | 3654144 | 2 or 4 | Non-Orthogonal |
| Category 7 | 301504 | 149776 (4 layers) 75376 (2 layers) | 3654144 | 2 or 4 | Non-Orthogonal |
| Category 8 | 2998560 | 299856 | 35982720 | 8 | Orthogonal, Non-Orthogonal |
| Category 9 | 452256 | 149776 (4 layers) 75376 (2 layers) | 5481216 | 2 or 4 | Orthogonal, Non-Orthogonal |
| Category 10 | 452256 | 149776 (4 layers) 75376 (2 layers) | 5481216 | 2 or 4 | Orthogonal, Non-Orthogonal |

NOTE 1: In carrier aggregation operation, the DL-SCH processing capability can be shared by the UE with that of MCH received from a serving cell. If the total BTS scheduling for DL-SCH and an MCH in one serving cell at a given TTI is larger than the defined processing capability, the prioritization between DL-SCH and MCH is left up to UE implementation.

NOTE 2: Within one TTI, a UE indicating category 0 shall be able to receive up to 1000 bits for a transport block associated with C-RNTI/P-RNTI/SI-RNTI/RA-RNTI and up to 2216 bits for another transport block associated with P-RNTI/SI-RNTI/RA-RNTI

FIG. 76

| CA Bandwidth Class | Aggregated Transmission Bandwidth Configuration | Number of contiguous CC | Nominal Guard Band $BW_{GB}$ | Multiple Access |
|---|---|---|---|---|
| A | $N_{RB,agg} \leq 100$ | 1 | $a_1 BW_{Channel(1)} - 0.5\Delta f_1$ (NOTE 2) | Orthogonal |
| B | $25 < N_{RB,agg} \leq 100$ | 2 | 0.05 max ($BW_{Channel(1)}$, $BW_{Channel(2)}$) − 0.5$\Delta f_1$ | Orthogonal |
| C | $100 < N_{RB,agg} \leq 200$ | 2 | 0.05 max ($BW_{Channel(1)}$, $BW_{Channel(2)}$) − 0.5$\Delta f_1$ | Orthogonal |
| D | $200 < N_{RB,agg} \leq 300$ | 3 | 0.05 max ($BW_{Channel(1)}$, $BW_{Channel(2)}$, $BW_{Channel(3)}$) − 0.5$\Delta f_1$ | Orthogonal |
| E | $[300] < N_{RB,agg} \leq [400]$ | FES | FES | Non-Orthogonal |
| F | $[400] < N_{RB,agg} \leq [500]$ | FES | FES | Non-Orthogonal |

NOTE 1: $BW_{Channel(1)}$, $j = 1, 2, 3$, is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.

NOTE 2: $a_1 = 0.16/1.4$ for $BW_{Channel(1)} = 1.4$ MHz whereas $a_1 = 0.05$ for all other channel bandwidths.

FIG. 106

| BASE STATION | FREQUENCY | Cell | Multiple Access | PCell/SCell |
|---|---|---|---|---|
| eNB1 | f1 | Cell 1 | Orthogonal | PCell |
| eNB1 | f2 | Cell 2 | Non-Orthogonal | SCell |
| eNB1 | f3 | Cell 3 | Orthogonal | |
| eNB1 | f4 | Cell 4 | Non-Orthogonal | |
| eNB2 | f2 | Cell 5 | Non-Orthogonal | |
| eNB2 | f3 | Cell 6 | Orthogonal | |
| eNB3 | f2 | Cell 7 | Orthogonal | |
| eNB3 | f3 | Cell 8 | Orthogonal | |
| eNB4 | f2 | Cell 9 | Non-Orthogonal | |
| eNB4 | f3 | Cell 10 | Non-Orthogonal | |

FIG. 109

| BASE STATION | FREQUENCY | Cell | Multiple Access | PCell/SCell |
|---|---|---|---|---|
| eNB1 | f1 | Cell 1 | Orthogonal | |
| eNB1 | f2 | Cell 2 | Non-Orthogonal | PCell |
| eNB1 | f3 | Cell 3 | Orthogonal | SCell |
| eNB1 | f4 | Cell 4 | Non-Orthogonal | |
| eNB2 | f2 | Cell 5 | Non-Orthogonal | |
| eNB2 | f3 | Cell 6 | Orthogonal | |
| eNB3 | f2 | Cell 7 | Orthogonal | |
| eNB3 | f3 | Cell 8 | Orthogonal | |
| eNB4 | f2 | Cell 9 | Non-Orthogonal | |
| eNB4 | f3 | Cell 10 | Non-Orthogonal | |

FIG. 112

| BASE STATION | FREQUENCY | Cell 1 | Multiple Access | PCell/SCell |
|---|---|---|---|---|
| eNB1 | f1 | Cell 1 | Orthogonal | PCell |
| eNB1 | f2 | Cell 2 | Non-Orthogonal | |
| eNB1 | f3 | Cell 3 | Orthogonal | |
| eNB1 | f4 | Cell 4 | Non-Orthogonal | |
| eNB2 | f2 | Cell 5 | Non-Orthogonal | SCell |
| eNB2 | f3 | Cell 6 | Orthogonal | |
| eNB3 | f2 | Cell 7 | Orthogonal | |
| eNB3 | f3 | Cell 8 | Orthogonal | |
| eNB4 | f2 | Cell 9 | Non-Orthogonal | |
| eNB4 | f3 | Cell 10 | Non-Orthogonal | |

RADIO COMMUNICATION SYSTEM, RADIO BASE STATION APPARATUS, TERMINAL APPARATUS, AND RADIO COMMUNICATION METHOD

CROSS-REFERENCE TO RELATED APPLICATION

This application is a continuation application of International Application Number PCT/JP2015/064108 filed on May 15, 2015 and designated the U.S., the entire contents of which are incorporated herein by reference.

FIELD

The embodiments discussed herein are related to a radio communication system, a radio base station apparatus, a terminal apparatus, and a radio communication method.

BACKGROUND

At present, in the 3GPP (3rd Generation Partnership Project), a standardization association, the specifications of an LTE (Long Term Evolution) system and an LTE-A (LTE-Advanced) system based on the LTE system are studied. As to the LTE, LTE Release 8 to LTE Release 12 have been worked out as international specifications. LTE Release 10 or after is called LTE-Advanced, which is regarded as 4th generation mobile communication (4G).

In the LTE, for downlink transmission, OFDMA (Orthogonal Frequency Division Multiple Access) is used. Also, for uplink transmission, DFT-s-FDMA (Discrete Fourier Transform-spread Orthogonal Frequency Division Multiple Access) or SC-FDMA (Single Carrier-FDMA) are used. In the OFDMA, because subcarriers are orthogonal, causing no interference among the subcarriers, it is possible to prevent the occurrence of interference in data transmission between users (or between terminals) in a cell.

Meanwhile, the study of 5th generation mobile communication (5G) after 4G has been started from about the year 2013. As a technique to be introduced in 5G, Non-Orthogonal Multiple Access (NOMA) is under study. In the 3GPP, a study for introducing the non-orthogonal multiple access is to be started in order to establish the specification of the LTE Release 13 and after. As a non-orthogonal multiple access scheme, FTN (Faster-Than-Nyquist), FMBC (Filter Bank Multi Carrier) and Super Position Coding (hierarchical modulation) are also under study.

Such techniques related to radio communication include techniques as follows, for example. Namely, there is a method and an apparatus in which a user apparatus (UE), located in an expanded range area of an adjacent base station cell in a communication network, reports the UE capability of canceling interference from the transmission of another cell, to a serving base station such as a macro cell which includes a low power cell. According to the above technique, it is urged that the expansion of a range can be determined optimally and beneficially for both a homogeneous network and a heterogeneous network.

Further, there is a technique of setting a hierarchy ratio, which is a signal power ratio at the superposition of an upper layer with a lower layer, a mapping pattern capable of selecting two patterns from bit mapping pattern candidates with an allowed overlap, and a ratio of mixing two mapping patterns in a signal sequence, as hierarchal parameters. It is urged that, according to the above technique, a communication system capable of flexibly adjusting the quality of each link in hierarchical modulation can be obtained.

Further, there is a radio communication system in which N×n sets of propagation environment information, reported from n terminals, are aggregated and the scheduling is performed by integrating a plurality of different communication services into one, so that a terminal, having a satisfactory propagation environment over a plurality of different communication services, and a communication service to be provided to the terminal are selected. According to the above technique, it is urged that the scheduling performed by integrating a plurality of communication services into one enables improved operability in radio communication.

Further, there is a radio base station which selects a user terminal from each user group according to the channel gain of each user terminal, to determine a user set to be non-orthogonally multiplexed to an arbitrary radio resource using transmission power which is fixedly allocated to each user group. In this case, the radio base station transmits a downlink signal to each user terminal in the user set, using transmission power allocated to each user group. According to this technique, it is urged that link adaptation which is optimal for a future radio communication system can be achieved.

Moreover, there is also a radio base station which multiplexes downlink data for each of a plurality of user terminals on each sub-band basis, to perform transmission using transmission power allocated to each of the plurality of user terminals on each sub-band basis. According to this technique, it is urged that link adaptation suitable for a future radio communication system can be obtained.

CITATION LIST

Patent Literature

Patent Literature 1: Japanese National Publication of International Application No. 2014-519235.
Patent Literature 2: International Publication Pamphlet No. WO 2014/030501.
Patent Literature 3: International Publication Pamphlet No. WO 2006/075372.
Patent Literature 4: Japanese Laid-open Patent Application Publication No. 2015-12458.
Patent Literature 5: Japanese Laid-open Patent Application Publication No. 2014-204277.

However, when the non-orthogonal multiple access scheme is introduced in an LTE system in which an orthogonal multiple access scheme is used, there is a case that a base station apparatus applies the non-orthogonal multiple access scheme to a terminal apparatus which supports the orthogonal multiple access scheme but does not support the non-orthogonal multiple access scheme. In this case, the terminal apparatus may be incapable of performing interference cancellation on a signal transmitted from the base station apparatus and decoding a radio signal, causing retransmission and a switch of the multiple access scheme. As a result, the transmission speed (or throughput) of the radio communication system falls to a certain speed or lower, which makes it impossible to satisfy a guaranteed speed, a maximum transmission delay designated by QoS (Quality of Service), etc. Further, when a transmission object is a moving image, a so-called frame drop may occur in some cases. Therefore, it becomes impossible to perform radio communication in the base station apparatus and the terminal apparatus.

As to the above-mentioned technique, for example, there may be cases that, if UE can report, to the serving base station apparatus, the UE capability to cancel interference from transmission by the other cell, the base station apparatus applies the non-orthogonal multiple access scheme to the terminal which supports the orthogonal multiple access scheme. In such a case, appropriate radio communication between the UE and the base station may be disabled as mentioned above. Similarly, as to the above-mentioned other techniques, the base station apparatus may apply the non-orthogonal multiple access scheme to a terminal which supports the orthogonal multiple access scheme, so that appropriate radio communication may be disabled between with a terminal apparatus which supports the non-orthogonal multiple access scheme.

SUMMARY

According to an aspect of the embodiment, a radio communication system including: a base station apparatus; and a terminal apparatus, wherein radio communication is performed between the base station apparatus and the terminal apparatus, and the base station apparatus or the terminal apparatus includes: a controller configured to identify a category of the terminal apparatus classified according to performance or capability of the terminal apparatus, based on at least one of first information and second information, the first information including the performance or capability of the terminal apparatus with respect to a non-orthogonal multiple access scheme, the second information including the performance or capability of the terminal apparatus with respect to an orthogonal multiple access scheme.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 74 is a diagram illustrating an example of a terminal category table.

FIG. 75 is a diagram illustrating an example of a terminal category table.

FIG. 76 is a diagram illustrating an example of a terminal category table.

FIG. 106 is a diagram illustrating correspondence among a base station, a frequency and a cell.

FIG. 109 is a diagram illustrating correspondence among a base station, a frequency and a cell.

FIG. 112 is a diagram illustrating correspondence among a base station, a frequency and a cell.

DESCRIPTION OF EMBODIMENTS

Figure 1:
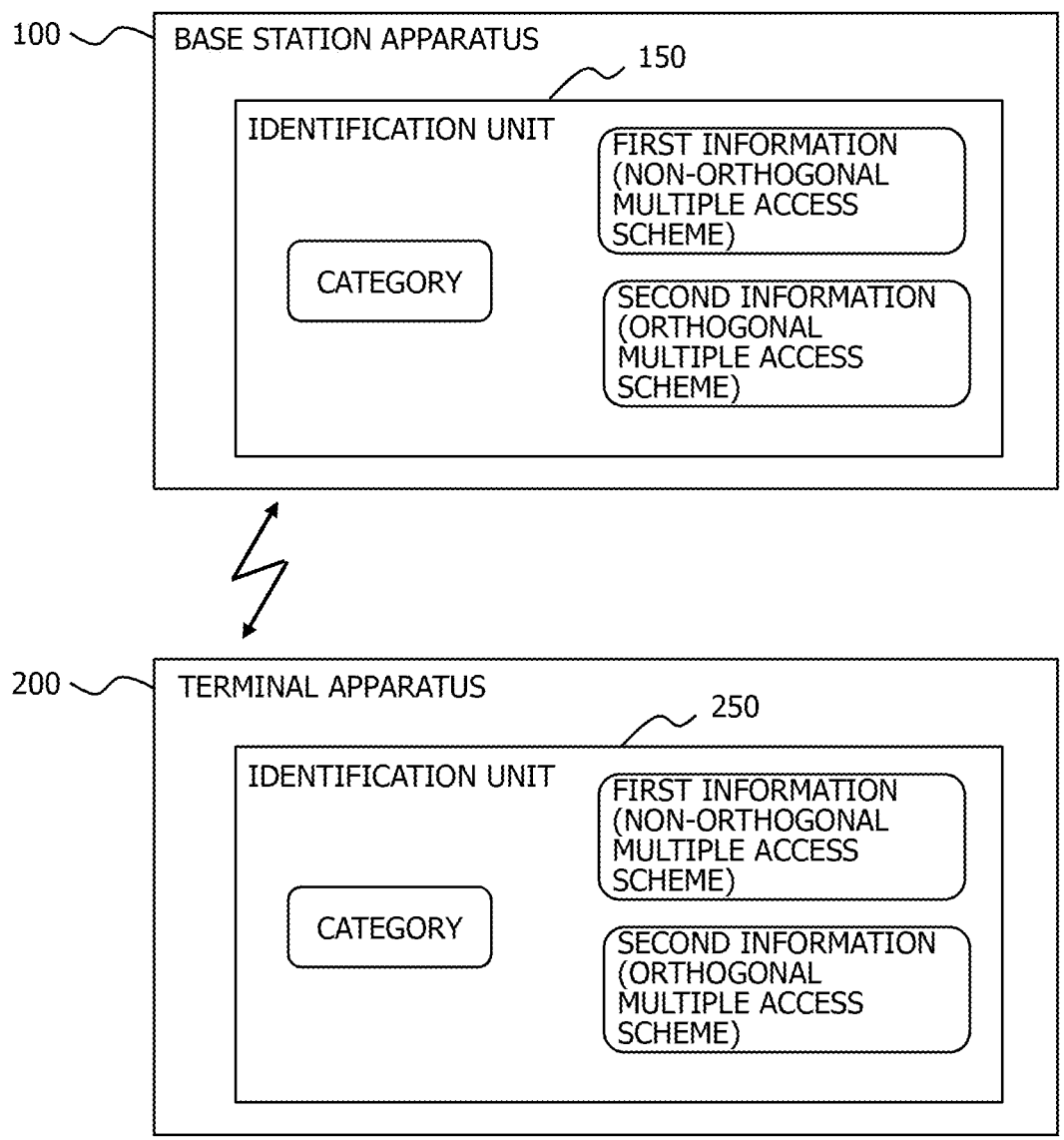
FIG. 1 is a diagram illustrating a configuration example of a radio communication system.

Hereinafter, the present embodiments will be described in detail by referring to the drawings. The problem and the embodiments in the present description are merely examples, and are not intended to restrict the scope of right of the present application. In particular, even if the expression of the description is different, the technique according to the present application is applicable as long as being technically equivalent in spite of the different expression, and the scope of right is not restricted.

First Embodiment

A first embodiment will be described. FIG. 1 is a diagram illustrating a configuration example of a radio communication system 10 according to the first embodiment.

The radio communication system 10 includes a base station apparatus (which may hereafter be referred to as "base station") 100 and a terminal apparatus (which may hereafter be referred to as "terminal") 200. The base station 100 is a radio communication apparatus which performs radio communication with a terminal 200 located in the serviceable range of the self-station. The base station 100 provides a terminal 200 with a variety of services including a speech communication service and a Web reading service.

The terminal 200 is a feature phone, a smart phone, a tablet terminal, a personal computer, a game apparatus, or the like. The terminal 200 is a movable communication apparatus.

The base station 100 or the terminal 200 includes an identification unit 150. The identification unit 150 identifies a category of the terminal 200, which is classified according to the performance or capability of the terminal 200, on the basis of at least one of first information, which represents the performance or capability of the terminal 200 concerning the non-orthogonal multiple access scheme, and second information which represents the performance or capability of the terminal 200 concerning the orthogonal multiple access scheme.

As such, the base station 100 and the terminal 200 can identify the category of the terminal 200 on the basis of at least one of the first information and the second information.

This enables the base station 100 to avoid such a situation as performing radio communication, by the non-orthogonal multiple access scheme, with the terminal 200 which does not support the non-orthogonal multiple access scheme. Similarly, this enables the base station 100 to avoid such a situation as performing radio communication, by the orthogonal multiple access scheme, with the terminal 200 which does not support the orthogonal multiple access scheme.

Also, when the terminal 200 supports the non-orthogonal multiple access scheme, the base station 100 can switch from the orthogonal multiple access scheme to the non-orthogonal multiple access scheme. Similarly, when the terminal 200 supports the orthogonal multiple access scheme, the base station 100 can switch from the non-orthogonal multiple access scheme to the orthogonal multiple access scheme.

Further, the base station 100, when the self-station does not support the non-orthogonal multiple access scheme, may hand over a terminal to a base station which supports the non-orthogonal multiple access scheme. Similarly, when the self-station does not support the orthogonal multiple access scheme, the base station 100 may hand over a terminal to a base station which supports the orthogonal multiple access scheme.

Further, the base station 100 may add a frequency band (or a cell or a frequency) which supports the non-orthogonal multiple access scheme. Similarly, the base station 100 may also add a frequency band which supports the orthogonal multiple access scheme. The simultaneous use of the added frequency band and the frequency band, which has originally been used, enables the base station 100 and the terminal 200 to perform radio communication by carrier aggregation.

Thus, it is possible to provide a radio communication system, a base station apparatus, a terminal apparatus and a radio communication method which can appropriately perform radio communication.

Further, it is possible to prevent such a situation that the base station 100 repeats the setting of a terminal 200, which does not support the non-orthogonal multiple access scheme, by the non-orthogonal multiple access scheme over multiple times, or repeats the setting of a terminal 200, which does not support the orthogonal multiple access scheme, by the orthogonal multiple access scheme over multiple times. Because the base station 100 may identify a category on the basis of at least one of the first information and the second information, it is possible to prevent a situation of repeating the setting over multiple times, and as a result, it is possible to improve a throughput.

Accordingly, it is possible to provide a radio communication system, a base station apparatus, a terminal apparatus and a radio communication method which improve the throughput.

Second Embodiment

Next, a second embodiment will be described. First, a description will be given of each term which is used in the second embodiment.

Description of Terms

A cell is a service area constituted using one frequency, for example. In this case, because of one frequency, a cell may be used with the same meaning as a frequency. Also a cell may be a service area formed by one radio base station apparatus (which may hereafter be referred to as a "base station"), or may be the combination of the service area concerned with the base station apparatus. The cell may be a cell defined in the 3GPP, for example.

One frequency includes, for example, a specific bandwidth and may be used in the same meaning as a component carrier (which may hereafter be referred to as "CC"). As the specific bandwidth, for example, there are 1.4 MHz, 3 MHz, 5 MHz, 10 MHz, 20 MHz, etc.

As to the frequency band, for example, a specific bandwidth is included. Therefore, the frequency band may be referred to as frequency, for example.

A radio resource includes, for example, a subcarrier (or frequency) and time. Or, a radio resource includes, for example, a spread code and time. The former may be used in OFDMA, whereas the latter may be used in CDMA (Code Division Multiple Access).

A base station is, for example, a radio communication apparatus capable of communication using one or a plurality of frequencies. Therefore, a base station may configure a plurality of cells. Accordingly, when a base station configures a single cell, there may be cases that a cell, a frequency, a CC and a base station are used in the same meaning.

Carrier aggregation (which may hereafter be referred to as "CA") signifies, for example, the execution of communication by simultaneously using a plurality of frequencies. Or, CA signifies, for example, the execution of communication by simultaneously using a plurality of system bands. Or, CA signifies, for example, the execution of communication by simultaneously using a plurality of frequency bands. For example, each individual frequency comes to a CC. Each CC may be subordinate to an identical frequency band, or may be subordinate to a different frequency band.

A non-orthogonal multiple access scheme is a scheme for multiplexing based on transmission power, for example. Or, a non-orthogonal multiple access scheme is, for example, a scheme in which, for a plurality of users (or terminal apparatuses (which may be referred to as "terminals")), each signal is allocated to an identical radio resource, so that transmission is performed with transmission power which is different signal-by-signal. Or, a non-orthogonal multiple access scheme is, for example, a scheme in which, at the multiplexing of a plurality of users (or terminals) to an identical radio resource, signals among mutual users are not orthogonal (or not separable). It may be possible that non-orthogonal implies the same meaning as being incapable of separating each user signal, for example.

On the other hand, an orthogonal multiple access scheme is, for example, a scheme in which a signal for one user (or terminal) is allocated to one or a plurality of radio resources (for example, subcarriers), so as to perform signal transmission for the plurality of users. It may be possible that orthogonal implies the same meaning as being capable of separating each user signal, for example.

Additionally, a multiple access scheme is, for example, a scheme of simultaneously performing a plurality of communication sets in which each communication set between one base station and a plurality of terminals may be executed simultaneously. A scheme of allocating different subcarriers (or different radio resources) by a base station to thereby simultaneously communicate with a plurality of terminals is, for example, OFDMA.

Superposition coding (or hierarchical modulation, which may hereafter be referred to as "hierarchical modulation") is, for example, a modulation scheme in which a signal point of lower-level modulation is formed to be included in each signal point of higher-level modulation. Superposition coding may be referred to as hierarchical modulation because higher-level modulation and lower-level modulation exist. Or, hierarchical modulation signifies, for example, a modulation scheme in which each individually mapped signal is superposed in a hierarchical manner. In the hierarchical modulation, modulation may be performed in a hierarchical manner by a tertiary or higher-order modulation scheme, not only the higher-level modulation and the lower-level modulation. The hierarchical modulation is one technique for achieving the non-orthogonal multiple access scheme, for example.

A terminal category signifies, for example, a category of a terminal (which may hereafter be referred to as a "terminal category") which is classified according to the capability or performance of a terminal, In the 3GPP, based on information which indicates the capability or performance of a terminal, the terminal is classified into "Category 1", "Category 2" and so on. Information indicating the capability or performance of a terminal includes, for example, the number of available downlink shared channels, the capability or incapability of continuous reception, a maximum bit count transmittable by one time transmission through a shared channel, and so on.

The terminal performance information signifies, for example, such information which indicates the capability or performance of the terminal. In the terminal performance information, for example, at least information whether or not supporting the non-orthogonal multiple access scheme is included. Also, the terminal performance information may include a supported modulation scheme, a coding method, supportability of a space multiplexing scheme such as MIMO, a transmission method which simultaneously uses a plurality of frequencies, like CA, etc. Further, the terminal performance information may include, for example, whether or not there is provided a function at transmission and reception by the non-orthogonal multiple access scheme, or whether the terminal performance is high or low, and so on. Or, the terminal performance information may include, for example, whether or not an interference suppression function is provided, whether or not a hierarchically modulated signal can be demodulated, and so on. Or, the terminal performance information may include, for example, information indicating the capability or incapability of the hierarchical modulation and the level of capability and accuracy of the interference suppression function.

Radio channel status information (or radio status information) is, for example, the information of a radio channel status between a base station and a terminal. As one type of the radio channel status information, for example, there is radio channel quality information. As radio channel quality, for example, there are pilot received power, pilot received quality, RSRP (Reference Signal Received Power), RSRQ (Reference Signal Received Quality) and RSSI (Received Signal Strength Indicator). In addition thereto, as radio channel quality information, there are CQI (Channel Quality Indicator), SIR (Signal to Interference Noise Ratio), SNR (Signal to Noise Ratio), CPICH RSCP (Common Pilot Channel Received Signal Code Power) and CPICH Ec/NO (Common Pilot Channel received Energy per chip divided by the power density). As the radio channel quality information, for example, it is possible to either use measured radio channel quality directly, or use a discrete numerical value (or normalized value), a time average value, a numeric difference value already transmitted, etc.

Radio Communication System

Figure 2:
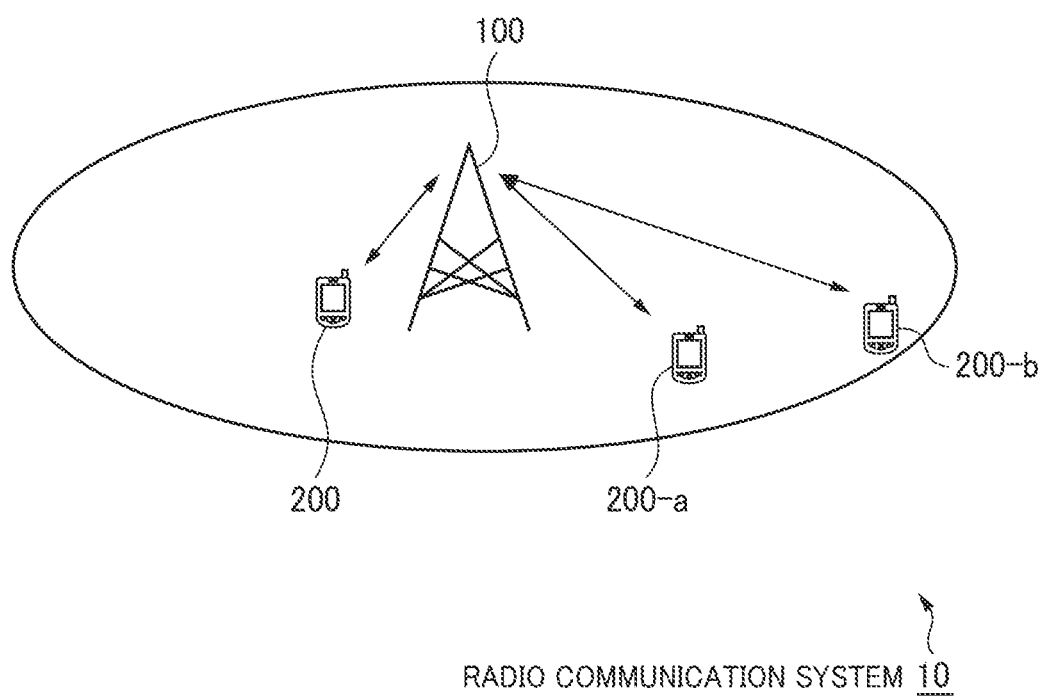
FIG. 2 is a diagram illustrating a configuration example of a radio communication system.

Next, a description will be given on a configuration example of a radio communication system in the present second embodiment. FIG. 2 is a diagram illustrating a configuration example of a radio communication system 10.

The radio communication system 10 includes a base station apparatus (eNB (evolve Node B), which may hereafter be referred to as a "base station") 100 and terminal apparatuses (which may hereafter be referred to as "terminals") 200, 200a, 200b.

The base station 100 is, for example, a radio communication apparatus which performs radio communication with the terminals 200, 200a, 200b which are located in the service area in the self-station.

Each terminal 200, 200a, 200b is, for example, a smart phone, a feature phone, a tablet terminal, a personal computer, a game apparatus, or the like. The terminal 200, 200a, 200b performs radio communication with the base station 100, so that can receive a variety of services including a speech communication service, a Web page reading service, etc.

The base station 100 can perform bidirectional communication with the terminals 200, 200a, 200b. Namely, it is possible to perform communication in a direction from the base station 100 to the terminals 200, 200a, 200b (which may hereafter be referred to as a "downlink direction") and communication in a direction from the terminals 200, 200a, 200b to the base station 100 (which may hereafter be referred to as an "uplink direction").

The base station 100 performs scheduling for radio communication with the terminals 200, 200a, 200b in the downlink direction and the uplink direction, to perform radio resource allocation, the determination of a coding scheme and a modulation scheme, and so on. The base station 100 transmits to each terminal 200, 200a, 200b a control signal which includes the result of the scheduling. The base station 100 and the terminals 200, 200a, 200b perform radio communication according to the scheduling result included in the control signal.

Incidentally, in the radio communication system 10 depicted in FIG. 2, there is illustrated an example in which three terminals 200, 200a, 200b perform radio communication with one base station 100. In the radio communication system 10, one terminal 200 or two terminals 200, 200a or four or more terminals 200, 200a . . . may perform radio communication with the base station 100.

Also, because the terminals 200, 200a, 200b are of an identical configuration, the terminal 200 will be used in a representative manner unless otherwise noted.

Orthogonal Multiple Access Scheme and Non-Orthogonal Multiple Access Scheme

Figure 3:
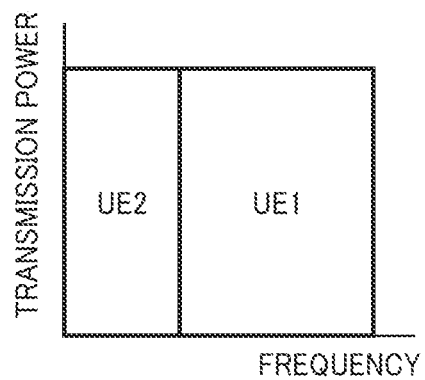
FIG. 3 is a diagram illustrating an example of an orthogonal multiple access scheme.
Figure 5:
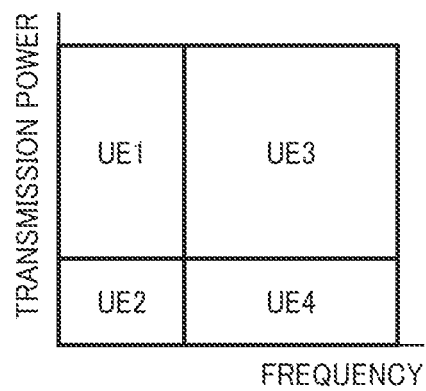
FIG. 5 is a diagram illustrating an example of a non-orthogonal multiple access scheme.
Figure 6:
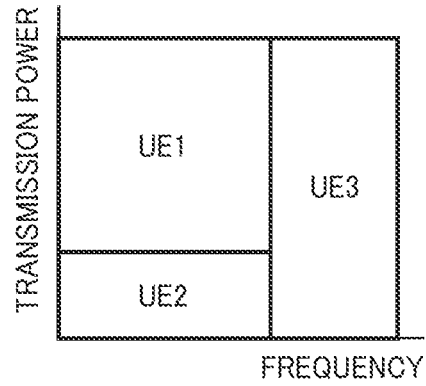
FIG. 6 is a diagram illustrating an example of a non-orthogonal multiple access scheme.

Next, examples of the orthogonal multiple access scheme and the non-orthogonal multiple access scheme will be described. FIG. 3 illustrates an example of the orthogonal multiple access scheme, FIGS. 4 and 5 illustrate examples of the non-orthogonal multiple access scheme, and FIG. 6 illustrates an example in which both are included.

As illustrated in FIG. 3, in the orthogonal multiple access scheme (for example, OFDMA), different radio resources are allocated to UE1 (for example, terminal 200a) and UE2 (for example, terminal 200b), and transmission is made using identical transmission power. In this case, in each frequency allocated to UE1, one or a plurality of subcarriers are included, and also, in each frequency allocated to UE2, one or a plurality of subcarriers are included. Because each subcarrier is orthogonal, it is possible to suppress the occurrence of interference between UE1 and UE2 concerning signal transmission and reception.

Figure 4:
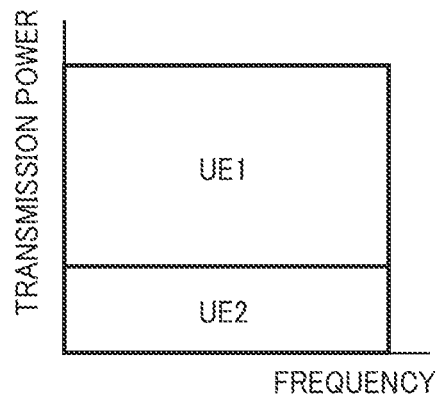
FIG. 4 is a diagram illustrating an example of a non-orthogonal multiple access scheme.

On the other hand, as illustrated in FIG. 4, in the non-orthogonal multiple access scheme, a frequency allocated to UE2 is included in a frequency allocated to UE1, causing the existence of an overlapped part between the two frequencies. In this case, UE2 is located, for example, in a closer distance than UE1 from the base station 100, causing lower transmission power for UE2 than for UE1. Also, UE1 is located, for example, at a cell end etc. in a longer distance than UE2 from the base station 100, causing higher transmission power for UE1 than for UE2. In UE2, in regard to a signal transmitted from the base station 100, a signal destined to UE1 is also received, and accordingly, the signal destined to UE1 causes interference. For this reason, UE2 performs processing to cancel or suppress the interference (which may hereafter be referred to as "interference suppression"). On the other hand, because UE1 is located in a longer distance than UE2 from the base station 100, the received power of a signal to UE2 becomes exceedingly small, so that UE1 can receive a signal destined to the self-terminal without receiving a signal destined to UE2.

Additionally, as to a method for interference suppression, for example, there are a method of using a training signal, a method of performing radio channel estimation and the equalization of a received signal which includes interference (for example, to resume a distorted signal caused by interference into an original signal) to thereby obtain a desired signal, and so on.

In the 3GPP etc., as an interference suppression method, SIC (Successive Interference Cancellation) is under study. The SIC is a method for reproducing a desired signal by successively canceling an interference signal from a multiplexed signal. For example, a terminal performs SIC in the following manner. Namely, when three signals are multiplexed, the terminal, in order to extract a first signal, firstly cancels or suppresses a second and a third signal, which are interference signals, so as to reproduce the first signal. Subsequently, in order to extract the second signal, the terminal cancels or suppresses the third signal, which is an interference signal, to reproduce the second signal, and further, reproduces the third signal. In the cases when two signals are multiplexed or when four or more signals are multiplexed, the terminal also performs processing in a similar manner. As such, in the SIC, interference suppression can be achieved if non-orthogonal multiplexing is performed on signals to a plurality of terminals, for example.

FIG. 5 is also an example of the non-orthogonal multiple access scheme. In this example, there is illustrated an example of allocating an identical frequency to UE1 and UE2, and an identical frequency to UE3 and UE4.

FIG. 6 illustrates an example in which each frequency is allocated to UE1 and UE2 by the non-orthogonal multiple access scheme, and to UE3 by the orthogonal multiple access scheme. As such, radio communication may be performed using the non-orthogonal multiple access scheme for a certain frequency and the orthogonal multiple access scheme for another frequency.

Hierarchical Modulation

Figure 7:
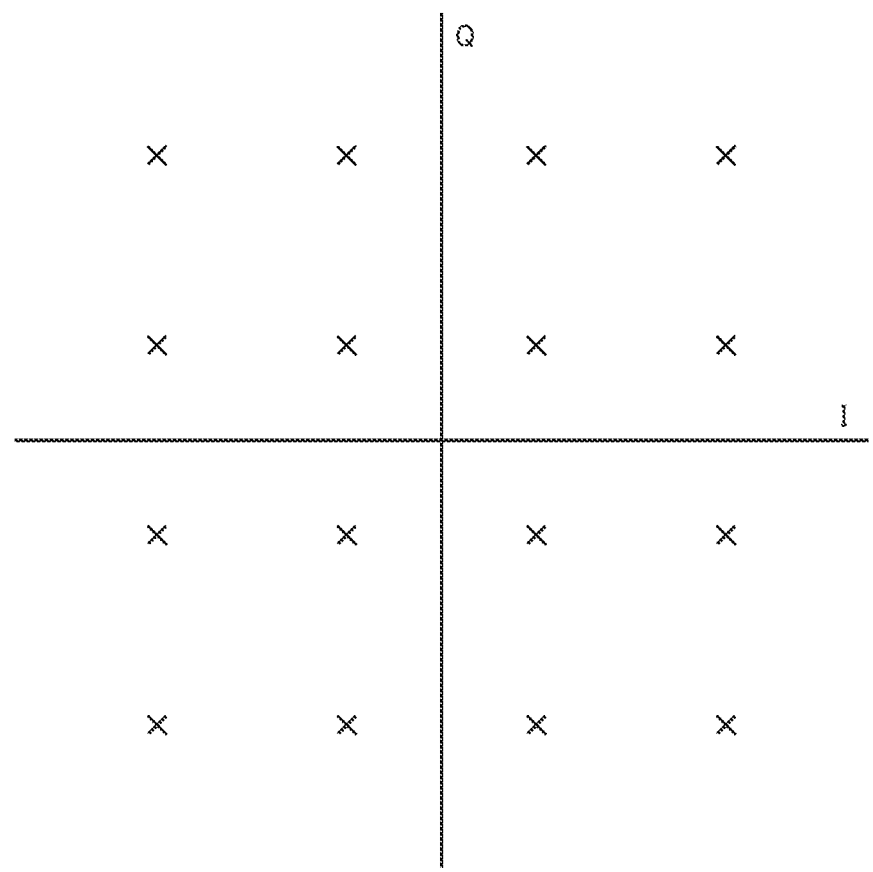
FIG. 7 is a diagram illustrating an example of hierarchical modulation.
Figure 8:
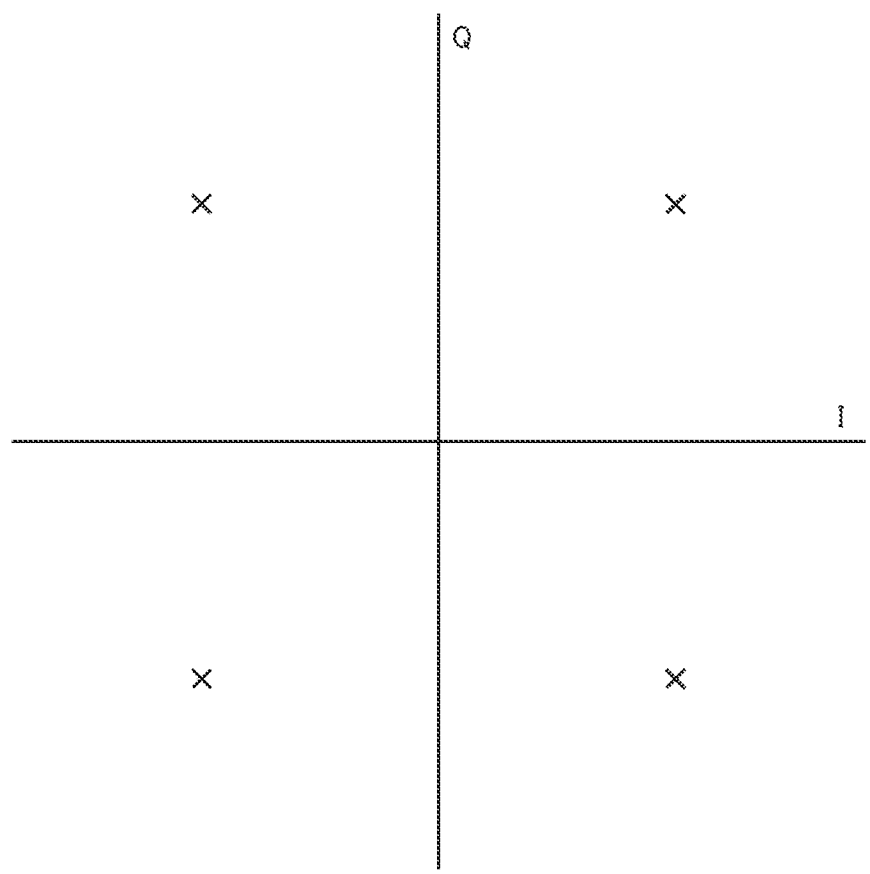
FIG. 8 is a diagram illustrating an example of hierarchical modulation.
Figure 9:
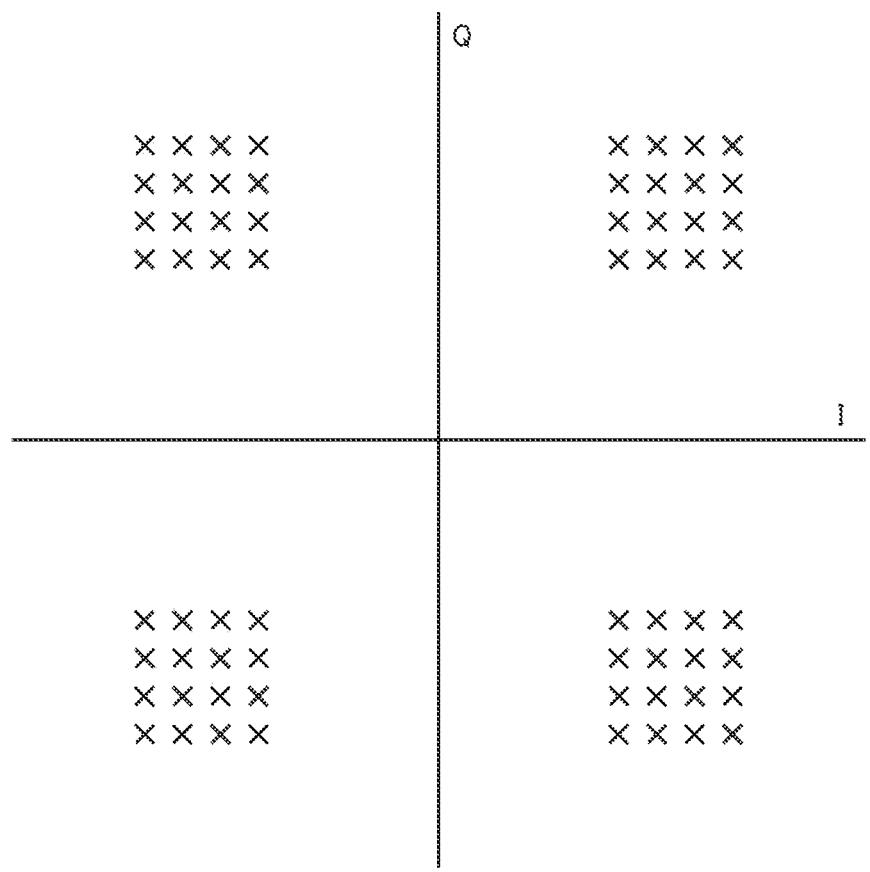
FIG. 9 is a diagram illustrating an example of hierarchical modulation.

Next, hierarchical modulation will be described. The hierarchical modulation is one technique for achieving the non-orthogonal multiple access scheme, for example. FIG. 7 illustrates an example of primary modulation in the hierarchical modulation, FIG. 8 illustrates an example of secondary modulation in the hierarchical modulation, and FIG. 9 illustrates an example of the hierarchical modulation.

In the hierarchical modulation, for example, processing as follows is performed. Namely, for a certain signal sequence, modulation by 16QAM (Quadrature Amplifier Modulation) is performed as primary modulation (or higher-level modulation). In this case, in a constellation as depicted in FIG. 7, representation is given as either one signal point among 16 signal points. Then, for a signal on which the primary modulation is performed, modulation by QPSK (Quadrature Phase Shift Keying) is performed as secondary modulation (or lower-level modulation). In this case, a hierarchically modulated signal is represented as either one signal point among signal points depicted in FIG. 9.

For example, the base station 100 performs primary modulation, such as 16QAM, on a signal to be transmitted to UE2 which is located in a closer distance than UE1 from the base station 100, and also performs secondary modulation, such as QPSK, on a signal to be transmitted to UE1 which is located at a cell edge in a longer distance than UE2 from the base station 100.

Each QPSK signal point (for example, FIG. 8) has a broader interval between each individual signal point than each 16QAM signal point (for example, FIG. 7). Accordingly, QPSK is resistant against noise and interference, though with a smaller data amount which can be transmitted in one time transmission, in comparison with 16QAM. Therefore, if transmission is made to UE1 located at the cell edge, it is possible to obtain a sufficiently satisfactory reception characteristic in UE1. On the other hand, because radio quality is satisfactory in UE2 located in a closer distance than UE1 from the base station 100, a transmission signal can be reproduced if modulation is performed by 16QAM, so that a larger data amount can be transmitted in comparison with QPSK.

For a signal on which the hierarchical modulation is performed, for example, demodulation for secondary modulation (secondary demodulation) is performed first and subsequently thereto, demodulation for primary modulation (primary demodulation) is performed, so that the transmission signal is demodulated.

Here, as to the order of the hierarchical modulation, for example, it may be possible to perform the primary modulation first and the secondary modulation next, or vice versa. As to the demodulation also, it may be possible to perform demodulation for the secondary modulation first and demodulation for the primary modulation next, or vice versa. The demodulation for the hierarchical modulation may be performed in the same order as the hierarchical modulation, or may be different. Here, when the order of the hierarchical modulation is first the primary modulation and next the secondary modulation, in some cases, a better reception characteristic may be obtainable if demodulation for the secondary modulation is performed first, in comparison with a case when demodulation for the primary modulation is performed first.

Configuration Examples of a Base Station and a Terminal

Next, each configuration example of a base station 100 and a terminal 200 will be described. The description will be given on each configuration example of the base station 100 and the terminal 200 in the following order.

<1. Base station configuration examples>
<1.1 Base station configuration example which supports the orthogonal multiple access scheme>
<1.2 Base station configuration example which supports the non-orthogonal multiple access scheme>
<1.3 Base station configuration example which supports the orthogonal multiple access scheme in downlink direction and the non-orthogonal multiple access scheme in uplink direction>
<1.4 Base station configuration example which supports the non-orthogonal multiple access scheme in downlink direction and the orthogonal multiple access scheme in uplink direction>
<2. Terminal configuration examples>
<2.1 Terminal configuration example which supports the orthogonal multiple access scheme>
<2.2 Terminal configuration example which supports the non-orthogonal multiple access scheme>
<2.3 Terminal configuration example which supports the non-orthogonal multiple access scheme in downlink direction and the orthogonal multiple access scheme in uplink direction>
<2.4 Terminal configuration example which supports the orthogonal multiple access scheme in downlink direction and the non-orthogonal multiple access scheme in uplink direction>
<3. Base station configuration example which supports the orthogonal multiple access scheme and the non-orthogonal multiple access scheme>
<4. Terminal configuration example which supports the orthogonal multiple access scheme and the non-orthogonal multiple access scheme>
<5. Variation of 3 and 4>
<6. Terminal category table>
<1. Base Station Configuration Examples>

In regard to configuration examples of the base station 100, a description will be given using FIGS. 10 through 29.

<1.1 Base Station Configuration Example which Supports the Orthogonal Multiple Access Scheme>

Figure 10:
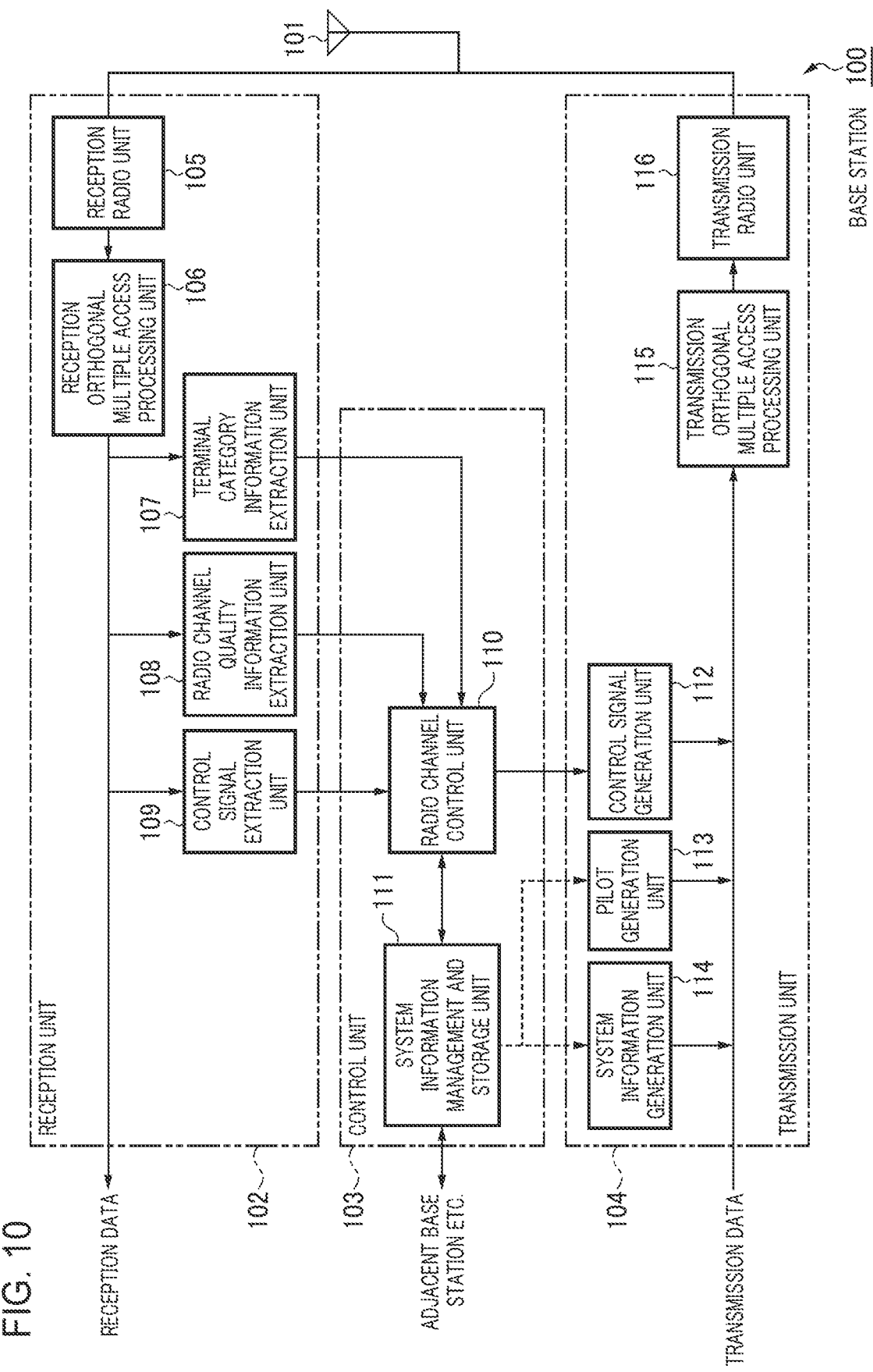
FIG. 10 is a diagram illustrating a configuration example of a base station.

FIGS. 10 through 17 are diagrams illustrating a configuration example etc. of a base station 100 which supports the orthogonal multiple access scheme. As depicted in FIG. 10, the base station 100 includes an antenna 101, a reception unit 102, a control unit 103 and a transmission unit 104. The reception unit 102 includes a reception radio unit 105, a reception orthogonal multiple access processing unit 106, a terminal category information extraction unit 107, a radio channel quality information extraction unit 108 and a control signal extraction unit 109. Also, the control unit 103 includes a radio channel control unit (or control unit, which may hereafter be referred to as a "radio channel control unit") 110 and a system information management and storage unit (which may hereafter be referred to as a "system information management unit") 111. Further, the transmission unit 104 includes a control signal generation unit 112, a pilot generation unit 113, a system information generation unit 114, a transmission orthogonal multiple access processing unit 115, and a transmission radio unit 116.

Here, the antenna 101, the reception radio unit 105, the reception orthogonal multiple access processing unit 106, the radio channel control unit 110, the transmission orthogonal multiple access processing unit 115 and the transmission radio unit 116 may configure a second communication unit which performs radio communication using the orthogonal multiple access scheme, for example.

The antenna 101 receives a radio signal transmitted from the terminal 200, so as to output the received radio signal to the reception radio unit 105. Also, the antenna 101 transmits to a terminal 200 a radio signal which is output from the transmission radio unit 116.

The reception radio unit 105 amplifies the radio signal and converts (down-converts) the radio signal in a radio band into a reception signal in a baseband. The reception radio unit 105 may include an amplifier circuit, a frequency conversion circuit, a BPF (Band Pass Filter), etc. The reception radio unit 105 outputs the reception signal to the reception orthogonal multiple access processing unit 106.

The reception orthogonal multiple access processing unit 106 performs processing to support the orthogonal multiple access scheme, on the reception signal to reproduce the transmission signal transmitted from the terminal 200. The reception orthogonal multiple access processing unit 106 outputs the reproduced transmission signal as the reception signal.

Figure 13:
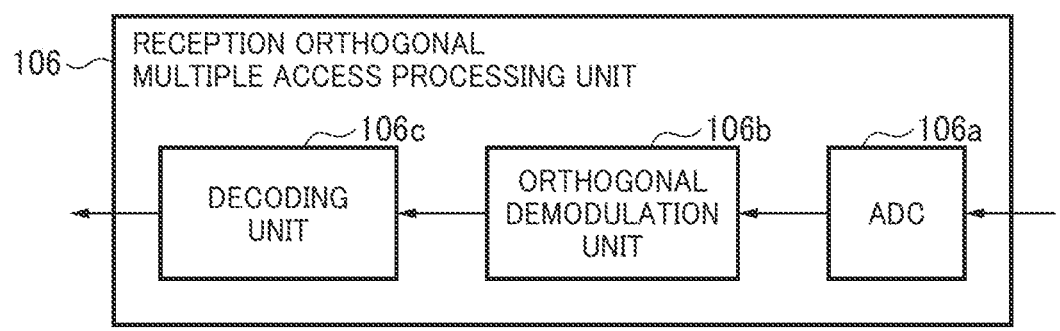
FIG. 13 is a diagram illustrating a configuration example of a reception orthogonal multiple access processing unit.

FIG. 13 is a diagram illustrating a configuration example of the reception orthogonal multiple access processing unit 106. The reception orthogonal multiple access processing unit 106 includes an ADC (Analog to Digital Converter) 106a, an orthogonal demodulation unit 106b and a demodulation unit 106.

The reception signal is converted from an analog signal to a digital signal by the ADC 106a, and by the orthogonal demodulation unit 106b, a signal transmitted from each terminal 200 is demodulated. By this, for example, the signal transmitted from each terminal 200 is demodulated, so that multiplexed signals are separated. The orthogonal demodulation unit 106b performs demodulation processing which supports the orthogonal multiple access scheme. Then, on the demodulated signal, error correction decoding processing is performed in the decoding unit 106c, so that the transmission signal transmitted from the terminal 200 is reproduced.

Figure 14:
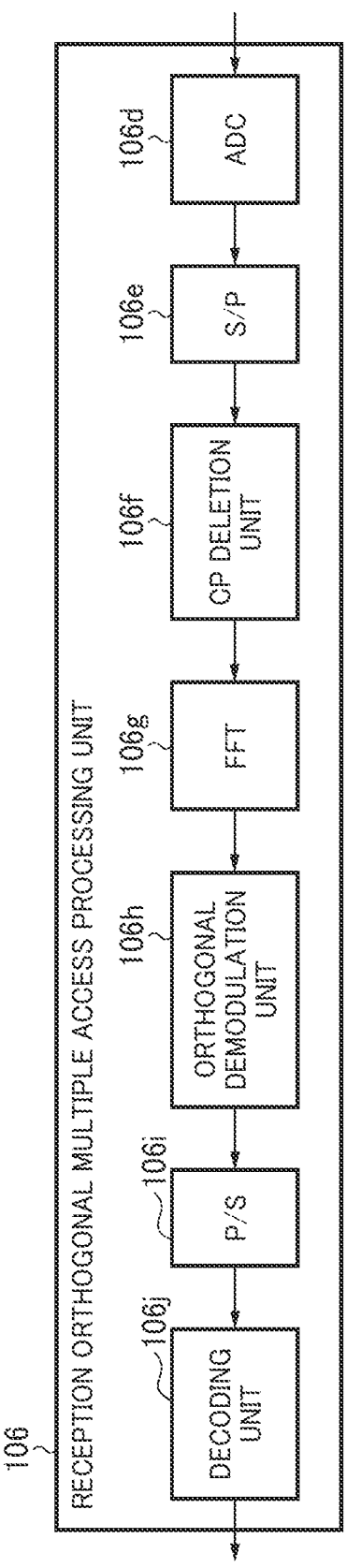
FIG. 14 is a diagram illustrating a configuration example of a reception orthogonal multiple access processing unit.

FIG. 14 is a diagram illustrating a configuration example of the reception orthogonal multiple access processing unit 106 when the orthogonal multiple access scheme is OFDMA. The reception orthogonal multiple access processing unit 106 includes an ADC 106d, an S/P (Serial to Parallel) 106e, a CP (Cyclic) deletion unit 106f, an FFT (Fast Fourier Transform) 106g, an orthogonal demodulation unit 106h, a P/S (Parallel to Serial) 106i and a decoding unit 106j.

The reception signal is converted from an analog signal to a digital signal, and then converted by the S/P 106e from a serial format digital signal to a parallel format digital signal. By this, the reception signal is separated into a time domain signal for each subcarrier. From the time domain signal, CP is removed by the CP deletion unit 106f, and the time domain signal is converted into a frequency domain signal by the FFT 106g. On the converted signal, demodulation processing which supports the orthogonal multiple access scheme is performed by the orthogonal demodulation unit 106h according to a modulation scheme scheduled by the radio channel control unit 110, so as to be converted into a demodulation signal, which is then converted in the P/S 106i from the demodulation signal of a parallel format to the demodulation signal of a serial format. On the serial format demodulation signal, error correction decoding processing is performed by the decoding unit 106j with a coding rate scheduled by the radio channel control unit 110, so that the transmission signal transmitted from the terminal 200 is reproduced.

Referring back to FIG. 10, the terminal category information extraction unit 107 receives the reception signal which is output from the reception orthogonal multiple access processing unit 106, to extract terminal category information from the received reception signal. The terminal category information extraction unit 107 outputs the extracted terminal category information to the radio channel control unit 110.

The radio channel quality information extraction unit 108 receives the reception signal being output from the reception orthogonal multiple access processing unit 106, to extract radio channel quality information from the received reception signal. The radio channel quality information extraction unit 108 outputs the extracted radio channel quality information to the radio channel control unit 110.

The control signal extraction unit 109 receives the reception signal being output from the reception orthogonal multiple access processing unit 106, to extract a control signal from the received reception signal. The control signal extraction unit 109 outputs the extracted control signal to the radio channel control unit 110.

The radio channel control unit 110 performs a variety of types of control including random access control, cell selection control, scheduling, and so on.

Figure 15:
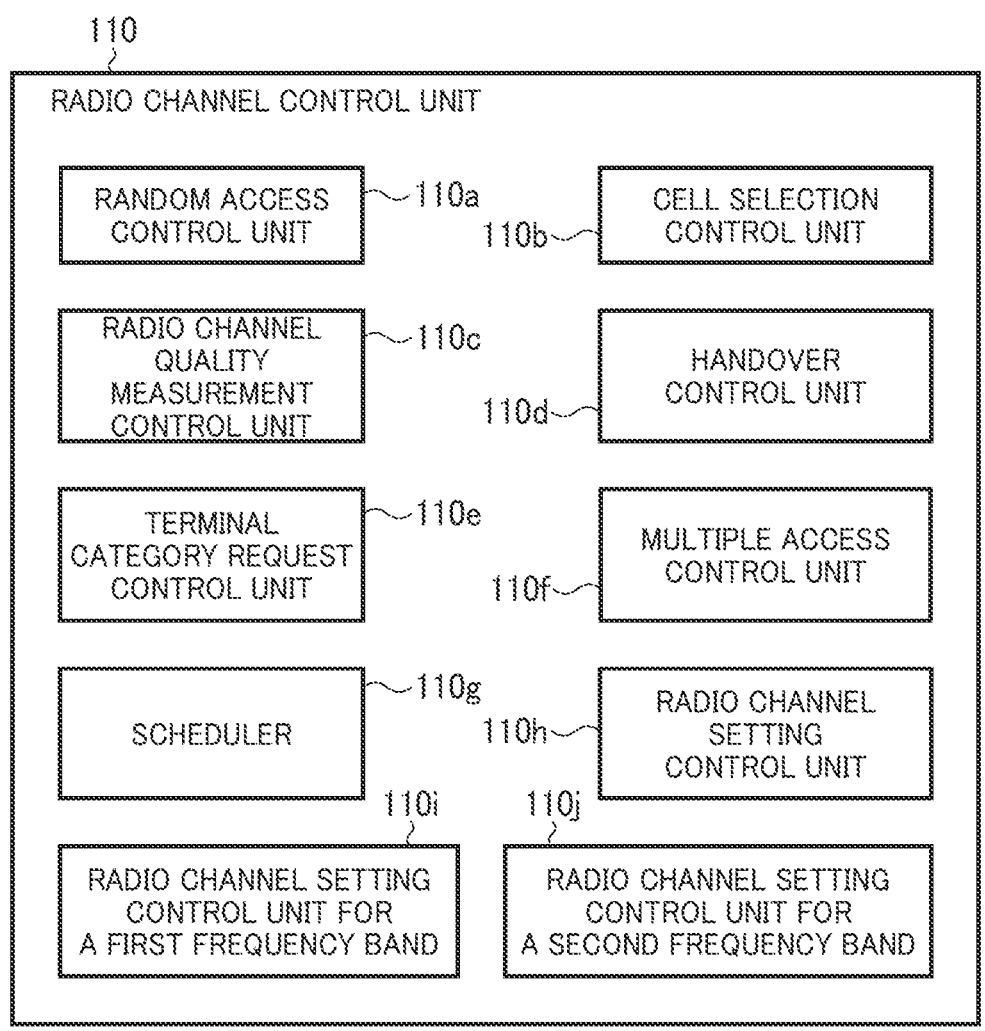
FIG. 15 is a diagram illustrating a configuration example of a radio channel control unit.

FIG. 15 is a diagram illustrating a configuration example of the radio channel control unit 110. The radio channel control unit 110 includes a random access control unit 110a, a cell selection control unit 110b, a radio channel quality measurement control unit 110c, a handover control unit 110d, a terminal category request control unit 110e, a multiple access control unit 110f and a scheduler 110g. The radio channel control unit 110 further includes a radio channel setting control unit 110h, a radio channel setting control unit 110i for a first frequency band, and a radio channel setting control unit 110j for a second frequency band.

The random access control unit 110a performs control related to a random access procedure which is performed when setting a radio channel between the base station 100 and the terminal 200. The cell selection control unit 110b performs control related to cell selection, such as the selection of a cell on the basis of received radio channel quality information. The radio channel quality measurement control unit 110c performs control related to the measurement of radio channel quality, including instructing the pilot generation unit 113 to generate a pilot signal so as to cause the terminal 200 to measure radio channel quality, and measuring radio channel quality on the basis of a pilot signal received in the reception radio unit 105, and the like. The handover control unit 110d performs control related to handover, including determining a base station which becomes a handover target of the terminal 200, and instructing the control signal generation unit 112 to generate and transmit a control signal for handover between with the terminal 200, and the like.

The terminal category request control unit 110e performs control related to a terminal category request, including instructing the control signal generation unit 112 to generate and transmit a control signal which requests the terminal 200 to transmit a terminal category.

The multiple access control unit 110f, for example, receives a terminal category from the terminal category information extraction unit 107, and based on the terminal category, verifies whether or not the terminal 200 supports the non-orthogonal multiple access scheme, or whether or not the terminal 200 supports the orthogonal multiple access scheme, or whether or not the terminal 200 supports both schemes. In this case, the multiple access control unit 110f may verify by accessing a category table of a terminal (which may hereafter be referred to as a "terminal category table"), which is stored in a memory etc., and by reading out terminal performance information corresponding to the terminal category.

In the terminal performance information, there are included, for example, information whether or not the terminal 200 supports the orthogonal multiple access scheme, or whether or not the terminal 200 supports the non-orthogonal multiple access scheme, or whether or not the terminal 200 supports both of the orthogonal multiple access scheme and the non-orthogonal multiple access scheme.

Alternatively, in the terminal performance information, it may be possible to include information which indicates the performance or capability of the terminal 200 concerning the non-orthogonal multiple access scheme, information which indicates the performance or capability of the terminal 200 concerning the orthogonal multiple access scheme, or information which indicates the performance or capability of the terminal 200 concerning both multiple access schemes.

Here, the terminal category table is a table in which, for example, the performance information and the terminal category of the terminal 200 are registered. Though an example of the terminal category table is illustrated in FIG. 74 etc., the details of which will be described later. The base station 100 and the terminal 200 retain the terminal category table of an identical content in each memory etc.

Referring back to FIG. 15, the scheduler 110*g* selects a terminal 200, a radio resource to be used for communication, a modulation scheme, a coding rate, etc., on the basis of the radio channel quality information, the terminal category, etc. The scheduler 110*g* outputs the selected radio resource etc. to the control signal generation unit 112, to instruct the control signal generation unit 112 to generate a control signal which includes such information.

The radio channel setting control unit 110*h* performs, for example, control related to radio channel setting to the terminal 200. The radio channel setting control unit 110*h* may perform, for example, control including changing and deleting a radio channel, adding a new radio channel, and so on.

The radio channel setting control unit 110*i* for a first frequency band performs control related to radio channel setting concerning a first frequency band when the base station 100 performs radio communication with the terminal 200 using CA, for example. The radio channel setting control unit 110*j* for a second frequency band performs control related to radio channel setting concerning a second frequency band when the base station 100 performs radio communication with the terminal 200 using CA, for example. The first frequency band may become a primary cell and the second frequency band may become a secondary cell, for example.

Referring back to FIG. 10, the system information management unit 111 stores, for example, system information to be used when the base station 100 performs a random access procedure between with the terminal 200. As the system information, there are the information of a random access preamble to be used in the random access procedure and so on, for example. The system information management unit 111 transmits the system information etc. to an adjacent base station etc., according to an instruction from the radio channel control unit 110.

The control signal generation unit 112, on receiving an instruction from the radio channel control unit 110, generates a control signal, so as to output the generated control signal to the transmission orthogonal multiple access processing unit 115.

The pilot generation unit 113, on receiving an instruction from the radio channel control unit 110, generates a pilot signal, so as to output the generated pilot signal to the transmission orthogonal multiple access processing unit 115.

The system information generation unit 114, on receiving an instruction from the radio channel control unit 110 or the system information management unit 111, outputs system information which is read out from the system information management unit 111 to the transmission orthogonal multiple access processing unit 115.

The transmission orthogonal multiple access processing unit 115 performs processing to support orthogonal multiple access processing for transmission data, the control signal, the pilot signal and the system information, to convert into each baseband signal and output the baseband signal.

Figure 11:
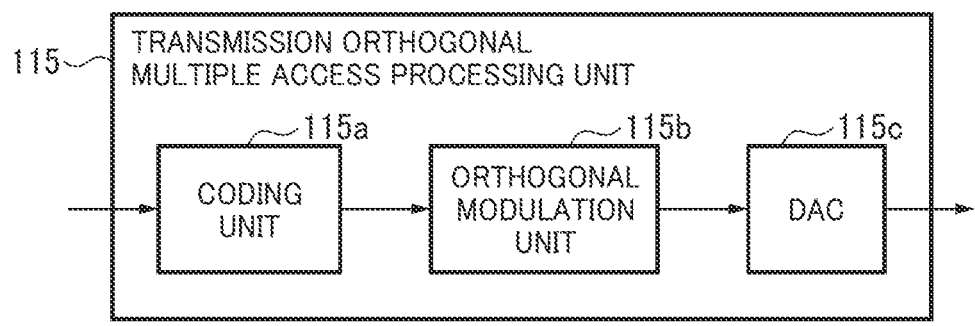
FIG. 11 is a diagram illustrating a configuration example of a transmission orthogonal multiple access processing unit.

FIG. 11 is a diagram illustrating a configuration example of the transmission orthogonal multiple access processing unit 115. The transmission orthogonal multiple access processing unit 115 includes a coding unit 115*a*, an orthogonal modulation unit 115*b* and a DAC (Digital to Analog Converter) 115*c*.

On the transmission data, the control signal, etc., error correction coding processing is performed by the coding unit 115*a* with a coding rate scheduled by the radio channel control unit 110. On the transmission data etc. on which error correction coding is performed, modulation processing to support the orthogonal multiple access scheme is performed according to a modulation scheme scheduled by the radio channel control unit 110, so that conversion into a modulation signal is performed. The modulation signal is converted by the DAC 115*c* from a digital signal to an analog signal. The converted analog signal is output from the DAC 115*c* as a baseband signal.

Figure 12:
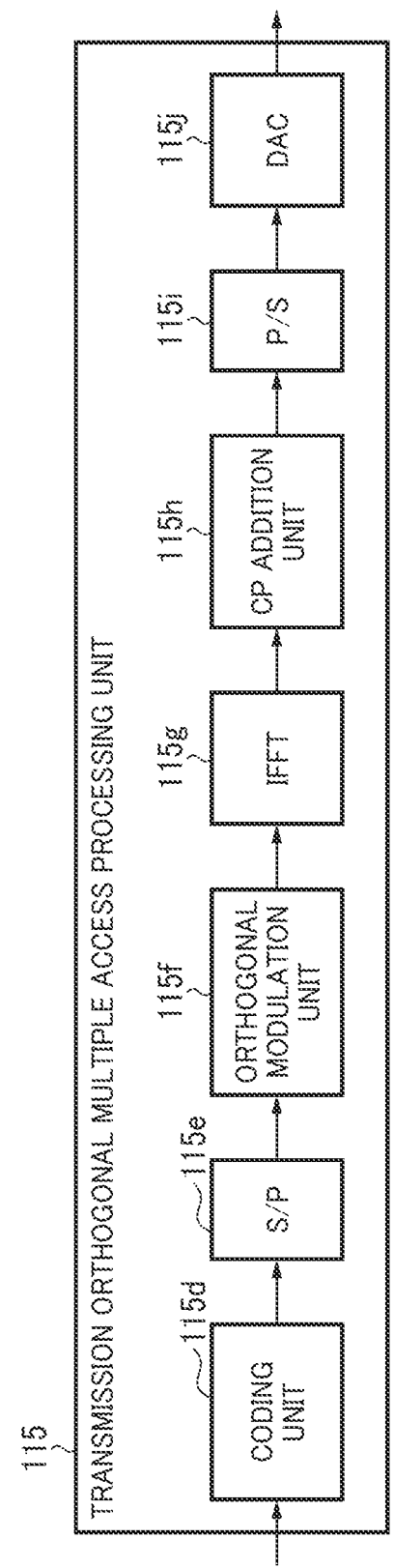
FIG. 12 is a diagram illustrating a configuration example of a transmission orthogonal multiple access processing unit.

FIG. 12 is a diagram illustrating a configuration example of the transmission orthogonal multiple access processing unit 115 when the orthogonal multiple access scheme is OFDMA. The transmission orthogonal multiple access processing unit 115 includes a coding unit 115*d*, an S/P 115*e*, an orthogonal modulation unit 115*f*, an IFFT (Inverse FFT) 115*g*, a CP addition unit 115*h*, a P/S 115*i* and a DAC 115*j*.

On the transmission data, the control signal, etc., error correction coding processing is performed in the coding unit 115*d*, and serial format data etc. are converted into parallel format data etc. in the S/P 115*e*, so as to become data for each subcarrier. On the data for each subcarrier etc., orthogonal modulation is performed in the orthogonal modulation unit 115*f*, so that conversion into a modulation signal is made, and the modulation signal is converted in the IFFT 115*g* from a frequency domain signal to a time domain signal. To the signal converted into the time domain, a CP is added in the CP addition unit 115*h*, and conversion is made from a parallel format signal to a serial format signal in the P/S 115*i*, and then, conversion is made from a digital signal to an analog signal in the DAC 115*j*. The DAC 115*j* outputs the converted analog signal as a baseband signal.

Referring back to FIG. 10, the transmission radio unit 116 converts (up-converts) the baseband signal, which is output from the transmission orthogonal multiple access processing unit 115, into a radio signal in a radio band, to amplify the radio signal. The transmission radio unit 116 may include an amplifier circuit, a frequency conversion circuit, a BPF, etc. The transmission radio unit 116 outputs the radio signal to the antenna 101.

The description of reception operation and transmission operation using the orthogonal multiple access scheme has been given. In the following description, the above operation is regarded to be identical unless otherwise noted, and therefore may be omitted. Additionally, it may be possible to add CRC to the control signal transmitted from the base station 100.

In the above, the configuration example of the base station 100 which supports the orthogonal multiple access scheme is described using FIG. 10. Here, the base station 100 which supports the orthogonal multiple access scheme as depicted in FIG. 10 is a configuration example when a terminal category is identified in the terminal 200. It may also be possible to configure to identify the terminal category in the base station 100.

Figure 16:
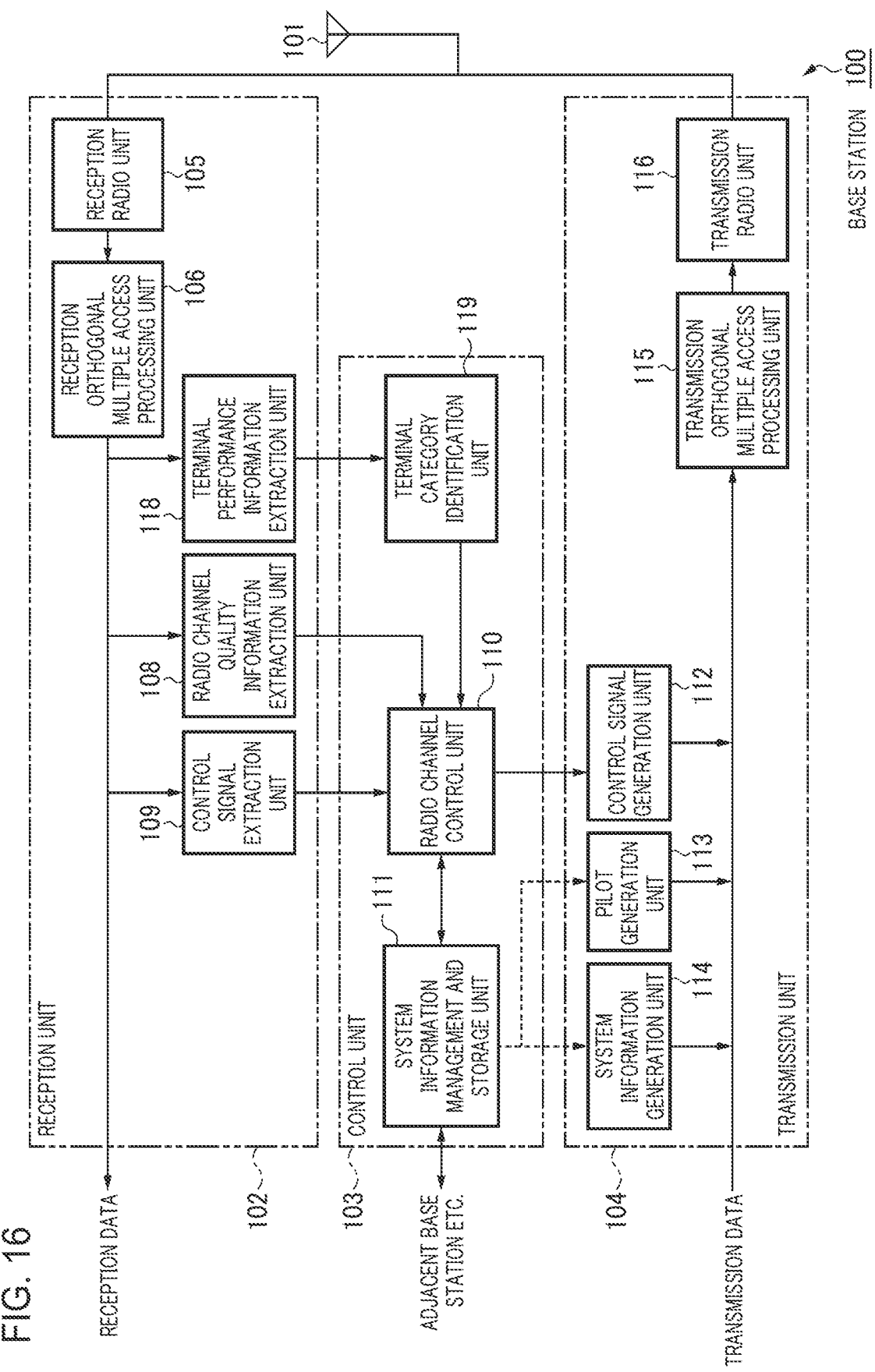
FIG. 16 is a diagram illustrating a configuration example of a base station.

FIG. 16 is a configuration example of the base station 100 when the base station 100 identifies a terminal category. The base station 100 further includes a terminal performance information extraction unit 118 and a terminal category identification unit 119.

The terminal performance information extraction unit 118 receives a reception signal being output from the reception orthogonal multiple access processing unit 106, to extract terminal performance information from the received reception signal. The terminal performance information extraction unit 118 outputs the extracted terminal performance information to the terminal category identification unit 119.

The terminal category identification unit 119 identifies the category of the terminal 200 on the basis of the terminal performance information. Namely, the terminal category identification unit 119 identifies the terminal category of the terminal 200 on the basis of at least one of information, which indicates the performance or capability of the terminal 200 concerning the non-orthogonal multiple access scheme, and information which indicates the performance or capability of the terminal 200 concerning the orthogonal multiple access scheme. For example, the terminal category identification unit 119 accesses a terminal category table stored in a memory, and reads out a terminal category corresponding to the terminal performance information from the terminal category table, so as to perform identification. The memory may be provided, for example, in the terminal category identification unit 119 or may be provided in the base station 100. The terminal category identification unit 119 outputs the identified terminal category to the radio channel control unit 110. The terminal category identification unit 119 corresponds to, for example, the identification unit 150 in the first embodiment, to become an identification unit to identify the category of the terminal 200.

The base station 100 depicted in FIG. 16 receives the terminal performance information transmitted from the terminal 200, to identify the terminal category on the basis of the terminal performance information. Also, the base station 100 can perform radio communication with the terminal 200 using the orthogonal multiple access scheme. Therefore, the terminal category identification unit 119 may identify the category of the terminal 200 on the basis of information which indicates the performance or capability of the terminal 200 concerning the non-orthogonal multiple access scheme.

Figure 17:
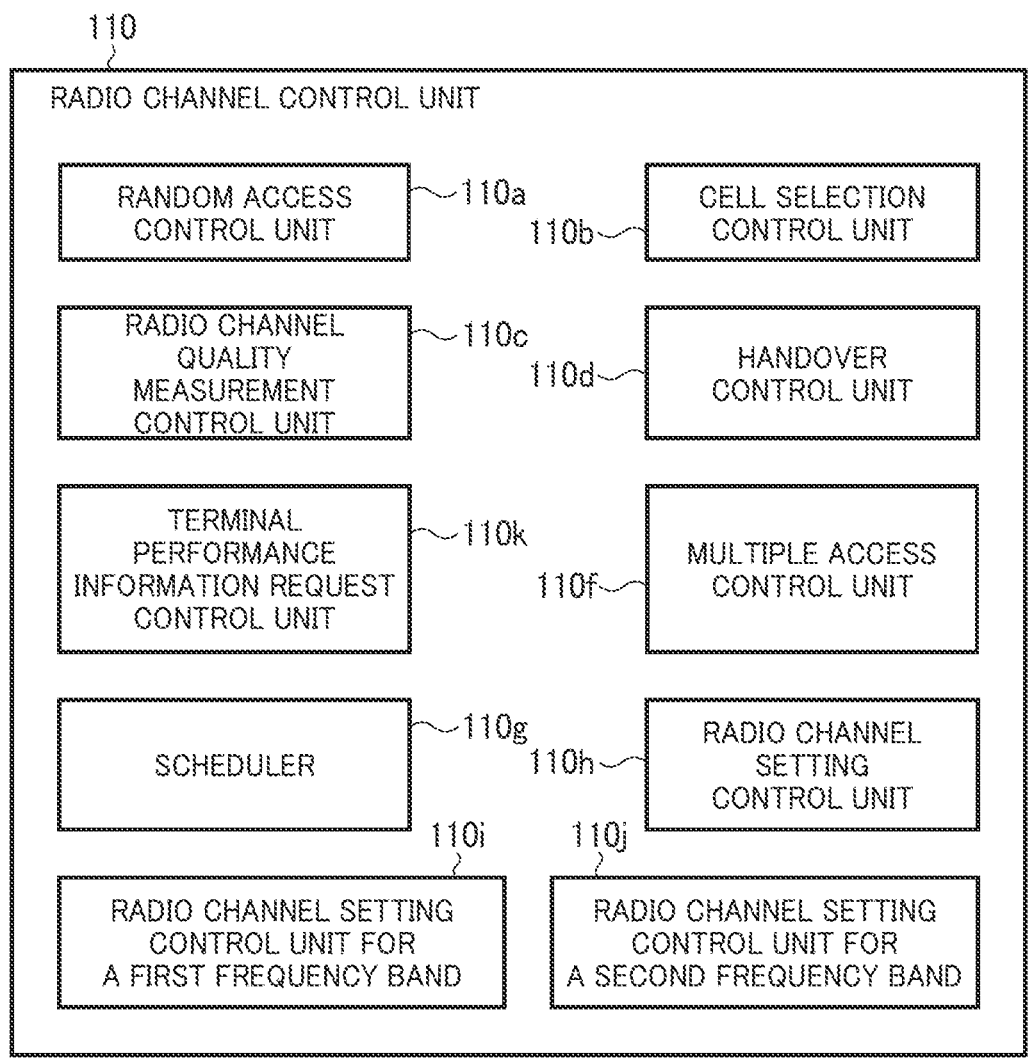
FIG. 17 is a diagram illustrating a configuration example of a radio channel control unit.

FIG. 17 is a diagram illustrating a configuration example of the radio channel control unit 110 in the base station 100 depicted in FIG. 16. The radio channel control unit 110 further includes a terminal performance information request control unit 110k.

The terminal performance information request control unit 110k performs control related to requesting terminal performance information, such as instructing the control signal generation unit 112 to generate a control signal for requesting the terminal 200 to transmit terminal performance information, etc.

As having been described above, the base station 100 may receive from the terminal 200 the terminal category identified by the terminal 200 (for example, FIG. 10), or may identify the category of the terminal 200 on the basis of the terminal performance information transmitted from the terminal 200 (for example, FIG. 16). For example, the base station 100, after identifying the terminal category, may hand over the terminal 200 to a base station which supports the non-orthogonal multiple access scheme, or may perform processing such as adding CC which supports the orthogonal multiple access scheme. The details of such processing will be described in operation examples.

<1.2 Base Station Configuration Example which Supports the Non-Orthogonal Multiple Access Scheme>

Figure 18:
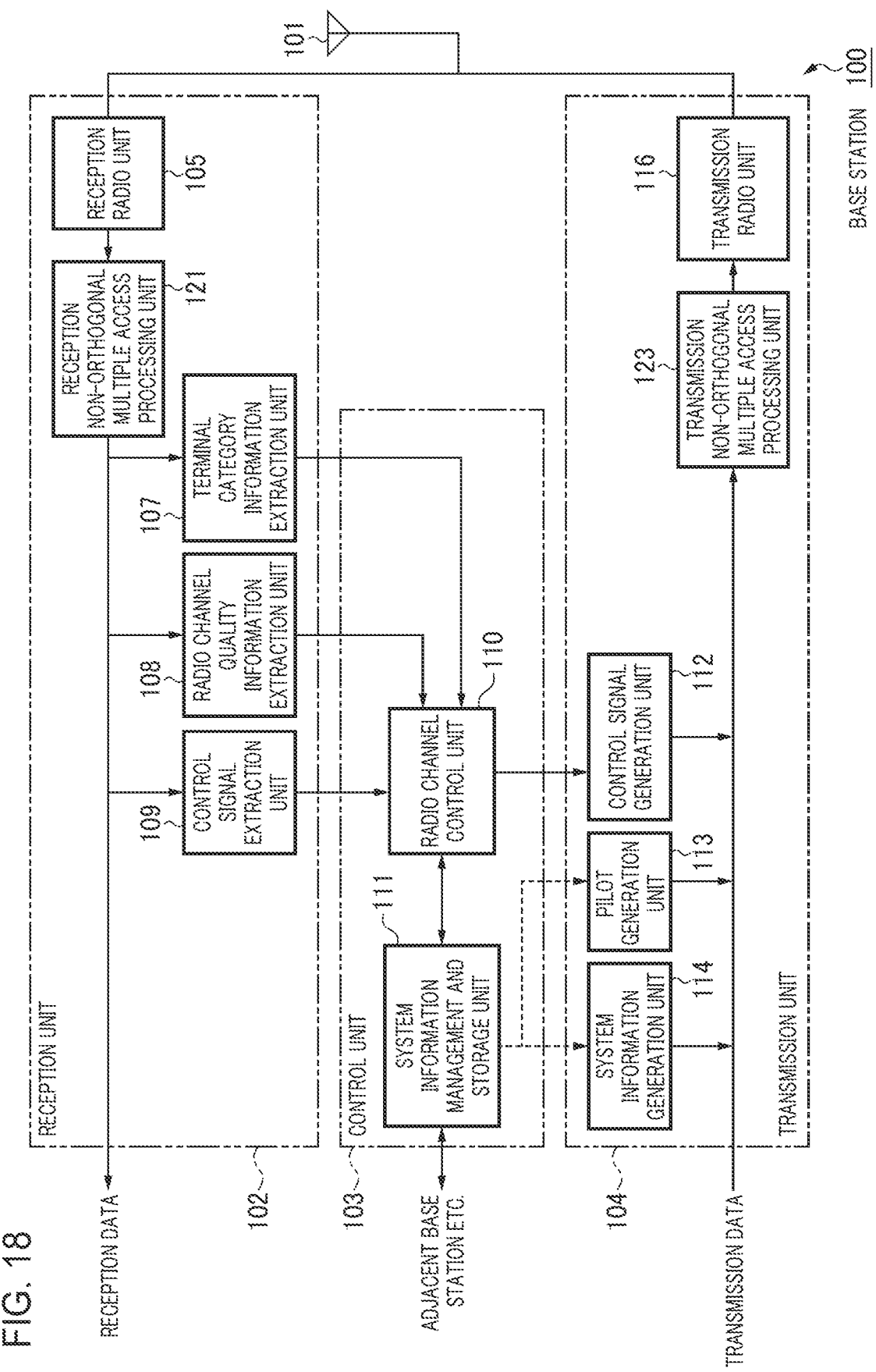
FIG. 18 is a diagram illustrating a configuration example of a base station.

FIG. 18 is a diagram illustrating a configuration example of a base station 100 which supports the non-orthogonal multiple access scheme. FIG. 18 illustrates a configuration example of the base station 100 when a terminal category is identified in a terminal 200.

The base station 100 further includes a reception non-orthogonal multiple access processing unit 121 and a transmission non-orthogonal multiple access processing unit 123.

Here, the antenna 101, the reception radio unit 105, the reception non-orthogonal multiple access processing unit 121, the radio channel control unit 110, the transmission non-orthogonal multiple access processing unit 123 and the transmission radio unit 116 may be a first communication unit which performs radio communication using the non-orthogonal multiple access scheme, for example.

The reception non-orthogonal multiple access processing unit 121 performs processing to support the non-orthogonal multiple access scheme, on a reception signal which is output from the reception radio unit 105, to separate a multiplex signal included in the reception signal and reproduce a transmission signal. The reception non-orthogonal multiple access processing unit 121 outputs the reproduced transmission signal as the reception signal.

Also, the transmission non-orthogonal multiple access processing unit 123 performs processing to support the non-orthogonal multiple access scheme, on transmission data, a control signal, a pilot signal and system information, to convert into a baseband signal and output the baseband signal.

First, the details of the transmission non-orthogonal multiple access processing unit 123 will be described, and next, the details of the reception non-orthogonal multiple access processing unit 121 will be described.

Figure 19:
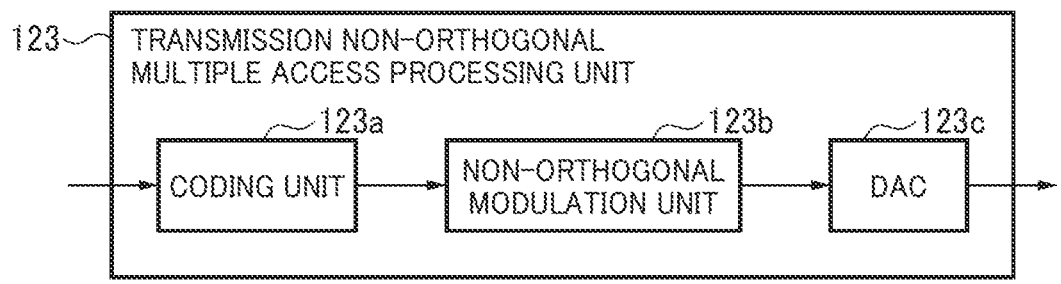
FIG. 19 is a diagram illustrating a configuration example of a transmission non-orthogonal multiple access processing unit.

FIG. 19 is a diagram illustrating a configuration example of the transmission non-orthogonal multiple access processing unit 123. The transmission non-orthogonal multiple access processing unit 123 includes a coding unit 123*a*, a non-orthogonal modulation unit 123*b* and a DAC 123*c*.

The coding unit 123*a* inputs the transmission data, the control signal, the pilot signal, the system information, etc., to perform error correction coding processing on the data, the signals, etc. according to a coding rate etc. scheduled in the radio channel control unit 110, to convert into coded data.

The non-orthogonal modulation unit 123*b* performs modulation processing to support the non-orthogonal multiple access scheme, on the coded data output from the coding unit 123*a*. As such modulation processing, for example, there is processing for the hierarchical modulation (which may hereafter be referred to as "hierarchical modulation processing"). In the following, a description will be given taking the hierarchical modulation processing, as an example. In the embodiments thereafter, similarly, examples of the hierarchical modulation processing will be described.

Figure 20:
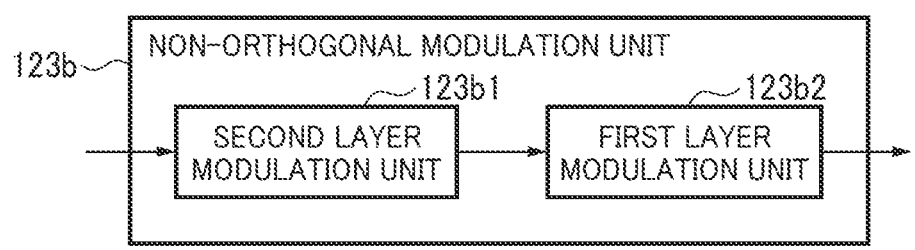
FIG. 20 is a diagram illustrating a configuration example of a non-orthogonal modulation unit.

FIG. 20 is a diagram illustrating a configuration example of the non-orthogonal modulation unit 123b. The non-orthogonal modulation unit 123b includes a second layer modulation unit (or secondary modulation unit, which may hereafter be referred to as a "second layer modulation unit") 123b1 and a first layer modulation unit (or primary modulation unit, which may hereafter be referred to as "first layer modulation unit") 123b2.

The second layer modulation unit 123b1 performs the processing of the secondary modulation (or second layer modulation, which may hereafter be referred to as "secondary modulation"), such as QPSK, on the coded transmission data etc. (which may hereafter be referred to as "coded data"), so as to convert into a secondary modulation signal.

The first layer modulation unit 123b2 performs, on the secondary modulation signal output from the second layer modulation unit 123b1, the processing of the primary modulation (or first layer modulation, which may hereafter be referred to as "primary modulation"), such as 16QAM, to convert into a primary modulation signal. The first layer modulation unit 123b2 outputs the primary modulation signal.

Figure 21:
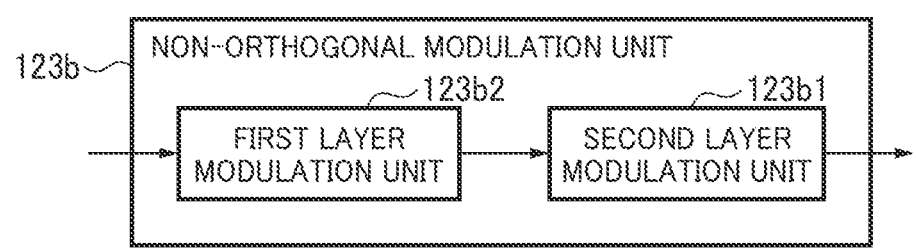
FIG. 21 is a diagram illustrating a configuration example of a non-orthogonal modulation unit.

FIG. 21 is a diagram illustrating another configuration example of the non-orthogonal modulation unit 123b. As depicted in FIG. 21, it may be possible to configure such that firstly the first layer modulation unit 123b2 performs the processing of the primary modulation on the coded data etc., and next, the second layer modulation unit 123b1 performs the processing of the secondary modulation on the primary modulation signal to output the secondary modulation signal.

As to the order of the first layer modulation unit 123b2 and the second layer modulation unit 123b1 in the non-orthogonal modulation unit 123b, whichever may be executed first.

Referring back to FIG. 19, the non-orthogonal modulation unit 123b outputs to the DAC 123c the primary modulation signal or the secondary modulation signal (hereinafter, the primary modulation signal or the secondary modulation signal may be referred to as "modulation signal"). The DAC 123c converts the modulation signal from a digital signal to an analog signal, to output the converted analog signal as a baseband signal.

Figure 22:
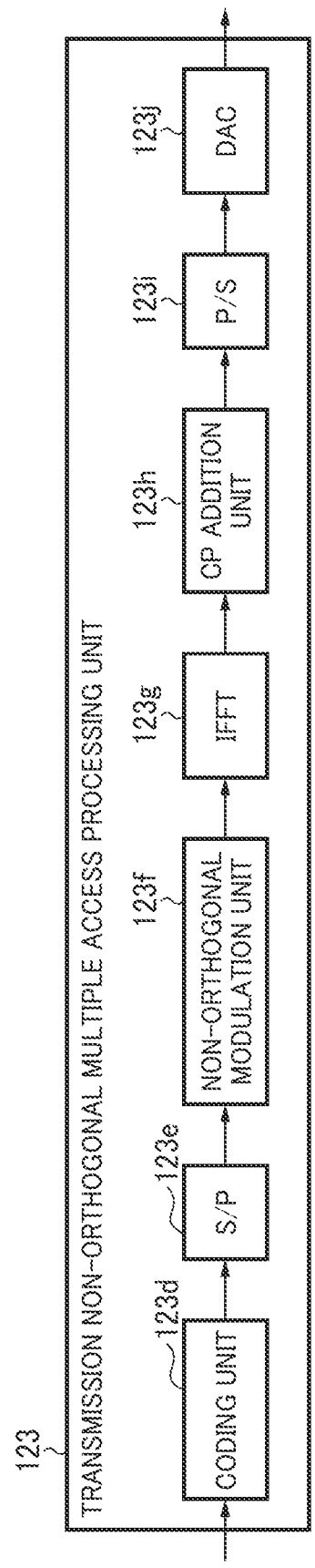
FIG. 22 is a diagram illustrating a configuration example of a transmission non-orthogonal multiple access processing unit.

FIG. 22 is a diagram illustrating another configuration example of the transmission non-orthogonal multiple access processing unit 123. The transmission non-orthogonal multiple access processing unit 123 includes a coding unit 123d, an S/P 123e, an non-orthogonal modulation unit 123f, an IFFT 123g, a CP addition unit 123h, a P/S 123i and a DAC 123j.

The transmission data, the pilot signal, the system information, etc. are input to the coding unit 123d, and after error correction coding processing is performed in the coding unit 123d, converted into coded data. The coded data is converted in the S/P 123e from the coded data of a serial format to the coded data of a parallel format, so as to be converted into coded data for each subcarrier. On the coded data for each subcarrier, hierarchical modulation processing is performed in the non-orthogonal modulation unit 123f, so that conversion into a modulation signal is performed. The non-orthogonal modulation unit 123f may be the non-orthogonal modulation unit 123b as depicted in FIGS. 20 and 21, for example. The modulation signal is converted in the IFFT 123g from the signal of a frequency domain to a time domain, and in the CP addition unit 123h, a CP is added to the time domain signal. The signal to which the CP is added is converted in the P/S 123i from a parallel format signal to a serial format signal, and in the DAC 123j, the time domain signal in the serial format is converted from a digital signal to an analog signal. The transmission non-orthogonal multiple access processing unit 123 outputs the analog signal, which is output from the DAC 123j, as a baseband signal.

Figure 23:
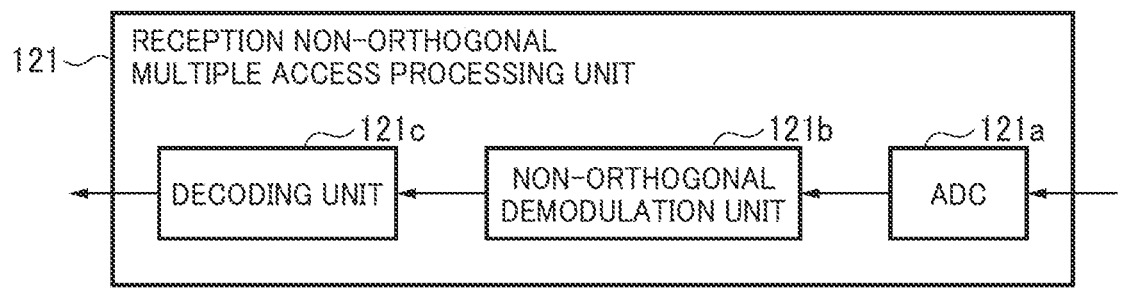
FIG. 23 is a diagram illustrating a configuration example of a reception non-orthogonal multiple access processing unit.

Referring back to FIG. 18, next, the details of the reception non-orthogonal multiple access processing unit 121 will be described. FIG. 23 is a diagram illustrating a configuration example of the reception non-orthogonal multiple access processing unit 121. The reception non-orthogonal multiple access processing unit 121 includes an ADC 121a, a non-orthogonal demodulation unit 121b and a decoding unit 121c.

The ADC 121a converts the baseband signal, which is output from the reception radio unit 105, from the analog signal to a digital signal.

The non-orthogonal demodulation unit 121b performs demodulation processing to support the non-orthogonal multiple access scheme, on the digital signal output from the ADC 121a. As such processing, there is the processing of hierarchical demodulation (which may hereafter be referred to as "hierarchical demodulation processing"), for example. By the hierarchical demodulation processing, for example, each signal transmitted from a plurality of terminals 200 can be separated. In this case, the non-orthogonal demodulation unit 121b can also perform the processing of interference suppression, such as SIC.

Figure 24:
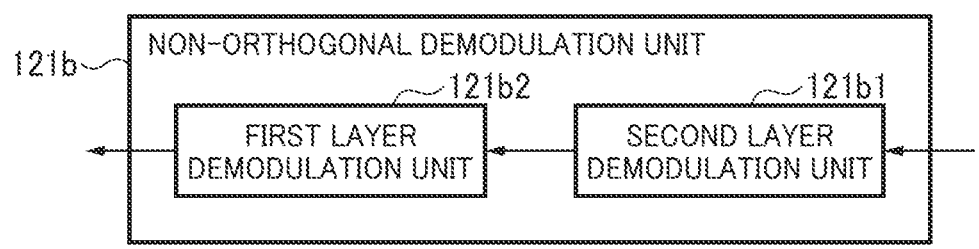
FIG. 24 is a diagram illustrating a configuration example of a non-orthogonal demodulation unit.

FIG. 24 is a diagram illustrating a configuration example of the non-orthogonal demodulation unit 121b. The example depicted in FIG. 24 illustrates an example of performing demodulation processing on a hierarchically modulated signal (which may hereafter be referred to as "hierarchical demodulation processing"), as an example of the non-orthogonal demodulation. In the following embodiments also, examples of the hierarchical demodulation processing will be described.

The non-orthogonal demodulation unit 121b includes a second layer demodulation unit (or secondary demodulation unit, which may hereafter be referred to as "second layer demodulation unit") 121b1 and a first layer demodulation unit (or primary demodulation unit, which may hereafter be referred to as "first layer demodulation unit") 121b2.

The second layer demodulation unit 121b performs, on the digital signal output from the ADC 121a, the processing of the secondary demodulation (or second layer demodulation, which may hereafter be referred to as "secondary demodulation") such as QPSK, to demodulate a secondary signal included in the digital signal, so as to output as a secondary demodulation signal.

The first layer demodulation unit 121b2 performs, on the secondary demodulation signal, primary demodulation (or first layer demodulation, which may hereafter be referred to as "primary demodulation"), such as 16QAM, to demodulate a primary signal included in the digital signal, so as to output as a primary demodulation signal.

For example, the second layer demodulation unit 121b1 may perform the processing of interference suppression on the primary signal, which is regarded as an interference signal, so that may demodulate or reproduce a secondary signal included in the digital signal. Also, for example, the first layer demodulation unit 121b2 may perform the processing of interference suppression on the secondary signal, which is regarded as an interference signal, so that may demodulate or reproduce a primary signal included in the digital signal.

Figure 25:
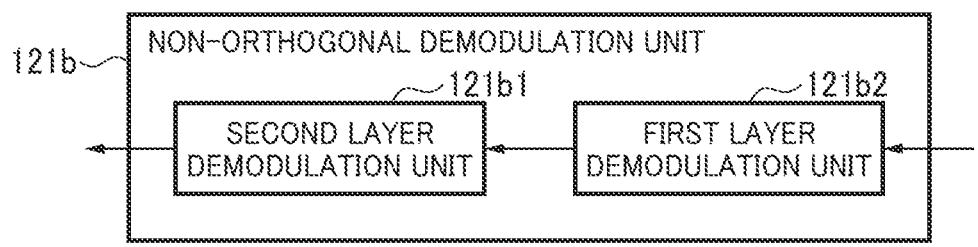
FIG. 25 is a diagram illustrating a configuration example of a non-orthogonal demodulation unit.

FIG. 25 is a diagram illustrating another configuration example of the non-orthogonal demodulation unit 121b. Similar to the hierarchical modulation, it may be possible to perform the processing of the primary demodulation in the first layer demodulation unit 121b2 first, and thereafter, the processing of the secondary demodulation in the second layer demodulation unit 121b1. As to a processing order by the first layer demodulation unit 121b2 and the second layer demodulation unit 121b1, whichever may be executed first.

The non-orthogonal demodulation unit 121b performs hierarchical demodulation processing on the digital signal output from the ADC 121 to output a secondary demodulation signal and a primary demodulation signal (which may hereafter be referred to as "demodulation signal"). In this case, for example, the primary demodulation signal may be a demodulation signal corresponding to a signal transmitted from UE2, which is located in a close distance from the base station 100, and the secondary demodulation signal may be a demodulation signal corresponding to a signal transmitted from UE1 which is located in a far distance from the base station 100, or may be vice versa.

Referring back to FIG. 23, the decoding unit 121c performs, on the demodulation signal output from the non-orthogonal demodulation unit 121b, error correction decoding processing according to a coding rate etc. scheduled in the radio channel control unit 110, to reproduce the transmission signal transmitted from each terminal 200. The demodulation unit 121c outputs the reproduced transmission signal as a reception signal. In this case, in the reproduced transmission signal, reception data, terminal category information, radio channel quality information, control signal, etc., which are transmitted from each terminal 200 and received in the base station 100, may be included.

Figure 26:
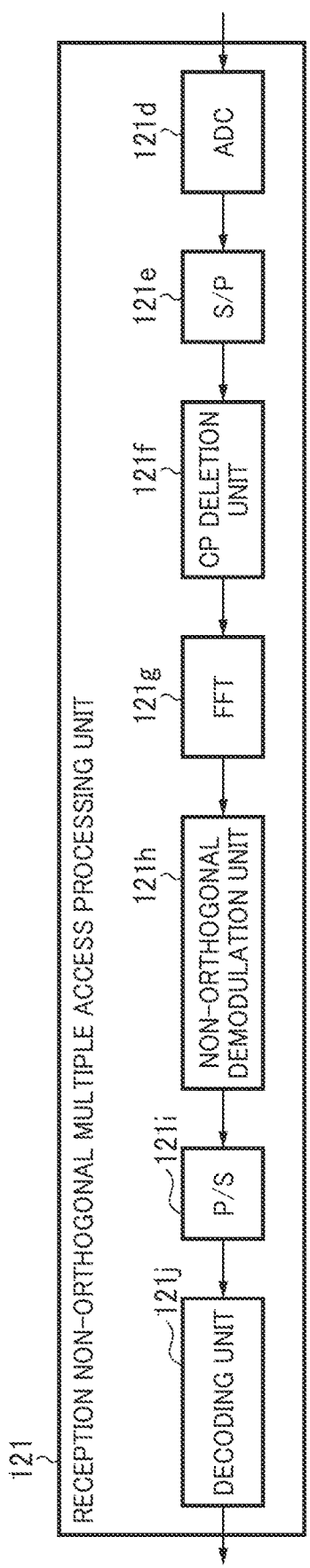
FIG. 26 is a diagram illustrating a configuration example of a reception non-orthogonal multiple access processing unit.

FIG. 26 is a diagram illustrating another configuration example of the reception non-orthogonal multiple access processing unit 121. The reception non-orthogonal multiple access processing unit 121 includes an ADC 121d, an S/P 121e, a CP deletion unit 121f, an FFT 121g, a non-orthogonal demodulation unit 121h, a P/S 121i and a decoding unit 121j.

A baseband signal output from the reception radio unit 105 is converted, in the ADC 121d, from an analog signal to a digital signal, and in the S/P 121e, the digital signal of a serial format is converted into the digital signal of a parallel format. In the CP deletion unit 121f, a CP is deleted from the parallel format digital signal, and in the FFT 121g, conversion from a time domain signal to a frequency domain signal is performed. On the frequency domain signal, hierarchical demodulation is performed in the non-orthogonal demodulation unit 121h, so that conversion to a demodulation signal is performed. The non-orthogonal demodulation unit 121h may be, for example, the non-orthogonal demodulation unit 121b as depicted in FIGS. 24 and 25. The demodulation signal is converted, in the P/S 121i, from the parallel format signal to a serial format signal, and on the serial format signal, error correction decoding processing is performed in the decoding unit 121j, so that the transmission signal transmitted from each terminal 200 is reproduced. The reception non-orthogonal multiple access processing unit 121 outputs the reproduced transmission signal as a reception signal.

In the above, the description has been given on the configuration example of the transmission non-orthogonal multiple access processing unit 123 taking FIGS. 19 through 21 as examples, and also on the configuration example of the reception non-orthogonal multiple access processing unit 121, taking FIGS. 23 through 25 as examples. As to the non-orthogonal modulation unit 123b of the transmission non-orthogonal multiple access processing unit 123 as depicted in FIGS. 20 and 21, for example, it may be possible to perform modulation processing which supports the orthogonal multiple access scheme, if either one of the second layer modulation unit 123b1 and the first layer modulation unit 123b2 is canceled. Also, as to the non-orthogonal demodulation unit 121b of the reception non-orthogonal multiple access processing unit 121, for example, it may be possible to perform demodulation processing which supports the orthogonal multiple access scheme if either one of the first layer demodulation unit 121b2 and the second layer demodulation unit 121b1 is canceled.

By such cancellation, the base station 100 which supports the non-orthogonal multiple access scheme may perform processing to support the orthogonal multiple access scheme, for example, so that may perform communication with a terminal 200 which supports the orthogonal multiple access scheme, not only with a terminal 200 which supports the non-orthogonal multiple access scheme.

Figure 27:
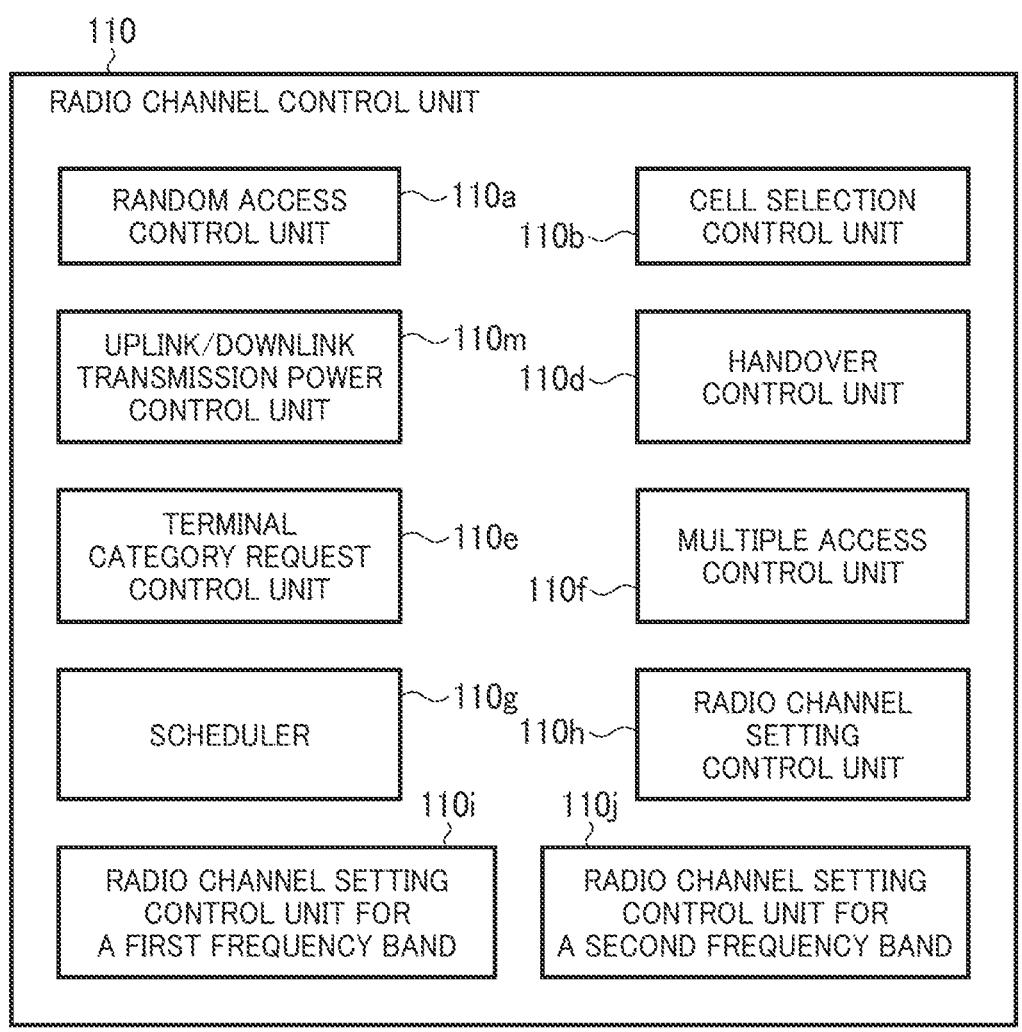
FIG. 27 is a diagram illustrating a configuration example of a radio channel control unit.

FIG. 27 is a diagram illustrating a configuration example of the radio channel control unit 110. The radio channel control unit 110 further includes an uplink/downlink transmission power control unit (which may hereafter be referred to as a "transmission power control unit") 110m.

The transmission power control unit 110m performs transmission power control between with each terminal 200 (or each user).

The transmission power control unit 110m performs transmission power control with respect to a downlink direction, for example, as follows. Namely, the transmission power control unit 110m instructs the pilot generation unit 113 to generate a pilot signal and transmit to the terminal 200. The radio channel quality information extraction unit 108 extracts downlink transmission power control information from a reception signal. The downlink transmission power control information includes, for example, control information measured in the terminal 200 based on the pilot signal. As such control information, for example, there is a control amount which indicates to the base station 100 how much amount of the transmission power is to be increased in order to obtain a target SIR at the terminal 200. Alternatively, as control information, there is a control amount which indicates to the base station 100 how much amount of the transmission power is to be decreased in order to obtain a target SIR as compared to an SIR which becomes excessive at the terminal 200. The radio channel quality information extraction unit 108 outputs the extracted downlink transmission power control information to the radio channel control unit 110. The transmission power control unit 110m determines a transmission power value for data etc. to be transmitted to the terminal 200, on the basis of the control amount included in the downlink transmission power control information, for example. The transmission power value becomes transmission power to the terminal 200 when the transmission power control is performed in the non-orthogonal multiple access scheme, for example. The transmission power control unit 110m determines a transmission power value on the basis of the downlink transmission power control information with respect to another terminal 200a. This enables the transmission of a radio signal with the transmission power for each UE according to the location of UE, as depicted in FIG. 4, for example. The transmission power control unit 110m may instruct the control signal generation unit 112 to generate a control signal which includes each determined transmission power value.

Further, the transmission power control unit 110*m* outputs an instruction signal, including a coefficient which is different user-by-user, to the coding unit 123*a* (for example, FIG. 19) of the transmission non-orthogonal multiple access processing unit 123. The coding unit 123*a* extracts the coefficient from the instruction signal, to multiply the coefficient with respect to each user data and a signal before coding or after coding. By this, for example, a signal output from the transmission radio unit 116 comes to have transmission power which is different user-by-user, as depicted in FIG. 4. Alternatively, the transmission power control unit 110*m* may output an instruction signal to the non-orthogonal modulation unit 123*b*, so that the non-orthogonal modulation unit 123*b* may multiply a coefficient, which is included in the instruction signal, with respect to data and a signal before modulation, to obtain transmission power which is different user-by-user. Alternatively, the transmission power control unit 110*m* may output an instruction signal to the transmission radio unit 116 (for example, FIG. 18), so that in an amplifier circuit included in the transmission radio unit 116, processing such as multiplying a coefficient may be performed in order to obtain different transmission power with respect to each signal destined to each terminal 200. Alternatively, in the case of the transmission non-orthogonal multiple access processing unit 123 depicted in FIG. 22, the transmission power control unit 110*m* may output each instruction signal to the coding unit 123*d*, the S/P 123*e*, the non-orthogonal modulation unit 123*f*, etc., so that processing of multiplying a coefficient which is different user-by-user, or the like, may be performed in the coding unit 123*d* etc.

The transmission power control unit 110*m* performs transmission power control in regard to the uplink direction, for example as follows. Namely, the transmission power control unit 110*m* receives a pilot signal output from the reception non-orthogonal multiple access processing unit 121. The pilot signal is a signal transmitted from the terminal 200. Based on the received pilot signal, the transmission power control unit 110*m* measures transmission power control information in the uplink direction. The uplink transmission power control information includes, for example, control information which is measured in the base station 100, based on the pilot signal. As such control information, for example, there is a control amount which indicates to the terminal 200 how much amount of the transmission power is to be increased in order to obtain a target SIR at the base station 100. Alternatively, as such control information, there is a control amount which indicates to the terminal 200 how much transmission power is to be decreased in order to obtain a target SIR as compared to an SIR which becomes excessive at the base station 100. The transmission power control unit 110*m* determines a transmission power value at the transmission of data etc. from the terminal 200, on the basis of a control amount included in the uplink transmission power control information, for example. The uplink transmission power becomes the transmission power of data etc. to be transmitted from the terminal 200 when transmission power control is performed in the non-orthogonal multiple access scheme, for example. The transmission power control unit 110*m* determines a transmission power value, on the basis of the uplink transmission power control information for another terminal 200*a*. This enables UE to perform radio signal transmission with transmission power for each UE according to the location of the UE, as depicted in FIG. 4, for example. The transmission power control unit 110*m* may instruct the control signal generation unit 112 to generate a control signal including each determined transmission power value.

In the above, the description has been given on the configuration example of the base station 100 which supports the non-orthogonal multiple access scheme. Here, the base station 100, as depicted in FIG. 18, which supports the non-orthogonal multiple access scheme is a configuration example when the terminal category is identified in the terminal 200. It may also be possible to identify the terminal category in the base station 100. In this case, the terminal category can be identified in the base station 100 by replacing, in the base station 100 as depicted in FIG. 16, for example, the reception orthogonal multiple access processing unit 106 and the transmission orthogonal multiple access processing unit 115 with the reception non-orthogonal multiple access processing unit 121 and the transmission non-orthogonal multiple access processing unit 123, respectively.

In this case, the terminal category identification unit 119 may identify the category of the terminal 200 on the basis of information which indicates the performance or capability of the terminal 200 concerning the orthogonal multiple access scheme, for example.

As having been described above, in the base station 100 which supports the non-orthogonal multiple access scheme, the terminal category identified in the terminal 200 may be received from the terminal 200. Also, in the base station 100 which supports the non-orthogonal multiple access scheme, the terminal category may be identified on the basis of the terminal performance information transmitted from the terminal 200. Based on the terminal category, the base station 100 may perform radio communication, in which the non-orthogonal multiple access scheme is supported, with the terminal 200, the handover of the terminal 200 to a base station which supports the orthogonal multiple access scheme, and processing to add CC which supports the non-orthogonal multiple access scheme, and so on. The details of such processing will be described in the operation examples.

Further, it is possible to perform processing to change at least one CC to a CC which supports the non-orthogonal multiple access scheme, during the execution of communication in which a plurality of CC, which use the orthogonal multiple access scheme, are used simultaneously. Also, it is possible to perform processing to change at least one CC to a CC which supports the orthogonal multiple access scheme, during the execution of communication in which a plurality of CC, which use the non-orthogonal multiple access scheme, are used simultaneously. Such CC of a change target may be either a primary cell or a secondary cell, for example.

Further, it is possible to perform such processing as deleting at least one CC during the execution of communication in which a plurality of CC, which use the orthogonal multiple access scheme, are used simultaneously, or deleting at least one CC during the execution of communication in which a plurality of CC, which use the non-orthogonal multiple access scheme, are used simultaneously. Still further, it is possible to perform such processing as deleting at least one CC during the execution of communication in which a plurality of CC, which use the orthogonal multiple access scheme and the non-orthogonal multiple access scheme, are used simultaneously. Such CC of a deletion target may be either a primary cell or a secondary cell, for example.

<1.3 Base Station Configuration Example which Supports the Orthogonal Multiple Access Scheme in Downlink Direction and the Non-Orthogonal Multiple Access Scheme in Uplink Direction>

Figure 28:
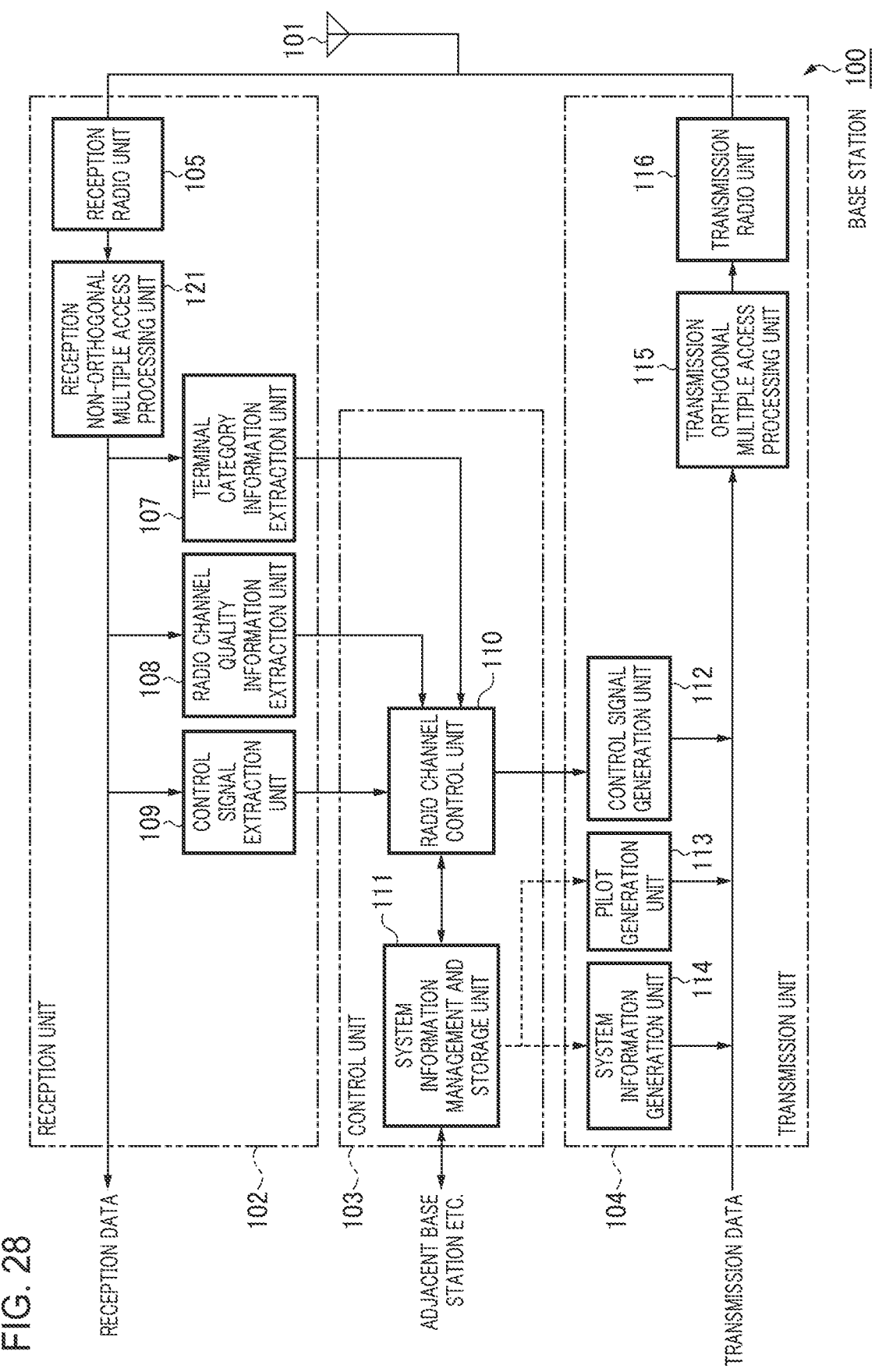
FIG. 28 is a diagram illustrating a configuration example of a base station.

FIG. 28 is a diagram illustrating a configuration example of a base station 100 which supports the orthogonal multiple access scheme in the downlink direction and the non-orthogonal multiple access scheme in the uplink direction.

The base station 100 further includes a reception non-orthogonal multiple access processing unit 121 and a transmission orthogonal multiple access processing unit 115. The reception non-orthogonal multiple access processing unit 121 is, for example, the reception non-orthogonal multiple access processing unit 121 of the base station (for example, FIG. 18) 100 which supports the non-orthogonal multiple access scheme. Also, the transmission orthogonal multiple access processing unit 115 is, for example, the transmission orthogonal multiple access processing unit 115 of the base station (for example, FIG. 10) 100 which supports the transmission orthogonal multiple access scheme.

As depicted in FIG. 28, the base station 100 may perform radio communication with the terminal 200 by the orthogonal multiple access scheme in the downlink direction and by the non-orthogonal multiple access scheme in the uplink direction.

Additionally, FIG. 28 illustrates a configuration example of the base station 100 when the terminal category is identified in the terminal 200. In the base station 100 as depicted in FIG. 16, for example, by replacing the reception orthogonal multiple access processing unit 106 with the reception non-orthogonal multiple access processing unit 121, the terminal category may be identified in the base station 100.

<1.4 Base Station Configuration Example which Supports the Non-Orthogonal Multiple Access Scheme in Downlink Direction and the Orthogonal Multiple Access Scheme in Uplink Direction>

Figure 29:
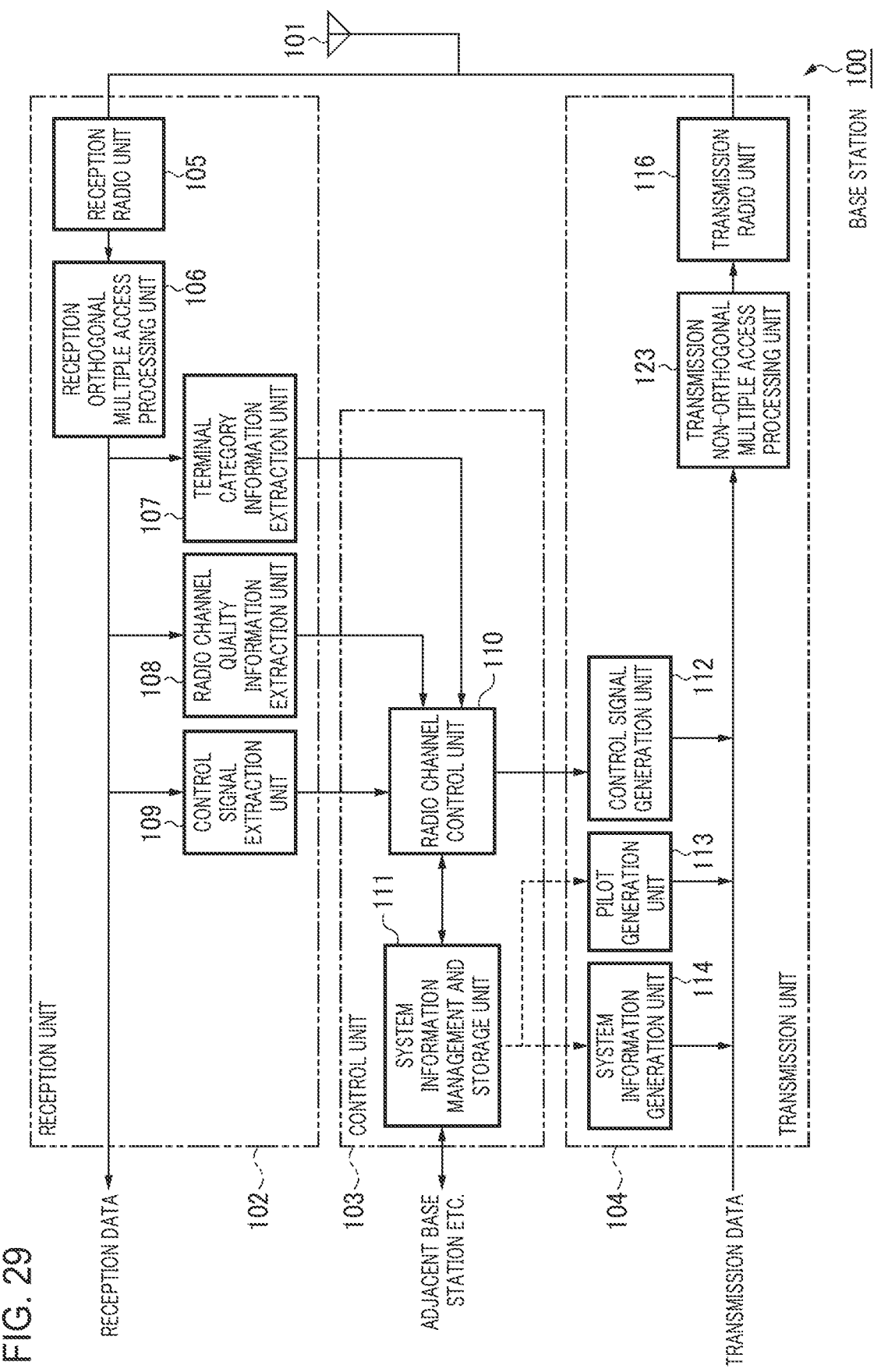
FIG. 29 is a diagram illustrating a configuration example of a base station.

FIG. 29 is a diagram illustrating a configuration example of a base station 100 which supports the non-orthogonal multiple access scheme in the downlink direction and the orthogonal multiple access scheme in the uplink direction. The base station 100 further includes a reception orthogonal multiple access processing unit 106 and a transmission non-orthogonal multiple access processing unit 123. The reception orthogonal multiple access processing unit 106 is, for example, the reception orthogonal multiple access processing unit 106 of the base station (for example, FIG. 10) 100 which supports the orthogonal multiple access scheme. Also, the transmission non-orthogonal multiple access processing unit 123 is, for example, the transmission non-orthogonal multiple access processing unit 123 of the base station (for example, FIG. 18) 100 which supports the non-orthogonal multiple access scheme.

As depicted in FIG. 29, the base station 100 may perform radio communication with the terminal 200 by the non-orthogonal multiple access scheme in the downlink direction and by the orthogonal multiple access scheme in the uplink direction.

Additionally, FIG. 29 illustrates a configuration example of the base station 100 when the terminal category is identified in the terminal 200. In the base station 100 as depicted in FIG. 16, for example, by replacing the transmission orthogonal multiple access processing unit 115 with the transmission non-orthogonal multiple access processing unit 123, the terminal category may be identified in the base station 100.

<2. Terminal Configuration Examples>

A description will be given on configuration examples of a terminal 200 using FIGS. 30 through 45.

<2.1 Terminal Configuration Example which Supports the Orthogonal Multiple Access Scheme>

Figure 30:
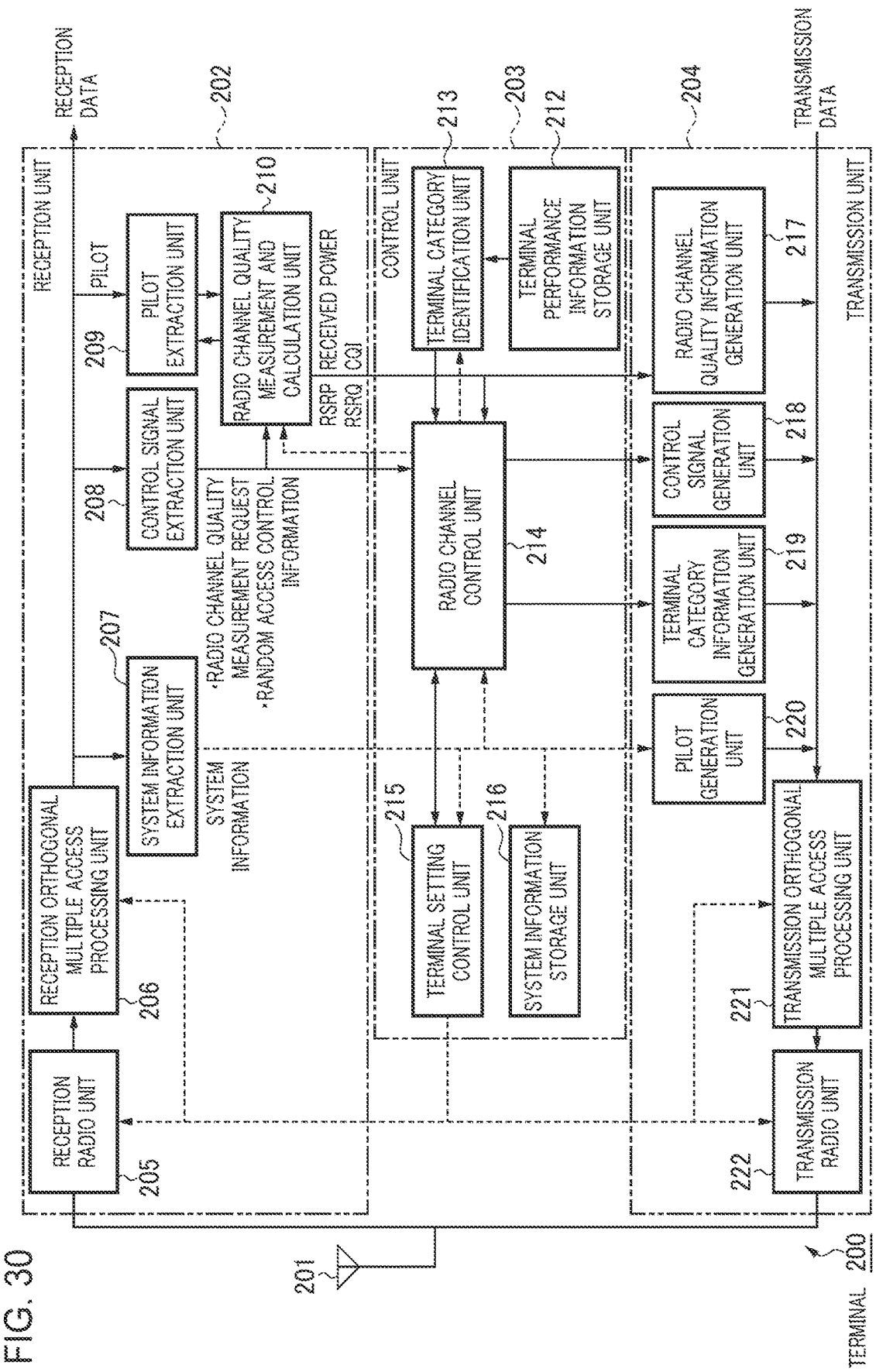
FIG. 30 is a diagram illustrating a configuration example of a terminal.

FIG. 30 is a diagram illustrating a configuration example of a terminal 200 which supports the orthogonal multiple access scheme. The terminal 200 includes an antenna 201, a reception unit 202, a control unit 203 and a transmission unit 204. The reception unit 202 includes a reception radio unit 205, a reception orthogonal multiple access processing unit 206, a system information extraction unit 207, a control signal extraction unit 208, a pilot extraction unit 209 and a radio channel quality measurement and calculation unit (which may hereafter be referred to a "radio channel quality measurement unit") 210. Also, the control unit 203 includes a terminal performance information storage unit 212, a terminal category identification unit 213, a radio channel control unit (or control unit, which may hereafter be referred to as a "radio channel control unit") 214, a terminal setting control unit 215 and a system information storage unit 216. The transmission unit 204 includes a radio channel quality information generation unit 217, a control signal generation unit 218, a terminal category information generation unit 219, a pilot generation unit 220, a transmission orthogonal multiple access processing unit 221 and a transmission radio unit 222.

Here, the antenna 201, the reception radio unit 205, the reception orthogonal multiple access processing unit 206, the radio channel control unit 214, the transmission orthogonal multiple access processing unit 221 and the transmission radio unit 222 may be, for example, a second communication unit which performs radio communication using the orthogonal multiple access scheme.

The antenna 201 receives a radio signal transmitted from a base station 100, so as to output the received radio signal to the reception radio unit 205. Also, the antenna 201 transmits to the base station 100 a radio signal which is output from the transmission radio unit 222.

The reception radio unit 205 amplifies the radio signal and converts down-converts) the radio signal in a radio band into a reception signal in a baseband. The reception radio unit 205 may include an amplifier circuit, a frequency conversion circuit, a BPF, etc. The reception radio unit 205 outputs the baseband signal in the baseband to the reception orthogonal multiple access processing unit 206.

The reception orthogonal multiple access processing unit 206 performs processing to support the orthogonal multiple access scheme, on the baseband signal to reproduce a transmission signal transmitted from the base station 100. The reception orthogonal multiple access processing unit 206 outputs the reproduced transmission signal as the reception signal. The reception orthogonal multiple access processing unit 206 may be of a similar configuration to the reception orthogonal multiple access processing unit 106 of the base station 100, for example, which may be the configuration example as depicted in FIGS. 13 and 14.

The system information extraction unit 207 extracts system information from the reception signal which is output from the reception orthogonal multiple access processing unit 206. The system information extraction unit 207 outputs the extracted system information to the radio channel control unit 214, the terminal setting control unit 215, the system information storage unit 216, the pilot generation unit 220, etc.

The control signal extraction unit 208 extracts a control signal from the reception signal being output from the reception orthogonal multiple access processing unit 206. As the control signal, there are scheduling information, a radio channel quality measurement request, random access control information, a terminal category request, etc. the control signal extraction unit 208 outputs the extracted control signal to the radio channel control unit 214 and the radio channel quality measurement unit 210.

The pilot extraction unit 209 extracts a pilot signal from the reception signal being output from the reception orthogonal multiple access processing unit 206. The pilot extraction unit 209 outputs the extracted pilot signal to the radio channel quality measurement unit 210. Also, the pilot extraction unit 209 may extract the pilot signal according to an instruction from the radio channel quality measurement unit 210.

Based on the pilot signal, the radio channel quality measurement unit 210 measures the radio channel quality of a radio channel between with the base station 100. The radio channel quality measurement unit 210 outputs the measured radio channel quality to the radio channel control unit 214 and the radio channel quality information generation unit 217. The radio channel quality measurement unit 210 may measure the radio channel quality according to an instruction from the radio channel control unit 214, so as to output the measured radio channel quality to the radio channel control unit 214, the radio channel quality information generation unit 217, etc.

The terminal performance information storage unit 212 stores the performance information of the terminal 200. In the terminal performance information, there are included, for example, information whether or the orthogonal multiple access scheme is supported, whether or not the non-orthogonal multiple access scheme is supported, or whether or not both of the orthogonal multiple access scheme and the non-orthogonal multiple access scheme are supported. Also, as the terminal performance information, there may be included information which indicates the performance or capability of the terminal 200 concerning the non-orthogonal multiple access scheme, information which indicates the performance or capability of the terminal 200 concerning the orthogonal multiple access scheme, or information which indicates the performance or capability of the terminal 200 concerning both multiple access schemes.

Additionally, because the terminal 200 depicted in FIG. 30 supports the orthogonal multiple access scheme, the terminal performance information in the terminal performance information storage unit 212 may include information which indicates that the orthogonal multiple access scheme is supported (or information indicating the capability or performance of the terminal 200 concerning the orthogonal multiple access scheme).

Based on the terminal performance information, the terminal category identification unit 213 identifies a terminal category. Namely, the terminal category identification unit 213 identifies the terminal category of the terminal 200 on the basis of at least one of information, which indicates the performance or capability of the terminal 200 concerning the non-orthogonal multiple access scheme, and information which indicates the performance or capability of the terminal 200 concerning the orthogonal multiple access scheme. For example, the terminal category identification unit 213 reads out from the terminal performance information storage unit 212 and reads out from the terminal category table a terminal category corresponding to the readout terminal performance information, so as to identify the terminal category. The terminal category table, which is the same as in the base station 100, may be stored in the terminal category identification unit 213 or in the memory of the terminal 200. Also, the terminal category identification unit 213 may identify the terminal category according to an instruction from the radio channel control unit 214. The terminal category identification unit 213, for example, corresponds to the identification unit 250 in the first embodiment, and is an identification unit which identifies the category of the terminal 200.

Here, because the terminal 200 depicted in FIG. 30 is a terminal which supports the orthogonal multiple access scheme, the terminal category identification unit 213 identifies the category of the terminal 200 on the basis of information which indicates the performance or capability of the terminal 200 concerning the orthogonal multiple access scheme.

The radio channel control unit 214 performs a variety of kinds of control in the terminal 200, including random access control, cell selection control, radio channel quality measurement control, and so on.

Figure 31:
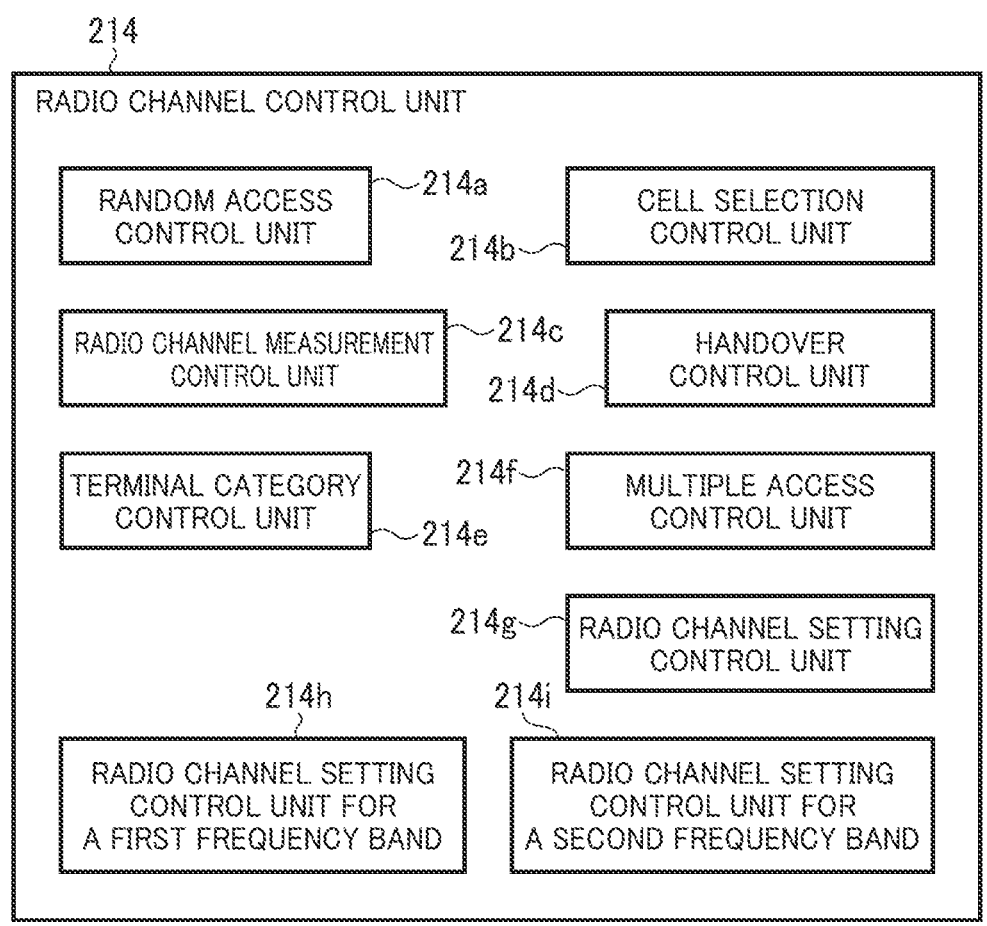
FIG. 31 is a diagram illustrating a configuration example of a radio channel control unit.

FIG. 31 is a diagram illustrating a configuration example of the radio channel control unit 214. The radio channel control unit 214 includes a random access control unit 214a, a cell selection control unit 214b, a radio channel measurement control unit 214c, a handover control unit 214d, a terminal category control unit 214e, a multiple access control unit 214f and a radio channel setting control unit 214g. The radio channel control unit 214 further includes a radio channel setting control unit 214h for a first frequency band, and a radio channel setting control unit 214i for a second frequency band.

The random access control unit 214a performs control related to a random access procedure which is performed when setting a radio channel between the base station 100 and the terminal 200. The cell selection control unit 214b performs control related to cell selection, such as the selection of a cell, on the basis of radio channel quality information which is measured in the radio channel quality measurement unit 210, for example. The radio channel quality measurement control unit 214c, on receiving a radio channel quality measurement request from the control signal extraction unit 208, performs control related to the measurement of radio channel quality, including instructing the radio channel quality measurement unit 210 to measure radio channel quality. The handover control unit 214d performs, for example, control related to handover, including instructing the control signal generation unit 218 to generate a control signal for handover between with the base station 100, and the like.

The terminal category control unit 214e performs control related to a terminal category. The terminal category control unit 214e performs the following processing, for example. Namely, the terminal category control unit 214e, when receiving a control signal from the control signal extraction unit 208 and extracting a terminal category request from the received control signal, instructs the terminal category identification unit 213 to identify a terminal category. Then, on receiving the terminal category from the terminal category identification unit 213, the terminal category control unit 214e outputs the terminal category to the terminal category information generation unit 219, so as to instruct the terminal category information generation unit 219 to generate a terminal category.

The multiple access control unit 214f, for example, on receiving the terminal category from the terminal category identification unit 213, identifies at least one multiple access scheme out of the orthogonal multiple access scheme and the non-orthogonal multiple access scheme, on the basis of the terminal category. The multiple access control unit 214f may control each unit 206, 221, etc. so that processing is performed using the identified multiple access scheme. In the example of FIG. 30, because the terminal 200 supports the orthogonal multiple access scheme, the terminal 200 may verify that processing to support the orthogonal multiple access is performed in each unit 206, 221. The multiple access control unit 214f may perform processing such as changing over the multiple access scheme.

The radio channel setting control unit 214g performs, for example, control related to radio channel setting to the base station 100. The radio channel setting control unit 214g may perform control to change or delete a radio channel, add a new radio channel, and so on.

The radio channel setting control unit 214h for a first frequency band, for example when communicating with the base station 100 using CA, performs control related to radio channel setting concerning a first frequency band. The radio channel setting control unit 214i for a second frequency band, for example when communicating with the base station 100 using CA, performs control related to radio channel setting concerning a second frequency band. For example, the first frequency band may become a primary cell, and the second frequency band may become a secondary cell.

Referring back to FIG. 30, the terminal setting control unit 215 performs control related to the setting of the terminal 200. For example, the terminal setting control unit 215 instructs or controls the reception radio unit 205, the reception orthogonal multiple access processing unit 206, the transmission orthogonal multiple access processing unit 221 and the transmission radio unit 222 to perform reception processing or transmission processing, on the basis of a scheduling result from the radio channel control unit 214.

The system information storage unit 216 stores system information output from the system information extraction unit 207.

The radio channel quality information generation unit 217, according to an instruction from the radio channel control unit 214, receives radio channel quality from the radio channel quality measurement unit 210 to generate radio channel quality information which includes the radio channel quality, so as to output the generated radio channel quality information to the transmission orthogonal multiple access processing unit 221.

The control signal generation unit 218 generates a control signal according to an instruction from the radio channel control unit 214, so as to output the generated control signal to the transmission orthogonal multiple access processing unit 221. As the control signal, there is a control signal for random access, a control signal for handover, and so on.

The terminal category information generation unit 219 generates terminal category information, which includes the terminal category received from the radio channel control unit 214, according to an instruction from the radio channel control unit 214, so as to output the generated terminal category to the transmission orthogonal multiple access processing unit 221.

The pilot generation unit 220 generates a pilot signal according to an instruction from the radio channel control unit 214, so as to output the generated pilot signal to the transmission orthogonal multiple access processing unit 221.

The transmission orthogonal multiple access processing unit 221 performs processing to support the orthogonal multiple access scheme, on the transmission data, the radio channel quality information, the control signal, the terminal category information and the pilot signal, so as to convert into each baseband signal. The transmission orthogonal multiple access processing unit 221 may perform the processing of, for example, SC-FDMA, DFT-s-FDMA, etc. The transmission orthogonal multiple access processing unit 221 may be of a similar configuration to the transmission orthogonal multiple access processing unit 115 in the base station 100, which may be the configuration examples as depicted in FIGS. 11 and 12.

The transmission radio unit 222 converts (up-converts) the baseband signal, which is output from the transmission orthogonal multiple access processing unit 221, into a radio signal in a radio band, and amplifies the radio signal to output to the antenna 201. The transmission radio unit 222 may include a frequency conversion circuit, an amplifier circuit, a BPF, etc.

In the above, the configuration example of the terminal which supports the orthogonal multiple access scheme has been described using FIG. 30. Here, FIG. 30 is the configuration example when the terminal category is identified in the terminal 200. It may also be possible to configure to identify the terminal category in the base station 100.

Figure 32:
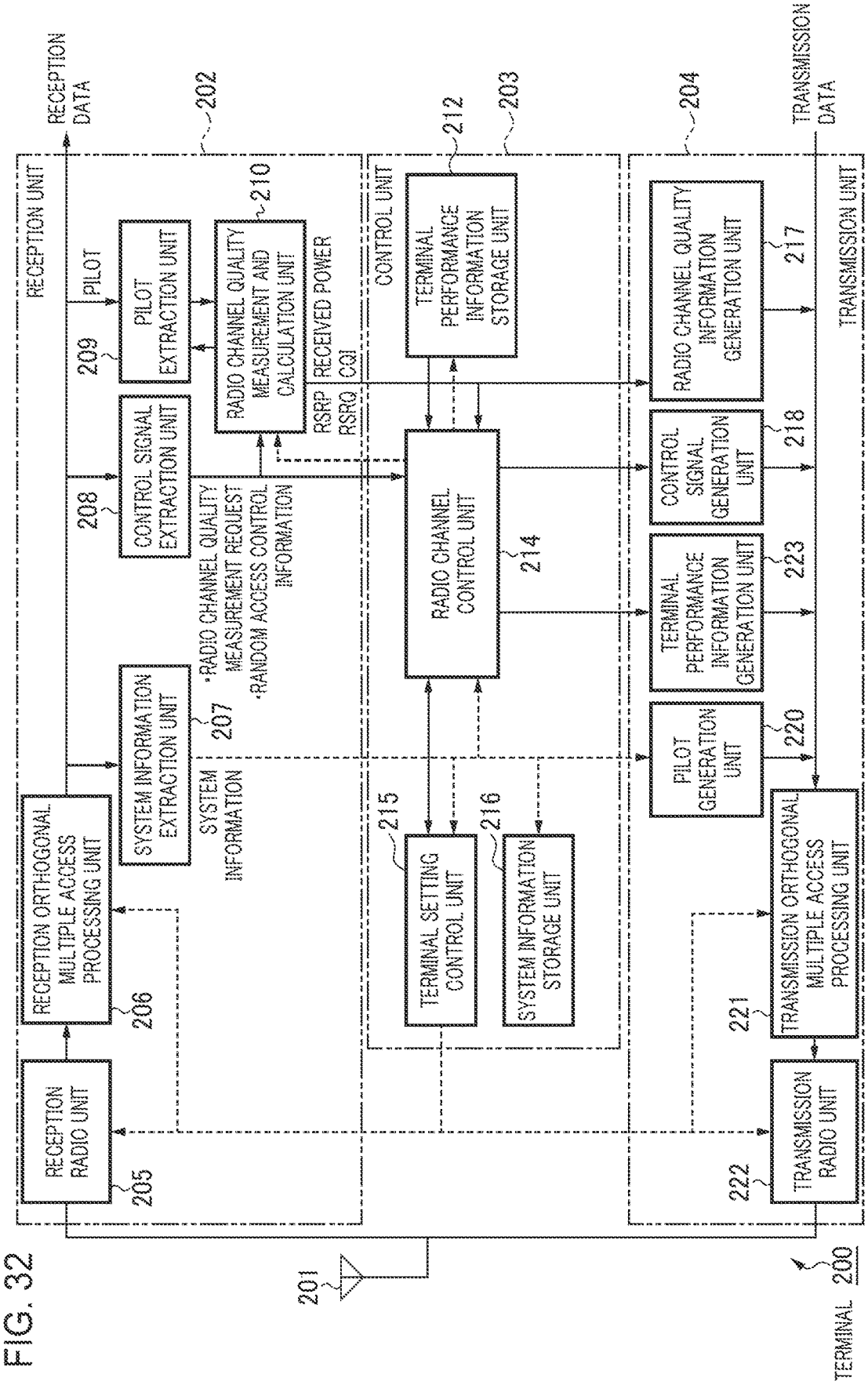
FIG. 32 is a diagram illustrating a configuration example of a terminal.

FIG. 32 is a configuration example of a terminal 200 when the terminal category is identified in the base station 100. In this case, in the terminal performance information storage unit 212, for example, there is stored terminal performance information which includes the information of the performance or capability of the terminal 200 concerning the orthogonal multiple access scheme. The terminal 200 is configured to transmit such terminal performance information to the base station 100.

As depicted in FIG. 32, the terminal 200 further includes a terminal performance information generation unit 223.

The terminal performance information generation unit 223 outputs the terminal performance information, which is output from the radio channel control unit 214, to the transmission orthogonal multiple access processing unit 221 according to an instruction from the radio channel control unit 214.

Figure 33:
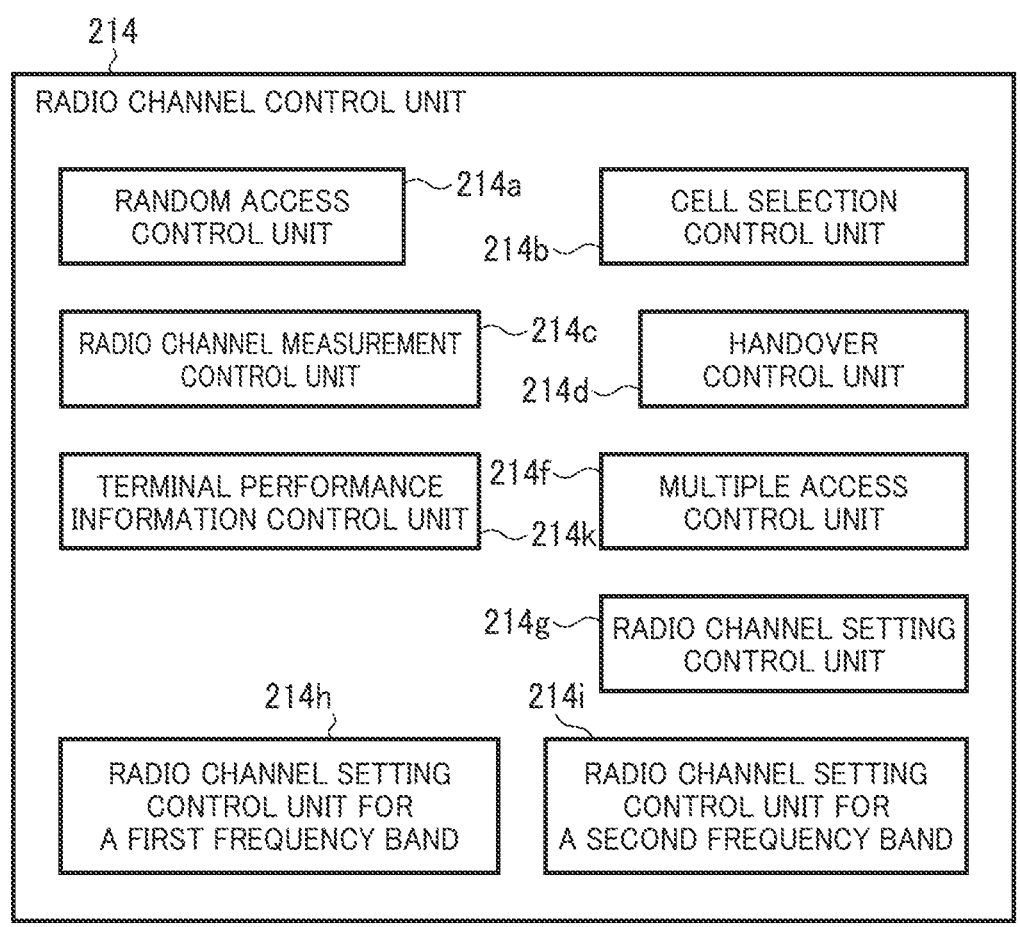
FIG. 33 is a diagram illustrating a configuration example of a radio channel control unit.

FIG. 33 is a diagram illustrating a configuration example of the radio channel control unit 214. The radio channel control unit 214 further includes a terminal performance information control unit 214k.

The terminal performance information control unit 214k performs control related to the terminal performance information. For example, the terminal performance information control unit 214k receives a control signal from the control signal extraction unit 208, and when extracting a performance information request from the control signal, accesses the terminal performance information storage unit 212 to read out the terminal performance information. The terminal performance information control unit 214k instructs the terminal performance information generation unit 223 to transmit the readout terminal performance information to the base station 100, and outputs the readout terminal performance information to the terminal performance information generation unit 223. This enables, for example, the terminal 200 to transmit to the base station 100 the terminal performance information which includes whether or not the terminal 200 supports the orthogonal multiple access scheme.

As having been described above, the terminal 200 which supports the orthogonal multiple access scheme may transmit the identified terminal category to the base station 100 (for example, FIG. 30), or may transmit the terminal performance information, indicative of supporting the orthogonal multiple access scheme, to the base station 100 (for example, FIG. 32). According to an instruction from the base station 100, the terminal 200 may perform processing such as handover to the base station 100 which supports the orthogonal multiple access scheme, the addition of CC which supports the orthogonal multiple access scheme, and so on. The details of such processing will be described in the operation examples.

<2.2 Terminal Configuration Example which Supports the Non-Orthogonal Multiple Access Scheme>

Figure 34:
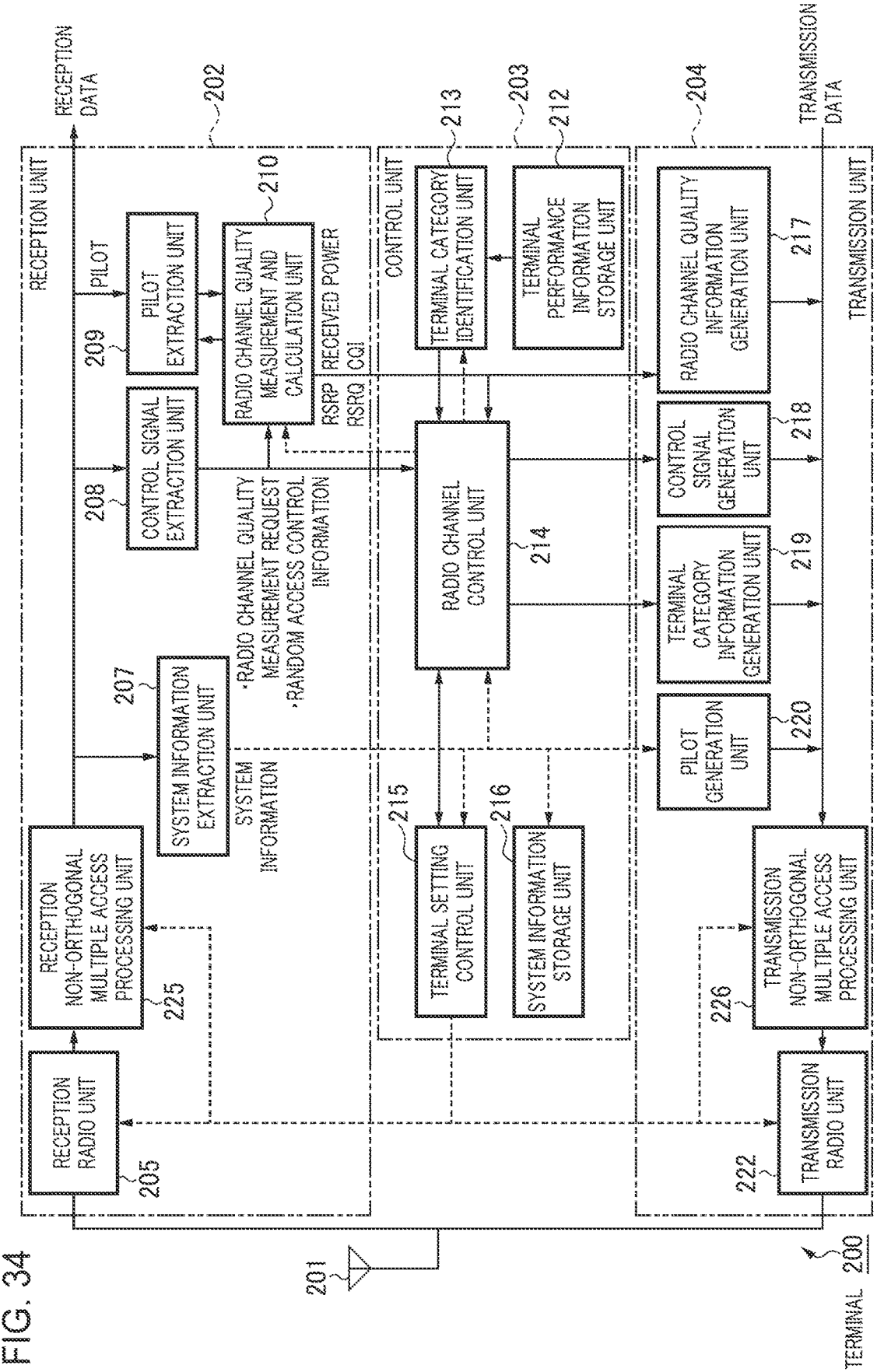
FIG. 34 is a diagram illustrating a configuration example of a terminal.

FIG. 34 is a diagram illustrating a configuration example of a terminal 200 which supports the non-orthogonal multiple access scheme. Also, FIG. 34 illustrates a configuration example of the terminal 200 when a terminal category is identified in the terminal 200.

The terminal 200 further includes a reception non-orthogonal multiple access processing unit 225 and a transmission non-orthogonal multiple access processing unit 226.

Here, the antenna 201, the reception radio unit 205, the reception non-orthogonal multiple access processing unit 225, the radio channel control unit 214, the transmission non-orthogonal multiple access processing unit 226 and the transmission radio unit 222 may configure a first communication unit which performs radio communication using the orthogonal multiple access scheme, for example.

The reception non-orthogonal multiple access processing unit 225 performs processing to support the non-orthogonal multiple access scheme on a baseband signal output from the reception radio unit 205, to reproduce a transmission signal transmitted from the base station 100. The reception non-orthogonal multiple access processing unit 225 outputs the reproduced transmission signal as a reception signal.

Also, the transmission non-orthogonal multiple access processing unit 226 performs processing to support the non-orthogonal multiple access scheme on transmission data, radio channel quality information, a control signal, terminal category information, a pilot signal, etc., to convert into a baseband signal. The transmission non-orthogonal multiple access processing unit 226 outputs the baseband signal.

Additionally, because the terminal 200 depicted in FIG. 34 supports the non-orthogonal multiple access scheme, terminal performance information which includes information indicating the capability or performance of the terminal 200 concerning the non-orthogonal multiple access scheme may be stored in the terminal performance information storage unit 212. Also, the terminal category identification unit 213 identifies a terminal category on the basis of the information indicating the performance or capability of the terminal concerning the non-orthogonal multiple access scheme, for example.

Next, the details of the transmission non-orthogonal multiple access processing unit 226 and the reception non-orthogonal multiple access processing unit 225 will be described. The detailed description will be given on the transmission non-orthogonal multiple access processing unit 226, and next, on the reception non-orthogonal multiple access processing unit 225.

Figure 35:
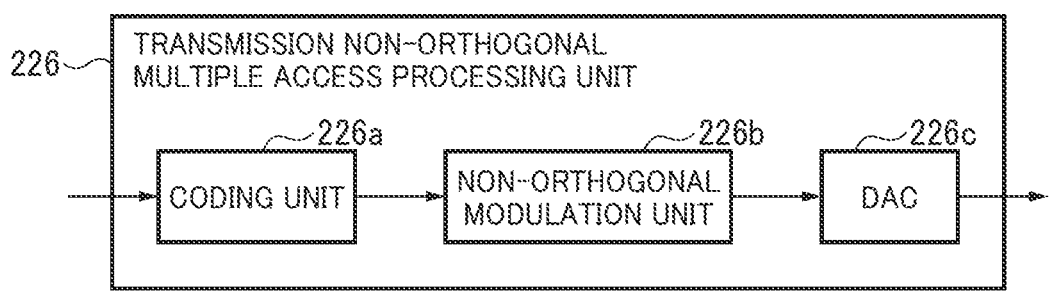
FIG. 35 is a diagram illustrating a configuration example of a transmission non-orthogonal multiple access processing unit.

FIG. 35 illustrates a configuration example of the transmission non-orthogonal multiple access processing unit 226. The configuration example of the transmission non-orthogonal multiple access processing unit 226 is similar to the configuration example of the transmission non-orthogonal multiple access processing unit 123 in the base station 100 (for example, FIG. 19). The transmission non-orthogonal multiple access processing unit 226 includes a coding unit 226a, a non-orthogonal modulation unit 226b and a DAC 226c.

Figure 36:
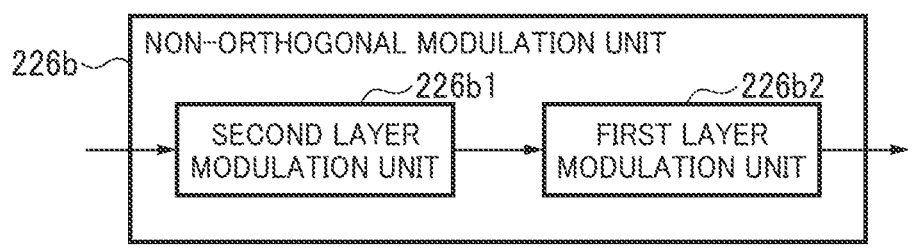
FIG. 36 is a diagram illustrating a configuration example of a non-orthogonal modulation unit.
Figure 37:
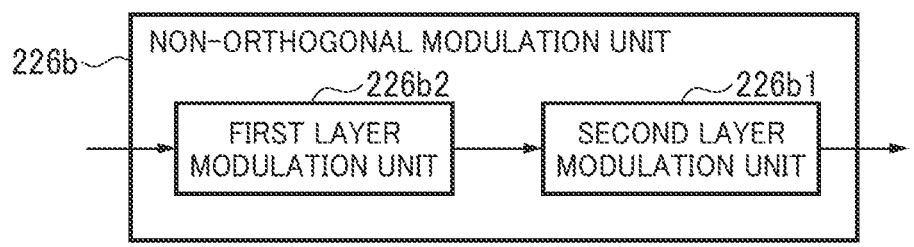
FIG. 37 is a diagram illustrating a configuration example of a non-orthogonal modulation unit.

FIGS. 36 and 37 are diagrams illustrating each configuration example of the non-orthogonal modulation unit 226b.

Similar to the non-orthogonal modulation unit 123b in the base station 100 (for example, FIGS. 20 and 21), the non-orthogonal modulation unit 226b also includes a second layer modulation unit 226b1 and a first layer modulation unit 226b2. In the non-orthogonal modulation unit 226b, as depicted in FIG. 36, it may be possible to perform processing for the second layer modulation unit 226b1, and thereafter processing for the first layer modulation unit 226b2. Also, as depicted in FIG. 37, it may be possible to perform processing for the first layer modulation unit 226b2, and thereafter processing for the second layer modulation unit 226b1. The non-orthogonal modulation unit 226b outputs a modulation signal, which is output from the second layer modulation unit 226b1 or the first layer modulation unit 226b2, to the DAC 226c.

Figure 38:
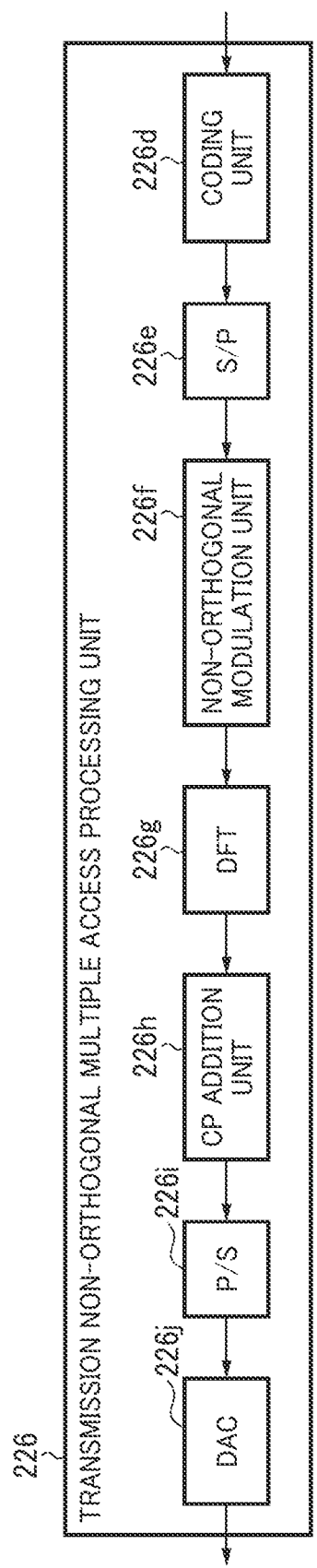
FIG. 38 is a diagram illustrating a configuration example of a transmission non-orthogonal multiple access processing unit.

FIG. 38 is a diagram illustrating another configuration example of the transmission non-orthogonal multiple access processing unit 226. The transmission non-orthogonal multiple access processing unit 226 includes a coding unit 226d, an S/P 226e, a non-orthogonal modulation unit 226f, a DFT 226g, a CP addition unit 226h, a P/S 226i and a DAC 226j. On transmission data, radio channel quality information, etc., error correction coding processing is performed in the coding unit 226d, and then conversion into a signal for each subcarrier etc. is performed in the S/P 226e, so that hierarchical modulation processing is performed in the non-orthogonal modulation unit 226f. The non-orthogonal modulation unit 226f may be, for example, each configuration example as depicted in FIGS. 36 and 37. On the modulation signal output from the non-orthogonal modulation unit 226f, DFT (Discrete Fourier Transfer) processing is performed in the DFT 226g, so that a modulated signal is converted into a frequency domain signal. To the converted signal, a CP is added by the CP addition unit 226h, and conversion is made from a parallel format to a serial format in the P/S 226i, and thereafter, conversion is made from a digital signal to an analog signal in the DAC 226j. The transmission non-orthogonal multiple access processing unit 226 outputs the analog signal to the transmission radio unit 222 as a baseband signal.

Figure 39:
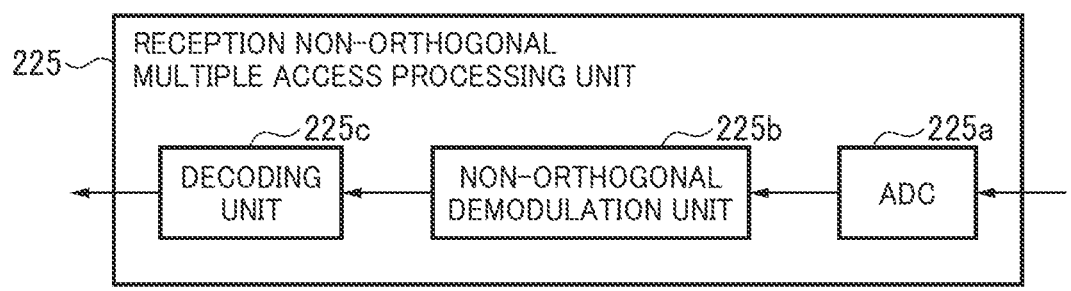
FIG. 39 is a diagram illustrating a configuration example of a reception non-orthogonal multiple access processing unit.

FIG. 39 is a diagram illustrating a configuration example of the reception non-orthogonal multiple access processing unit 225. The configuration example of the reception non-orthogonal multiple access processing unit 225 is similar to the configuration example of the reception non-orthogonal multiple access processing unit 121 in the base station 100 (for example, FIG. 23). The reception non-orthogonal multiple access processing unit 225 includes an ADC 225a, a non-orthogonal demodulation unit 225b and a decoding unit 225c.

Figure 40:
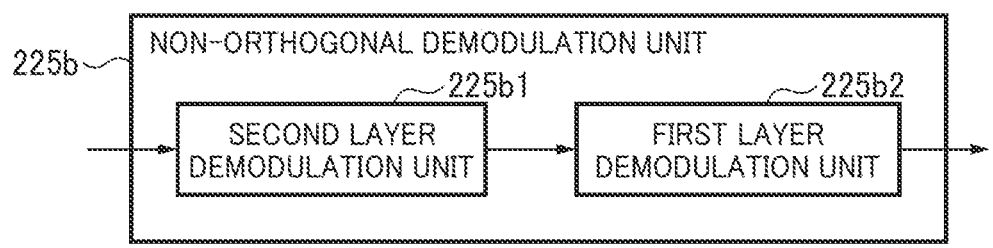
FIG. 40 is a diagram illustrating a configuration example of a non-orthogonal demodulation unit.
Figure 41:
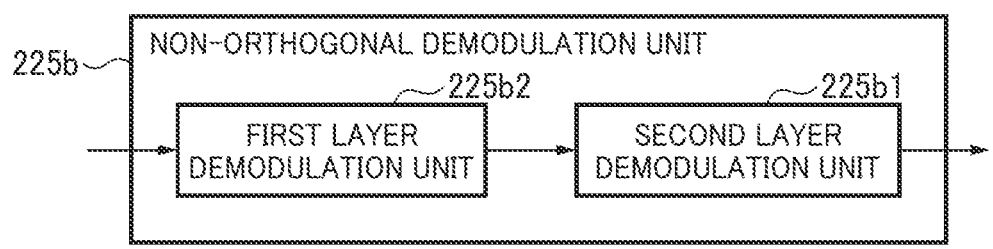
FIG. 41 is a diagram illustrating a configuration example of a non-orthogonal demodulation unit.

FIGS. 40 and 41 are diagrams illustrating each configuration example of the non-orthogonal demodulation unit 225b. Similar to the non-orthogonal demodulation unit 121b in the base station 100 (for example, FIGS. 24 and 25), the non-orthogonal demodulation unit 225b includes a second layer demodulation unit 225b1 and a first layer demodulation unit 225b2. In the non-orthogonal demodulation unit 225b also, as depicted in FIG. 40, it may be possible to perform processing for the second layer demodulation unit 225b1, and thereafter processing for the first layer demodulation unit 225b2. Also, as depicted in FIG. 41, it may be possible to perform processing for the first layer demodulation unit 225b2, and thereafter processing for the second layer demodulation unit 225b1. The non-orthogonal demodulation unit 225b outputs a demodulation signal, which is output from the second layer demodulation unit 225*b*1 or the first layer demodulation unit 225*b*2, to the decoding unit 225*c*.

Figure 42:
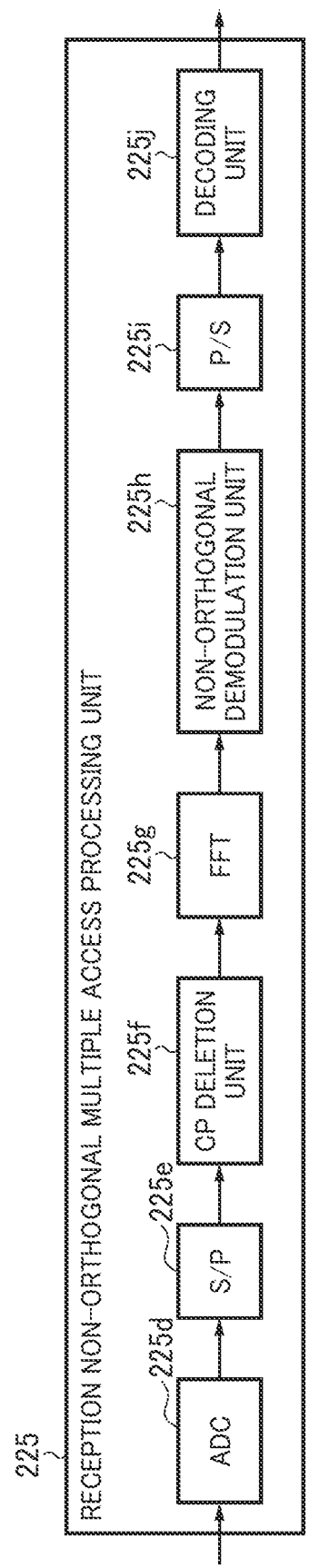
FIG. 42 is a diagram illustrating a configuration example of a reception non-orthogonal multiple access processing unit.

FIG. 42 is a diagram illustrating another configuration example of the reception non-orthogonal multiple access processing unit 225. The reception non-orthogonal multiple access processing unit 225 includes an ADC 225*d*, an S/P 225*e*, a CP deletion unit 225*f*, an FFT 225*g*, a non-orthogonal demodulation unit 225*h*, a P/S 225*i* and a decoding unit 225*j*.

A reception signal in a baseband which is output from the reception radio unit 205 is converted in the ADC 225*d* from an analog signal to a digital signal, and in the S/P 225*e*, the digital signal is converted to a digital signal of a serial format to a digital signal of a parallel format, so as to become the digital signal for each subcarrier. In the CP deletion unit 225*f*, CP is deleted from the parallel format digital signal, and in the FFT 225*g*, conversion from a time domain signal to a frequency domain signal is made. On the frequency domain signal, hierarchical demodulation is performed in the non-orthogonal demodulation unit 225*h*, so that conversion to a demodulation signal is performed. The non-orthogonal demodulation unit 225*h* may be, for example, the non-orthogonal demodulation unit 225*b* depicted in FIGS. 40 and 41. The demodulation signal is converted in the P/S 225*i* from a parallel format signal into a serial format, and on the serial format signal, error correction decoding processing is performed in the decoding unit 225*j*, so that the transmission signal transmitted from the base station 100 is reproduced. The reception non-orthogonal multiple access processing unit 225 outputs the reproduced transmission signal as a reception signal.

Figure 43:
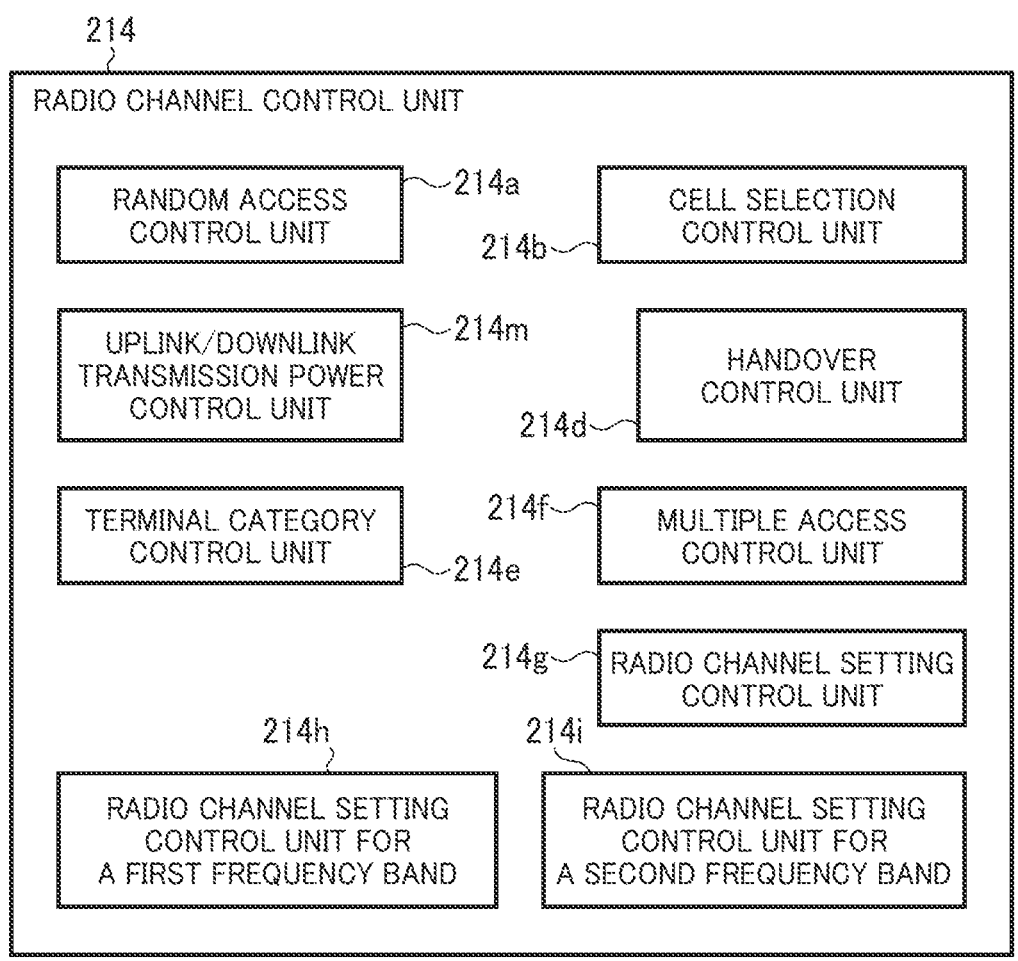
FIG. 43 is a diagram illustrating a configuration example of a radio channel control unit.

FIG. 43 is a diagram illustrating a configuration example of the radio channel control unit 214. The radio channel control unit 214 further includes an uplink/downlink transmission power control unit (which may hereafter be referred to as a "transmission power control unit") 214*m*.

The transmission power control unit 214*m* performs transmission power control between with the base station 100. As mentioned above, the transmission power control unit 214*m*, for example, acquires downlink transmission power control information on the basis of the pilot signal. For this purpose, the transmission power control unit 214*m* instructs the radio channel quality measurement unit 210 to acquire downlink transmission power control information. According to the instruction, the radio channel quality measurement unit 210 acquires downlink transmission power control information. The transmission power control unit 214*m* instructs the radio channel quality information generation unit 217 to generate downlink transmission power control information. By this, the downlink transmission power control information is transmitted to the base station 100. Also, the transmission power control unit 214*m* instructs the pilot generation unit 220 to generate a pilot signal. This enables the base station 100 to acquire uplink transmission power control information on the basis of the pilot signal transmitted from the terminal 200, and to perform the measurement of radio channel quality in the uplink direction.

In the above, using FIG. 34, the description has been given on the configuration example of the terminal 200 which supports the non-orthogonal multiple access scheme. Here, the terminal 200, as depicted in FIG. 34, which supports the non-orthogonal multiple access scheme illustrates a configuration example when the terminal category is identified in the terminal 200. It may be possible to configure to identify the terminal category in the base station 100. A configuration example of the terminal 200 in such a case is, for example, as follows.

Namely, in the configuration example of the terminal 200 depicted in FIG. 32, the reception orthogonal multiple access processing unit 206 is replaced with the reception non-orthogonal multiple access processing unit 225, and the transmission orthogonal multiple access processing unit 221 is replaced with the transmission non-orthogonal multiple access processing unit 226, respectively. This enables the terminal 200, which supports the non-orthogonal multiple access scheme, to transmit the terminal performance information to the base station 100, so that the identification of the terminal category may be performed in the base station 100. The terminal performance information in this case includes, for example, information which indicates the performance or capability of the terminal 200 concerning the non-orthogonal multiple access scheme.

As having been described, the terminal category may be identified in the terminal 200 which supports the non-orthogonal multiple access scheme, so as to be transmitted to the base station 100 (for example, FIG. 34). Or, by the transmission of the terminal performance information to the base station 100, the terminal category may be identified in the base station 100 (for example, FIG. 32). In the terminal 200 which supports the non-orthogonal multiple access scheme, according to an instruction from the base station 100, it is possible to perform handover processing to a base station 100 which supports the non-orthogonal multiple access scheme, or processing for the addition of CC which supports the non-orthogonal multiple access scheme. The details of such processing will be described in the operation examples.

<2.3 Terminal Configuration Example which Supports the Non-Orthogonal Multiple Access Scheme in Downlink Direction and the Orthogonal Multiple Access Scheme in Uplink Direction>

Figure 44:
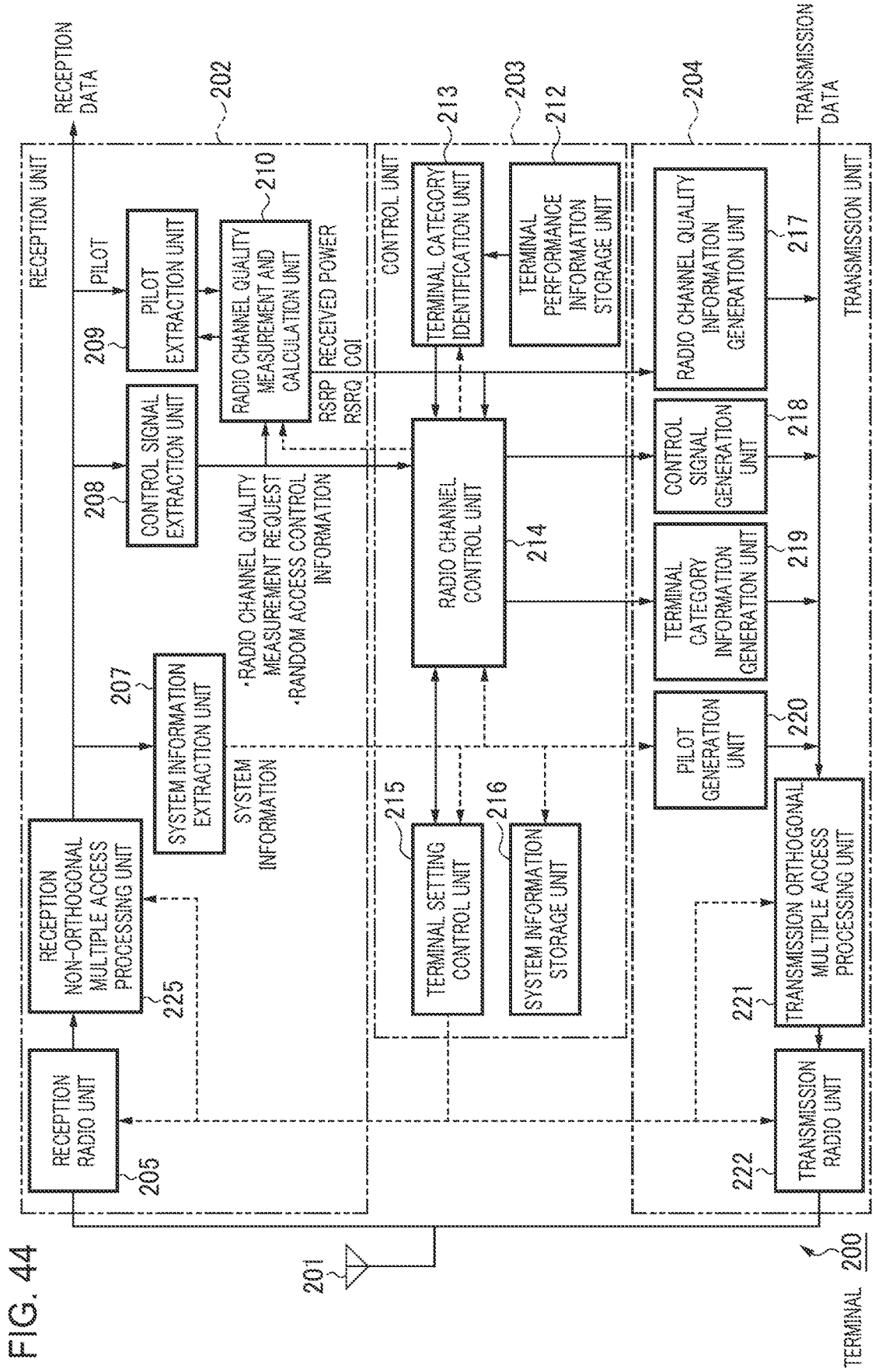
FIG. 44 is a diagram illustrating a configuration example of a terminal.

FIG. 44 is a diagram illustrating a configuration example of a terminal 200 which supports the non-orthogonal multiple access scheme in the downlink direction and the orthogonal multiple access scheme in the uplink direction.

The terminal 200 further includes a reception non-orthogonal multiple access processing unit 225 and a transmission orthogonal multiple access processing unit 221. The reception non-orthogonal multiple access processing unit 225 is, for example, the reception non-orthogonal multiple access processing unit 225 of the terminal 200 (for example, FIG. 34) which supports the non-orthogonal multiple access scheme. Also, the transmission orthogonal multiple access processing unit 221 is the transmission orthogonal multiple access processing unit 221 of the terminal 200 (for example, FIG. 30) which supports the orthogonal multiple access scheme.

As depicted in FIG. 44, the terminal 200 can communicate with the base station 100 by the non-orthogonal multiple access scheme in the downlink direction and by the orthogonal multiple access scheme in the uplink direction.

Here, FIG. 44 illustrates the configuration example when a terminal category is identified in the terminal 200. For example, in the configuration example of the terminal 200 as depicted in FIG. 32, a configuration example when the terminal category is identified in the base station 100 is obtained by using the reception non-orthogonal multiple access processing unit 225 in place of the reception orthogonal multiple access processing unit 206.

<2.4 Terminal Configuration Example which Supports the Orthogonal Multiple Access Scheme in Downlink Direction and the Non-Orthogonal Multiple Access Scheme in Uplink Direction>

Figure 45:
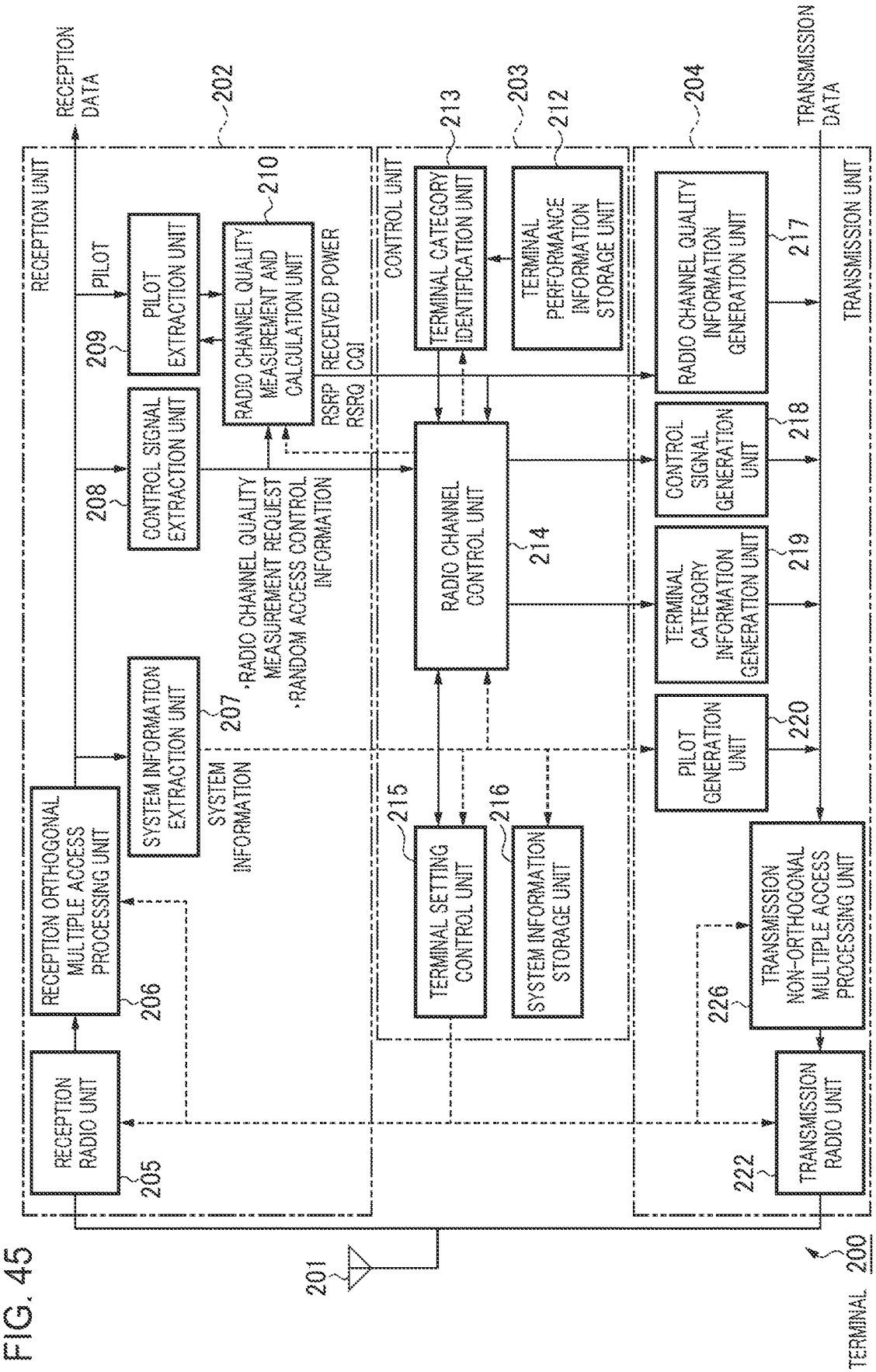
FIG. 45 is a diagram illustrating a configuration example of a terminal.

FIG. 45 is a diagram illustrating a configuration example of a terminal 200 which supports the orthogonal multiple access scheme in the downlink direction and the non-orthogonal multiple access scheme in the uplink direction.

The terminal 200 further includes a reception orthogonal multiple access processing unit 206 and a transmission non-orthogonal multiple access processing unit 226. The reception orthogonal multiple access processing unit 206 is, for example, the reception orthogonal multiple access processing unit 206 of the terminal 200 (for example, FIG. 30) which supports the orthogonal multiple access scheme. Also, the transmission non-orthogonal multiple access processing unit 226 is the transmission non-orthogonal multiple access processing unit 226 of the terminal 200 (for example, FIG. 30) which supports the orthogonal multiple access scheme.

As depicted in FIG. 45, the terminal 200 may communicate with the base station 100 by the orthogonal multiple access scheme in the downlink direction and by the non-orthogonal multiple access scheme in the uplink direction.

Here, FIG. 45 illustrates the configuration example when a terminal category is identified in the terminal 200. For example, in the configuration example of the terminal 200 as depicted in FIG. 32, a configuration example when the terminal category is identified in the base station 100 is obtained by using the transmission non-orthogonal multiple access processing unit 226 in place of the transmission orthogonal multiple access processing unit 221.

<3. Base Station Configuration Example which Supports the Orthogonal Multiple Access Scheme and the Non-Orthogonal Multiple Access Scheme>

Next, a description will be given on a configuration example of a base station 100 which supports the orthogonal multiple access scheme and the non-orthogonal multiple access scheme in the uplink direction and also supports the orthogonal multiple access scheme and the non-orthogonal multiple access scheme in the downlink direction.

Figure 46:
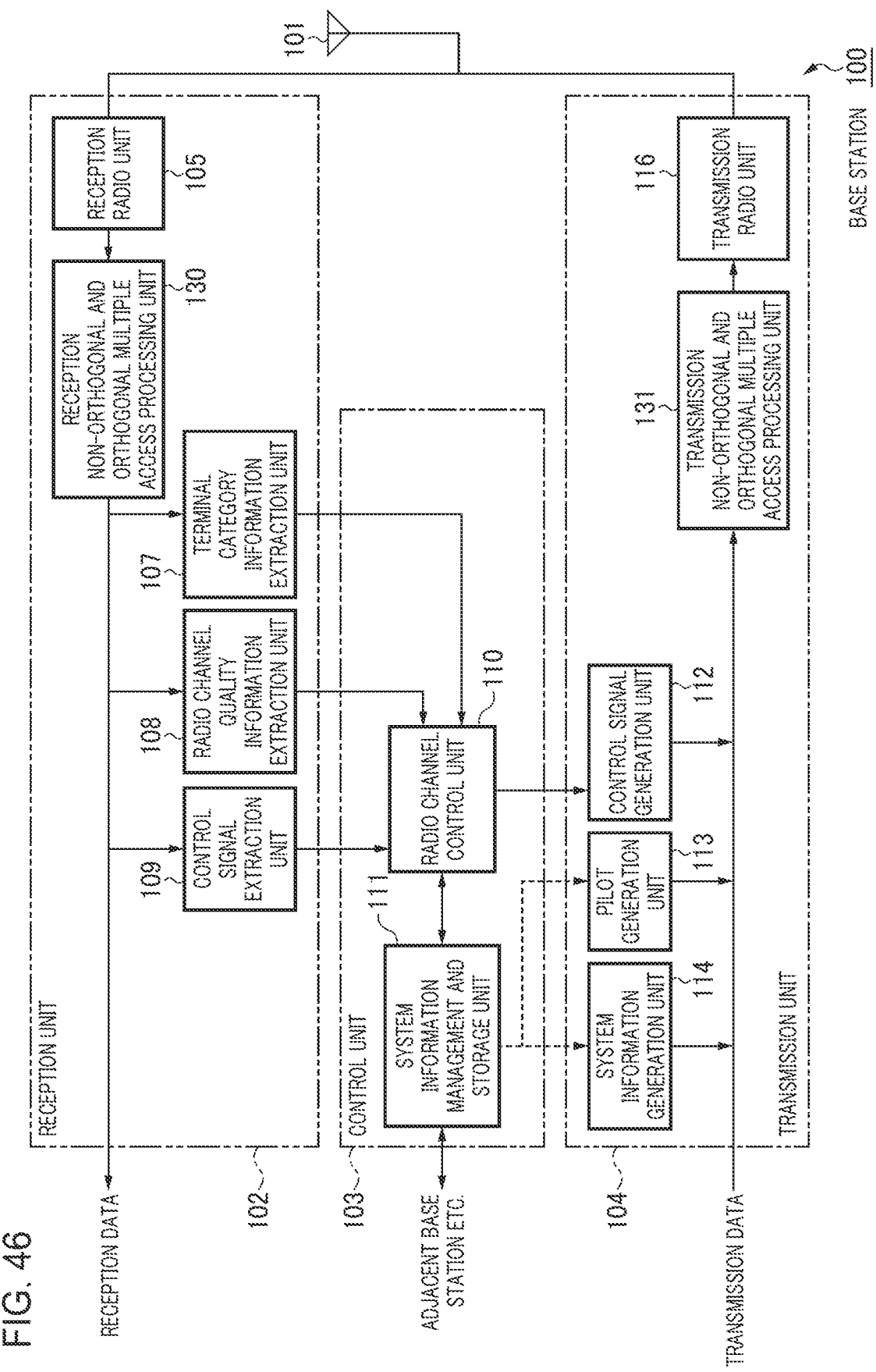
FIG. 46 is a diagram illustrating a configuration example of a base station.

FIG. 46 is a diagram illustrating a configuration example of such a base station 100. The base station 100 further includes a reception non-orthogonal and orthogonal multiple access processing unit (which may hereafter be referred to as a "reception multiple access processing unit") 130 and a transmission non-orthogonal and orthogonal multiple access processing unit (which may hereafter be referred to as a "transmission multiple access processing unit") 131.

The reception multiple access processing unit 130 performs processing, which supports the non-orthogonal multiple access scheme and the orthogonal multiple access scheme, on a baseband signal output from the reception radio unit 105, to reproduce a transmission signal transmitted from the terminal 200. The reception multiple access processing unit 130 outputs the reproduced transmission signal as a reception signal.

Also, the transmission multiple access processing unit 131 performs processing, which supports the non-orthogonal multiple access scheme and the orthogonal multiple access scheme, on transmission data, a control signal, a pilot signal and system information, to convert into a baseband signal. The transmission multiple access processing unit 131 outputs the baseband signal.

First, the details of the transmission multiple access processing unit 131 will be described, and next, the details of the reception multiple access processing unit 130 will be described.

Figure 47:
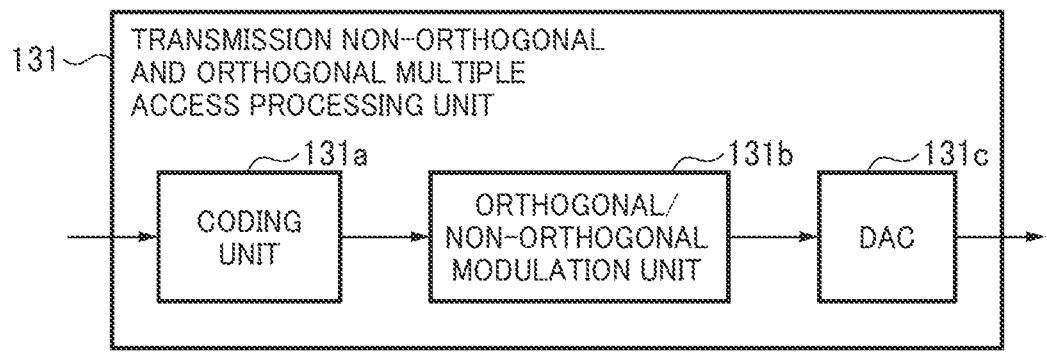
FIG. 47 is a diagram illustrating a configuration example of a transmission non-orthogonal and orthogonal multiple access processing unit.

FIG. 47 is a diagram illustrating a configuration example of the transmission multiple access processing unit 131. The transmission multiple access processing unit 131 includes a coding unit 131$a$, an orthogonal/non-orthogonal modulation unit 131$b$ and a DAC 131$c$.

The coding unit 131$a$ performs error correction coding processing on a reception signal according to a coding rate scheduled in the radio channel control unit 110, to convert into coded data.

The orthogonal/non-orthogonal modulation unit 131$b$ performs modulation processing which supports the orthogonal multiple access scheme and the non-orthogonal multiple access scheme, on the coded data, to output modulation data. As the modulation processing which supports the non-orthogonal multiple access scheme, there is hierarchical modulation processing, for example, and hereinafter, a description will be given taking the hierarchical modulation processing as an example. The same also applies to the embodiments thereafter.

Figure 48:
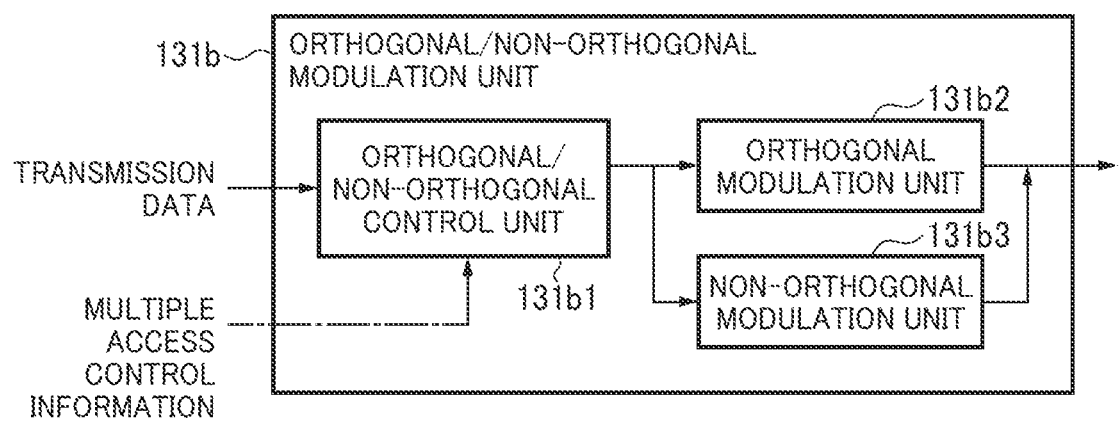
FIG. 48 is a diagram illustrating a configuration example of an orthogonal/non-orthogonal modulation unit.

FIG. 48 is a diagram illustrating a configuration example of the orthogonal/non-orthogonal modulation unit 131$b$. The orthogonal/non-orthogonal modulation unit 131$b$ includes an orthogonal/non-orthogonal control unit 131$b$1, an orthogonal modulation unit 131$b$2 and a non-orthogonal modulation unit 131$b$3.

The orthogonal/non-orthogonal control unit 131$b$1 outputs transmission data (or coded data) to the orthogonal modulation unit 131$b$2 or the non-orthogonal modulation unit 131$b$3, based on multiple access control information. The orthogonal/non-orthogonal control unit 131$b$1 outputs the transmission data to the orthogonal modulation unit 131$b$2 when information indicative of the orthogonal multiple access scheme is included in the multiple access control information. On the other hand, the orthogonal/non-orthogonal control unit 131$b$1 outputs the transmission data to the non-orthogonal modulation unit 131$b$3 when information indicative of the non-orthogonal multiple access scheme is included in the multiple access information. The orthogonal modulation unit 131$b$2 modulates the transmission data according to the result of scheduling in the radio channel control unit 110, such as QPSK, 16QAM, etc. The non-orthogonal modulation unit 131$b$3 performs hierarchical modulation on the transmission data by the first layer modulation unit 123$b$2 and the second layer modulation unit 123$b$1, as depicted in FIGS. 20 and 21, for example. The orthogonal modulation unit 131$b$2 and the non-orthogonal modulation unit 131$b$3 output the modulation data to the DAC 131$c$.

Here, the multiple access control information is generated by the multiple access control unit 110$f$ of the radio channel control unit 110, for example, and is input to the orthogonal/non-orthogonal control unit 131$b$1.

Figure 49:
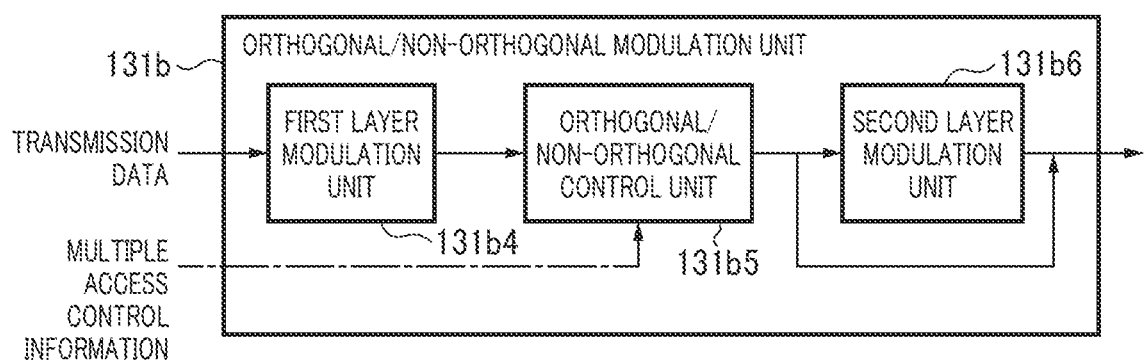
FIG. 49 is a diagram illustrating a configuration example of an orthogonal/non-orthogonal modulation unit.

FIGS. 49 through 52 are diagrams illustrating other configuration examples of the orthogonal/non-orthogonal modulation unit 131$b$. As depicted in FIG. 49, the orthogonal/non-orthogonal modulation unit 131$b$ includes a first layer modulation unit 131$b$4, an orthogonal/non-orthogonal control unit 131$b$5 and a second layer modulation unit 131$b$6. In the example of FIG. 49, first, the first layer modulation unit 131$b$4 modulates the transmission data. Next, when information indicative of the orthogonal multiple access scheme is included in the multiple access control information, the orthogonal/non-orthogonal control unit 131$b$5 outputs primary modulation data, which is output from the first layer modulation unit 131$b$4, to the DAC 131$c$, without outputting to the second layer modulation unit 131$b$6. In this case, the primary modulation data becomes modulation data associated with the orthogonal multiple access scheme, so as to be output from the orthogonal/non-orthogonal modulation unit 131b. On the other hand, when information indicative of the non-orthogonal multiple access scheme is included in the multiple access control information, the primary modulation data which is output from the first layer modulation unit 131b4 is output to the second layer modulation unit 131b6.

Figure 50:
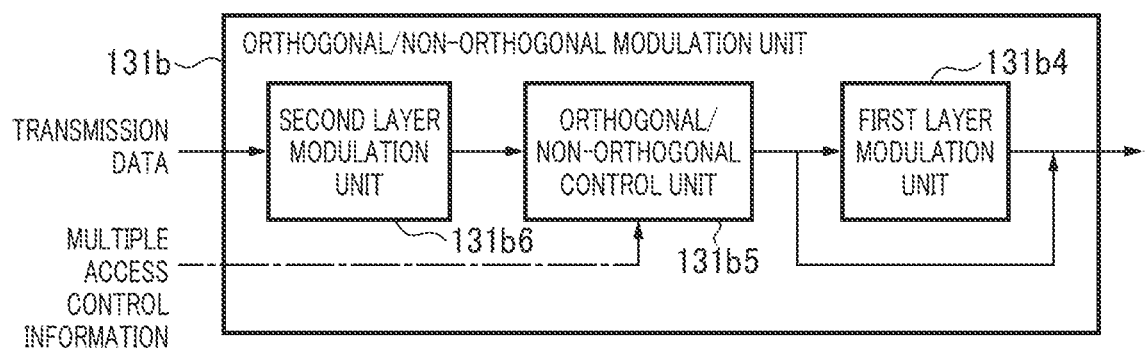
FIG. 50 is a diagram illustrating a configuration example of an orthogonal/non-orthogonal modulation unit.

The orthogonal/non-orthogonal modulation unit 131b depicted in FIG. 50 is a configuration example in which, as to the orthogonal/non-orthogonal modulation unit 131b depicted in FIG. 49, the order of the first layer modulation unit 131b4 and the second layer modulation unit 131b6 is replaced.

Figure 51:
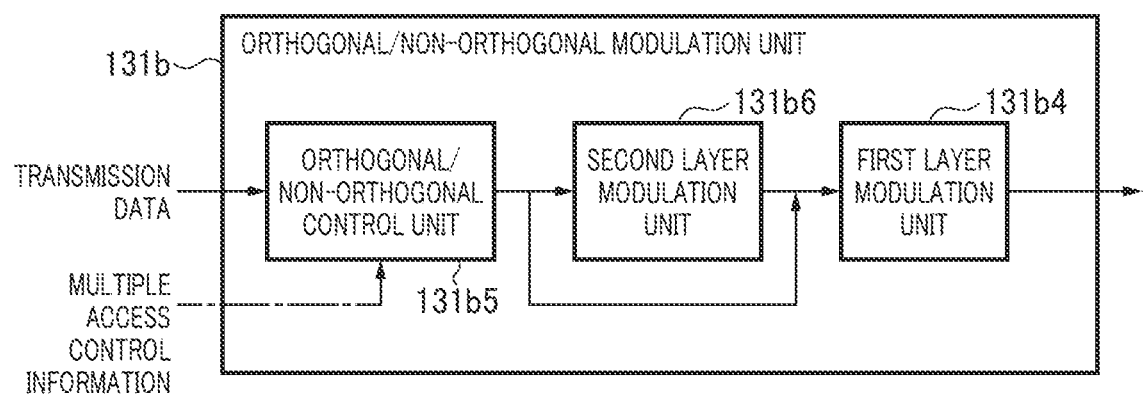
FIG. 51 is a diagram illustrating a configuration example of an orthogonal/non-orthogonal modulation unit.

Also, the orthogonal/non-orthogonal modulation unit 131b depicted in FIG. 51 illustrates an example of inputting, to the orthogonal/non-orthogonal modulation unit 131b depicted in FIG. 49, the transmission data first to the orthogonal/non-orthogonal control unit 131b5. Namely, the orthogonal/non-orthogonal control unit 131b5 outputs the transmission data to the first layer modulation unit 131b4 without outputting to the second layer modulation unit 131b6, or outputs the transmission data to the second layer modulation unit 131b6, on the basis of the multiple access control information. The former is a case when the information of the orthogonal multiple access scheme is included in the multiple access control information, whereas the latter is a case when the information of the non-orthogonal multiple access scheme is included in the multiple access control information.

Figure 52:
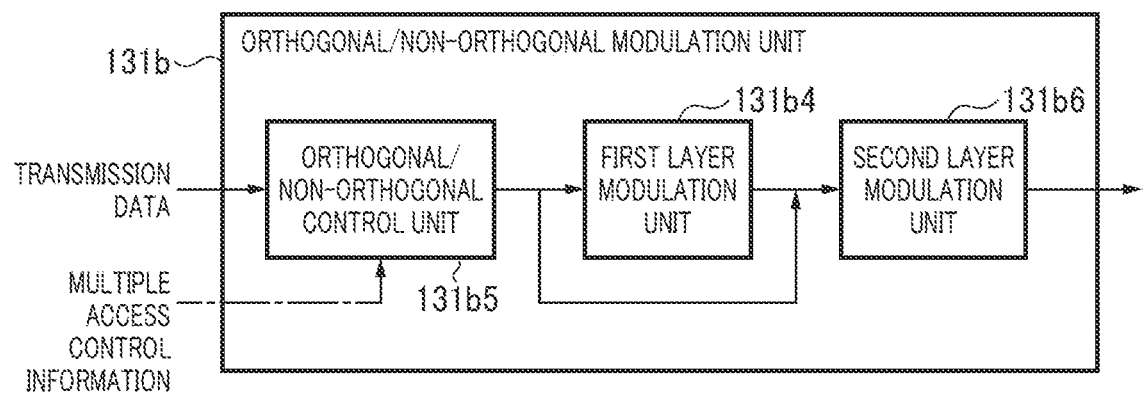
FIG. 52 is a diagram illustrating a configuration example of an orthogonal/non-orthogonal modulation unit.

Further, the orthogonal/non-orthogonal modulation unit 131b depicted in FIG. 52 illustrates a configuration example in which, as to the orthogonal/non-orthogonal modulation unit 131b depicted in FIG. 51, the order of the first layer modulation unit 131b4 and the second layer modulation unit 131b6 is replaced.

As such, the orthogonal/non-orthogonal modulation unit 131b supports two modulation schemes, which are the orthogonal modulation which supports the orthogonal access scheme and non-orthogonal modulation (for example, hierarchical modulation) which supports the non-orthogonal access scheme, and is configured to support both multiple access schemes.

As depicted in FIGS. 48 through 52, the orthogonal/non-orthogonal control unit 131b5, the first layer modulation unit 131b4 and the second layer modulation unit 131b6 in the orthogonal/non-orthogonal modulation unit 131b1 may be connected in any order.

Figure 53:
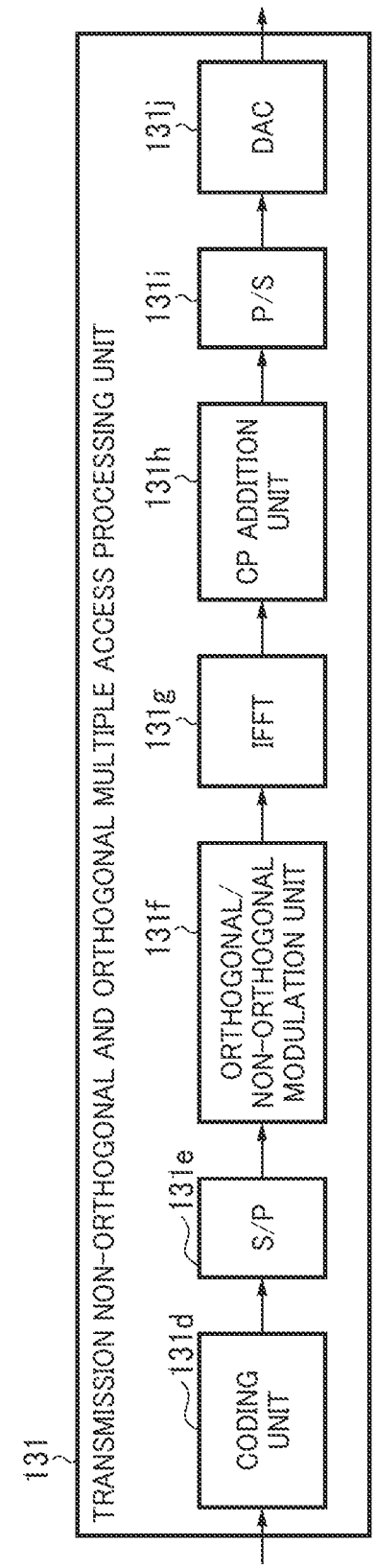
FIG. 53 is a diagram illustrating a configuration example of a transmission non-orthogonal and orthogonal multiple access processing unit.

FIG. 53 is a diagram illustrating another configuration example of the transmission multiple access processing unit 131. The transmission multiple access processing unit 131 includes a coding unit 131d, an S/P 131e, an orthogonal/non-orthogonal modulation unit 131f, an IFFT 131g, a CP addition unit 131h, a P/S 131i and a DAC 131j.

Transmission data, a pilot signal, system information, etc. are input to the coding unit 131d and, after error correction coding processing is performed in the coding unit 131d, converted into coded data. The coded data is converted in the S/P 131e from the coded data of a serial format to the coded data of a parallel format, so as to be converted into coded data for each subcarrier. As to the coded data for each subcarrier, modulation processing which supports the orthogonal multiple access scheme and the non-orthogonal multiple access scheme is performed in the orthogonal/non-orthogonal modulation unit 131f. The orthogonal/non-orthogonal modulation unit 131f may be each orthogonal/non-orthogonal modulation unit 131b as depicted in FIGS. 47 through 52, for example. The modulation signal output from the orthogonal/non-orthogonal modulation unit 131f is converted in the IFFT 131g from a frequency domain signal into a time domain, and in the CP addition unit 131h, a CP is added to the time domain signal. The signal to which the CP is added is converted in the P/S 131i from a parallel format signal to a serial format signal, and in the DAC 131j, the serial format signal is converted from a digital signal to an analog signal. The transmission multiple access processing unit 131 outputs the analog signal, which is output from the DAC 131j, as a baseband signal.

Figure 54:
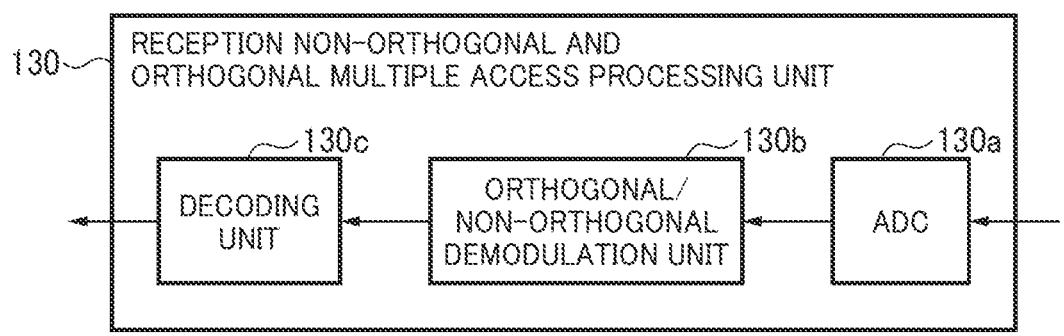
FIG. 54 is a diagram illustrating a configuration example of a reception non-orthogonal and orthogonal multiple access processing unit.

Referring back to FIG. 46, next, a description will be given on a configuration example of the reception multiple access processing unit 130. FIG. 54 is a diagram illustrating a configuration example of the reception multiple access processing unit 130. The reception multiple access processing unit 130 includes an ADC 130a, an orthogonal/non-orthogonal demodulation unit 130b and a decoding unit 130c.

The ADC 130a converts the baseband signal, which is output from the reception radio unit 105, from the analog signal to a digital signal.

The orthogonal/non-orthogonal demodulation unit 130b performs demodulation processing to support the orthogonal multiple access scheme and the non-orthogonal multiple access scheme, on the digital signal, to output demodulation data. As the demodulation processing to support the non-orthogonal multiple access scheme, for example, there is hierarchical demodulation processing. In the following, a description will be given by taking the hierarchical demodulation processing as an example. The same also applies to the embodiments thereafter.

Figure 55:
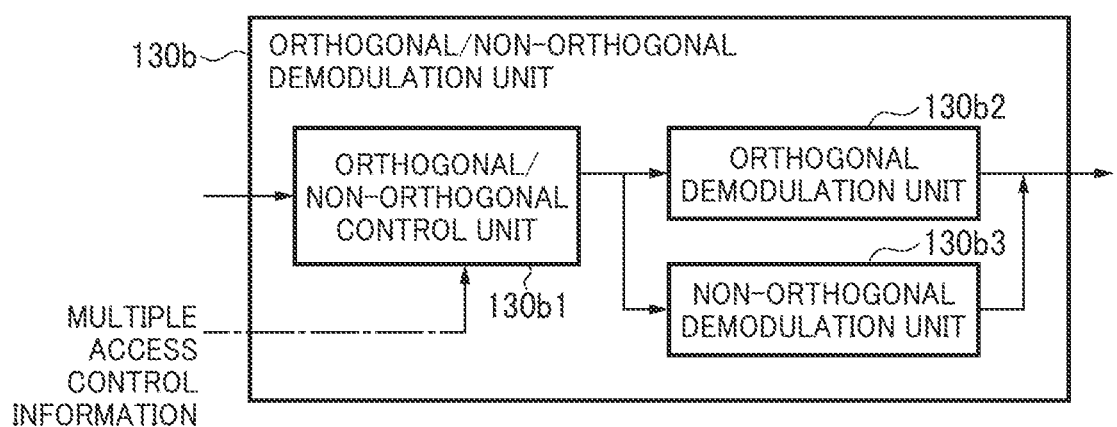
FIG. 55 is a diagram illustrating a configuration example of an orthogonal/non-orthogonal demodulation unit.

FIG. 55 is a diagram illustrating a configuration example of the orthogonal/non-orthogonal demodulation unit 130b. The orthogonal/non-orthogonal demodulation unit 130b includes an orthogonal/non-orthogonal control unit 130b1, an orthogonal demodulation unit 130b2 and a non-orthogonal demodulation unit 130b3.

The orthogonal/non-orthogonal control unit 130b1 outputs the digital signal to the orthogonal demodulation unit 130b2 or the non-orthogonal demodulation unit 130b3, on the basis of the multiple access control information. The orthogonal/non-orthogonal control unit 130b1 outputs the reception signal to the orthogonal demodulation unit 130b2, when information indicative of the orthogonal multiple access scheme is included in the multiple access control information. On the other hand, the orthogonal/non-orthogonal control unit 130b1 outputs the digital signal to the non-orthogonal demodulation unit 130b3, when information indicative of the non-orthogonal multiple access scheme is included in the multiple access control information. In the orthogonal demodulation unit 130b2, demodulation processing is performed on the digital signal according to the result of scheduling in the radio channel control unit 110, such as QPSK, 16QAM, etc. The non-orthogonal demodulation unit 130b3 performs hierarchical modulation on the digital signal by the first layer demodulation unit 121b2 and the second layer demodulation unit 121b1, as depicted in FIGS. 24, 25, etc., for example. The orthogonal demodulation unit 130b2 and the non-orthogonal demodulation unit 130b3 output modulation data to the decoding unit 130c.

Here, for example, the multiple access control information is generated in the multiple access control unit 110f of the radio channel control unit 110, so as to be input to the orthogonal/non-orthogonal control unit 130b1.

Similar to the orthogonal/non-orthogonal modulation unit 131b (for example, FIGS. 48 through 52), the orthogonal/ non-orthogonal control unit 130b1, the orthogonal demodulation unit 130b2 and the non-orthogonal demodulation unit 130b3 which are included in the orthogonal/non-orthogonal demodulation unit 130b may be connected in any order.

As such, the orthogonal/non-orthogonal demodulation unit 130b supports two modulation schemes, namely, orthogonal demodulation which supports the orthogonal multiple access scheme and non-orthogonal demodulation (for example, hierarchical demodulation) which supports the non-orthogonal multiple access scheme, so that demodulation processing may be performed in either of the multiple access schemes.

Referring back to FIG. 54, the decoding unit 130c performs, on the demodulation signal output from the orthogonal/non-orthogonal demodulation unit 130b, error correction decoding processing according to a coding rate etc. scheduled in the radio channel control unit 110, to convert into a reception signal. The decoding unit 130c outputs the reception signal.

Figure 56:
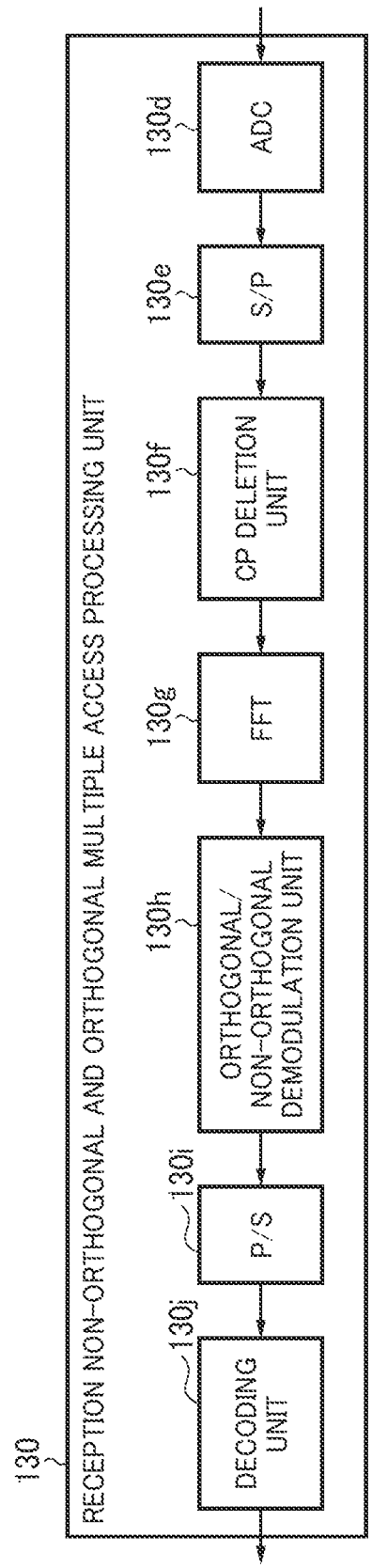
FIG. 56 is a diagram illustrating a configuration example of a reception non-orthogonal and orthogonal multiple access processing unit.

FIG. 56 is a diagram illustrating another configuration example of the reception multiple access processing unit 130. The reception multiple access processing unit 130 includes an ADC 130d, an S/P 130e, a CP deletion unit 130f, an FFT 130g, an orthogonal/non-orthogonal demodulation unit 130h, a P/S 130i and a decoding unit 130j.

A baseband signal which is output from the reception radio unit 105 is converted in the ADC 130d from an analog signal to a digital signal, and in the S/P 130e, the digital signal of a serial format is converted into the digital signal of a parallel format. In the CP deletion unit 130f, a CP is deleted from the parallel format digital signal, and in the FFT 130g, conversion from a time domain signal to a frequency domain signal is performed. On the frequency domain signal, orthogonal demodulation or hierarchical demodulation is performed in the orthogonal/non-orthogonal demodulation unit 130h, so that conversion to a demodulation signal is performed. The orthogonal/non-orthogonal demodulation unit 130h may be, for example, the orthogonal/non-orthogonal demodulation unit 130b as depicted in FIG. 55. The demodulation signal is converted in the P/S 130i from the parallel format signal to a serial format signal, and on the serial format signal, error correction decoding processing is performed in the decoding unit 130j, so that the transmission signal transmitted from each terminal 200 is reproduced. The reception multiple access processing unit 130 outputs the reproduced transmission signal as a reception signal.

Figure 57:
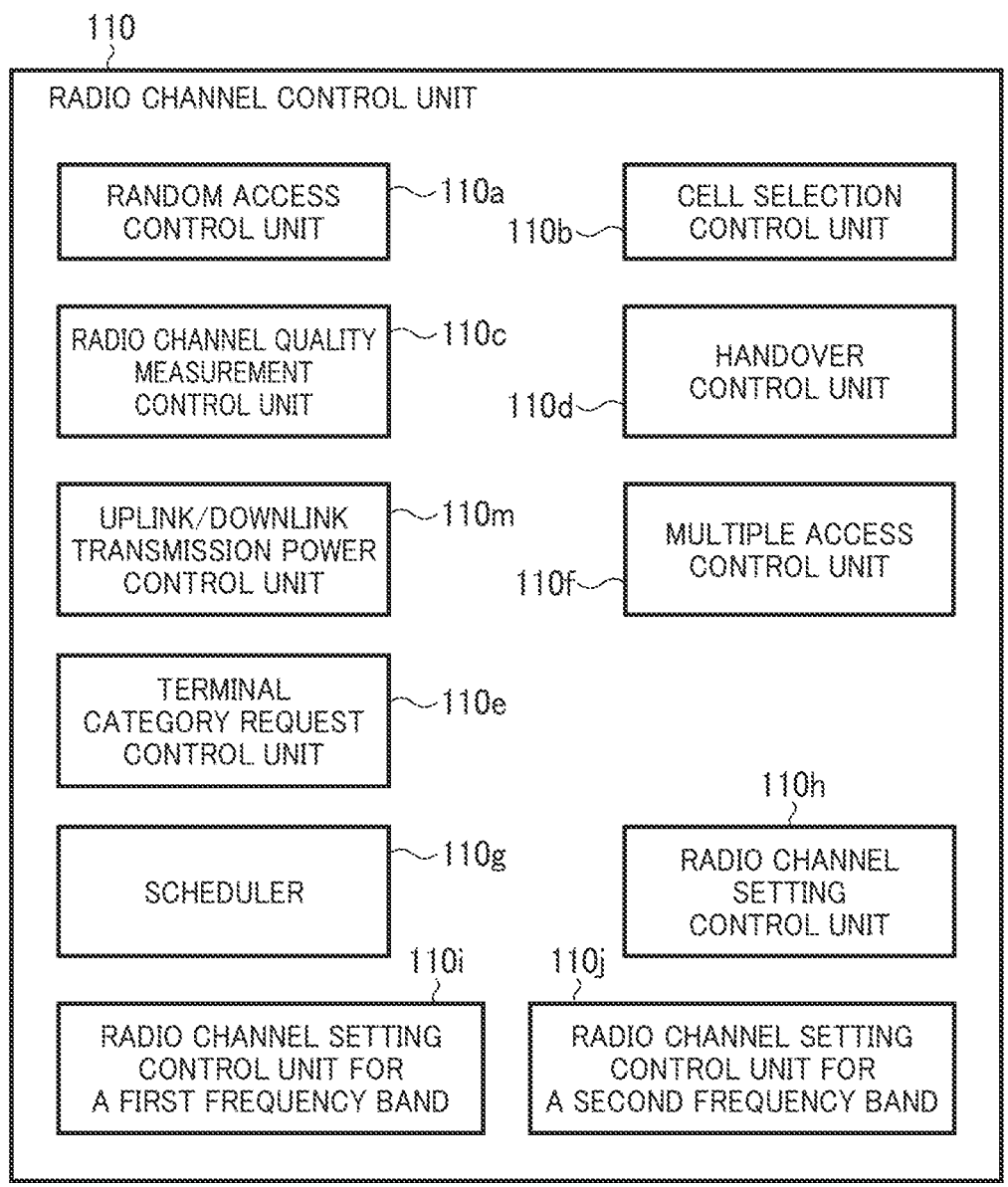
FIG. 57 is a diagram illustrating a configuration example of a radio channel control unit.

FIG. 57 is a diagram illustrating a configuration example of the radio channel control unit 110 in the base station 100 which supports the orthogonal multiple access scheme and the non-orthogonal multiple access scheme. The radio channel control unit 110 depicted in FIG. 57 has a merged configuration of the radio channel control unit 110 (orthogonal multiple access scheme) as depicted in FIG. 15 with the radio channel control unit 110 (non-orthogonal multiple access scheme) as depicted in FIG. 27.

Here, the terminal category request control unit 110c may request of the terminal 200 at least one of the terminal performance information of the non-orthogonal multiple access scheme and the terminal performance information of the orthogonal multiple access scheme.

In the above, using FIG. 46 etc., the description has been given on the configuration example of the base station 100 which supports the orthogonal multiple access scheme and the non-orthogonal multiple access scheme. Here, FIG. 46 illustrates the configuration example of the base station 100 when the terminal category is identified in the terminal 200.

It may also be possible to configure to identify the terminal category in the base station 100. In this case, for example, in the base station 100 as depicted in FIG. 16, a configuration example of the base station 100 when the terminal category is identified in the base station 100 is obtained by replacing the reception orthogonal multiple access processing unit 106 and the transmission orthogonal multiple access processing unit 115 with the reception multiple access processing unit 130 and the transmission multiple access processing unit 131, respectively.

In this case, the terminal category identification unit 119 identifies the terminal category on the basis of terminal performance information transmitted from the terminal 200. From a terminal 200 which supports the orthogonal multiple access scheme, the terminal performance information of the orthogonal multiple access scheme is transmitted, and also, from a terminal 200 which supports the non-orthogonal multiple access scheme, the terminal performance information of the non-orthogonal multiple access scheme is transmitted. Also, from a terminal 200 which supports both access schemes, terminal performance information indicating that both access schemes are supported is transmitted, as will be described later.

Accordingly, the terminal category identification unit 119 identifies a terminal category on the basis of information which indicates the performance or capability of the terminal 200 concerning the non-orthogonal multiple access scheme. Also, the terminal category identification unit 119 identifies a terminal category on the basis of information which indicates the performance or capability of the terminal 200 concerning the orthogonal multiple access scheme. Further, the terminal category identification unit 119 identifies a terminal category on the basis of information which indicates the performance or capability of the terminal 200 concerning that both of the orthogonal multiple access scheme and the non-orthogonal multiple access scheme are supported.

Thus, the terminal category identification unit 119 identifies the terminal category of the terminal 200, on the basis of at least one of information, which indicates the performance or capability of the terminal 200 concerning the non-orthogonal multiple access scheme and the orthogonal multiple access scheme, and information which indicates the performance or capability of the terminal 200 concerning the orthogonal multiple access scheme.

<4. Terminal Configuration Example which Supports the Orthogonal Multiple Access Scheme and the Non-Orthogonal Multiple Access Scheme>

Next, a description will be given on a configuration example of a terminal 200 which supports the orthogonal multiple access scheme and the non-orthogonal multiple access scheme in the uplink direction, and also supports the orthogonal multiple access scheme and the non-orthogonal multiple access scheme in the downlink direction.

Figure 58:
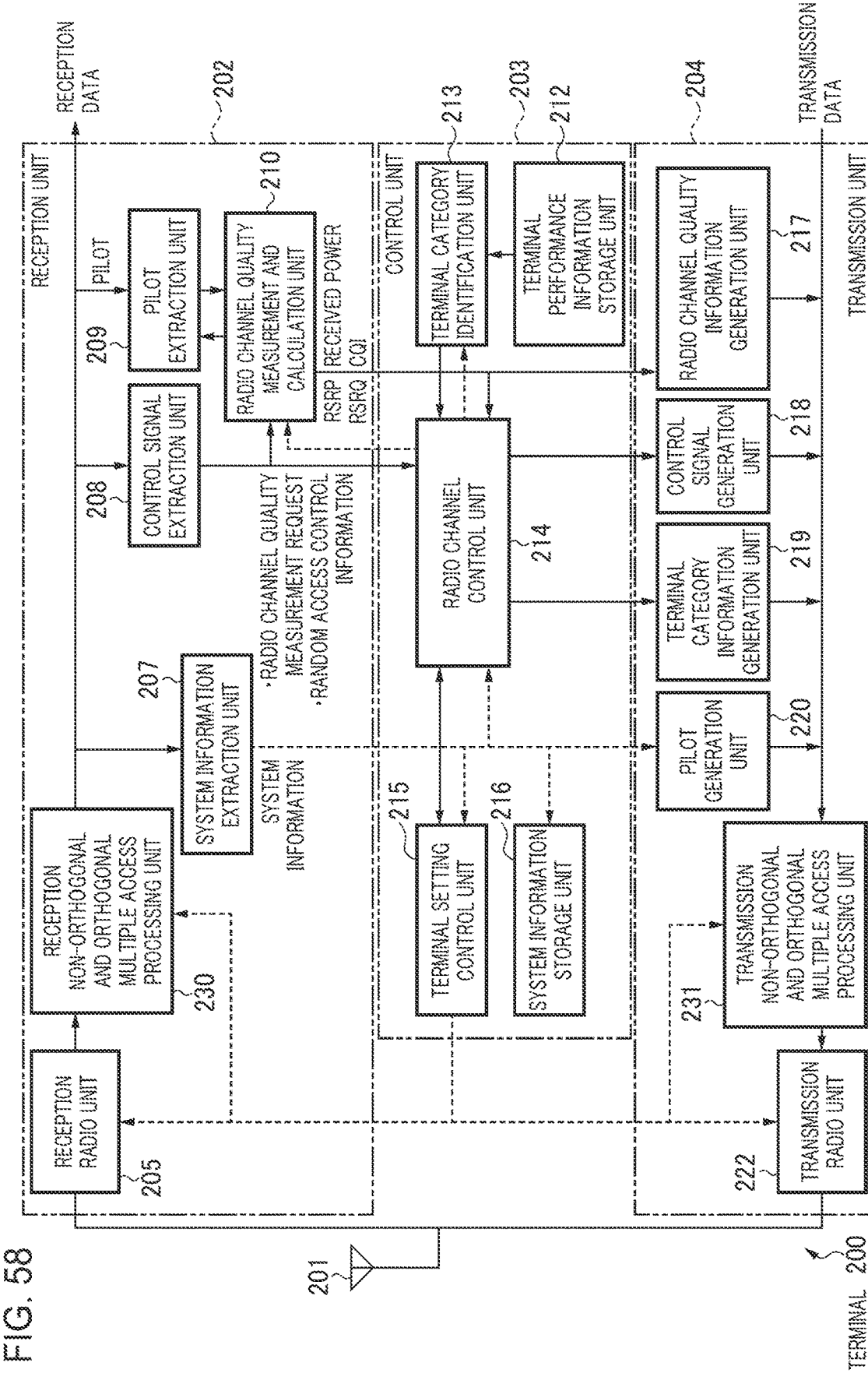
FIG. 58 is a diagram illustrating a configuration example of a terminal.

FIG. 58 is a diagram illustrating a configuration example of such a terminal 200. The terminal 200 further includes a reception non-orthogonal and orthogonal multiple access processing unit (which may hereafter be referred to as a "reception multiple access processing unit") 230 and a transmission non-orthogonal and orthogonal multiple access processing unit (which may hereafter be referred to as a "transmission multiple access processing unit") 231.

The reception multiple access processing unit 230 performs processing, which supports the non-orthogonal multiple access scheme and the orthogonal multiple access scheme, on a baseband signal output from the reception radio unit 205, to reproduce a transmission signal transmitted from the base station 100. The reception multiple access processing unit 230 outputs the reproduced transmission signal as a reception signal.

Also, the transmission multiple access processing unit 231 performs processing, which supports the non-orthogonal multiple access scheme and the orthogonal multiple access scheme, on transmission data, radio channel quality information, a control signal, terminal category information, a pilot signal, etc. to convert into a baseband signal. The transmission multiple access processing unit 231 outputs the baseband signal.

Here, the terminal 200 depicted in FIG. 58 supports both access schemes. Therefore, a terminal category identification unit 213 identifies the terminal category of the terminal 200 on the basis of information indicating the performance or capability of the terminal 200 concerning the non-orthogonal multiple access scheme and the orthogonal multiple access scheme. In a terminal performance information storage unit 212, there is stored terminal performance information which includes the information indicating the performance or capability of the terminal 200 concerning the non-orthogonal multiple access scheme and the orthogonal multiple access scheme.

Next, a description will be given on the details of the transmission multiple access processing unit 231 and the reception multiple access processing unit 230. First, the details of the transmission multiple access processing unit 231 will be described, and next, the details of the reception multiple access processing unit 230 will be described.

Figure 59:
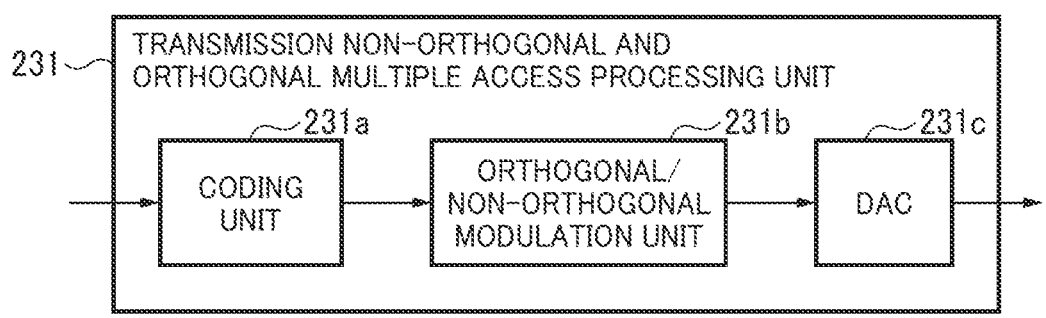
FIG. 59 is a diagram illustrating a configuration example of a transmission non-orthogonal and orthogonal multiple access processing unit.

FIG. 59 is a diagram illustrating a configuration example of the transmission multiple access processing unit 231. The transmission multiple access processing unit 231 includes a coding unit 231$a$, an orthogonal/non-orthogonal modulation unit 231$b$ and a DAC 231$c$.

The coding unit 231$a$ performs error correction coding processing on transmission data and radio channel quality information, according to a coding rate etc. scheduled in the base station 100 and instructed from a terminal setting control unit 215, to convert into coded data.

The orthogonal/non-orthogonal modulation unit 231$b$ performs modulation processing, which supports the orthogonal multiple access scheme and the non-orthogonal multiple access scheme, on the coded data to output modulation data. As the modulation processing which supports the non-orthogonal multiple access scheme, for example, there is hierarchical modulation processing.

Figure 60:
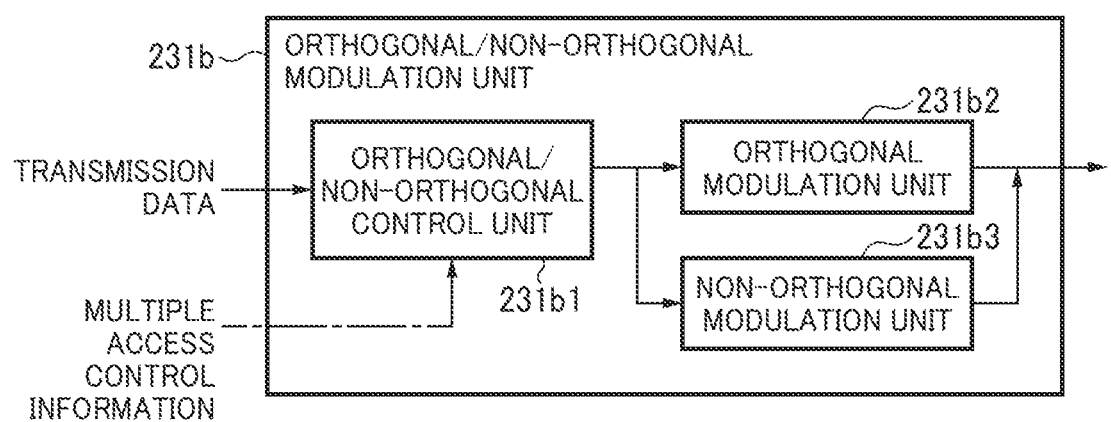
FIG. 60 is a diagram illustrating a configuration example of an orthogonal/non-orthogonal modulation unit.

FIG. 60 is a diagram illustrating a configuration example of the orthogonal/non-orthogonal modulation unit 231$b$. The orthogonal/non-orthogonal modulation unit 231$b$ is of an identical configuration to the orthogonal/non-orthogonal modulation unit 131$b$ of the base station 100 (for example, FIG. 48), and includes an orthogonal/non-orthogonal control unit 231$b1$, an orthogonal modulation unit 231$b2$ and a non-orthogonal modulation unit 231$b3$. The orthogonal/non-orthogonal control unit 131$b1$ outputs the coded data to the orthogonal modulation unit 231$b2$ when information indicative of the orthogonal multiple access scheme is included in multiple access control information. On the other hand, when information indicative of the non-orthogonal multiple access scheme is included in multiple access control information, the orthogonal/non-orthogonal control unit 231$b1$ outputs the coded data to the non-orthogonal modulation unit 231$b3$. In the orthogonal modulation unit 231$b2$, the transmission data is modulated according to the result of scheduling in the base station 100, such as QPSK, 16QAM, etc. The non-orthogonal modulation unit 231$b3$ performs hierarchical modulation on the transmission data by the first layer modulation unit 123$b2$ and the second layer modulation unit 123$b1$, as depicted in FIGS. 20, 21, etc., for example. The orthogonal modulation unit 231$b2$ and the non-orthogonal modulation unit 231$b3$ output modulation data to the DAC 131$c$.

Here, the multiple access control information is, for example, generated by a multiple access control unit 214$f$ (for example, FIG. 69) of the radio channel control unit 214 and input to the orthogonal/non-orthogonal control unit 231$b1$.

FIGS. 61 through 64 are diagrams illustrating other configuration examples of the orthogonal/non-orthogonal modulation unit 231$b$. As depicted in FIGS. 61 through 64, a first layer modulation unit 231$b4$, an orthogonal/non-orthogonal control unit 231$b5$ and a second layer modulation unit 231$b6$ may be connected in any order, similar to the orthogonal/non-orthogonal modulation unit 131$b$ in the base station 100 (for example, FIGS. 48 through 52).

Figure 61:
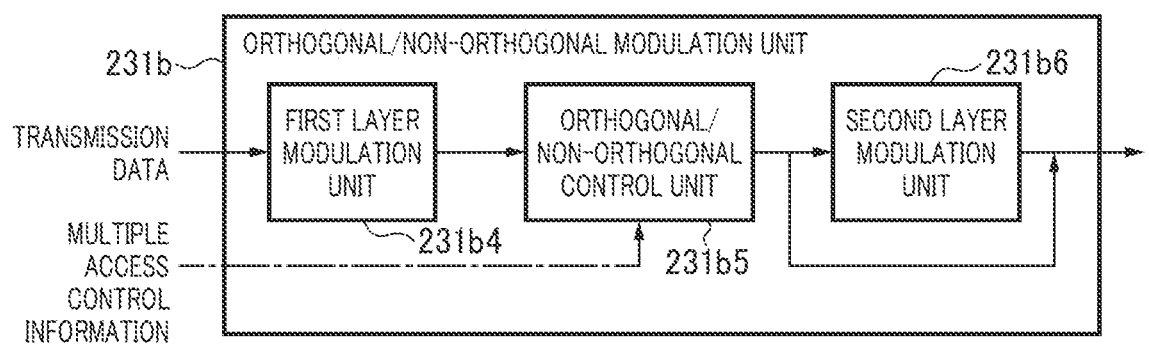
FIG. 61 is a diagram illustrating a configuration example of an orthogonal/non-orthogonal modulation unit.
Figure 62:
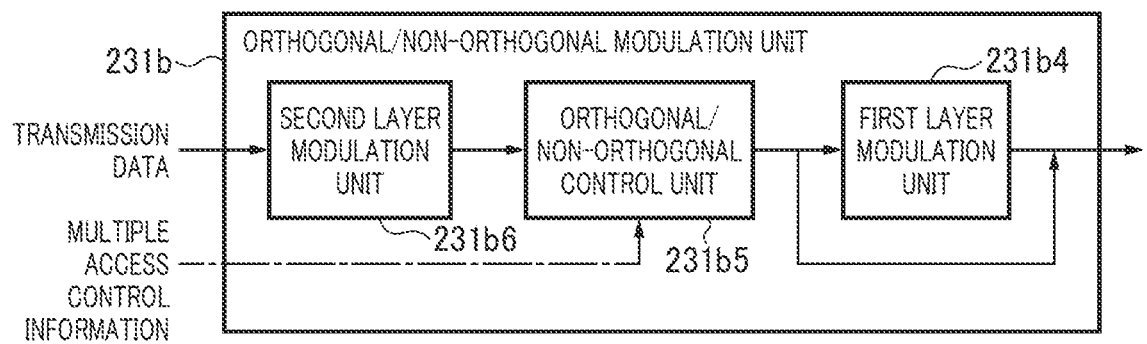
FIG. 62 is a diagram illustrating a configuration example of an orthogonal/non-orthogonal modulation unit.
Figure 63:
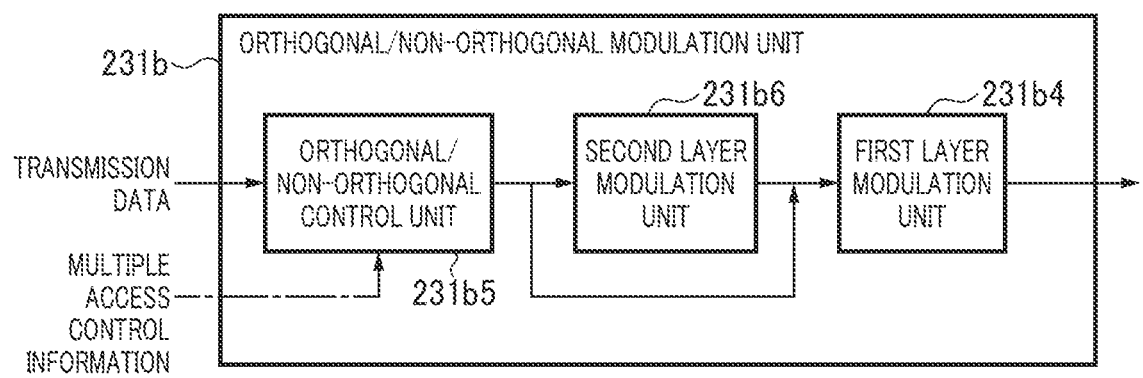
FIG. 63 is a diagram illustrating a configuration example of an orthogonal/non-orthogonal modulation unit.
Figure 64:
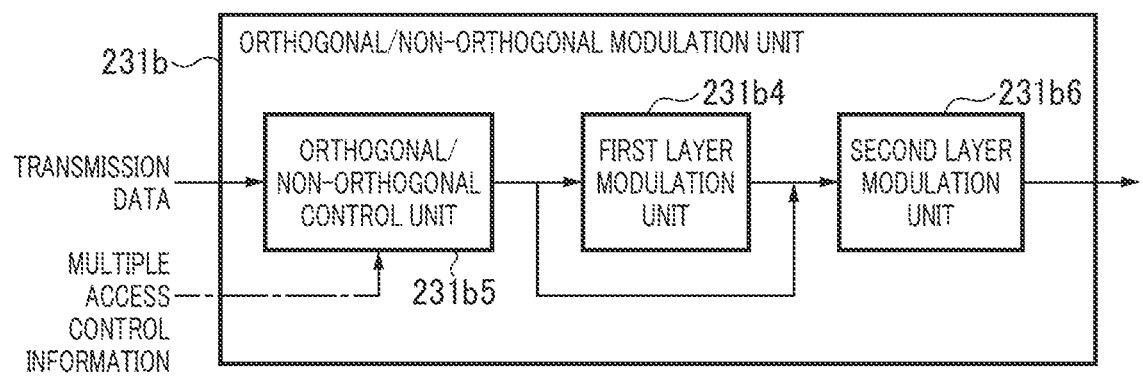
FIG. 64 is a diagram illustrating a configuration example of an orthogonal/non-orthogonal modulation unit.

As depicted in FIG. 61 for example, the orthogonal/non-orthogonal control unit 231$b5$ outputs primary modulation data, which is output from the first layer modulation unit 231$b4$, to the second layer modulation unit 231$b6$ or to the DAC 231$c$, without outputting the second layer modulation unit 231$b6$. In this case, the order of the first layer modulation unit 231$b4$ and the second layer modulation unit 231$b6$ may be replaced (for example, FIG. 62). Also, it may be possible to configure to input transmission data to the orthogonal/non-orthogonal control unit 231$b5$, so as to output the transmission data to the second layer modulation unit 231$b6$ or the first layer modulation unit 231$b4$ according to the multiple access control information (for example, FIGS. 63 and 64).

Figure 65:
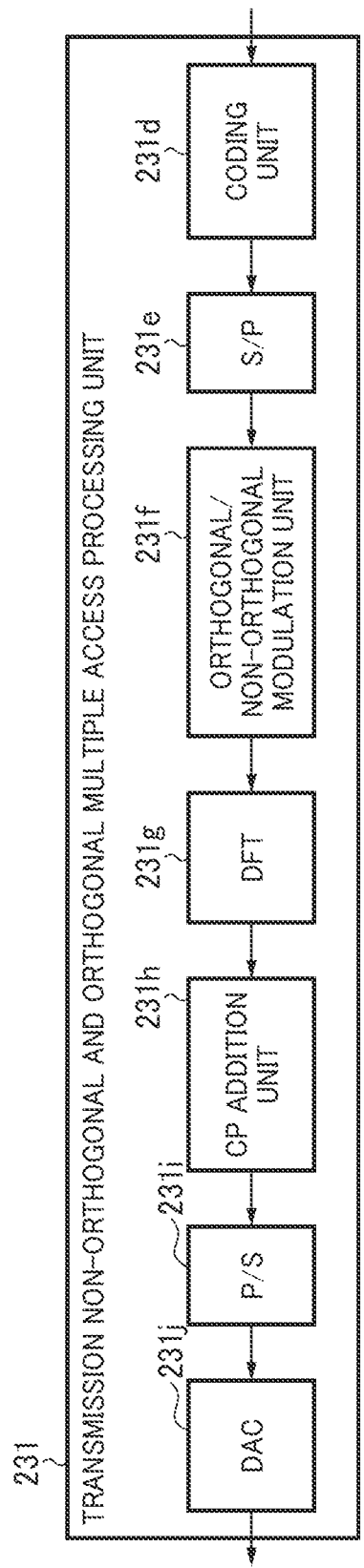
FIG. 65 is a diagram illustrating a configuration example of a transmission non-orthogonal and orthogonal multiple access processing unit.

FIG. 65 is a diagram illustrating another configuration example of the transmission multiple access processing unit 231. The transmission multiple access processing unit 231 includes a coding unit 231$d$, an S/P 231$e$, an orthogonal/non-orthogonal modulation unit 231$f$, a DFT 231$g$, a CP addition unit 231$h$, a P/S 231$i$ and a DAC 231$j$.

Transmission data, a control signal, terminal category information, a pilot signal, etc. are input to the coding unit 231$d$ and converted into coded data after error correction coding processing is performed in the coding unit 231$d$. The coded data is converted in the S/P 231$e$ from the coded data of a serial format to the coded data of a parallel format, so as to be converted into coded data for each subcarrier. On the coded data for each subcarrier, modulation processing which supports the orthogonal multiple access scheme and the non-orthogonal multiple access scheme is performed in the orthogonal/non-orthogonal modulation unit 231$f$. The orthogonal/non-orthogonal modulation unit 231$f$ may be any orthogonal/non-orthogonal modulation unit 231$b$ depicted in FIGS. 60 through 64, for example. The modulation signal output from the orthogonal/non-orthogonal modulation unit 231$f$ is converted to a frequency domain signal in the DFT 231$g$, so that a CP is added in the CP addition unit 231$h$. The signal having the added CP is converted in the P/S 231$i$ from a parallel format signal to a serial format signal, and in the DAC 231$j$, the serial format signal is converted from a digital signal to an analog signal. The transmission multiple access processing unit 231 outputs the analog signal, which is output from the DAC 231$j$, as a baseband signal.

Figure 66:
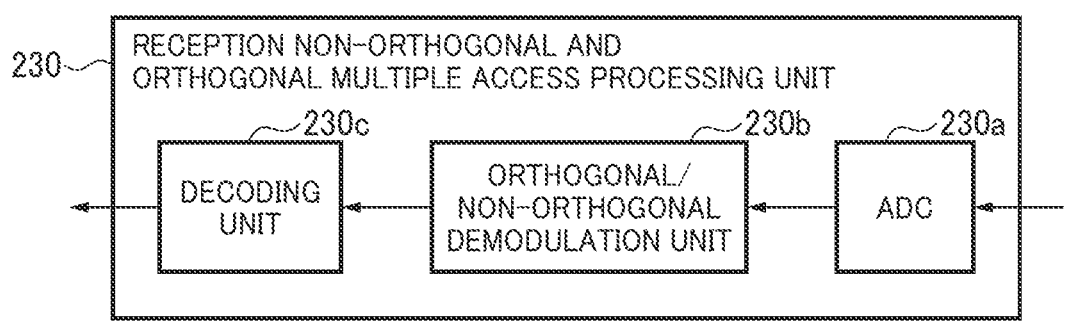
FIG. 66 is a diagram illustrating a configuration example of a reception non-orthogonal and orthogonal multiple access processing unit.

Referring back to FIG. 58, next, a description will be given on a configuration example of the reception multiple access processing unit 230. FIG. 66 is a diagram illustrating a configuration example of the reception multiple access processing unit 230. The reception multiple access processing unit 230 includes an ADC 230a, an orthogonal/non-orthogonal demodulation unit 230b and a decoding unit 230c.

The ADC 230a converts the baseband signal, which is output from the reception radio unit 205, from the analog signal to a digital signal.

The orthogonal/non-orthogonal demodulation unit 230b performs demodulation processing which supports the orthogonal multiple access scheme and the non-orthogonal multiple access scheme on the digital signal to output demodulation data. As the demodulation processing which supports the non-orthogonal multiple access scheme, for example, there is hierarchical demodulation processing.

Figure 67:
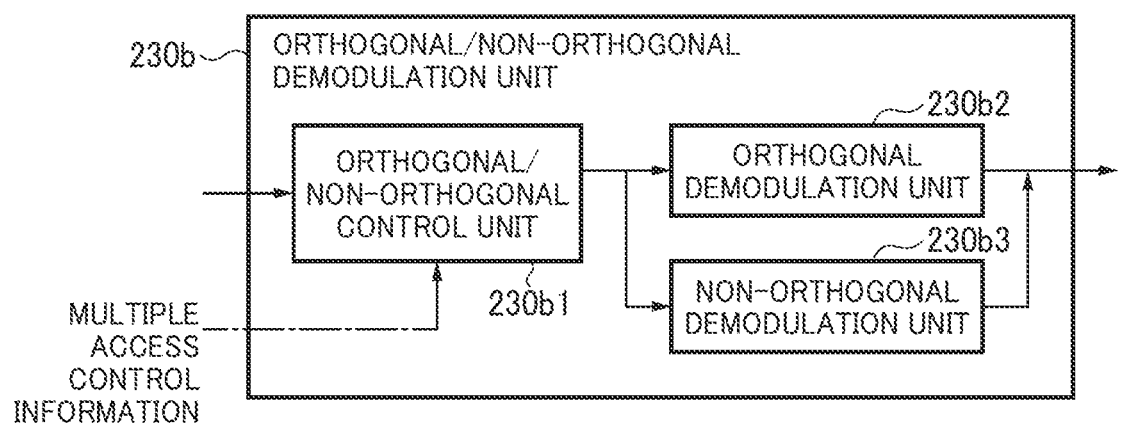
FIG. 67 is a diagram illustrating a configuration example of an orthogonal/non-orthogonal demodulation unit.

FIG. 67 is a diagram illustrating a configuration example of the orthogonal/non-orthogonal demodulation unit 230b. The orthogonal/non-orthogonal demodulation unit 230b includes an orthogonal/non-orthogonal control unit 230b1, an orthogonal demodulation unit 230b2 and a non-orthogonal demodulation unit 230b3.

The orthogonal/non-orthogonal demodulation unit 230b is of an identical configuration to the orthogonal/non-orthogonal demodulation unit 130b of the base station 100. The orthogonal/non-orthogonal control unit 231b1 outputs the reception signal to the orthogonal demodulation unit 231b2, when information indicative of the orthogonal multiple access scheme is included in the multiple access control information. On the other hand, the orthogonal/non-orthogonal control unit 231b1 outputs the reception signal to the non-orthogonal demodulation unit 230b3, when information indicative of the non-orthogonal multiple access scheme is included in the multiple access control information. In the orthogonal demodulation unit 230b2, the demodulation of the reception signal is performed according to the result of scheduling in the base station 100, such as QPSK, 16QAM, etc. The non-orthogonal demodulation unit 230b3 performs hierarchical demodulation on the reception signal by the first layer demodulation unit 121b2 and the second layer demodulation unit 121b1, as depicted in FIGS. 24, 25, etc., for example. The orthogonal demodulation unit 230b2 and the non-orthogonal demodulation unit 230b3 output modulation data to the decoding unit 230c.

Here, for example, the multiple access control information is generated in the multiple access control unit 214f of the radio channel control unit 214, and input to the orthogonal/non-orthogonal control unit 230b1.

The orthogonal/non-orthogonal control unit 230b1, the orthogonal demodulation unit 230b2 and the non-orthogonal demodulation unit 230b3 which are included in the orthogonal/non-orthogonal demodulation unit 230b may be connected in any order.

As such, in the orthogonal/non-orthogonal demodulation unit 230b, orthogonal demodulation which supports the orthogonal multiple access scheme and non-orthogonal demodulation (for example, hierarchical demodulation) which supports the non-orthogonal multiple access scheme are supported, so that demodulation processing may be performed in either of the multiple access schemes.

Figure 68:
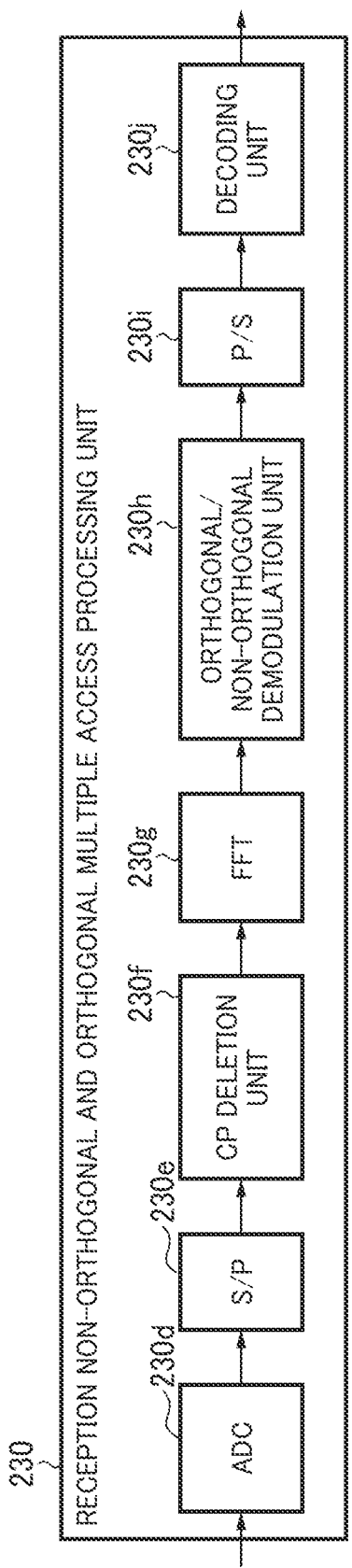
FIG. 68 is a diagram illustrating a configuration example of a reception non-orthogonal and orthogonal multiple access processing unit.

FIG. 68 illustrates another configuration example of the reception multiple access processing unit 230. FIG. 68 is a diagram illustrating the other configuration example of the reception multiple access processing unit 230. The reception multiple access processing unit 230 includes an ADC 230d, an S/P 230e, a CP deletion unit 230f, an FFT 230g, an orthogonal/non-orthogonal demodulation unit 230h, a P/S 230i and a decoding unit 230j.

A baseband signal which is output from the reception radio unit 105 is, after passing through the ADC 230d, the S/P 230e, the CP deletion unit 230f and the FFT 230g, converted into a frequency domain signal from which the CP is deleted. Orthogonal demodulation or hierarchical demodulation is performed on the above signal by the orthogonal/non-orthogonal demodulation unit 230h, so that conversion into a demodulation signal is made. The orthogonal/non-orthogonal demodulation unit 230h may be the orthogonal/non-orthogonal demodulation unit 230b as depicted in FIG. 67, for example. The demodulation signal is output, as a reception signal, through the P/S 230i and the decoding unit 230j.

Figure 69:
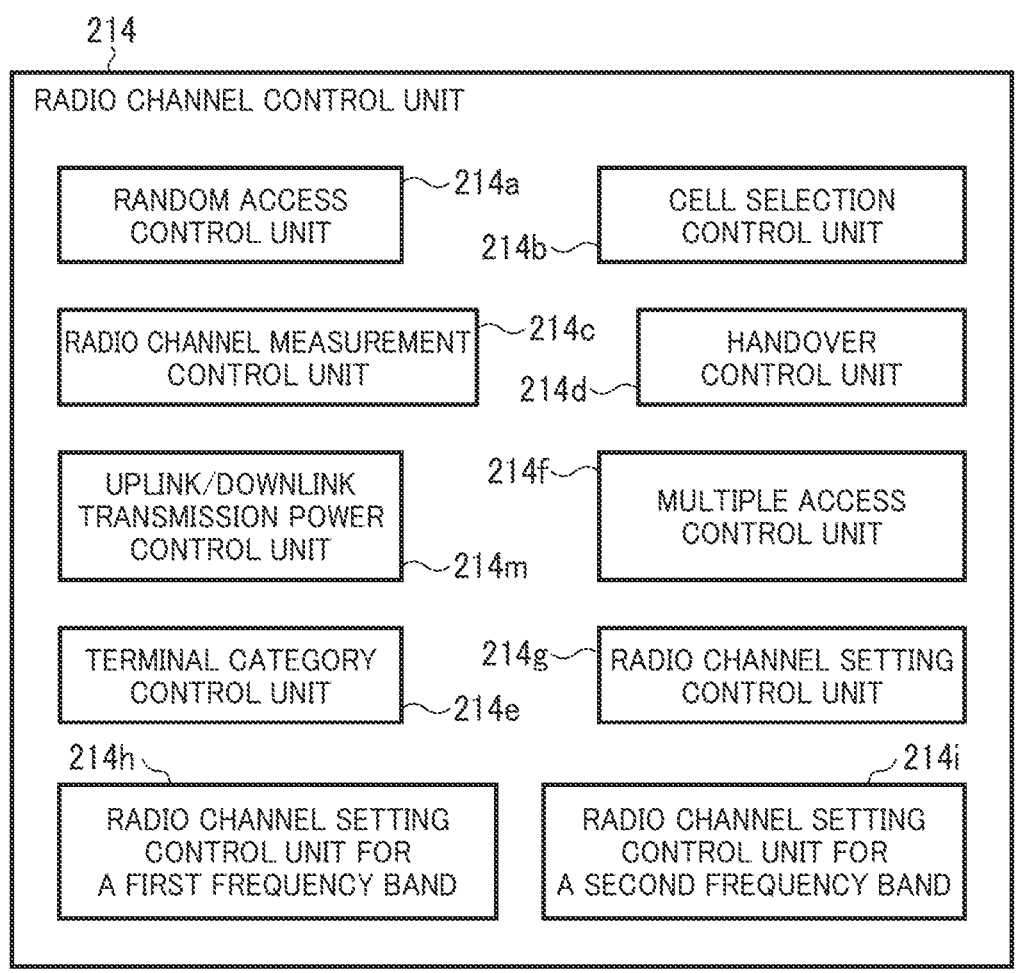
FIG. 69 is a diagram illustrating a configuration example of a radio channel control unit.

FIG. 69 is a diagram illustrating a configuration example of a radio channel control unit 214 in the terminal 200 which supports the orthogonal multiple access scheme and the non-orthogonal multiple access scheme. The radio channel control unit 214 depicted in FIG. 69 is configured by merging the radio channel control unit 214 (orthogonal multiple access scheme) as depicted in FIG. 31 with the radio channel control unit 214 (non-orthogonal multiple access scheme) as depicted in FIG. 43.

In the above, the description has been given, using FIG. 58 etc., on the configuration example of the terminal 200 which supports the orthogonal multiple access scheme and the non-orthogonal multiple access scheme. Here, FIG. 58 illustrates the configuration example of the terminal 200 when the terminal category is identified in the terminal 200. It may also be possible to configure to identify the terminal category in the base station 100. In this case, a configuration example of the terminal 200 is, for example, as follows. Namely, the configuration example of the terminal 200 when the terminal category is identified in the base station 100 is obtained by replacing, in the terminal 200 depicted in FIG. 32, the reception orthogonal multiple access processing unit 206 and the transmission orthogonal multiple access processing unit 221 with the reception multiple access processing unit 230 and the transmission multiple access processing unit 231, respectively.

<5. Variation of 3 and 4>

Figure 70:
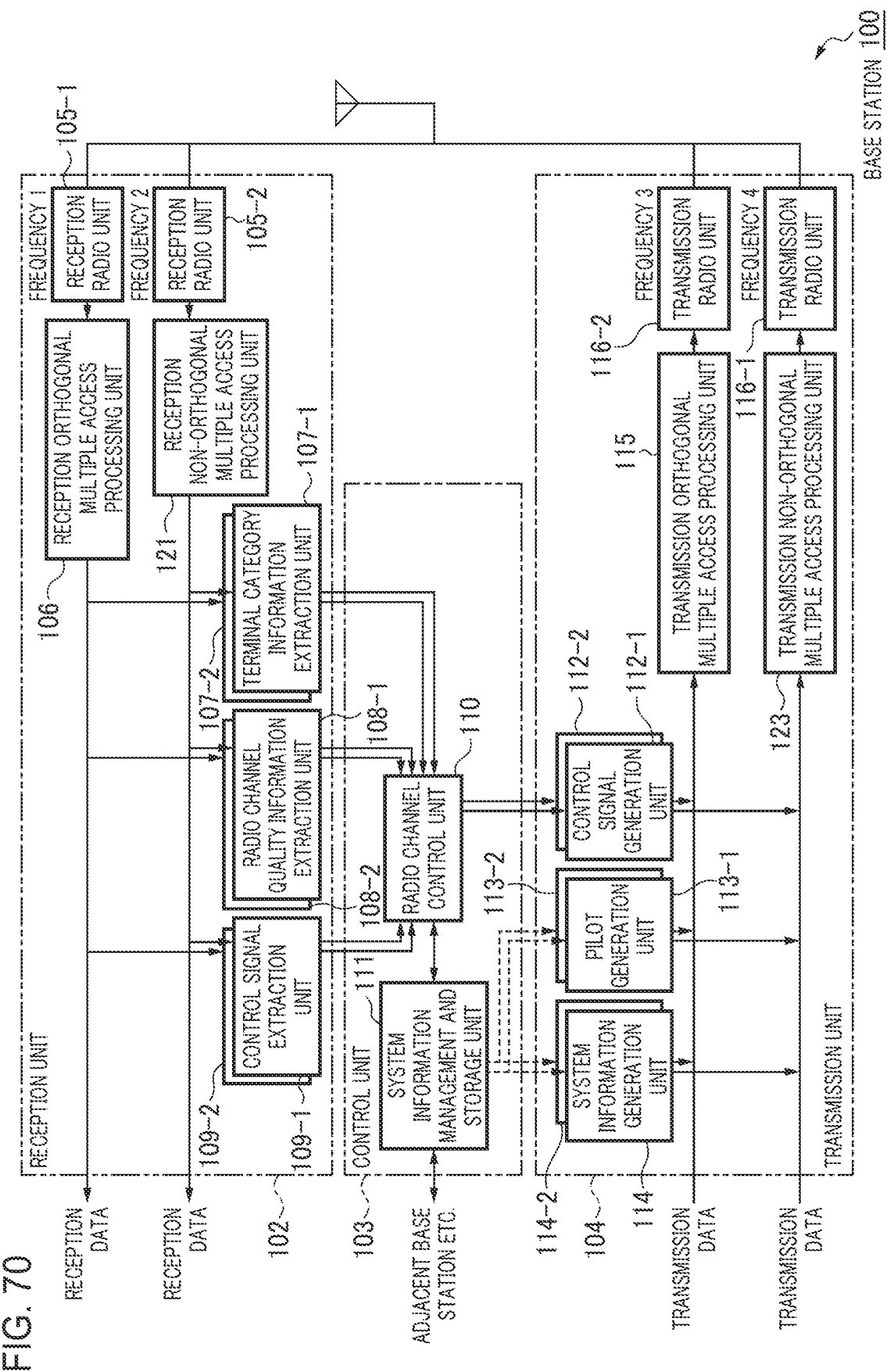
FIG. 70 is a diagram illustrating a configuration example of a base station.
Figure 71:
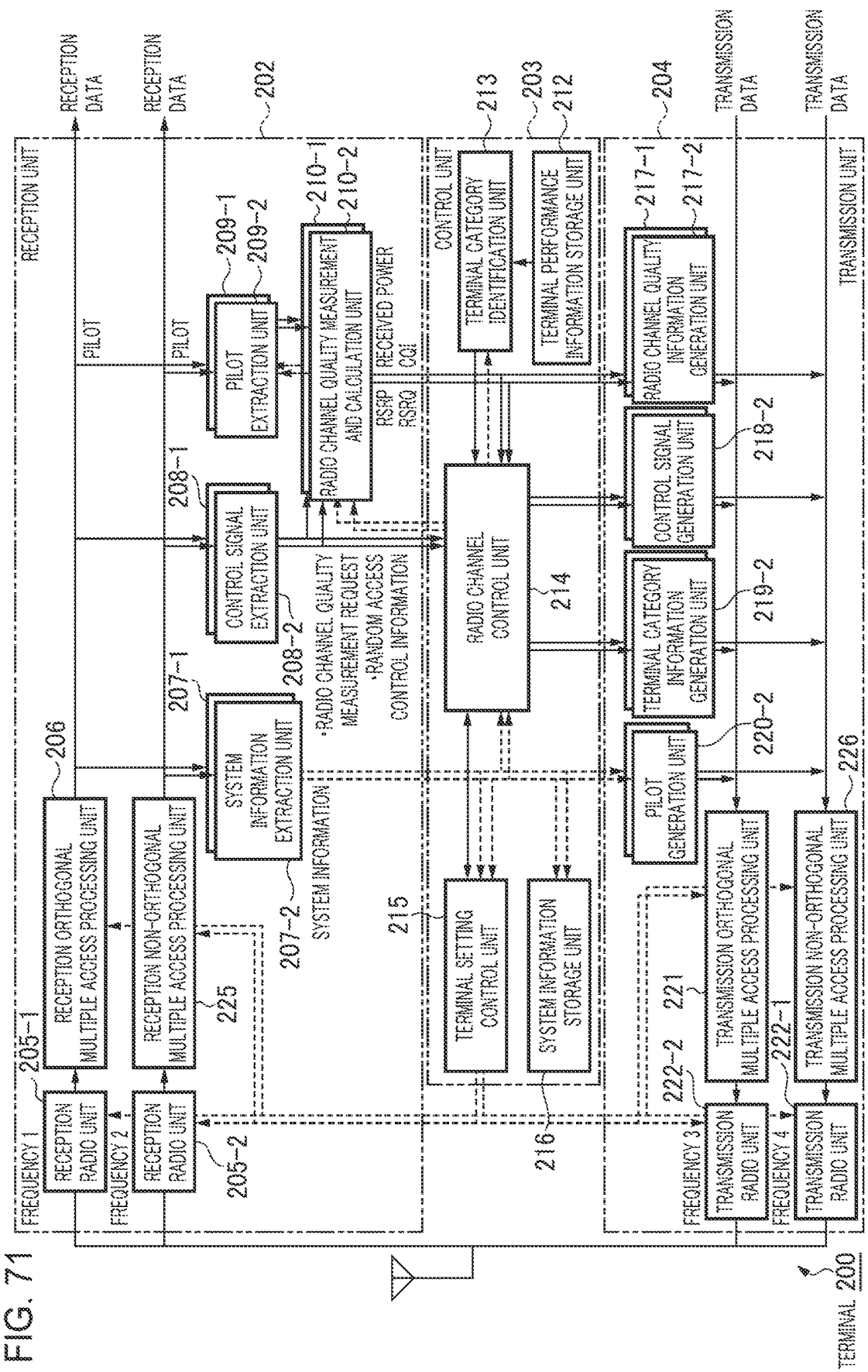
FIG. 71 is a diagram illustrating a configuration example of a terminal.

FIG. 70 and FIG. 71 illustrate configuration examples of a base station 100 and a terminal 200, respectively. As depicted in FIGS. 70, 71, the base station 100 and the terminal 200 support both of the orthogonal multiple access scheme and the non-orthogonal multiple access scheme. The base station 100 supports the orthogonal multiple access scheme at certain frequencies (frequency 1 and frequency 3) whereas supports the non-orthogonal multiple access scheme at other frequencies (frequency 2 and frequency 4), so that different configurations are made frequency-by-frequency.

In the configuration example of the base station 100 depicted in FIG. 70, although terminal category information extraction units 107-1, 107-2 are of different configurations frequency-by-frequency, it may also be possible to configure to perform processing in one terminal category information extraction unit. The same also applies to radio channel quality information extraction units 108-1, 108-2 and control signal extraction units 109-1, 109-2 and further, control signal generation units 112-1, 112-2, pilot generation units 113-1, 113-2 and system information generation units 114-1, 114-2.

In the terminal 200 depicted in FIG. 71 also, for example, as to system information extraction units 207-1, 207-2, etc., processing may be performed by one system information extraction unit. The same also applies to other configurations.

Additionally, the configuration examples of FIGS. 70, 71 illustrate examples in which different configurations are made in regard to two frequencies in the uplink direction and two frequencies in the downlink direction. Other than this, different configurations may be made in regard to three or more frequencies for each frequency in each of the uplink and downlink directions.

Also, FIGS. 70 and 71 illustrate configuration examples when the terminal category is identified in the terminal 200. It may also be possible to configure to identify the terminal category in the base station 100. In this case, a terminal category identification unit 119 is included in the base station 100, so that terminal performance information, which is read out from a terminal performance information storage unit 212, may be transmitted from the terminal 200 to the base station 100.

<6. Terminal Category Table>

FIGS. 74 through 76 are diagrams illustrating examples of a terminal category table. As depicted in FIGS. 74 through 76, in the terminal category table, an item of "Multiple Access" is included at the right end. In "Multiple Access", for example, there is included at least either of information which indicates the performance or capability of the terminal 200 concerning the non-orthogonal multiple access scheme and information which indicates the performance or capability of the terminal 200 concerning the orthogonal multiple access scheme. In the examples depicted in FIGS. 74 through 76, it is possible to register, in "Multiple Access", three types of terminal performance information, which are "Orthogonal", "Non-Orthogonal" and "Orthogonal, Non-Orthogonal".

"Orthogonal" is terminal performance information which indicates that the terminal 200 supports the orthogonal multiple access scheme, for example. "Non-Orthogonal" is terminal performance information which indicates that the terminal 200 supports the non-orthogonal multiple access scheme, for example. Also, "Orthogonal, Non-Orthogonal" is terminal performance information which indicates that the terminal 200 supports both of the orthogonal multiple access scheme and the non-orthogonal multiple access scheme, for example.

For example, in the example of FIG. 74, "Category 1" indicates that the terminal 200 supports the orthogonal multiple access scheme, and "Category 2" indicates that the terminal 200 supports the non-orthogonal multiple access scheme. Also, in the example of FIG. 74, "Category 9" indicates that the terminal 200 supports both of the orthogonal multiple access scheme and the non-orthogonal multiple access scheme.

Using the terminal category table of FIG. 74, when classification is made for the aforementioned configuration examples of the terminal 200 (FIGS. 30, 32, 34, 44, 45, 58, 71, etc.), FIGS. 30 and 32 are terminals 200 which support the orthogonal multiple access scheme. Therefore, each of the above terminals 200 falls into either one of "Category 1" to "Category 4".

Also, the terminal 200 depicted in FIG. 34, because of supporting the non-orthogonal multiple access scheme, falls into either one of "Category 5" to "Category 8".

Further, each terminal 200 depicted in FIGS. 58 and 71, because of supporting both of the orthogonal multiple access scheme and the non-orthogonal multiple access scheme, falls into either one of "Category 9" to "Category 12".

Here, each terminal 200 depicted in FIGS. 44 and 45 provides different multiple access schemes between the uplink and downlink directions. In these cases, the above terminal 200 may be either of "Category 1" through "Category 12". Or, for the above terminal 200, terminal performance information such as "Uplink: Orthogonal, Downlink: Non-Orthogonal", "Uplink: Non-Orthogonal, Downlink: Orthogonal" may be added.

Additionally, in the terminal category table depicted in FIG. 74, terminal performance information of "Maximum number of DL-SCH transport block bits received within a TTI" to "Multiple Access" is registered. The above terminal performance information indicates, for example, a maximum number of bits transmittable at one time transmission through a shared channel in the downlink direction (DL-SCH (Downlink Shared Channel)), an available modulation scheme, and so on.

In the terminal category table depicted in FIG. 75 also, each type of the multiple access schemes supported by the terminal 200 may be registered in the item of "Multiple Access", though the types of terminal performance information to be registered are different as compared with FIG. 74.

Additionally, in the terminal category table depicted in FIG. 75, items excluding "Multiple Access" are specified as an LTE terminal category in 3GPP TS25.306 V12.3.0 etc., for example.

The terminal category table depicted in FIG. 76 enables the identification of the performance or capability of the terminal 200 by "CA Bandwidth Class" at the left end, so as to enable classification for the performance or capability of the terminal 200. The "CA Bandwidth Class" is, for example, a class obtained through classification according to a frequency bandwidth which can be supported by the terminal 200 when performing radio communication using CA. For example, when the number of resource blocks included in one frequency bandwidth is 100, and when up to two frequency bandwidths are supported, the class of the terminal 200 is "B", and when the number of resource blocks included in one frequency bandwidth is 200, and when up to two frequency bandwidths are supported, the class of the terminal 200 is "C".

Each terminal category table depicted in FIGS. 74 through 76 is an example. For example, in the terminal category table, terminal performance information, indicating each type of the multiple access schemes which can be supported by the terminal 200, is registered, so that can identify the category of the terminal 200 ("category 1", "A", etc.) according to the above information. Oppositely, by the terminal category table, each type of the multiple access schemes which can be supported by the terminal 200 can be identified based on the category of the terminal 200, for example.

Additionally, in the terminal category table, in place of the multiple access type which can be supported by the terminal 200, for example, it may be possible to provide terminal performance information which indicates whether or not a function to be used when communication is performed using the non-orthogonal multiple access scheme is provided in the terminal 200, whether the performance of the function concerned is high or low, or the like. For example, it may be possible to provide terminal performance information which indicates whether or not the terminal 200, when using an identical radio resource used by an identical base station or a radio resource adjacent to the above resource, provides a function to delete or reduce communication interference from another terminal 200a being in communication. Or, it may be possible to provide terminal performance information which indicates whether or not the terminal 200 can demodulate a hierarchically modulated signal, or terminal performance information which indicates whether or not the hierarchical modulation is possible.

Operation Examples

Next, operation examples will be described. As operation examples, first, in Embodiments 1 through 3, it is described that a terminal 200 reports that the non-orthogonal multiple access scheme or the orthogonal multiple access scheme is supported.

Next, in Embodiment 4, a description is given of a switch between the orthogonal multiple access scheme and the non-orthogonal multiple access scheme. In this example, a base station 100, which receives a report from the terminal 200 in Embodiments 1 through 3 etc., changes over the multiple access scheme, for example.

Next, in Embodiment 5, a description is given of a case when a handover is performed to a frequency or a base station of a different multiple access scheme. This example describes a case in which the base station 100, which receives the report from the terminal 200 in Embodiments 1 through 3 etc., hands over the terminal 200 to a base station which supports the non-orthogonal multiple access scheme, and so on.

Next, in Embodiment 6, an example of carrier aggregation will be described. This example describes a case in which the base station 100, which receives the report from the terminal 200, for example, in Embodiments 1 through 3 etc., adds a CC which supports the multiple access scheme or a CC which supports the non-orthogonal multiple access scheme, and so on.

The operation examples will be described in the following order.

<1. Embodiment 1: Reporting to the base station which supports the orthogonal multiple access scheme that the terminal supports the non-orthogonal multiple access scheme>
<1.1 Embodiment 1-1: A case when the terminal identifies terminal category>
<1.2 Embodiment 1-2: A case when the base station identifies terminal category>
<1.3 Effects of Embodiment 1>
<2. Embodiment 2: Reporting to the base station which supports the non-orthogonal multiple access scheme that the terminal supports the orthogonal multiple access scheme>
<2.1 Effects of Embodiment 2>
<3. Embodiment 3: Reporting to the base station which supports the orthogonal multiple access scheme and the non-orthogonal multiple access scheme that both of the orthogonal multiple access scheme and the non-orthogonal multiple access scheme are supported or either one scheme is supported>
<3.1 Effects of Embodiment 3>
<4. Embodiment 4: Switch between the orthogonal multiple access scheme and the non-orthogonal multiple access scheme in the same base station>
<4.1 Effects of Embodiment 4>
<5. Embodiment 5: A case of handover to a frequency or a base station of different multiple access scheme>
<5.1 Embodiment 5-1: A case of handover to a frequency of different multiple access scheme in the same base station>
<5.2 Embodiment 5-2: A case of handover to the same frequency of different multiple access scheme in different base station>
<5.3 Embodiment 5-3: A case of handover to different multiple access scheme in different base station and to different frequency>
<5.4 Effects of Embodiment 5>
<6. Embodiment 6: Carrier aggregation>
<6.1 Embodiment 6-1: Adding, to CC of the orthogonal multiple access scheme, CC of the non-orthogonal multiple access scheme of the same base station>
<6.2 Embodiment 6-2: Adding, to CC of the non-orthogonal multiple access scheme to CC of the orthogonal multiple access scheme of the same base station>
<6.3 Embodiment 6-3: Adding, to CC of the orthogonal multiple access scheme, CC of the orthogonal multiple access scheme of different base station>
<6.4 Effects of Embodiment 6>

1. Embodiment 1: Reporting to the Base Station which Supports the Orthogonal Multiple Access Scheme that the Terminal Supports the Non-Orthogonal Multiple Access Scheme Embodiment 1 will be described as an operation example. Embodiment 1 is an example in which a terminal 200 reports a base station 100, which supports the orthogonal multiple access scheme, that the terminal 200 supports the non-orthogonal multiple access scheme. This case includes a case when the terminal 200 identifies a terminal category and a case when the base station 100 identifies a terminal category. The description of Embodiment 1 in the following is given by classification into two.

1.1 Embodiment 1-1: A Case when the Terminal Identifies Terminal Category

As Embodiment 1-1, an example when the terminal 200 identifies a terminal category will be described.

In Embodiment 1-1, as a base station 100, for example, operation may be performed in such a base station 100 as in FIG. 10 (in the uplink direction also, the orthogonal multiple access scheme in the downlink direction), FIG. 18 (the non-orthogonal multiple access scheme in the uplink and downlink directions), FIG. 28 (the non-orthogonal multiple access scheme in the uplink direction, and the orthogonal multiple access scheme in the downlink direction), FIG. 29 (the orthogonal multiple access scheme in the uplink direction, and the non-orthogonal multiple access scheme in the downlink direction), etc. Namely, a base station 100 which supports the orthogonal multiple access scheme may support the orthogonal multiple access scheme in one of the uplink and downlink directions, for example. Also, a base station 100 which supports the non-orthogonal multiple access scheme in the uplink and downlink directions (for example, FIG. 18) can perform radio communication with the terminal 200 using the orthogonal multiple access scheme in some cases. Therefore, such a base station 100 may be included in Embodiment 1-1. In the present Embodiment 1-1, a description will be given in a representative manner using the base station 100 as depicted in FIG. 10.

Also, as to a terminal 200, for example, operation may be performed in such a terminal 200 as in FIG. 44 (the orthogonal multiple access scheme in the uplink direction, and the non-orthogonal multiple access scheme in the downlink direction), FIG. 45 (the non-orthogonal multiple access scheme in the uplink direction, and the orthogonal multiple access scheme in the downlink direction) or FIG. 58 (both schemes in both uplink and downlink directions). For example, a description will be given in a representative manner using the terminal 200 as depicted in FIG. 58.

Figure 72:
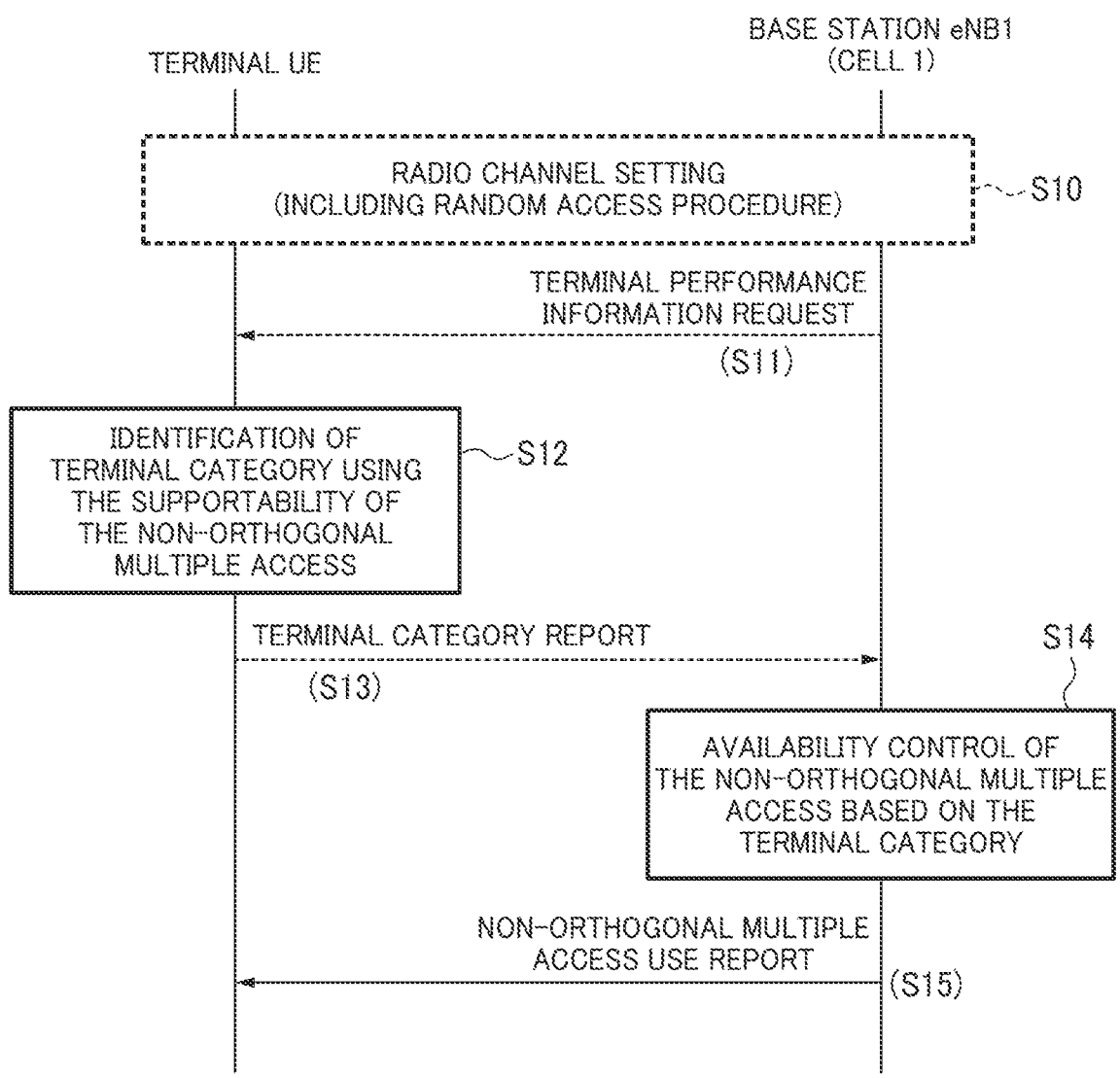
FIG. 72 is a diagram illustrating a sequence example when a terminal identifies a terminal category.

FIG. 72 is a sequence diagram illustrating an operation example in Embodiment 1-1. The terminal 200 executes a random access procedure with between the base station (or cell #1) 100, so as to set a radio channel between with the base station 100 (S10).

For example, processing as follows is performed. Namely, the terminal 200 selects a base station (or a cell) to be connected to, using radio channel quality measurement from an adjacent base station (or an adjacent cell) which adopts the orthogonal multiple access scheme. In this case, the terminal 200 selects the cell of the base station 100. The terminal 200 executes the random access procedure between with the selected cell, so as to set a radio channel between with the base station 100 which constitutes the cell.

As the random access procedure, for example, there are an LTE Contention based random access procedure and a Non-contention based random access procedure. As the random access procedure, a W-CDMA (Wideband Code Division Multiple Access) random access procedure is also available.

In the following, a description is given by taking LTE as an example of the orthogonal multiple access scheme. Also, as the random access procedure, a description is given by taking LTE as an example. However, in other embodiments including the present Embodiment 1-1, it is not limited to the LTE, and other communication schemes or other random access procedures may be applicable.

In the present Embodiment 1-1, in this random access procedure, for example, the base station 100 and the terminal 200 set a radio channel using the orthogonal multiple access scheme. Accordingly, the base station 100 and the terminal 200, after setting the radio channel, come to exchange radio signals using the orthogonal multiple access scheme.

Next, the base station 100 transmits a terminal performance information request to the terminal 200 (S11). For example, the terminal category request control unit 110e of the radio channel control unit 110 instructs the control signal generation unit 112 to generate a control signal including a terminal category request. By this, the control signal is transmitted to the terminal 200. The control signal may be, for example, a terminal category request which requests the category of the terminal or may be a terminal performance information request which requests the performance information of the terminal 200.

Next, the terminal 200 identifies a terminal category using the supportability of the non-orthogonal multiple access (that is, whether or not communication is possible using the non-orthogonal multiple access scheme, for example, etc.) (S12). For example, processing as follows is performed. Namely, the control signal extraction unit 208 extracts a terminal performance information request from a received control signal to output to the radio channel control unit 214. The terminal category control unit 214e of the radio channel control unit 214, on receiving the terminal performance information request, instructs the terminal category identification unit 213 to identify the terminal category. According to the instruction, the terminal category identification unit 213 reads out terminal performance information from the terminal performance information storage unit 212, accesses a terminal category table stored in the memory, so as to identify the terminal category corresponding to the readout terminal performance information. In the present Embodiment 1-1, the terminal category identification unit 213 identifies the terminal category on the basis of information which indicates the performance or capability of the terminal 200 concerning the non-orthogonal multiple access scheme. When the terminal category table is FIG. 74, either one of terminal categories among "Category 5" to "Category 8" (for example, "Category 5"), that is, a terminal category corresponding to "Non-Orthogonal" is identified. The terminal category identification unit 213 outputs the identified terminal category to the radio channel control unit 214.

Next, the terminal 200 transmits the identified terminal category to the base station 100 (S13). For example, the terminal category control unit 214e, on receiving the terminal category from the terminal category identification unit 213, outputs the terminal category to the terminal category information generation unit 219, and instructs to generate terminal category information. By this, the terminal category is transmitted from the terminal category information generation unit 219 to the base station 100. The terminal category information generation unit 219 may add CRC to the terminal category information. The addition may also be performed in the embodiments hereinafter.

Next, the base station 100 performs availability control of the non-orthogonal multiple access on the basis of the terminal category (S14). For example, based on the received terminal category, the base station 100 verifies that the terminal 200 supports the non-orthogonal multiple access. In this case, for example, processing as follows is performed. Namely, the multiple access control unit 110f, on receiving the terminal category information from the terminal category information extraction unit 107, verifies terminal performance from the terminal category, on the basis of the terminal category table. In the above-mentioned example, when receiving "Category 5", the multiple access control unit 110f, because of being "Non-Orthogonal" in the terminal category table, can verify that the terminal 200 supports the non-orthogonal multiple access scheme. The availability control may be performed in the terminal category request control unit 110e, instead of the multiple access control unit 110f, for example. The same also applies to the embodiments hereinafter.

Next, the base station 100 transmits a non-orthogonal multiple access use report to the terminal 200 (S15). For example, the multiple access control unit 110f, when verifying that the terminal 200 supports the non-orthogonal multiple access scheme, instructs the control signal generation unit 112 to generate a control signal which includes the non-orthogonal multiple access use report. By this, the non-orthogonal multiple access use report is transmitted to the terminal 200.

Thus, based on the terminal category, the base station 100 can identify whether or not the terminal 200 supports the non-orthogonal multiple access scheme. This enables, for example, the base station 100 to cause the terminal 200 to switch to the non-orthogonal multiple access scheme, to support a handover to a base station which supports the non-orthogonal multiple access scheme, and so on. Further, the base station 100 can perform processing such as adding a CC which supports the non-orthogonal multiple access scheme. Such an operation example will be described in Embodiment 4 and thereafter.

Additionally, in the sequence example of FIG. 72, it may be possible for the base station 100 not to transmit the terminal performance information request (S11). In this case, the terminal 200, after the radio channel setting (S10), may identify and report the terminal category (S12, S13). The same also applies to the embodiments hereinafter.

Figure 73:
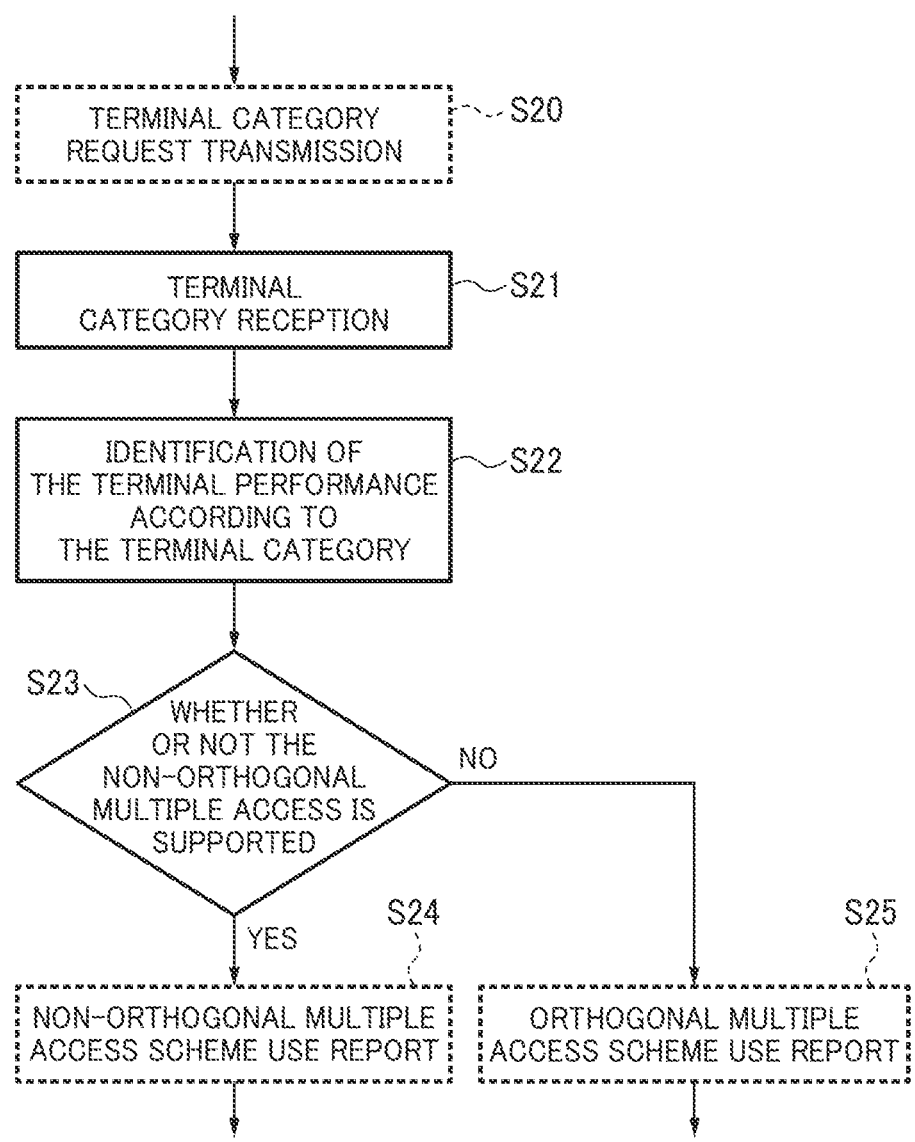
FIG. 73 is a flowchart illustrating an operation example in a base station.

FIG. 73 is a flowchart illustrating an operation example in the base station 100. The base station 100 transmits a terminal category request to the terminal 200 (S20), and then receives a terminal category from the terminal 200 (S21).

Next, the base station 100 identifies terminal performance on the basis of the terminal category (S22). Based on the identified terminal performance, the base station 100 discriminates whether or not the terminal 200 supports the non-orthogonal multiple access scheme (S23).

If the terminal 200 supports the non-orthogonal multiple access scheme (YES in S23), the base station 100 transmits a non-orthogonal multiple access scheme use report to the terminal 200 (S24). On the other hand, if the terminal 200 does not support the non-orthogonal multiple access scheme (NO in S23), the base station 100 transmits an orthogonal multiple access scheme use report to the terminal 200 (S25).

In the flowchart of FIG. 73, it may also be possible not to transmit the orthogonal multiple access scheme use report (S25). The reason is that, for example, mutual connection using the orthogonal multiple access scheme is already completed in the radio channel setting (S10). Similarly, the transmission of the report concerned is not needed in other embodiments.

In the flowchart of the above illustrated FIG. 73, the base station 100 discriminates whether or not the report of the non-orthogonal multiple access scheme is to be made on the basis of the terminal performance which indicates whether or not the non-orthogonal multiple access scheme is supported. For example, as depicted in FIGS. 77 through 79, it may also be possible to discriminate whether or not to report the non-orthogonal multiple access scheme, on the basis of other terminal performance than mentioned above.

Figure 77:
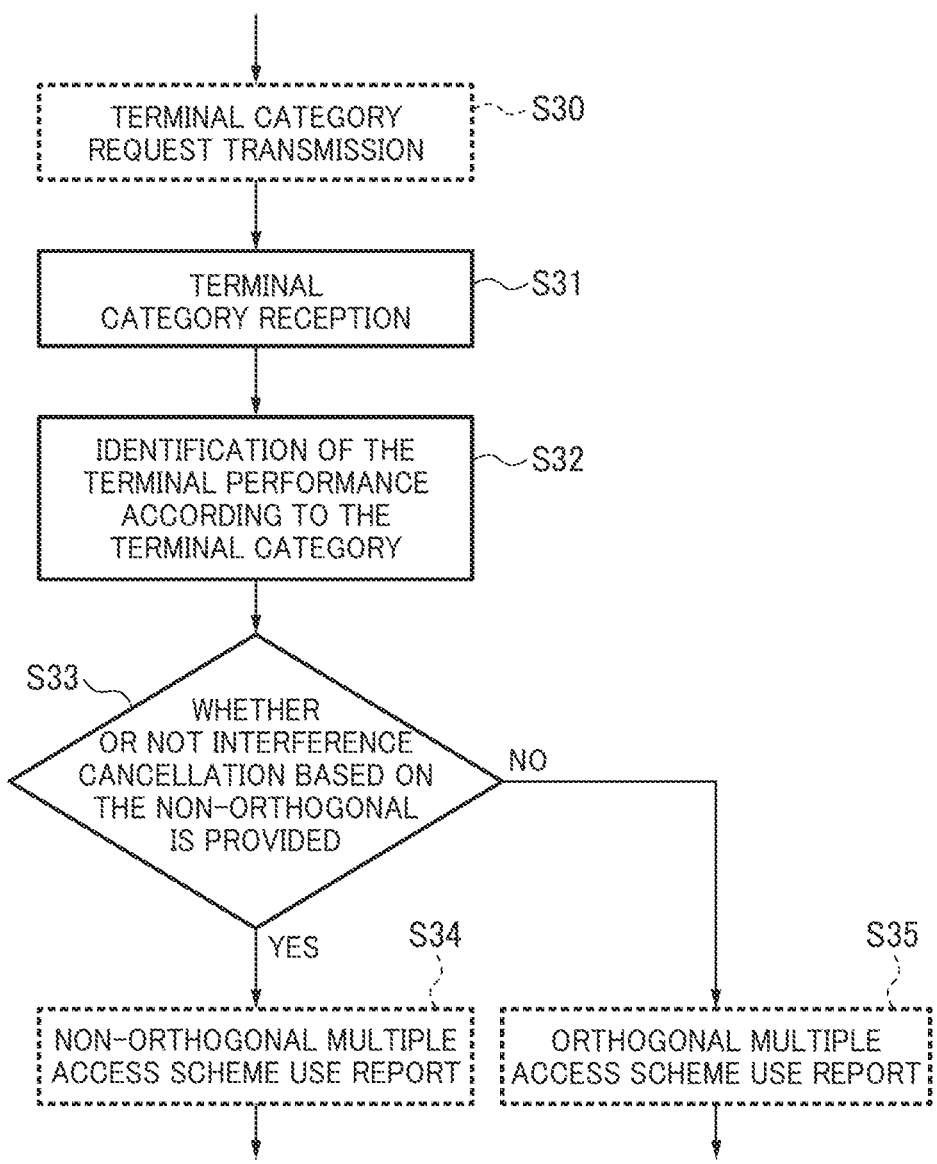
FIG. 77 is a flowchart illustrating an operation example in a base station.

In the flowchart depicted in FIG. 77, an operation example in which the discrimination is made based on the terminal performance which indicates the provision or non-provision of interference cancellation. The interference cancellation is, for example, one of functions when the terminal 200 performs communication using the non-orthogonal multiple access scheme. For example, processing as follows is performed. Namely, the multiple access control unit 110ƒ verifies from the terminal category table the provision or non-provision of the interference cancellation on the basis of the terminal category (S33), and if the function of the interference cancellation is provided (YES in S33), the multiple access control unit 110ƒ transmits a use report of the non-orthogonal multiple access scheme to the terminal 200 (S34). In this case, the base station 100 discriminates that the interference cancellation function associated with the non-orthogonal multiple access scheme is provided in the terminal 200, so as to transmit the use report of the non-orthogonal multiple access scheme. On the other hand, if no interference function is provided (NO in S33), the multiple access control unit 110ƒ transmits a use report of the orthogonal multiple access scheme to the terminal 200 (S35). In this case, the base station 100 discriminates that the interference function to support the non-orthogonal multiple access scheme is not provided in the terminal 200, so as to transmit the use report of the orthogonal multiple access scheme.

Figure 78:
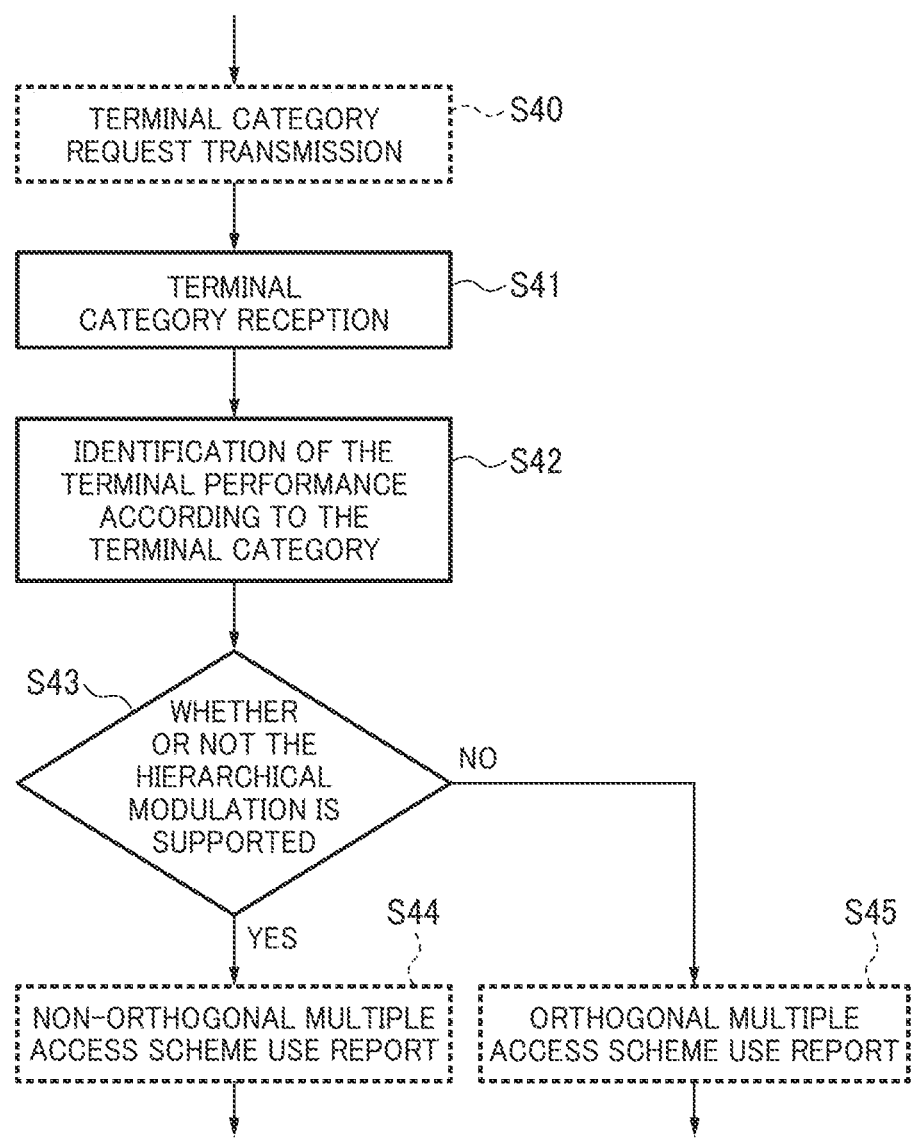
FIG. 78 is a flowchart illustrating an operation example in a base station.
Figure 79:
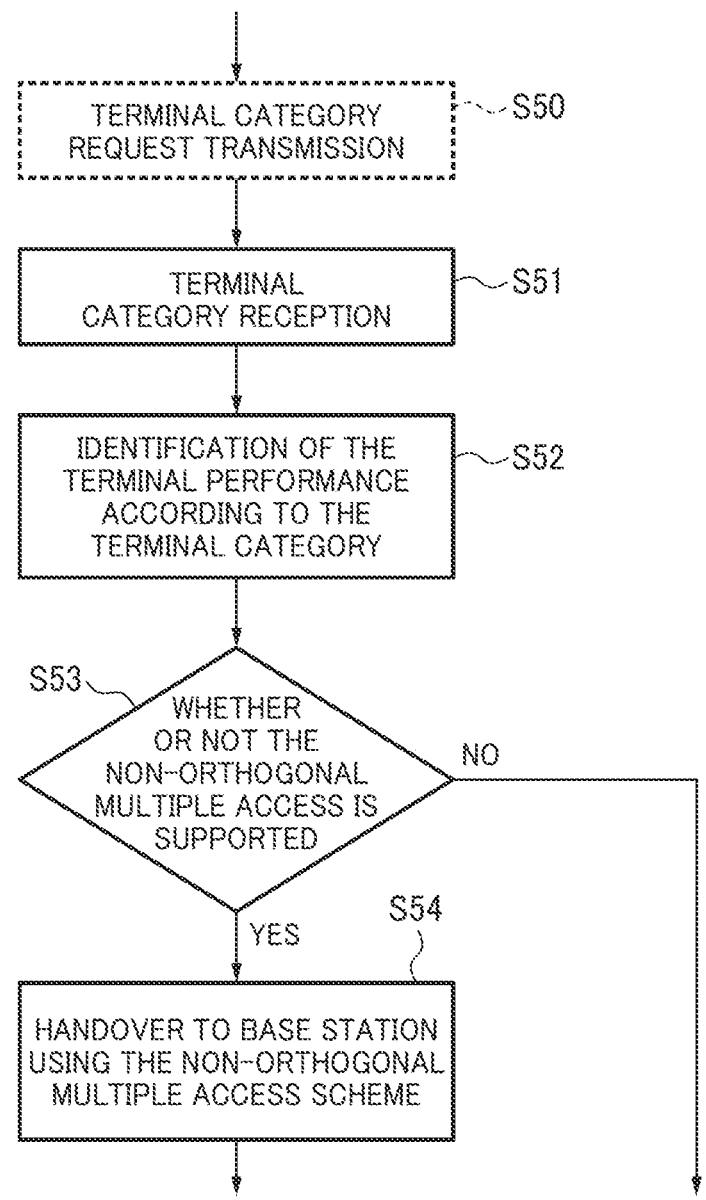
FIG. 79 is a flowchart illustrating an operation example in a base station.

FIG. 78 is an example in which discrimination is performed based on the terminal performance which indicates the provision or non-provision of supporting the hierarchical modulation. For example, processing as follows is performed. Based on the terminal category, the multiple access control unit 110ƒ verifies from the terminal category table the provision or non-provision of supporting the hierarchical modulation (S43), and if supporting the hierarchical modulation is existent (YES in S43), transmits the use report of the non-orthogonal multiple access scheme (S44). In this case, the base station 100 discriminates that the hierarchical modulation function which supports the non-orthogonal multiple access scheme is provided in the terminal 200, so as to transmit the use report of the non-orthogonal multiple access scheme. On the other hand, if supporting the hierarchical modulation is not existent (NO in S43), the multiple access control unit 110ƒ transmits a use report of the orthogonal multiple access scheme (S45). In this case, the base station 100 discriminates that the hierarchical modulation function which supports the non-orthogonal multiple access scheme is not provided in the terminal 200, so as to transmit the use report of the orthogonal multiple access scheme.

Here, processing in S33 of FIG. 77 and S43 of FIG. 78 may be performed in the terminal category control unit 241*e*, and processing of S35 and S45 may be omitted.

FIGS. 79 through 82 are flowcharts illustrating operation examples performed in Embodiment 5 and Embodiment 6. Though the details will be described in Embodiments 5 and 6, a brief description will be given using FIGS. 79 through 82.

Figure 80:
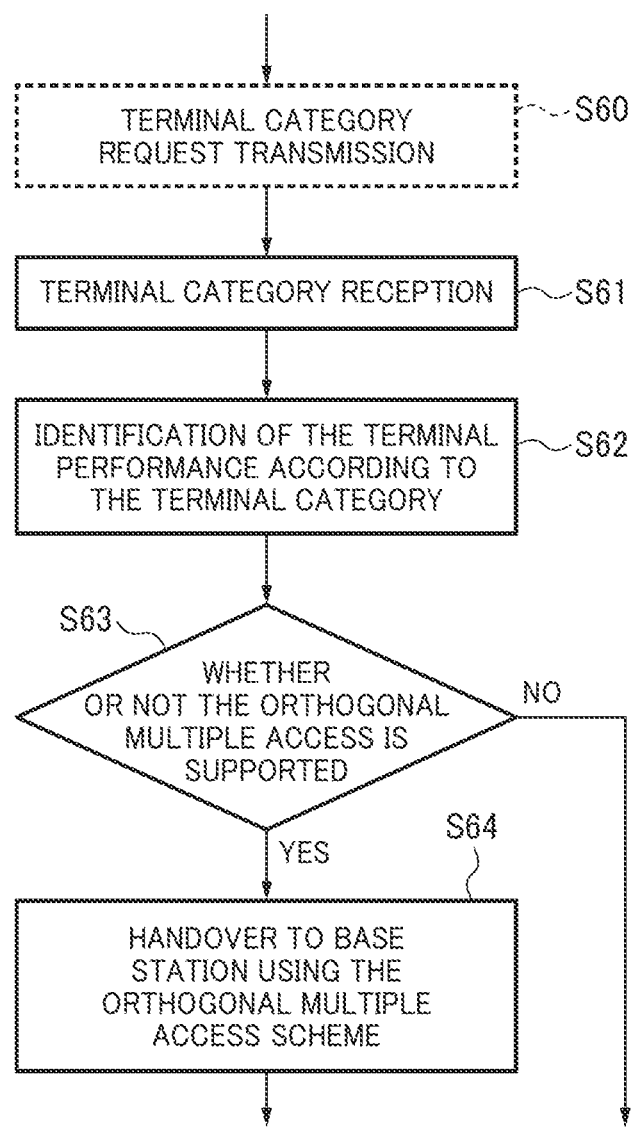
FIG. 80 is a flowchart illustrating an operation example in a base station.

Among them, FIGS. 79 and 80 illustrates examples of causing to hand over to a base station 100-1 which supports the non-orthogonal multiple access scheme, and causing to hand over to a base station 100-2 which supports the orthogonal multiple access scheme, respectively.

As depicted in FIG. 79, the base station 100 transmits a terminal category request to the terminal 200 (S50), and on receiving a terminal category from the terminal (S51), identifies terminal performance on the basis of the terminal category (S52). The base station 100, if the terminal 200 supports the non-orthogonal multiple access scheme in regard to the identified terminal performance (YES in S53), causes the terminal 200 to hand over to a base station 100-1 which uses the non-orthogonal multiple access scheme (S54). This is a case when the base station 100, which sets a radio channel and performs radio communication with the terminal 200 using the orthogonal multiple access scheme, discriminates that the terminal 200 supports the non-orthogonal multiple access scheme, on the basis of the terminal category transmitted from the terminal 200. On the other hand, if the terminal 200 does not support the non-orthogonal multiple access scheme in regard to the identified terminal performance (S53), the base station 100 does not particularly cause to hand over. In this case, the base station 100 discriminates that the terminal 200 supports the orthogonal multiple access scheme, so as to maintain the orthogonal multiple access scheme.

In FIG. 80, when the base station 100 supports the non-orthogonal multiple access scheme, and if supporting the orthogonal multiple access scheme in regard to identified terminal performance (YES in S63), the base station 100 causes the terminal 200 to hand over to a base station 100-2 which supports the orthogonal multiple access scheme (S64). This is a case when the base station 100, which sets a radio channel and performs radio communication with the terminal 200 using the non-orthogonal multiple access scheme, discriminates that the terminal 200 supports the non-orthogonal multiple access scheme, on the basis of the terminal category transmitted from the terminal 200. On the other hand, if the terminal 200 does not support the orthogonal multiple access scheme in regard to the identified terminal performance (NO in S63), the base station 100 does not particularly cause to hand over. In this case, the base station 100 discriminates that the terminal 200 supports the non-orthogonal multiple access scheme, so as to maintain the non-orthogonal multiple access scheme.

Figure 81:
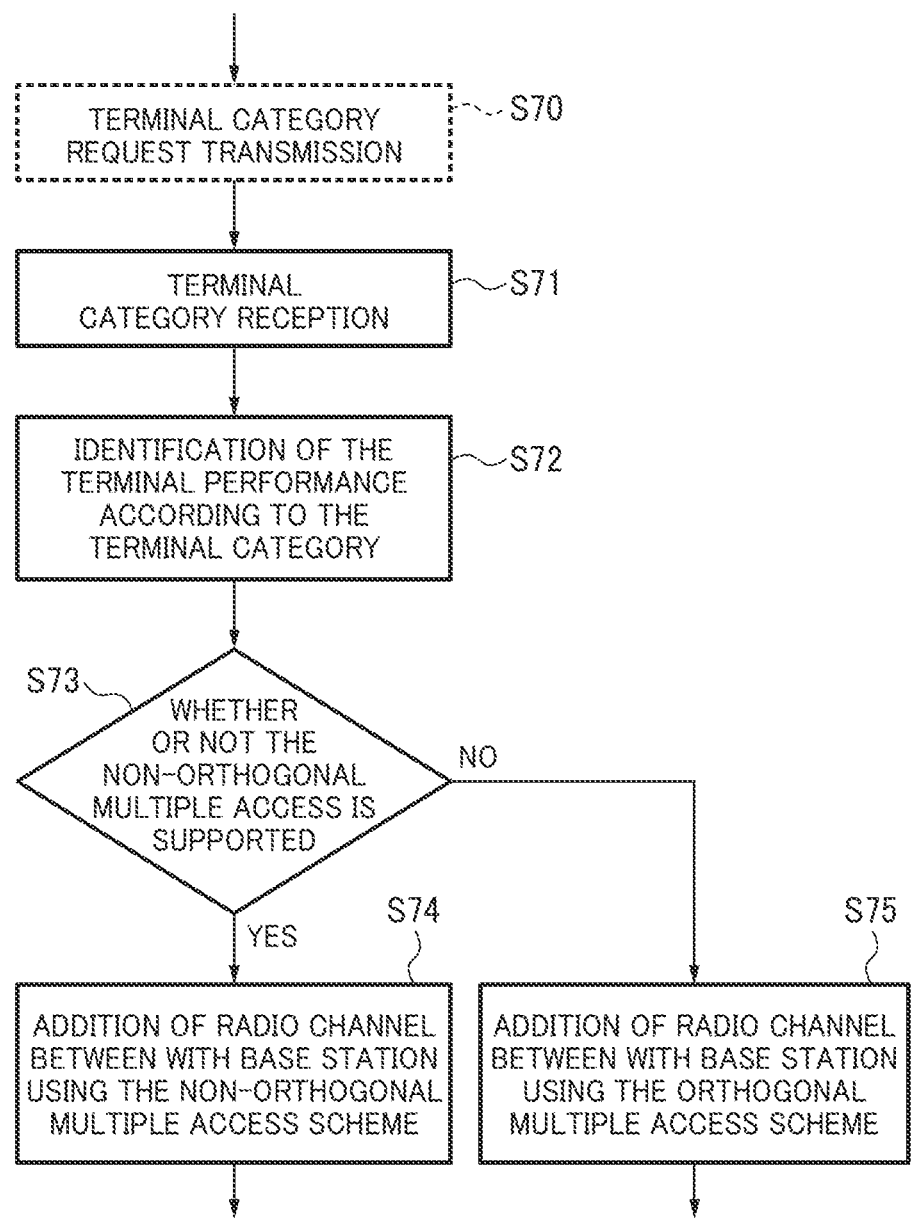
FIG. 81 is a flowchart illustrating an operation example in a base station.
Figure 82:
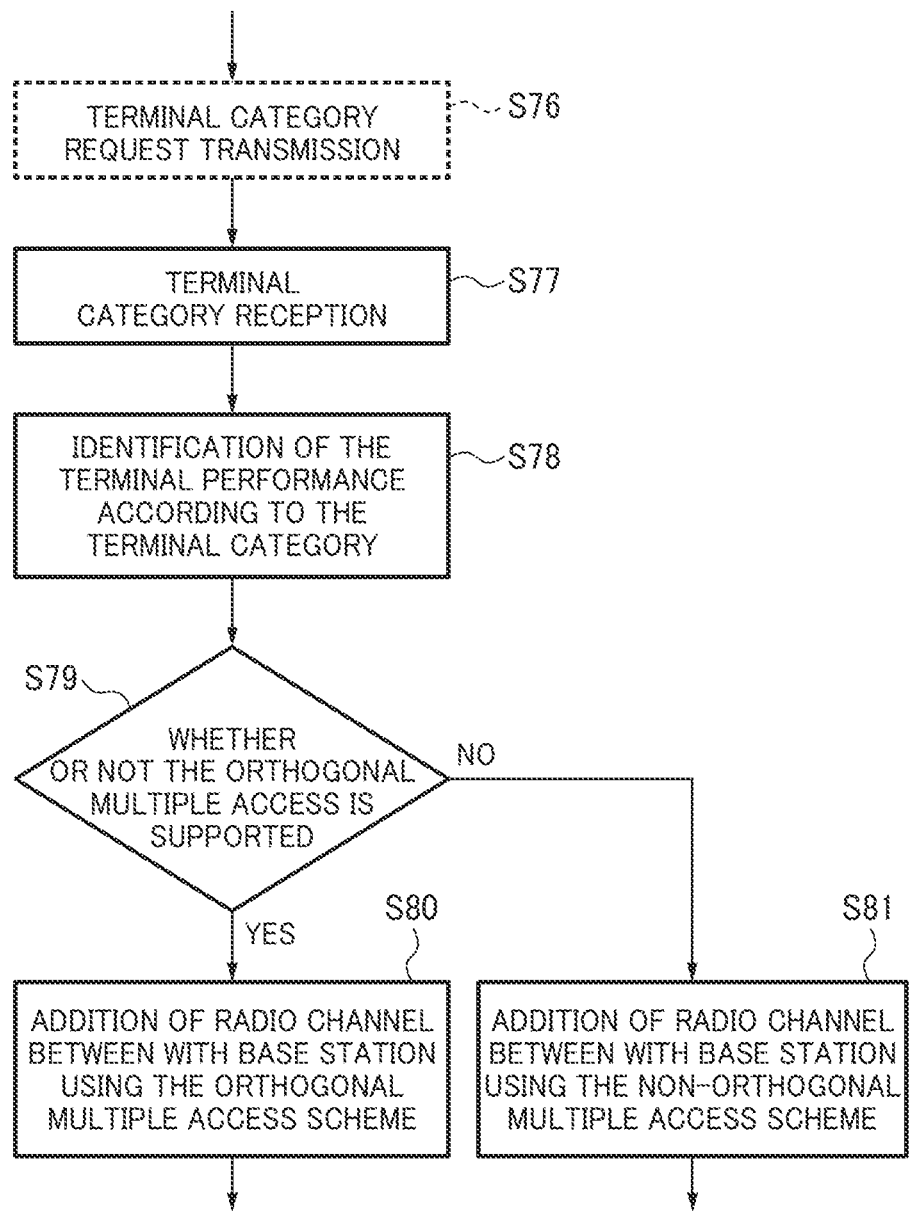
FIG. 82 is a flowchart illustrating an operation example in a base station.

FIGS. 81 and 82 are examples of adding a link using the non-orthogonal multiple access scheme, adding a link using the orthogonal multiple access scheme, etc. By adding such a link, the base station 100 can add a CC which supports the non-orthogonal multiple access scheme, and perform CA by the addition of the CC which supports the orthogonal multiple access scheme.

As depicted in FIG. 81, the base station 100, when supporting the non-orthogonal multiple access scheme in regard to the identified terminal performance (YES in S73), performs processing to add a radio channel between with the base station 100-2 using the non-orthogonal multiple access scheme (S74). On the other hand, when not supporting the non-orthogonal multiple access scheme (NO in S73), the base station 100 performs processing to add a radio channel between with a base station 100 or 100-1, using the orthogonal multiple access scheme (S75).

As depicted in FIG. 82, when supporting the orthogonal multiple access scheme in regard to the identified terminal performance (YES in S79), the base station 100 performs processing to add a radio channel between with the base station 100-1 using the orthogonal multiple access scheme (S80). On the other hand, when not supporting the orthogonal multiple access scheme (NO in S79), the base station 100 performs processing to add a radio channel between with a base station 100 or 100-2, using the non-orthogonal multiple access scheme (S75).

1.2 Embodiment 1-2: A Case when the Base Station Identifies Terminal Category Next, a description will be given on Embodiment 1-2. Embodiment 1-2 is described on an example when the base station 100 identifies a terminal category.

In Embodiment 1-2, as the base station 100, operation in FIG. 16 (in the uplink direction also, the orthogonal multiple access scheme in the downlink direction) may be performed, for example. Also, there may be provided a terminal in which, in the terminal 200 of FIG. 32 (in the uplink direction also, the orthogonal multiple access scheme in the downlink direction), for example, the reception orthogonal multiple access processing unit 206 is replaced with the reception multiple access processing unit 230, and the transmission orthogonal multiple access processing unit 221 is replaced with the transmission multiple access processing unit 231. Alternatively, for example, there may be provided a terminal in which, in the terminal 200 of FIG. 32, the reception orthogonal multiple access processing unit 206 is replaced with the reception non-orthogonal multiple access processing unit 225 or the transmission orthogonal multiple access processing unit 221 is replaced with the transmission non-orthogonal multiple access processing unit 226.

Figure 83:
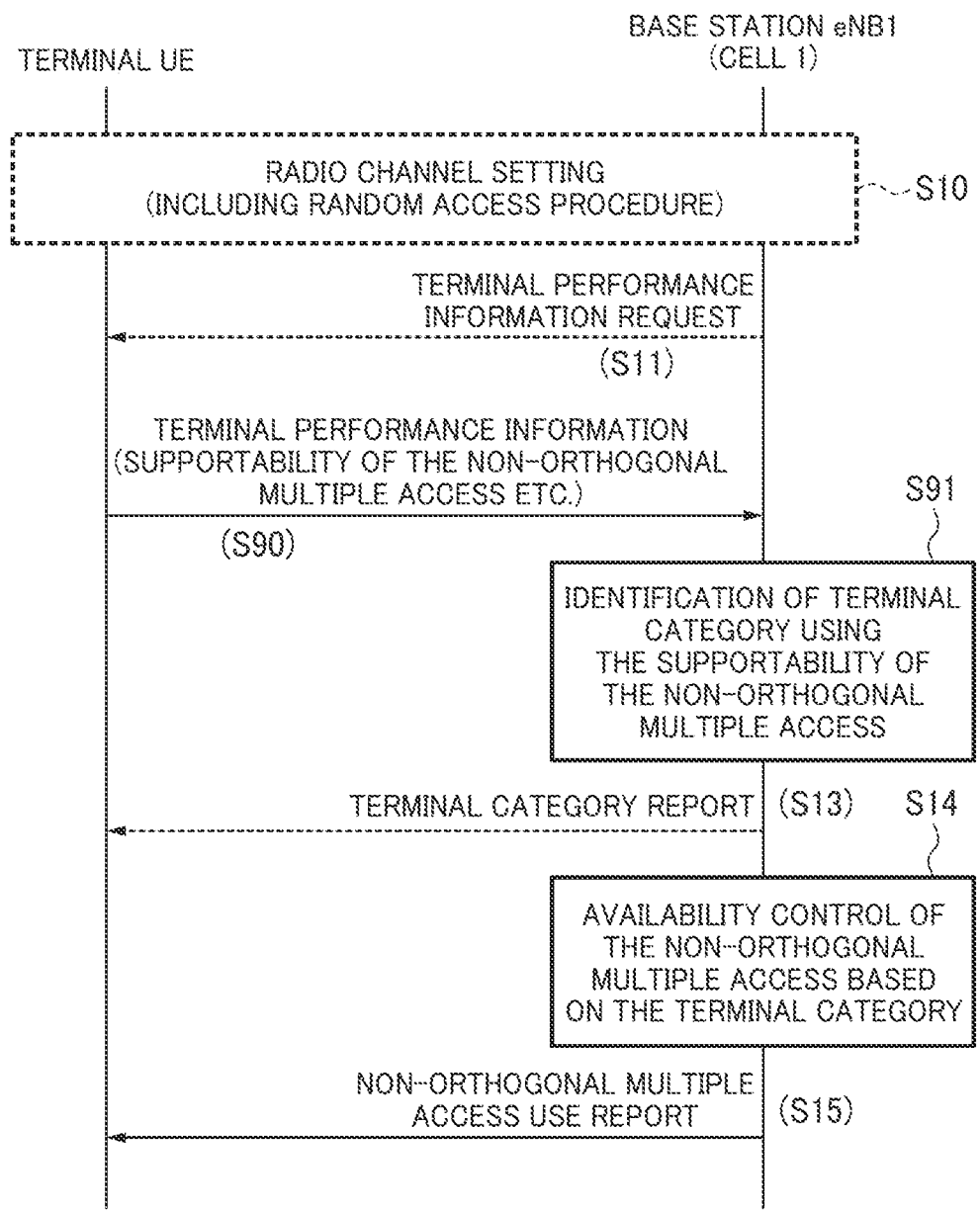
FIG. 83 is a diagram illustrating a sequence example when a base station identifies a terminal category.

FIG. 83 is a flowchart illustrating an operation example of Embodiment 1-2. The terminal 200 performs a random access procedure between with the base station 100 to perform radio channel setting by the orthogonal multiple access scheme (S10).

Next, the base station 100 transmits a terminal performance information request to the terminal 200 (S11).

The terminal 200, on receiving the terminal performance information request, transmits terminal performance information to the base station 100 (S90). For example, the terminal performance information control unit 214k of the radio channel control unit 214, on receiving the terminal performance information request from the control signal extraction unit 208, reads out terminal performance information from the terminal performance information storage unit 212, to instruct the terminal performance information generation unit 223 to generate the readout terminal performance information. By this, the terminal performance information is transmitted from the terminal performance information generation unit 223 to the base station 100.

The base station 100, on receiving the terminal performance information, identifies a terminal category on the basis of the supportability of the non-orthogonal multiple access scheme (S91). For example, the terminal performance information extraction unit 118 extracts terminal performance information from the reception signal, and the terminal category identification unit 119 identifies the terminal category on the basis of information which indicates the performance or capability of the terminal 200 concerning the non-orthogonal multiple access scheme. For example, based on the terminal category table (for example, FIG. 74) stored in the memory, the terminal category identification unit 119 may identify from among "Category 4" to "Category 7" which are set to be "Non-Orthogonal".

Next, the base station 100 reports the identified terminal category to the terminal 200 (S13), to perform the availability control of the non-orthogonal multiple access based on the terminal category (S14). For example, the multiple access control unit 110f verifies whether or not the terminal 200 supports the non-orthogonal multiple access scheme.

Next, the base station 100 transmits a non-orthogonal multiple access use report to the terminal 200 (S15). For example, the multiple access control unit 110f, when verifying that the terminal 200 supports the non-orthogonal multiple access scheme, transmits the above report to the terminal 200.

In FIGS. 83, S11 and S13 may be omitted. The same also applies to Embodiment 2 or thereafter.

Figure 84:
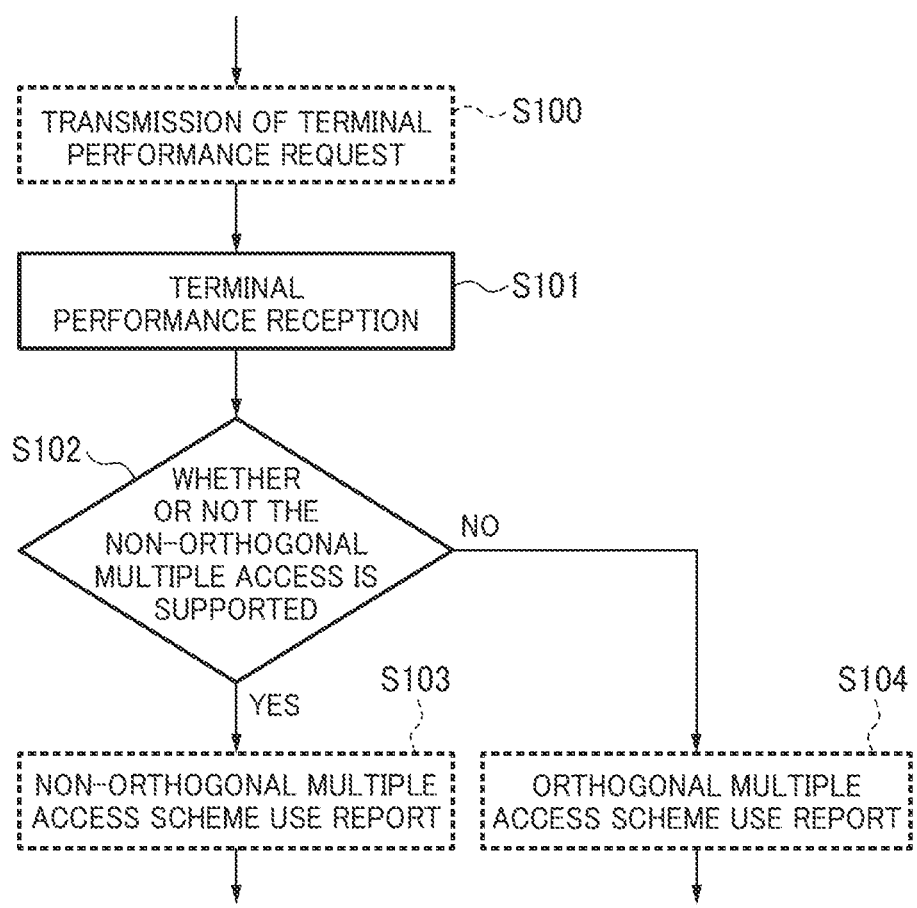
FIG. 84 is a flowchart illustrating an operation example in a base station.

FIG. 84 is a flowchart illustrating an operation example of the present Embodiment 1-2 in the base station 100. The base station 100 transmits a terminal performance request to the terminal 200 (S100), and then receives terminal performance from the terminal 200 (S101). Next, the base station 100 discriminates whether or not the non-orthogonal multiple access scheme is supported (S102), and if the terminal 200 supports the non-orthogonal multiple access scheme (YES in S102), the base station 100 transmits a use report of the non-orthogonal multiple access scheme to the terminal 200 (S103). On the other hand, if the terminal 200 does not support the non-orthogonal multiple access scheme (NO in S102), the base station 100 transmits a use report of the orthogonal multiple access scheme to the terminal 200 (S104).

1.3 Effects of Embodiment 1

As such, in Embodiment 1, the base station 100 or the terminal 200 is configured to identify the terminal category on the basis of the terminal performance information which indicates whether or not the terminal 200 supports the non-orthogonal multiple access scheme. This prevents, for example, the occurrence of such a situation that the base station 100 transmits a use report of the orthogonal multiple access scheme to a terminal 200 which does not support the orthogonal multiple access scheme, and also prevents the execution of radio communication with the terminal 200 incorrectly by the non-orthogonal multiple access scheme. Therefore, the base station 100, by appropriately setting a multiple access scheme, can appropriately perform radio communication with the terminal 200. Further, the base station 100, by appropriately setting a multiple access scheme, can prevent such a situation that an incorrect multiple access scheme is set over multiple times, which enables an improved processing speed, and as a result, it is possible to improve data transmission speed (or a throughput).

Further, at that time, it may be possible to identify the terminal category in the terminal 200, as in Embodiment 1-1, or identify the terminal category in the base station 100, as in Embodiment 1-2. At the identification of the terminal category, the terminal performance information includes information whether or not the terminal 200 supports the non-orthogonal multiple access scheme. Therefore, by the identification of the terminal category, it becomes easy to discriminate whether or not the terminal 200 supports the non-orthogonal multiple access scheme.

2. Embodiment 2: Reporting to the Base Station which Supports the Non-Orthogonal Multiple Access Scheme that the Terminal Supports the Orthogonal Multiple Access Scheme Next, Embodiment 2 will be described. Embodiment 2 is an operation example in which a base station 100, which supports the non-orthogonal multiple access scheme, is reported that the terminal 200 supports the orthogonal multiple access scheme.

FIG. 72 is a sequence diagram illustrating an operation example in Embodiment 2. However, in each processing of FIG. 72, the "non-orthogonal multiple access" is to be replaced with the "orthogonal multiple access". Further, FIG. 72 is an example in which a terminal category is identified in the terminal 200.

Here, the configuration example of the base station 100 in this case may be operated, for example, in such a base station 100 as in FIG. 18 (the non-orthogonal multiple access scheme in both the uplink and downlink directions), FIG. 28 (the non-orthogonal multiple access scheme in the uplink direction, and the orthogonal multiple access scheme in the downlink direction), FIG. 29 (the orthogonal multiple access scheme in the uplink direction, and the non-orthogonal multiple access scheme in the downlink direction), FIG. 46 (both multiple access schemes in both uplink and downlink directions) or the like.

Also, as to the terminal 200, for example, operation may be performed in such a terminal 200 as in FIG. 44 (the orthogonal multiple access scheme in the uplink direction, and the non-orthogonal multiple access scheme in the downlink direction), FIG. 45 (the non-orthogonal multiple access scheme in the uplink direction, and the orthogonal multiple access scheme in the downlink direction), FIG. 58 (both schemes in both uplink and downlink directions) or the like.

As depicted in FIG. 72, the terminal 200 sets a radio channel between with the base station 100 (S10), so that can perform radio communication using the non-orthogonal multiple access scheme.

Next, the base station 100 requests of the terminal 200 terminal performance information (S11), and the terminal 200 identifies a terminal category using the supportability of the orthogonal multiple access scheme (that is, for example, whether or not communication is possible using the orthogonal multiple access scheme, or the like) (S12). For example, the terminal category identification unit 213 of the terminal 200 identifies the terminal category on the basis of information which indicates the performance or capability of the terminal 200 concerning the orthogonal multiple access scheme. In the example when the terminal category table is FIG. 74, the terminal category identification unit 213 identifies either one of "Category 1" to "Category 4" which are set to be "Orthogonal".

Next, the terminal 200 transmits the identified terminal category to the base station 100 (S13), so that the base station 100 performs availability control of the orthogonal multiple access on the basis of the received terminal category (S14). For example, based on the terminal category, the multiple access control unit 110f of the terminal 200 verifies whether or not the terminal 200 supports the orthogonal multiple access scheme.

Next, the base station 100 transmits an orthogonal multiple access use report to the terminal 200 (S15). For example, the multiple access control unit 110f, on verifying that the terminal 200 supports the orthogonal multiple access scheme, transmits the above report to the terminal 200.

FIG. 73 is a flowchart illustrating an operation example of the base station 100 in the present Embodiment 2. In this case also, for each processing, "non-orthogonal multiple access" is replaced with the "orthogonal multiple access" and the "orthogonal multiple access" is replaced with the "non-orthogonal multiple access".

The base station 100 transmits a terminal category request to the terminal 200 (S20), and on receiving a terminal category from the terminal 200 (S21), identifies terminal performance on the basis of the terminal category (S22). Then, based on the identified terminal performance, the base station 100 verifies whether or not the terminal 200 supports the orthogonal multiple access scheme (S23), and if the terminal 200 supports the orthogonal multiple access scheme (YES in S23), transmits a use report of the orthogonal multiple access scheme to the terminal 200 (S24). On the other hand, if the terminal 200 does not support the orthogonal multiple access scheme (NO in S23), the base station 100 transmits a use report of the non-orthogonal multiple access scheme to the terminal 200 (S25).

As to Embodiment 2 also, similar to Embodiment 1-1, it may be possible to transmit the use report of the orthogonal multiple access scheme, on the basis of the provision or non-provision of interference cancellation by the non-orthogonal access scheme and the support of the hierarchical modulation (S78), instead of the terminal performance information which indicates whether or not being capable of supporting the orthogonal multiple access scheme. Also, as to a handover to a base station 100 using the orthogonal multiple access scheme, operation may be performed according to FIG. 80. Further, as to the addition of CC using the orthogonal multiple access scheme, operation may be performed according to FIG. 82.

In the aforementioned processing of Embodiment 2, the description has been given on the example in which the terminal 200 identifies the terminal category. In the present Embodiment 2 also, similar to Embodiment 1-2, it may also be possible to configure to identify the terminal category in the base station 100. In regard to an operation example in this case, FIG. 83 illustrates a sequence diagram, and FIG. 84 illustrates a flowchart illustrating an operation example in the base station 100, respectively. In this case also, in FIGS. 83 and 84, the "non-orthogonal multiple access" is replaced with the "orthogonal multiple access", and the "orthogonal multiple access" is replaced with the "non-orthogonal multiple access".

When described using the example of FIG. 83, the terminal 200 transmits, as terminal performance information, to the base station 100 terminal performance information indicative of supporting the orthogonal multiple access scheme (S90). For example, as the terminal performance information, the terminal 200 transmits "Orthogonal" etc. to the base station 100.

The base station 100 performs the identification of a terminal category using the supportability of the orthogonal multiple access scheme (S91) and the report of the terminal category (S13), to perform the availability control of the orthogonal multiple access based on the terminal category (S14). For example, the terminal category identification unit 119 of the base station 100 receives from the terminal performance information extraction unit 118 terminal performance information (for example, "Orthogonal") indicative of supporting both of the orthogonal multiple access scheme, to identify a terminal category ("Category 1" or the like) using the above information. Also, for example, the multiple access control unit 110f verifies that the terminal 200 supports the orthogonal multiple access scheme on the basis of the identified terminal category.

Then, the base station 100, on verifying that the terminal 200 supports the orthogonal multiple access scheme, transmits an orthogonal multiple access use report to the terminal 200 (S15).

Also, in the example of FIG. 84, the base station 100 verifies whether or not the terminal 200 supports the orthogonal multiple access scheme, on the basis of the received terminal performance information (S102 in FIG. 84). If the terminal 200 supports the orthogonal multiple access scheme, the base station 100 transmits a report to that effect (S103), whereas if does not support, transmits a use report of the non-orthogonal multiple access scheme (S104).

2.1 Effects of Embodiment 2

As such, in Embodiment 2, the base station 100 or the terminal 200 is configured to identify the terminal category on the basis of the terminal performance information which indicates whether or not the terminal 200 supports the orthogonal multiple access scheme. This prevents, for example, the occurrence of such a situation that the base station 100 transmits the use report of the orthogonal multiple access scheme to a terminal 200 which does not support the orthogonal multiple access scheme, and also prevents the incorrect execution of radio communication with the terminal 200 by the non-orthogonal multiple access scheme. Therefore, by the setting of an appropriate multiple access scheme, the base station 100 can appropriately perform radio communication with the terminal 200. Further, the setting of the appropriate multiple access scheme in the base station 100 can prevent such a situation that an incorrect multiple access scheme is set over multiple times, so that can improve a processing speed, and as a result, can also improve a data transmission speed (or a throughput).

Further, at that time, it may be possible to identify the terminal category in the terminal 200, or identify the terminal category in the base station 100. At the identification of the terminal category, the terminal performance information includes information whether or not the terminal 200 supports the orthogonal multiple access scheme. Therefore, by the identification of the terminal category, it becomes easy to discriminate whether or not the terminal 200 supports the orthogonal multiple access scheme.

<3. Embodiment 3: Reporting to the Base Station which Supports the Orthogonal Multiple Access Scheme and the Non-Orthogonal Multiple Access Scheme that both of the Orthogonal Multiple Access Scheme and the Non-Orthogonal Multiple Access Scheme are Supported or either One Scheme is Supported>

Next, Embodiment 3 will be described. Embodiment 3 is an example in which a terminal 200 reports to a base station 100, which supports the orthogonal multiple access scheme and the non-orthogonal multiple access scheme, that the terminal 200 supports both or either one of the orthogonal multiple access scheme and the non-orthogonal multiple access scheme.

For example, a configuration example of the base station 100 in Embodiment 3 is FIG. 46, and a configuration example of the terminal 200 is FIG. 58. Also, for example, a sequence example in Embodiment 3 is FIG. 72, and a flowchart in the base station 100 is FIG. 73.

Using FIG. 72, the operation example of Embodiment 3 will be described. The terminal 200 sets a radio channel between with the base station 100 (S10). For example, the terminal 200 sets the radio channel using the orthogonal multiple access scheme, so as to exchange radio signals thereafter using the non-orthogonal multiple access scheme.

Next, the base station 100 transmits terminal performance information to the terminal 200, so that the terminal 200 identifies a terminal category using the supportability of the non-orthogonal multiple access scheme (S12). For example, the terminal category identification unit 213 identifies the terminal category on the basis of information which indicates the performance or capability of the terminal 200 concerning the non-orthogonal multiple access scheme and the orthogonal multiple access scheme. For example, in the example of FIG. 74, the terminal category identification unit 213 identifies either one of terminal categories among "Category 9" to "Category 12" which are set to be "Orthogonal, Non-Orthogonal".

Next, the terminal 200 transmits the identified terminal category to the base station 100 (S13), and the base station 100 performs availability control of the non-orthogonal multiple access and the orthogonal multiple access scheme based on the terminal category (S14). For example, the multiple access control unit 110f verifies, based on the terminal category, that the terminal 200 supports both non-orthogonal and orthogonal multiple access schemes.

Then, the base station 100 transmits to the terminal 200 a use report of both of the non-orthogonal multiple access scheme and the orthogonal multiple access scheme (S15).

FIG. 73 illustrates an operation example in the base station 100. Here, the "non-orthogonal multiple access" in S23 and S24 is to be replaced with the "non-orthogonal multiple access and the orthogonal multiple access", and the "orthogonal multiple access scheme" in S25 is to be replaced with the "non-orthogonal multiple access scheme".

The base station 100 transmits a terminal category request to the terminal 200 (S20), so as to receive a terminal category from the terminal 200 (S21). The base station 100 identifies terminal performance on the basis of the terminal category, and based on the identified terminal performance, verifies whether or not the terminal 200 supports both of the non-orthogonal multiple access scheme and the orthogonal multiple access scheme (S23).

If the terminal 200 supports both multiple access schemes (YES in S23), the base station 100 transmits a use report of the non-orthogonal multiple access scheme and the orthogonal multiple access scheme (S24). On the other hand, if the terminal 200 does not support both multiple access schemes (NO in S23), the base station 100 transmits a use report of the non-orthogonal multiple access scheme (S25).

Here, the examples of FIGS. 72 and 73 are operation examples when the terminal category is identified in the terminal 200. Operation examples when the terminal category is identified in the base station 100 are illustrated in FIGS. 83 and 84. In FIGS. 83 and 84 also, the "non-orthogonal multiple access" is replaced with the "non-orthogonal multiple access and the orthogonal multiple access" and in regard to S104 in FIG. 84, the "orthogonal multiple access" is replaced with the "non-orthogonal multiple access".

In the example of FIG. 83, the terminal 200 transmits to the base station 100 information which indicates that the terminal 200 supports both of the non-orthogonal multiple access scheme and the orthogonal multiple access scheme, as terminal performance information (S90). For example, the terminal 200 transmits "Non-orthogonal, Orthogonal" or the like to the base station 100.

The base station 100 identifies a terminal category using the supportability of both of the non-orthogonal multiple access scheme and the orthogonal multiple access scheme (that is, whether or not communication is possible using the orthogonal multiple access scheme and the non-orthogonal multiple access scheme) (S91). For example, the terminal category identification unit 119 identifies the terminal category on the basis of information which indicates the performance or capability of the terminal 200 concerning the non-orthogonal multiple access scheme and the orthogonal multiple access scheme.

Next, the base station 100 reports the identified terminal category to the terminal 200 (S13), and performs the availability control of the non-orthogonal multiple access scheme and the orthogonal multiple access scheme which is based on the terminal category (S14). For example, based on the identified terminal category, the multiple access control unit 110f verifies whether or not the terminal 200 supports the non-orthogonal multiple access scheme and the orthogonal multiple access scheme.

Then, on verifying that the terminal 200 supports both schemes, the base station 100 transmits to the terminal 200 a use report of the non-orthogonal multiple access and the orthogonal multiple access schemes (S15).

In the example of FIG. 84, the base station 100 verifies whether or not the terminal 200 supports both schemes, on the basis of the received terminal performance information (S102 of FIG. 84). When verifying that the terminal 200 supports both schemes, the base station 100 transmits a report to that effect (S103), whereas when the terminal 200 does not support both schemes, the base station 100 transmits a use report of the orthogonal multiple access scheme (S104).

Here, in the case that the base station 100 supports the non-orthogonal multiple access scheme and the orthogonal multiple access scheme, an example of reporting that the terminal 200 supports the non-orthogonal multiple access scheme may be operated in a similar manner to Embodiment 1 (for example, FIGS. 72, 73, 83 and 84).

Also, in the case that the base station 100 supports the non-orthogonal multiple access scheme and the orthogonal multiple access scheme, an example of reporting that the terminal 200 supports the orthogonal multiple access scheme may be operated in a similar manner to Embodiment 2.

3.1 Effects of Embodiment 3

Embodiment 3 is an example in which the terminal 200 reports to the base station 100, which supports both of the non-orthogonal multiple access scheme and the orthogonal multiple access scheme, that the terminal 200 supports both of the non-orthogonal multiple access scheme and the orthogonal multiple access scheme. This prevents, for example, the occurrence of such a situation that the base station 100 transmits the use report of both schemes to a terminal 200 which does not support both of the non-orthogonal multiple access scheme and the orthogonal multiple access scheme, and also prevents the execution of radio communication with the terminal 200 by an incorrect multiple access scheme. Therefore, the base station 100 can appropriately set a multiple access scheme, so that can appropriately perform radio communication with the terminal 200. Further, the appropriate setting of a multiple access scheme in the base station 100 can prevent such a situation that an incorrect multiple access scheme is set over multiple times, which can improve a processing speed, and as a result, can improve a data transmission speed (or a throughput).

Further, in the terminal category, there is included information whether or not the terminal 200 supports both of the non-orthogonal multiple access scheme and the orthogonal multiple access scheme, as terminal performance information. Therefore, by the identification of the terminal category, it becomes easy to discriminate whether or not the terminal 200 supports both multiple access schemes.

Further, it becomes possible to select a multiple access scheme on the basis of communication traffic and a load state using the orthogonal multiple access scheme and communication traffic and a load state using the non-orthogonal multiple access scheme. Therefore, a throughput can be improved.

4. Embodiment 4: Switch Between the Orthogonal Multiple Access Scheme and the Non-Orthogonal Multiple Access Scheme in the Same Base Station Next, a description will be given on Embodiment 4. Embodiment 4 is an example of changing over in an identical base station 100 from the orthogonal multiple access scheme to the non-orthogonal multiple access scheme, or from the non-orthogonal multiple access scheme to the orthogonal multiple access scheme. In the following, a description will be given on an example of changing over from the orthogonal multiple access scheme to the non-orthogonal multiple access scheme.

Figure 85:
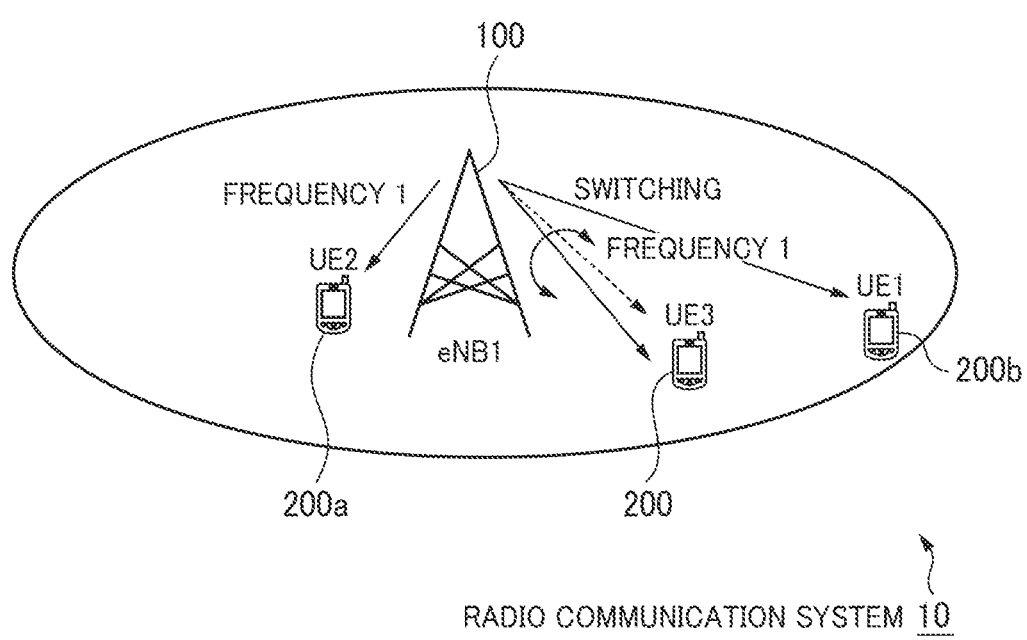
FIG. 85 is a diagram illustrating a configuration example of a radio communication system.

For example, a configuration example of a radio communication system 10 of Embodiment 4 is illustrated in FIG. 85, a configuration example of a base station 100 is illustrated in FIG. 46 and a configuration example of a terminal 200 is illustrated in FIG. 58, respectively.

FIG. 85 illustrates an example in which a terminal 200 performing radio communication with the base station 100 is changed over from the orthogonal multiple access scheme to the non-orthogonal multiple access scheme. In this case, the base station 100 and the terminal 200 switch a multiple access scheme in the same frequency.

Figure 86:
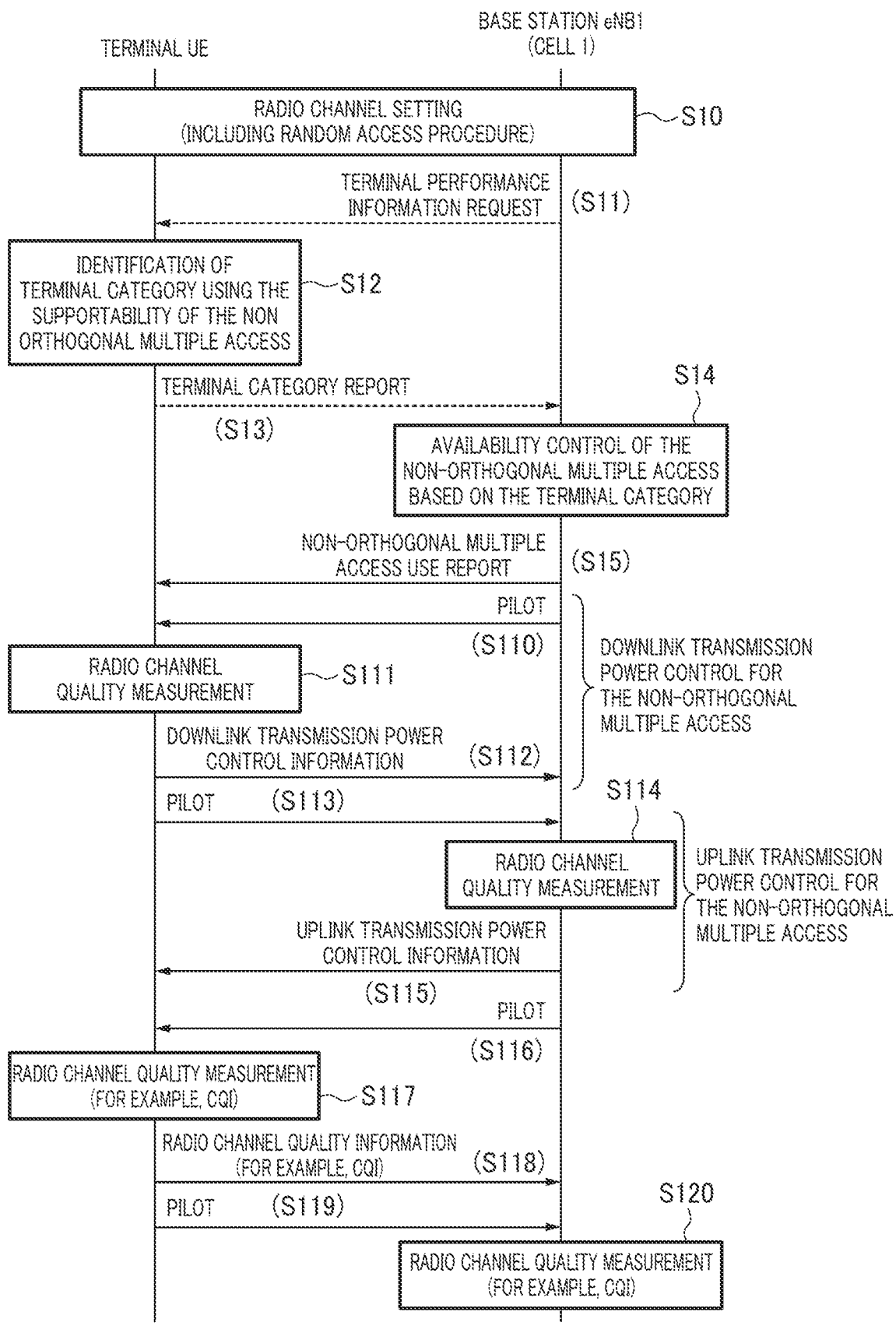
FIG. 86 is a sequence diagram illustrating an operation example when changing over a multiple access scheme.

FIG. 86 is a sequence diagram illustrating an operation example of Embodiment 4. The terminal 200 measures radio channel quality from an adjacent base station using the orthogonal multiple access scheme, and based on the measured radio channel quality, selects a base station 100, so as to set a radio channel between with the base station 100 through a random access procedure etc. (S10).

Next, the base station 100 transmits a terminal performance information request to the terminal 200 (S11), and the terminal 200, on receiving the terminal performance information request, identifies a terminal category using the supportability of the non-orthogonal multiple access scheme (S12). For example, the terminal category identification unit 213 identifies the terminal category on the basis of performance information of the terminal 200 concerning the non-orthogonal multiple access scheme.

Next, the terminal 200 transmits the identified terminal category to the base station 100 (S13). For example, the radio channel control unit 214 receives the terminal category from the terminal category identification unit 213, and instructs the terminal category information generation unit 219 to generate a terminal category and transmit to the base station 100.

Next, the base station 100 performs the availability control of the non-orthogonal multiple access on the basis of the terminal category (S14). For example, based on the terminal category received from the terminal category information extraction unit 107, the multiple access control unit 110$f$ verifies that the terminal 200 supports the non-orthogonal multiple access scheme.

Next, the base station 100 transmits a non-orthogonal multiple access use report to the terminal 200 (S15). For example, the multiple access control unit 110$f$, on verifying that the terminal 200 supports the non-orthogonal multiple access scheme, instructs the control signal generation unit 112 to generate a control signal including the multiple access use report. By this, the non-orthogonal multiple access use report is transmitted to the terminal 200.

In the following processing, the base station 100 performs transmission power control for the non-orthogonal multiple access (S110 to S115) and the measurement of radio channel quality (S116 to S120). In this case, as to the transmission power control, there are processing in the downlink direction (S110 to S112) and processing in the uplink direction (S113 to S115). Also, the measurement of the radio channel quality is performed in the downlink direction (S116 to S118) and in the uplink direction (S119 to S120).

Namely, the base station 100 transmits a pilot signal (S110). For example, the pilot generation unit 113, on receiving an instruction from the radio channel control unit 110, generates and transmits the pilot signal.

The terminal 200, on receiving the pilot signal, measures radio channel quality on the basis of the received pilot signal (S111). For example, the radio channel quality measurement unit 210 measures SIR of the pilot signal, to measure a control amount which indicates how much amount of the transmission power is to be increased or decreased for a target SIR.

Next, the terminal 200 transmits downlink transmission power control information to the base station 100 (S112). For example, the radio channel quality information generation unit 217, on receiving an instruction from the radio channel control unit 214, receives the control amount from the radio channel quality measurement unit 210, and generates downlink transmission power control information which includes the above control amount to transmit toward the terminal 200.

Also, the terminal 200 transmits a pilot signal (S113). For example, the pilot generation unit 220, on receiving an instruction from the radio channel control unit 214, generates and transmits the pilot signal.

The base station 100, on receiving the pilot signal, measures radio channel quality on the basis of the received pilot signal (S114). For example, the transmission power control unit 110$m$ receives a reception signal from the reception non-orthogonal and orthogonal multiple access processing unit 130, extracts the pilot signal from the reception signal, so as to measure the control amount on the basis of the extracted pilot signal. In this case also, the transmission power control unit 110$m$ may measure a control amount which indicates how much amount of the transmission power is to be increased or decreased for the target SIR.

Next, the base station 100 transmits uplink transmission power control information to the terminal 200 (S115). For example, the transmission power control unit 110$m$ generates uplink transmission power control information, which includes the measured control amount, so as to instruct the control signal generation unit 112 to generate a control signal which includes the uplink transmission power control information. By this, the uplink transmission power control information is transmitted to the terminal 200.

Further, the base station 100 transmits each pilot signal (S116). In this case, the base station 100 transmits two pilot signals, which are a pilot signal by the non-orthogonal multiple access scheme and a pilot signal by the orthogonal multiple access scheme. These two pilot signals, because of common pilot signals to a plurality of terminals, may be transmitted before the transmission of the uplink transmission power control information to the terminal 200. The same also applies to other embodiments including the present embodiment.

For example, processing as follows is performed in the base station 100. Namely, according to an instruction from the radio channel control unit 110, the transmission non-orthogonal and orthogonal multiple access processing unit 131 (for example, FIG. 46) performs two kinds of processing, which are transmission orthogonal multiple access processing and non-orthogonal multiple access processing, on the pilot signal received from the pilot generation unit 113. The orthogonal/non-orthogonal control unit 131$b$1 (for example, FIG. 48) receives multiple access control information as an instruction from the radio channel control unit 110, and according to the above multiple access control information, outputs the pilot signal to the orthogonal modulation unit 131$b$2 and the non-orthogonal modulation unit 131$b$3. This enables the base station 100 to transmit the pilot signal by the non-orthogonal multiple access scheme and the pilot signal processed by the orthogonal multiple access scheme.

Referring back to FIG. 86, next, the terminal 200 measures radio channel quality on the basis of the received pilot signal (S117). In the terminal 200, two sets of radio channel quality, which are obtained when using the non-orthogonal multiple access scheme and when using the orthogonal multiple access scheme, are measured. Here, the base station 100 may request such measurement by using a control signal, for example, so as to be performed in the terminal 200 either periodically or when radio channel quality of a threshold or higher is obtained.

The measurement of the two sets of radio channel quality is performed by processing as follows, for example. Namely, as to a pilot signal transmitted by the orthogonal multiple access scheme, the reception non-orthogonal and orthogonal multiple access processing unit 230 (for example, FIG. 58) performs reception processing using the orthogonal multiple access scheme according to an instruction from the radio channel control unit 214, and as to a pilot signal transmitted by the non-orthogonal multiple access scheme, performs reception processing using the non-orthogonal multiple access scheme. The orthogonal/non-orthogonal control unit 230$b$1 (for example, FIG. 67) receives multiple access control information, as an instruction from the radio channel control unit 214, and according to the multiple access control information, outputs the pilot signal, transmitted by the orthogonal multiple access scheme, to the orthogonal demodulation unit 230$b$2, whereas outputs the pilot signal transmitted by the non-orthogonal multiple access scheme to the non-orthogonal demodulation unit 230$b$3. For example, two pilot signals may be identified by radio resource allocation, a data amount, etc., and therefore, such identification information may be included in the multiple access control information. Thereafter, the radio channel quality measurement unit 210 (for example, FIG. 58) measures radio channel quality on the basis of the two pilot signals extracted by the pilot extraction unit 209. The radio channel quality measurement unit 210, for example, may identify the two pilot signals on the basis of the identification information, so that may measure each set of radio channel quality. This enables the terminal 200 to measure the two sets of radio channel quality, namely, radio channel quality when using the non-orthogonal multiple access scheme and radio channel quality when using the orthogonal multiple access scheme. The radio channel quality includes, for example, CQI.

Referring back to FIG. 86, next, the terminal 200 transmits the measured radio channel quality to the base station 100 (S118). For example, processing as follows is performed. Namely, the radio channel quality measurement control unit 214c instructs the radio channel quality information generation unit 217 to generate radio channel quality information. According to the instruction, the radio channel quality information generation unit 217 receives two sets of radio channel quality from the radio channel quality measurement unit 210, and generates radio channel quality information including the two sets of radio channel quality, so as to transmit to the base station 100. The base station 100 obtains the two sets of radio channel quality in the downlink direction.

Next, the terminal 200 transmits each pilot signal (S119). In this case also, the terminal 200 transmits two pilot signals which are a pilot signal by the non-orthogonal multiple access scheme and a pilot signal by the orthogonal multiple access scheme.

For example, processing as follows is performed. Namely, the transmission non-orthogonal and orthogonal multiple access processing unit 231 (for example, FIG. 58) performs, according to an instruction from the radio channel control unit 214, two kinds of processing, which are transmission orthogonal multiple access processing and non-orthogonal multiple access processing, on each pilot signal received from the pilot generation unit 220. The orthogonal/non-orthogonal control unit 231b1 (for example, FIG. 67) receives multiple access control information, as an instruction from the radio channel control unit 214, and outputs the pilot signal to the orthogonal modulation unit 231b2 and the non-orthogonal modulation unit 231b3, according to the multiple access control information. This enables the terminal 20 to transmit the pilot signal by the non-orthogonal multiple access scheme and the pilot signal processed by the orthogonal multiple access scheme.

Referring back to FIG. 86, next, the base station 100, on receiving the pilot signals, measures radio channel quality on the basis of the received pilot signals (S120). In this case also, the base station 100 performs reception processing on the pilot signal transmitted by the non-orthogonal multiple access scheme, using the non-orthogonal multiple access scheme, and also performs reception processing on the pilot signal transmitted by the orthogonal multiple access scheme, using the orthogonal multiple access scheme.

For example, processing as follows is performed. Namely, as to a pilot signal transmitted by the orthogonal multiple access scheme, the reception non-orthogonal and orthogonal multiple access processing unit 130 (for example, FIG. 46), performs reception processing using the orthogonal multiple access scheme, according to an instruction from the radio channel control unit 110, and as to a pilot signal transmitted by the non-orthogonal multiple access scheme, performs reception processing using the non-orthogonal multiple access scheme. The orthogonal/non-orthogonal control unit 130b1 (for example, FIG. 55) receives multiple access control information, as an instruction from the radio channel control unit 110, and according to the multiple access control information, outputs the pilot signal, transmitted by the orthogonal multiple access scheme, to the orthogonal demodulation unit 130b2, whereas outputs the pilot signal transmitted by the non-orthogonal multiple access scheme to the non-orthogonal demodulation unit 130b3. For example, two pilot signals may be identified by radio resource allocation, a data amount, etc., and therefore, such identification information may be included in the multiple access control information. Thereafter, the radio channel quality measurement control unit 110c measures radio channel quality on the basis of the two pilot signals extracted by the pilot extraction unit 209. This enables the base station 100 to measure the two sets of radio channel quality, namely, radio channel quality when using the non-orthogonal multiple access scheme and radio channel quality when using the orthogonal multiple access scheme. The base station 100 obtains two sets of radio channel quality in the uplink direction.

Figure 87:
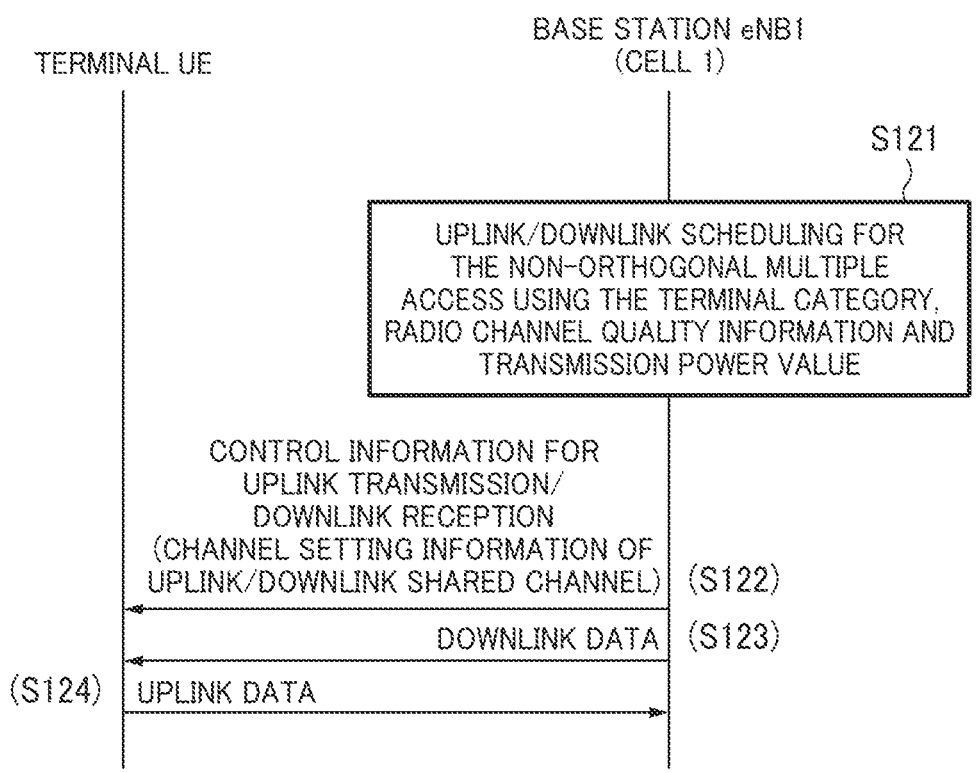
FIG. 87 is a sequence diagram illustrating an operation example when changing over a multiple access scheme.

Next, the base station 100 performs scheduling for the non-orthogonal multiple access scheme in the uplink and downlink directions using a terminal category, radio channel quality and a transmission power value (S121 in FIG. 87).

In this case, the base station 100 selects the non-orthogonal multiple access scheme if the radio channel quality when using the non-orthogonal multiple access scheme in the base station 100 currently in connection is higher than the radio channel quality when using the orthogonal multiple access scheme in the base station 100 currently in connection. Then, the base station 100 determines or discriminates to switch from the orthogonal multiple access scheme to the non-orthogonal multiple access scheme. The base station 100 performs scheduling when using the non-orthogonal multiple access scheme.

The discrimination of switch from the non-orthogonal multiple access scheme to the orthogonal multiple access scheme is performed, for example, in the following manner. Namely, the multiple access control unit 110f receives from the radio channel quality measurement control unit 110c two sets of radio channel quality by the orthogonal multiple access scheme and the non-orthogonal multiple access scheme. Then, if the radio channel quality when using the non-orthogonal multiple access scheme is higher than the radio channel quality when using the orthogonal multiple access scheme, the multiple access control unit 110f determines to switch from the orthogonal multiple access scheme to the non-orthogonal multiple access scheme. In this case, the multiple access control unit 110f may determine to switch if the radio channel quality of the non-orthogonal multiple access scheme is higher than the radio channel quality of the orthogonal multiple access scheme in regard to the radio channel quality in two directions, the uplink and downlink directions. Alternatively, the multiple access control unit 110f may determine to switch if the radio channel quality of the non-orthogonal multiple access scheme is higher than the radio channel quality of the orthogonal multiple access scheme in regard to the radio channel quality in either one of the uplink and downlink directions.

The scheduling is performed, for example, in the following manner. Namely, the scheduler 110g, on receiving from the multiple access control unit 110f an instruction to switch using the non-orthogonal multiple access scheme, selects a terminal 200 to be communicated with, and selects (or schedules) a radio resource to be used for the communication, a modulation scheme and a coding rate (coding method) to be used for the communication, etc., on the basis of radio channel quality when using the non-orthogonal multiple access scheme and transmission power information when using the non-orthogonal multiple access scheme.

Thereafter, for example, the base station 100 performs radio communication with the terminal 200 using the non-orthogonal multiple access scheme. For example, the radio channel control unit 110, the transmission non-orthogonal and orthogonal multiple access processing unit 131, the transmission radio unit 116 and the and the antenna 101 become a communication unit which performs radio communication.

Next, the base station 100 transmits to the terminal 200 control information for uplink transmission and/or downlink transmission (S122). For example, processing as follows is performed. Namely, the scheduler 110*g* outputs the selected radio resource, the modulation scheme, the coding rate, etc. to the control signal generation unit 112, so as to instruct to generate a control signal, including the above information (the above information may be referred to as "scheduling information") and transmit to the terminal 200. The control signal generation unit 112 generates the control signal according to the above instruction, and transmits the generated control signal to the terminal 200. At that time, the scheduler 110*g* outputs the selected radio resource, the modulation scheme, the coding rate, etc. to the transmission non-orthogonal and orthogonal multiple access processing unit 131 and the reception non-orthogonal multiple and orthogonal multiple access processing unit 130. This enables the base station 100 to transmit a control signal, data, etc. to the terminal 200, using the selected radio resource, the modulation scheme and the coding rate, and to receive a signal transmitted from the terminal 200.

Here, the base station 100 may transmit to the terminal 200 by including information, which indicates to switch to the non-orthogonal multiple access scheme, in the control signal. For example, the multiple access control unit 110*f*, on determining to switch to the non-orthogonal multiple access scheme, instructs the control signal generation unit 112 to generate a control signal including the above information. This enables transmitting the information of the non-orthogonal multiple access scheme after the switch, from the control signal generation unit 112 to the terminal 200. In this case, the base station 100 may transmit the information of the non-orthogonal multiple access scheme after the switch, by including in the control signal together with the scheduling information etc.

The terminal 200, on receiving the control signal, performs processing as follows, for example. Namely, the radio channel control unit 214, on receiving from the control signal extraction unit 208 the scheduling information and the information of switch to the non-orthogonal multiple access scheme, requests the terminal setting control unit 215 to enable the use of the non-orthogonal multiple access scheme. The terminal setting control unit 215, on receiving the request, performs setting the reception radio unit 205, the reception non-orthogonal and orthogonal multiple access processing unit 230, the transmission radio unit 222 and the transmission non-orthogonal and orthogonal multiple access processing unit 231 so as to support the non-orthogonal multiple access scheme.

Thereafter, the base station 100 performs the transmission of downlink data to the terminal 200 and the reception of uplink data from the terminal 200, according to the scheduling information, and also the terminal 200 performs the reception of the downlink data and the transmission of the uplink data, according to the scheduling information (S123, S124).

Next, another operation example in the present Embodiment 4 will be described.

Figure 88:
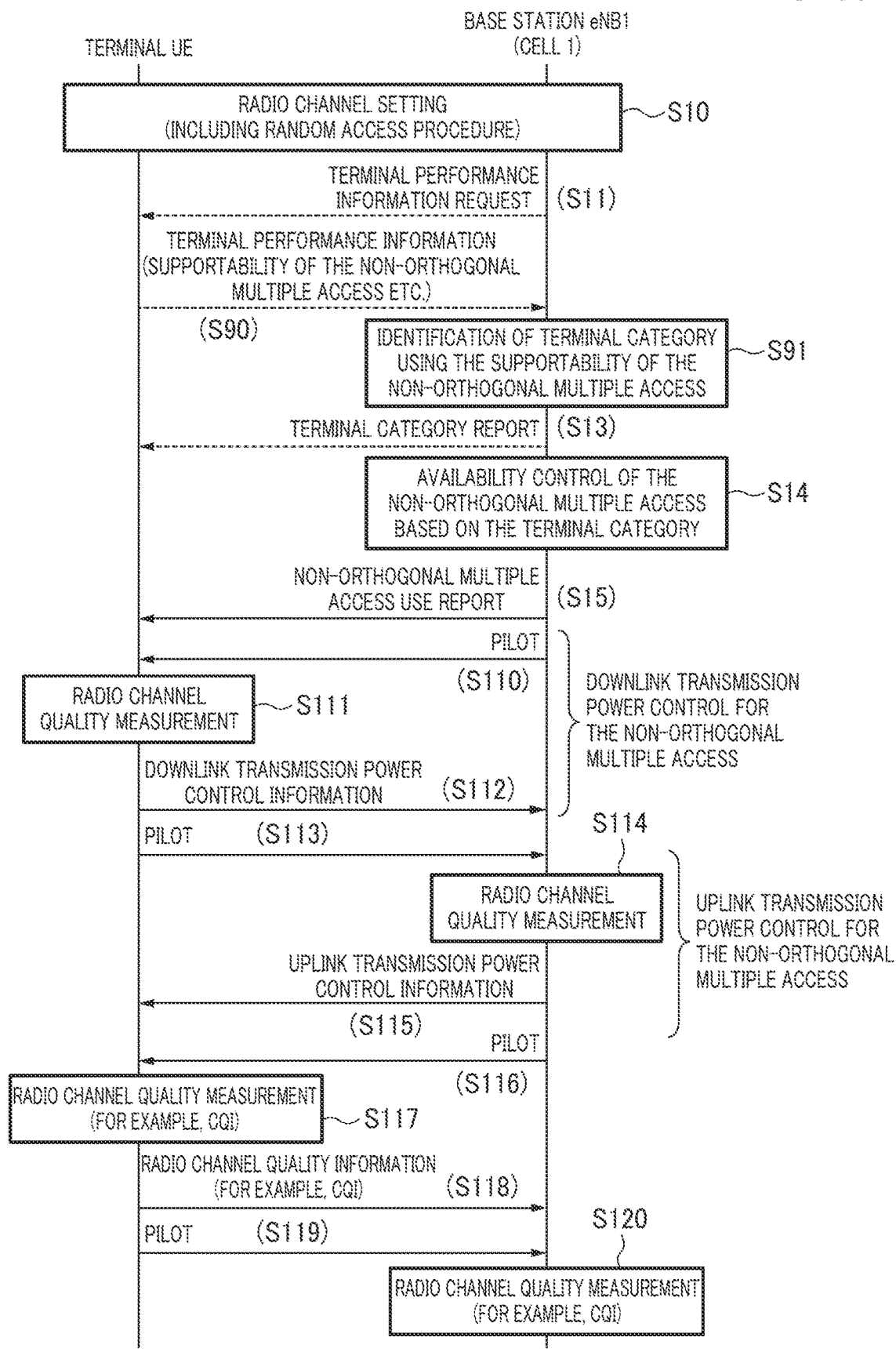
FIG. 88 is a sequence diagram illustrating an operation example when changing over a multiple access scheme.
Figure 89:
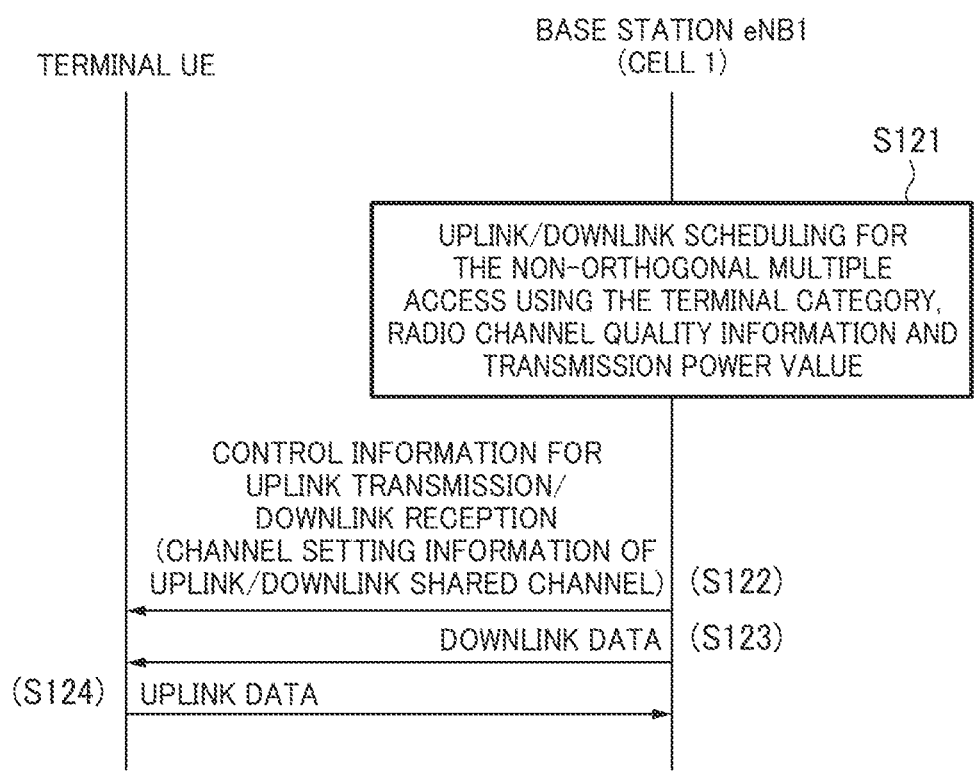
FIG. 89 is a sequence diagram illustrating an operation example when changing over a multiple access scheme.

The above-mentioned example has been described on an operation example when the terminal category is identified in the terminal 200. For example, the terminal category may be identified in the base station 100. FIGS. 88 and 89 illustrate the operation example of such a case.

The terminal 200, on receiving a terminal performance information request, transmits terminal performance information to the base station 100 (S11, S90), so that the base station 100 identifies a terminal category on the basis of the terminal performance information (S91). The terminal performance information is terminal performance information of the non-orthogonal multiple access scheme, similar to the case when the terminal category is identified in the terminal 200. As to processing thereafter (S110-S124), similar processing to the case when the terminal category is identified in the terminal 200 is performed.

Figure 90:
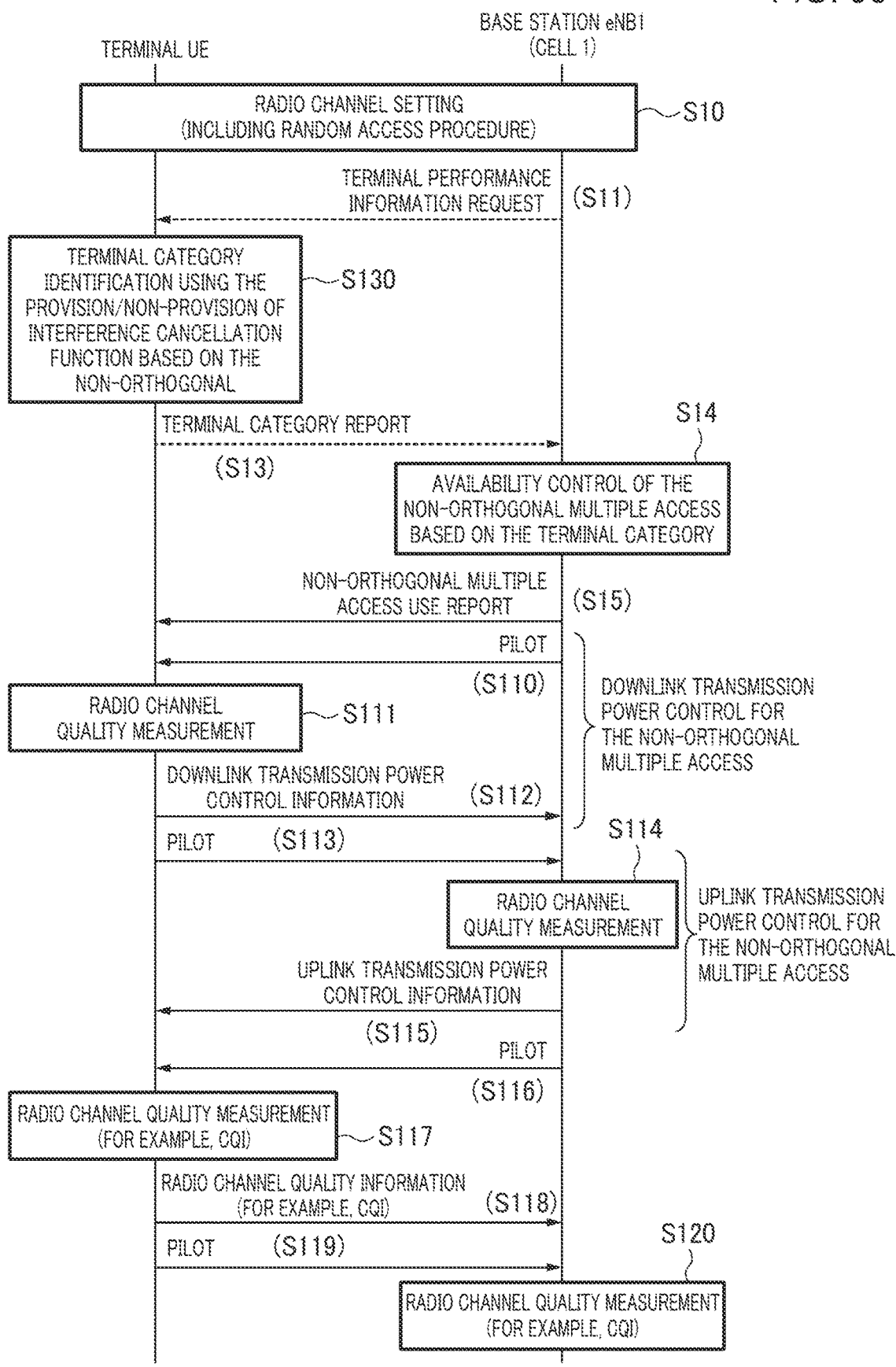
FIG. 90 is a sequence diagram illustrating an operation example when changing over a multiple access scheme.
Figure 91:
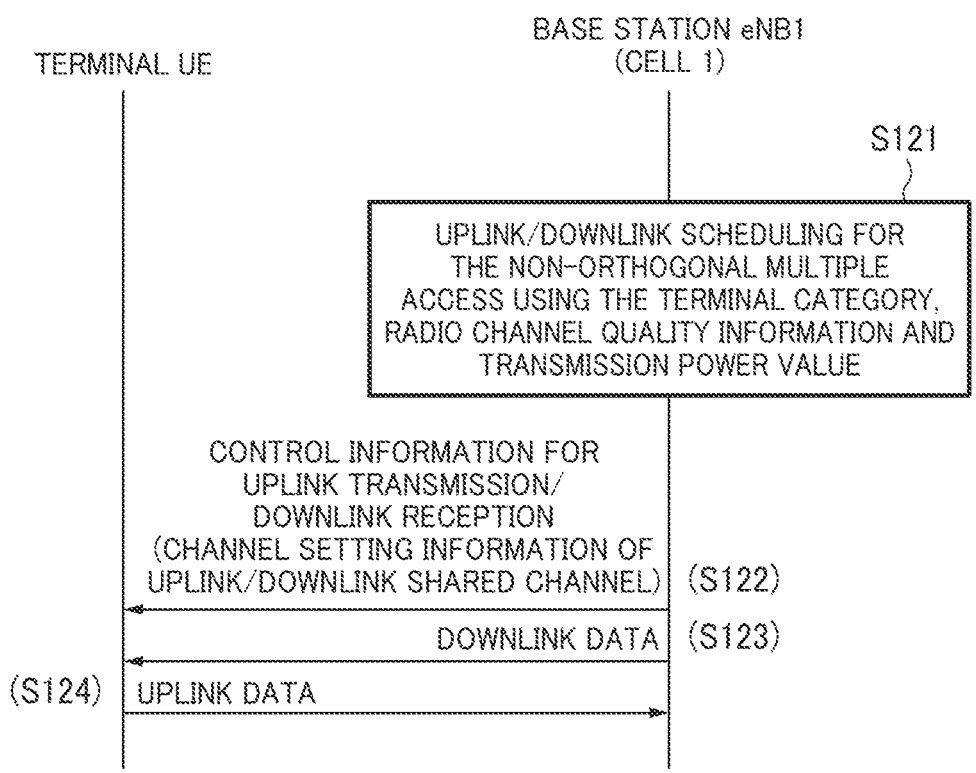
FIG. 91 is a sequence diagram illustrating an operation example when changing over a multiple access scheme.

FIGS. 90 and 91, which are an example when the terminal category is identified in the terminal 200, illustrate an operation example when identifying the terminal category on the basis of the provision or non-provision of interference cancellation by the non-orthogonal multiple access scheme, as terminal performance information. In this case, for example, the terminal category identification unit 213 identifies the terminal category on the basis of information indicative of the provision or non-provision of the interference cancellation function (S130). In this case, if the interference cancellation function is provided in the terminal 200, a terminal category comes to a category which supports the non-orthogonal multiple access scheme, whereas if no interference cancellation function is provided, a terminal category comes to a category which supports the orthogonal multiple access scheme. Thereafter, the same as the above-mentioned example of FIG. 86 applies.

Figure 92:
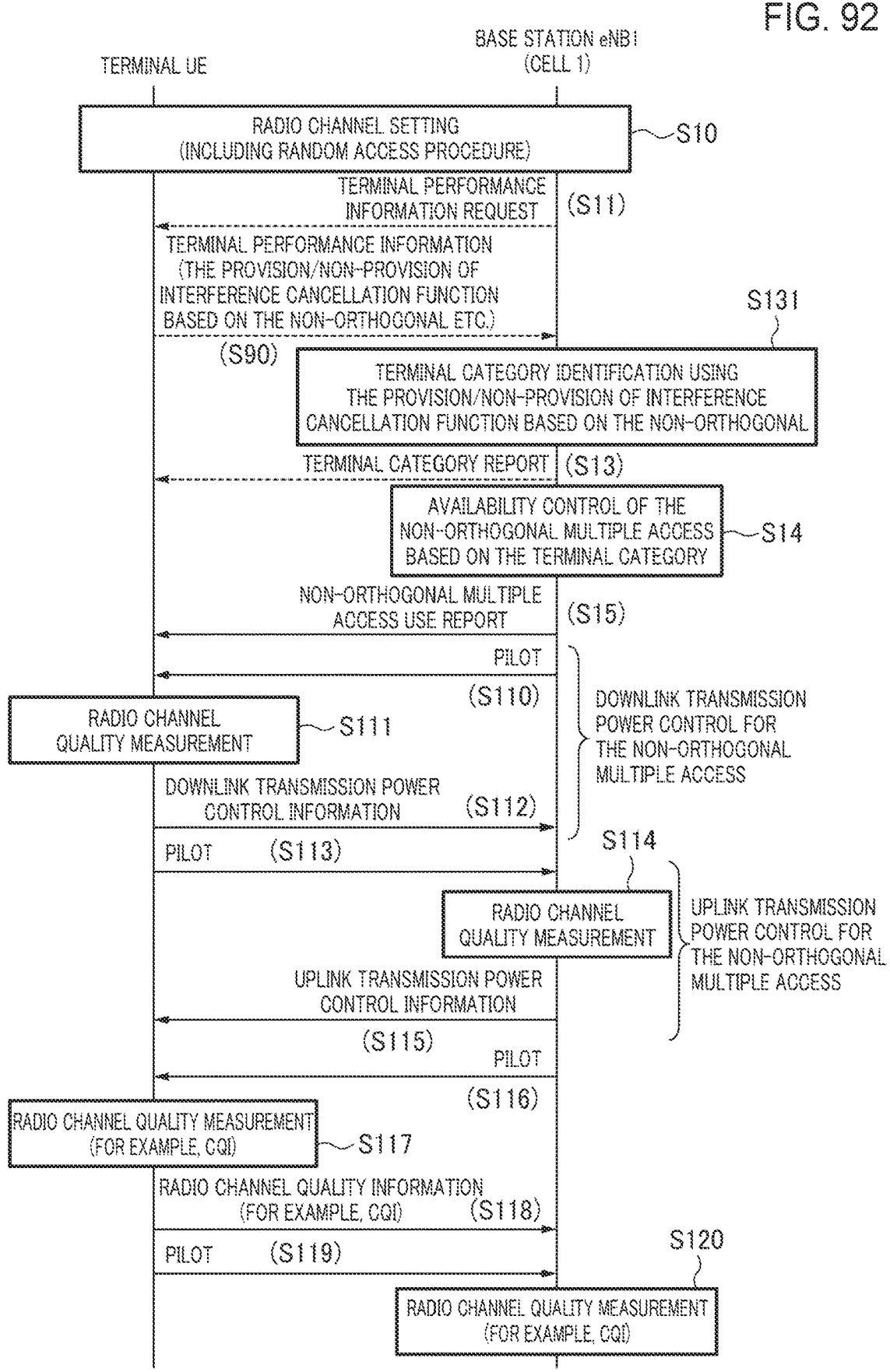
FIG. 92 is a sequence diagram illustrating an operation example when changing over a multiple access scheme.
Figure 93:
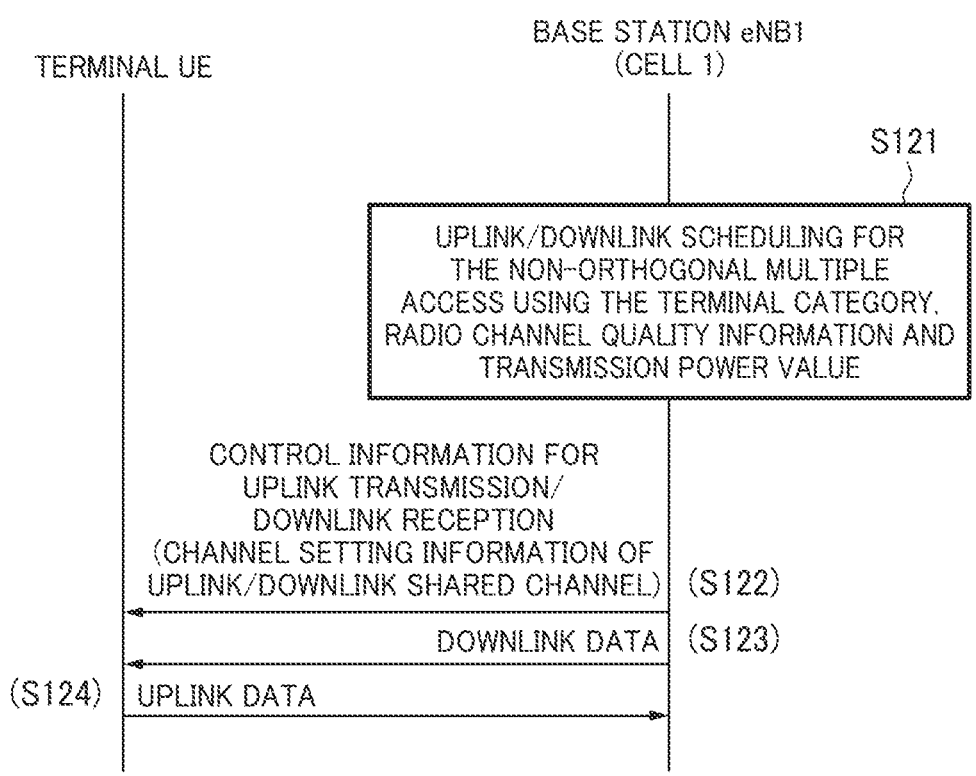
FIG. 93 is a sequence diagram illustrating an operation example when changing over a multiple access scheme.

On the other hand, FIGS. 92 and 93 are an example when the terminal category is identified in the base station 100, which illustrate an operation example when the terminal category is measured based on the provision or non-provision of interference cancellation by the non-orthogonal multiple access scheme, as terminal performance information. In this case, the terminal 200 transmits terminal performance information to the base station 100 (S90), and the terminal performance information comes to information about the provision or non-provision of the interference cancellation function by the non-orthogonal multiple access scheme. Also, the terminal category identification unit 119 of the base station 100, when receiving terminal performance information indicating that the interference cancellation function is provided, identifies the terminal category which supports the non-orthogonal multiple access scheme. On the other hand, when receiving terminal performance information indicating that the interference cancellation function is not provided, the terminal category identification unit 119 may identify a terminal category which supports the orthogonal multiple access scheme (S131). The processing thereafter is similar to the above-mentioned example of FIG. 86.

Figure 94:
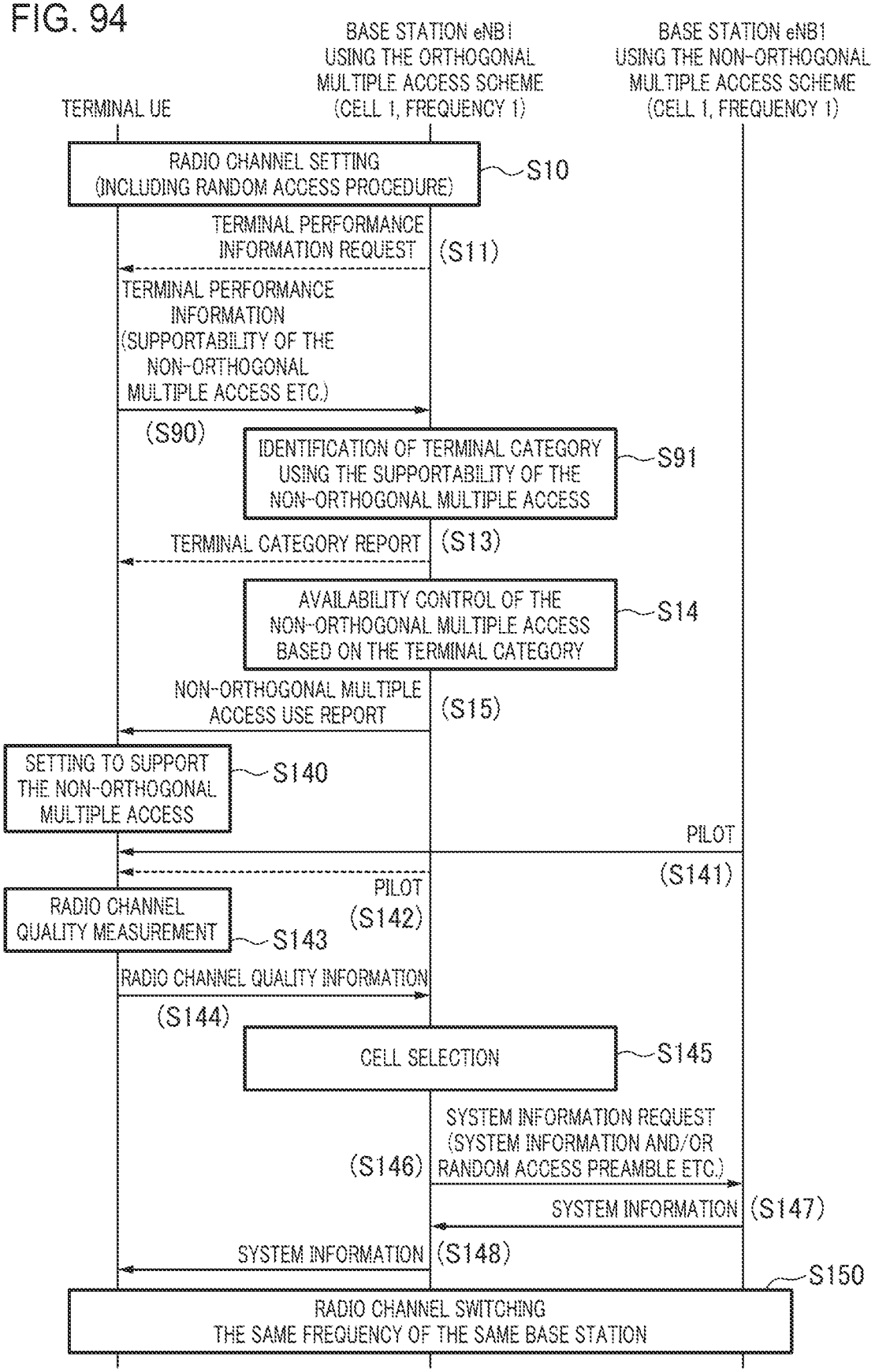
FIG. 94 is a sequence diagram illustrating an operation example when changing over a multiple access scheme.
Figure 95:
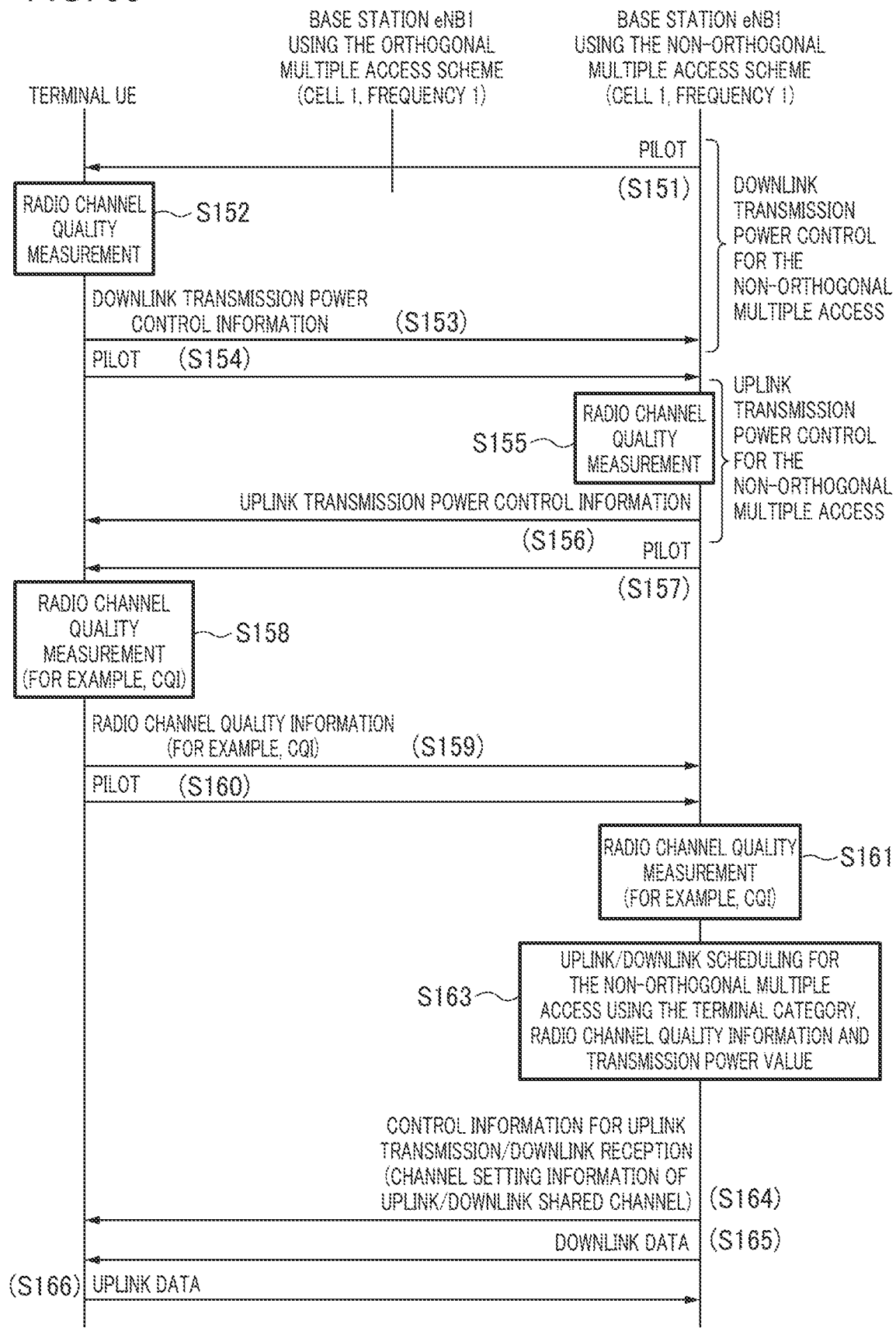
FIG. 95 is a sequence diagram illustrating an operation example when changing over a multiple access scheme.

FIGS. 94 and 95 are an example in which cell section causes a switch from the orthogonal multiple access scheme to the non-orthogonal multiple access scheme (S145), and thereafter, scheduling is performed (S163).

The same as the example of FIG. 88 applies to S10 to S15. The terminal 200, on receiving a non-orthogonal multiple access use report from the base station 100, performs setting to support the non-orthogonal multiple access scheme (S140).

For example, processing as follows is performed. Namely, the radio channel control unit 214, on receiving a non-orthogonal multiple access use report from the control signal extraction unit 208, requests the terminal setting control unit 215 to enable the use of the non-orthogonal multiple access scheme. On receiving the request, the terminal setting control unit 215 instructs the reception radio unit 205, the reception non-orthogonal and orthogonal multiple access processing unit 230, the transmission radio unit 222 and the transmission non-orthogonal and orthogonal multiple access processing unit 231 to prepare to be able to support the non-orthogonal multiple access scheme.

Next, the base station 100 transmits to the terminal 200 a pilot signal which is processed by the non-orthogonal multiple access scheme and a pilot signal which is processed by the orthogonal multiple access scheme (S141, S142). The above processing (S141, S142) is similar to the processing of S116 in FIG. 86.

The terminal 200 measures radio channel quality on the basis of the pilot signal (S143). The terminal 200 measures the radio channel quality when the non-orthogonal multiple access scheme is used, on the basis of the pilot signal processed by the non-orthogonal multiple access scheme. Also, the terminal 200 measures the radio channel quality when the orthogonal multiple access scheme is used, on the basis of the pilot signal processed by the orthogonal multiple access scheme. The radio channel quality may be, for example, CQI.

It is not needed for the terminal 200 to measure the radio channel quality relative to the base station 100 which is currently in connection and supports the orthogonal multiple access scheme. Therefore, S142 may be omitted. It may be instructed by a control signal from the base station 100 on which base station (or cell) 100 the radio channel quality is to be measured.

In the present operation example, the radio channel quality in the downlink direction is measured in the terminal 200. However, the radio channel quality in the uplink direction may be measured in the base station 100.

Next, the terminal 200 transmits radio channel quality information to the base station 100 (S144). The terminal 200 transmits to the base station 100 the radio channel quality information which includes two sets of radio channel quality having been measured.

Then, the base station 100 selects a cell on the basis of the radio channel quality information (S145). In this case, if the radio channel quality when using the non-orthogonal multiple access scheme is higher (and/or if quality is better) than the radio channel quality when using the orthogonal multiple access scheme, the base station 100 determines to switch to the orthogonal multiple access scheme, so as to select a cell in which the non-orthogonal multiple access scheme is used. In the above operation example, the cell is the same cell of the same base station 100.

Next, the base station 100 transmits system information to the terminal 200 (S146 to S148). In the above operation example, because of the same base station of the same cell, processing from S146 to S147 may be omitted, and therefore the description is omitted.

For example, processing as follows is performed. Namely, the radio channel control unit 110, when performing cell selection (S145), instructs the system information management unit 111 to generate system information. The system information management unit 111, on receiving the above instruction, reads out system information to output to the system information generation unit 114, to instruct to generate system information. By this, the system information is transmitted from the system information generation unit 114 toward the terminal 200.

Then, the base station 100 performs a radio channel switching (S150). For example, the terminal setting control unit 215 sets to the reception radio unit 205, the reception non-orthogonal and orthogonal multiple access processing unit 230, the transmission radio unit 222 and the transmission non-orthogonal and orthogonal multiple access processing unit 231 to perform a switch to the non-orthogonal multiple access scheme.

In the processing thereafter (S151-S163 in FIG. 95), which is similar to the processing of S110-S120 in FIG. 86, because the switch to the non-orthogonal multiple access processing has been performed (S150), transmission power control information and radio channel quality when using the non-orthogonal multiple access scheme is measured (S151-S161). Also, the base station 100 performs scheduling in the uplink and downlink directions, using the measured transmission power control information and the radio channel quality (S163, S164), so as to perform data transmission and reception according to the result of the scheduling (S165, S166).

In the above-mentioned example, the description has been given on the example of switch from the orthogonal multiple access scheme to the non-orthogonal multiple access scheme. As to a case of switch from the non-orthogonal multiple access scheme to the orthogonal multiple access scheme, the base station 100 and the terminal 200 may execute in a similar manner to the above-mentioned operation example. For example, in the processing of FIGS. 86 and 87, the "non-orthogonal multiple access" is to be replaced with the "orthogonal multiple access". The same applies to the operation example in FIGS. 88 through 95. In this case, the base station 100 transmits to the terminal 200 a control signal which includes information indicative of changing over to the orthogonal multiple access scheme, so that the terminal 200 performs the switch to the orthogonal multiple access scheme on the basis of the above information.

Here, a transmission unit which transmits to the terminal 200 the non-orthogonal multiple access scheme or the orthogonal multiple access scheme after the switch corresponds to, for example, the control signal generation unit 112, the transmission non-orthogonal and orthogonal multiple access processing unit 131, the transmission radio unit 116 and the antenna 101. At this time, the transmission unit may transmit information, which indicates the non-orthogonal multiple access scheme or the orthogonal multiple access scheme after the switch, using a first downlink frequency.

Also, a communication unit which performs radio communication using the non-orthogonal multiple access scheme or the orthogonal multiple access scheme after the switch corresponds to, for example, the antenna 101, the reception radio unit 105, the reception non-orthogonal and orthogonal multiple access processing unit 130, the transmission non-orthogonal and orthogonal multiple access processing unit 131, the transmission radio unit 116 and the radio channel control unit 110. At this time, radio communication using the non-orthogonal multiple access scheme after the switch or the orthogonal multiple access scheme may be performed using a first uplink frequency and a first downlink frequency.

4.1 Effects of Embodiment 4

In the above-mentioned manner, the base station 100 and the terminal 200 can switch and select a multiple access scheme on the basis of the terminal performance. For example, when the terminal 200 supports both of the orthogonal multiple access scheme and the non-orthogonal multiple access scheme, it becomes possible to select a multiple access scheme capable of achieving higher speed transmission than the multiple access scheme currently in use, on the basis of radio channel quality and radio resource use information of the orthogonal multiple access scheme and/or the non-orthogonal multiple access scheme. As a result, it is possible to improve a transmission speed (a throughput).

Also, because the base station 100 can verify that the terminal 200 supports the non-orthogonal multiple access scheme, on the basis of the terminal category and the terminal performance information, it is possible to prevent a situation of incorrectly applying the non-orthogonal multiple access scheme to the terminal 200 which does not support the non-orthogonal multiple access scheme. Accordingly, the base station 100 appropriately sets a multiple access scheme, so as to appropriately perform radio communication with the terminal 200.

Further, because it is possible to prevent such a situation that the base station 100 incorrectly applies the non-orthogonal multiple access scheme to the terminal 200 which does not support the non-orthogonal multiple access scheme, and tries to set the non-orthogonal multiple access scheme over multiple times, the processing speed can be improved as compared to the above-mentioned case. As a result, it is possible to improve a transmission speed (a throughput) of data etc.

5. Embodiment 5: a Case of Handover to a Frequency or a Base Station of Different Multiple Access Scheme Next, Embodiment 5 will be described. In the above-mentioned Embodiment 4, the description has been given on an example of switch to a different multiple access scheme within the same base station 100 at the same frequency. In this case, because of the same frequency of the same base station 100, the multiple access scheme is configured to be changed over without handover processing. In Embodiment 5, handover processing is performed because there is a switch to a frequency of a different multiple access scheme, or a switch to a base station of a different multiple access scheme.

Typically, in Embodiment 5-1, a description will be given on an operation example when a handover is performed to a frequency of a different multiple access scheme within the same base station 100. Also, in Embodiment 5-2, a description will be given on an operation example when a handover is performed to the same frequency of a different multiple access scheme in a different base station 100-2. Further, in Embodiment 5-3, a description will be given on an operation example when a handover is performed to a different multiple access scheme in a different base station 100-2 and to a different frequency. Hereinafter, each operation example in Embodiment 5 will be described successively.

5.1 Embodiment 5-1: A Case of Handover to a Frequency of Different Multiple Access Scheme within the same Base Station Embodiment 5-1 is an operation example when a handover is performed to a frequency of a different multiple access scheme within the same base station. For example, a configuration example of a radio communication system 10 of Embodiment 5-1 is illustrated in FIG. 96, a configuration example of a base station 100 is illustrated in FIGS. 46 and 70, and a configuration example of a terminal 200 is illustrated in FIGS. 58 and 71, respectively.

Figure 96:
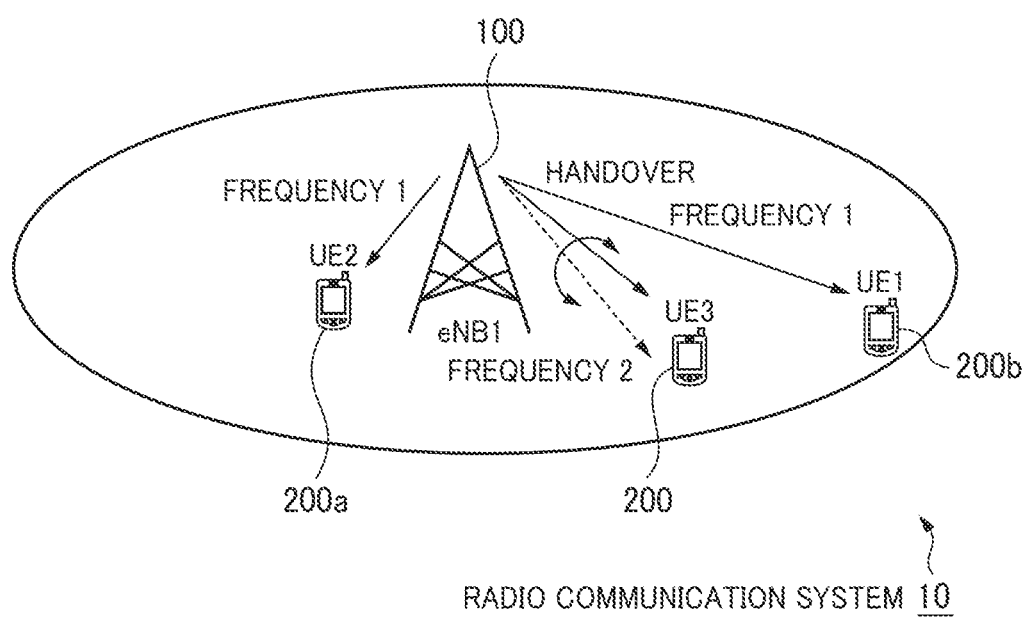
FIG. 96 is a diagram illustrating a configuration example of a radio communication system.

FIG. 96 illustrates the configuration example of the radio communication system 10 of Embodiment 5-1. In FIG. 96, there is illustrated an example when the switch of the terminal 200 is performed from a first frequency, which is used in the orthogonal multiple access scheme, to a second frequency which is used in the non-orthogonal multiple access scheme. The first frequency and the second frequency are different frequencies.

Hereafter, a description will be given on an example when a handover is performed from the first frequency which is used in the orthogonal multiple access scheme to the second frequency which is used in the non-orthogonal multiple access scheme. The similar operation is performed as to a handover from the second frequency, which is used in the non-orthogonal multiple access scheme, to the first frequency which is used in the orthogonal multiple access scheme.

Further, as to the handover, there may be cases when a handover is performed in both of the uplink and downlink directions, and when a handover is performed in either one of the uplink and downlink directions. In the present Embodiment 5-1, a case when the handover is performed in the downlink direction will be described.

Figure 98:
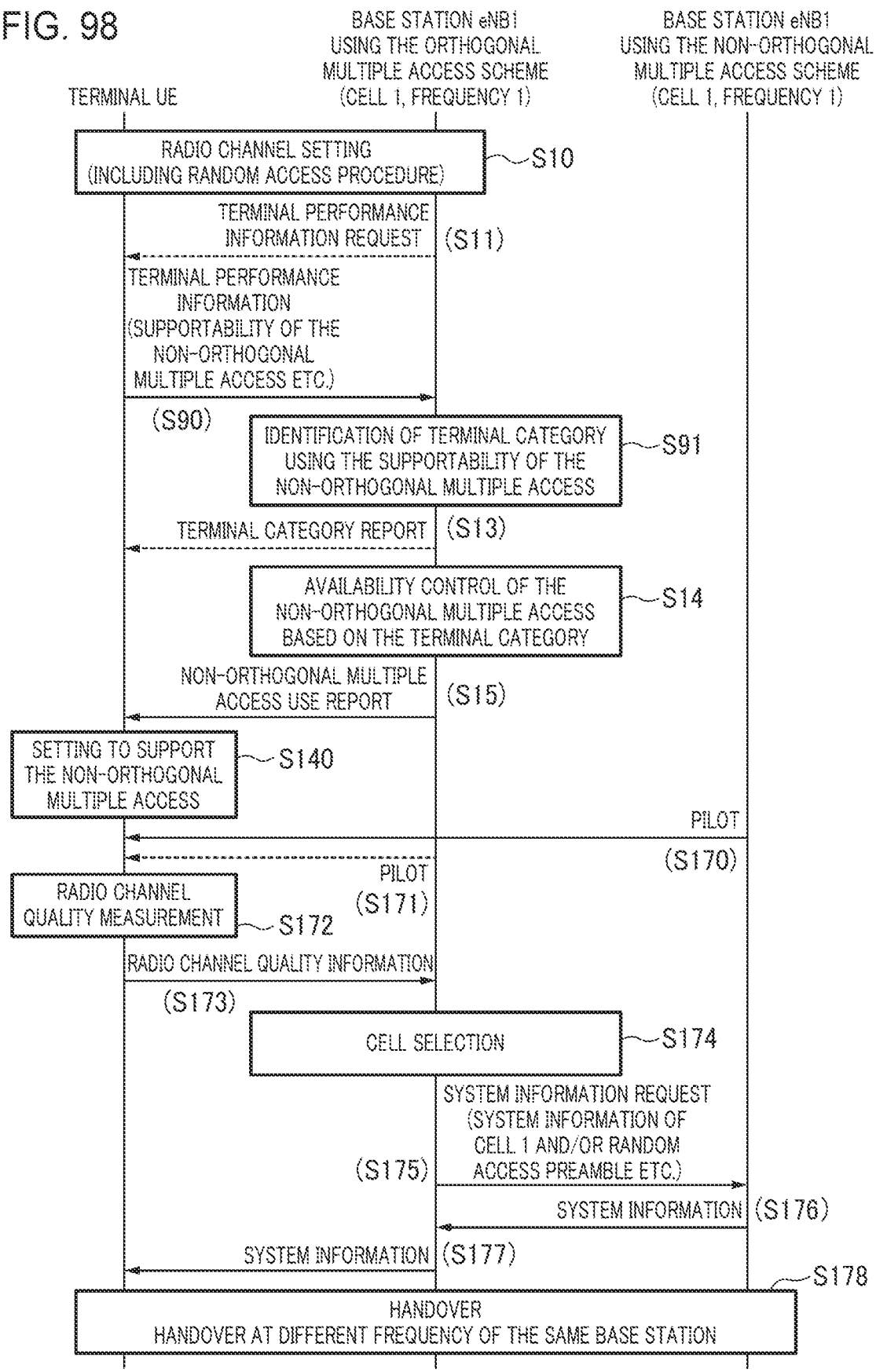
FIG. 98 is a sequence diagram when a handover is performed.
Figure 99:
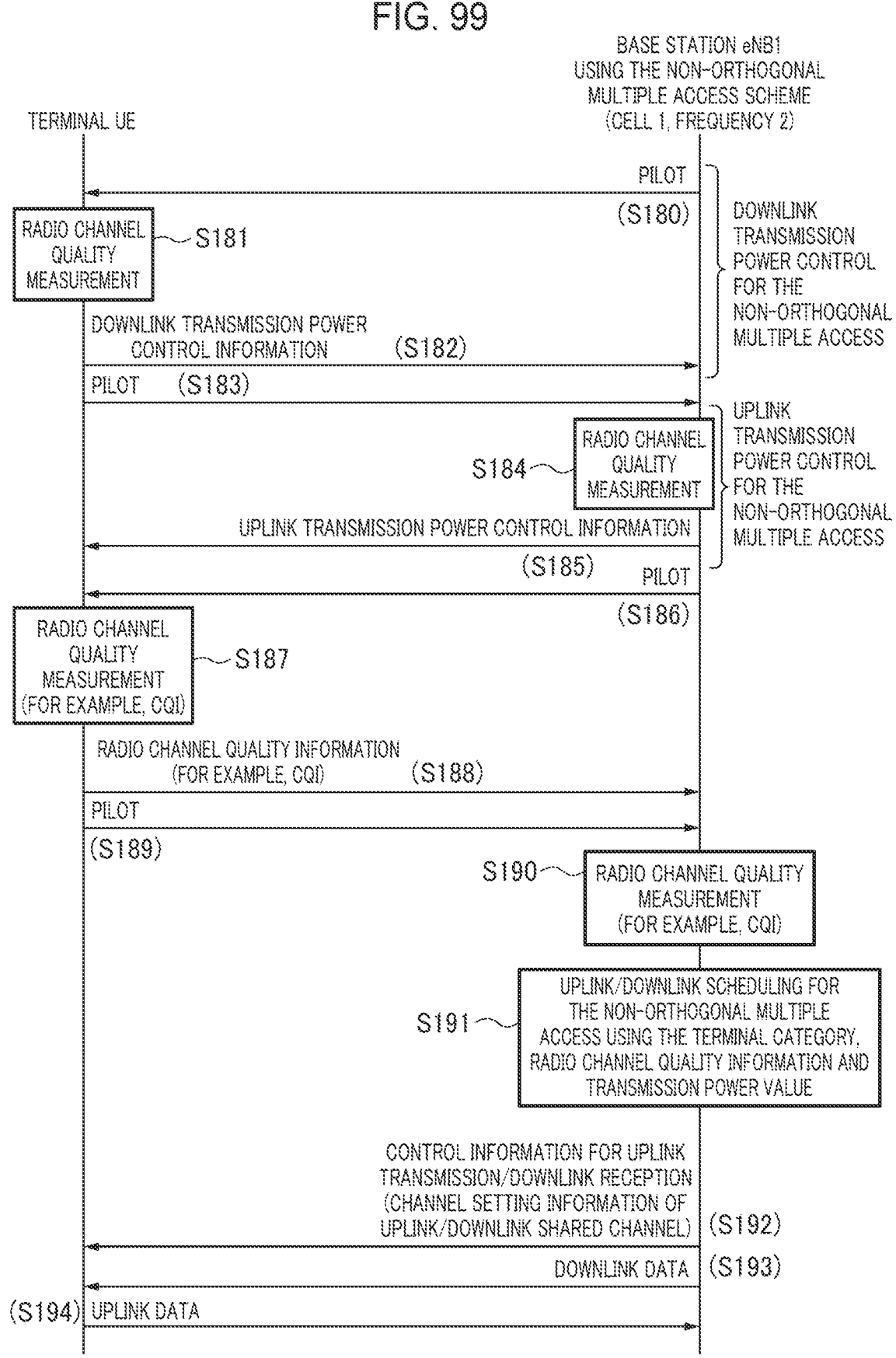
FIG. 99 is a sequence diagram when a handover is performed.

FIGS. 98 and 99 are sequence diagrams illustrating an operation example of Embodiment 5-1. Similar to Embodiment 4 etc., the terminal 200 sets a radio channel between with the base station 100 using a random access procedure etc. (S10), so as to perform radio communication by the orthogonal multiple access scheme.

Next, the terminal 200, on receiving a terminal performance information request transmitted from the base station 100, transmits terminal performance information to the base station 100 (S90). In the terminal performance information, for example, information which indicates that the terminal 200 supports the non-orthogonal multiple access scheme is included.

The base station 100 identifies a terminal category on the basis of the terminal performance information received from the terminal 200, to verify whether or not the terminal 200 supports the non-orthogonal multiple access scheme (S91, S13, S14).

Next, on verifying that the terminal 200 supports the non-orthogonal multiple access scheme, the base station 100 transmits a non-orthogonal multiple access use report to the terminal 200 (S15), so that the terminal 200 prepares setting to support the non-orthogonal multiple access (S140).

Also, the base station 100 transmits a pilot signal when using the non-orthogonal multiple access scheme, at the second frequency (S170). Also, the base station 100 transmits a pilot signal when using the multiple access scheme, at the first frequency (S171).

For example, processing as follows is performed. Namely, the radio channel control unit 110 (for example, FIG. 46) instructs the transmission non-orthogonal and orthogonal multiple access processing unit 131 to perform transmission processing of the pilot signal at the first frequency using the orthogonal multiple access scheme, and to perform transmission processing of the same pilot signal at the second frequency using the non-orthogonal multiple access scheme. The orthogonal/non-orthogonal control unit 131b1 of the transmission non-orthogonal and orthogonal multiple access processing unit 131 (for example FIG. 48), on receiving the above instruction as multiple access scheme control information, outputs the pilot signal to the orthogonal modulation unit 131*b*2, to instruct to modulate the pilot signal using the first frequency. Also, the orthogonal/non-orthogonal control unit 131*b*1 outputs the same pilot signal to the non-orthogonal modulation unit 131*b*3, to instruct to modulate the pilot signal using the second frequency. This enables the base station 100 to transmit, at the first frequency, the pilot signal when using the orthogonal multiple access scheme, and to transmit, at the second frequency, the pilot signal when using the non-orthogonal multiple access scheme.

Referring back to FIG. 98, next, the terminal 200 measures radio channel quality (S172), so as to transmit radio channel quality information to the base station 100 (S173).

For example, processing as follows is performed. Namely, the radio channel quality measurement unit 210 of the terminal 200 (for example, FIG. 58) measures radio channel quality when using the orthogonal multiple access scheme, on the basis of the pilot signal which is received at the first frequency when using the orthogonal multiple access scheme. Also, the radio channel quality measurement unit 210 measures radio channel quality when using the non-orthogonal multiple access scheme, on the basis of the pilot signal which is received at the second frequency when using the non-orthogonal multiple access scheme. The radio channel quality information generation unit 217 generates radio channel quality information which includes two sets of radio channel quality, according to an instruction from the radio channel control unit 214, to transmit toward the base station 100. Here, the radio channel quality may be, for example, CQI.

Referring back to FIG. 98, next, the base station 100 performs cell selection on the basis of the radio channel quality information (S174).

For example, processing as following is performed. Namely, the cell selection control unit 110*b* of the radio channel control unit 110 (for example, FIGS. 46 and 57) receives radio channel quality information from the radio channel quality information extraction unit 108. If radio channel quality when using the non-orthogonal multiple access scheme is higher (and/or quality is better) than radio channel quality when using the orthogonal multiple access scheme, the cell selection control unit 110*b* determines to switch from the orthogonal multiple access scheme using the first frequency to the non-orthogonal multiple access scheme using the second frequency. The cell selection control unit 110*b* selects a multiple access scheme on the basis of the terminal category. In this case, the cell selection control unit 110*b* selects a handover target frequency (for example, the second frequency), that is, a frequency used in the non-orthogonal multiple access scheme. The cell selection control unit 110*b* reports to the handover control unit 110*d* that the handover of the terminal 200 to the second frequency is to be performed.

Referring back to FIG. 98, next, the base station 100 transmits to the terminal 200 the system information of the non-orthogonal multiple access scheme (S175 to S177). As the system information of the non-orthogonal multiple access scheme, for example, a random access preamble used in a random access procedure is also included. The random access preamble may be, for example, either a contention based random access preamble or a non-contention based individual random access preamble. Also, in the system information, the frequency (for example, the second frequency), which is used in the non-orthogonal multiple access and selected in the radio channel control unit 110, is included.

For example, processing as follows is performed. Namely, the system information management unit 111 (for example, FIG. 46), on receiving an instruction from the radio channel control unit 110, reads out the system information of the non-orthogonal multiple access scheme, to output to the system information generation unit 114. The system information generation unit 114 generates system information, which includes the random access preamble etc., to transmit toward the terminal 200. Here, such system information may be generated in the control signal generation unit 112 as a control signal, so that may be transmitted to the terminal 200 as a control signal.

Referring back to FIG. 98, next, the base station 100 and the terminal 200 perform processing for handover (S178).

For example, processing as follows is performed in the base station 100. Namely, the base station 100 generates a control signal which requests to hand over to the base station 100, which uses the non-orthogonal multiple access scheme, at the second frequency, so as to transmit to the terminal 200. Typically, the handover control unit 110*d* (for example, FIGS. 46 and 57) of the radio channel control unit 110, after transmitting the system information, instructs the control signal generation unit 112 to generate the above control signal, to transmit to the terminal 200. In this case, the handover control unit 110*d* may instruct the control signal generation unit 112 to generate a control signal which includes a handover request (or a switch request, which may hereafter be referred to as a "handover request") to instruct to hand over from the orthogonal multiple access scheme using the first frequency to the non-orthogonal multiple access scheme using the second frequency. The transmission of the handover request is, because the handover is not performed yet, transmitted by the orthogonal multiple access scheme using the first frequency, for example.

Referring back to FIG. 98, additionally, the transmission of the control signal to request the handover (S178) and the transmission of the system information (S177) may be performed either simultaneously, or the transmission of the system information may be performed after the control signal is transmitted.

Further, in the terminal 200, for example, processing as follows is performed. Namely, the terminal 200, on receiving the system information, performs synchronization at a designated handover target frequency, to perform a Non-Contention based random access procedure or a Contention based random access procedure. When performing the Non-Contention based random access procedure, the terminal 200 uses a random access preamble (or dedicated preamble) which is reported to the terminal 200 using a certain frequency of the orthogonal multiple access scheme. Also, when performing the Contention based random access procedure, the terminal 200 arbitrarily selects and uses one of a plurality of random access preambles which are reported as system information. Subsequently, the terminal 200 performs a random access at the second frequency of the non-orthogonal multiple access scheme, to newly set a radio channel. Such processing is performed, for example, in the radio channel control unit 214 or the terminal setting control unit 215, or the like. Thus, the terminal 200 performs switch to a different frequency of the same base station 100, so that may perform radio communication with the base station 100 by the non-orthogonal multiple access scheme using the second frequency.

Processing thereafter (S180 to S190 in FIG. 99) includes processing in the base station 100 to acquire transmission power control information in the downlink and uplink directions (S180 to S185), and processing to acquire radio channel quality in the downlink and uplink directions (S186 to S190). The above processing is performed using the second frequency, because the handover to the second frequency is already performed.

Next, based on the acquired transmission power control information and the radio channel quality, the base station 100 performs scheduling in the uplink and downlink directions (S191). The base station 100 transmits to the terminal 200 the result of scheduling as a control signal (S192), and thereafter, the base station 100 and the terminal 200 perform data transmission and reception according to the result of scheduling (S193, S194).

In the above, the description has been given on the handover from the first frequency which is used in the orthogonal multiple access scheme, to the second frequency which is used in the non-orthogonal multiple access scheme. Similar operation to the above-mentioned example is performed for a handover from the second frequency which is used in the non-orthogonal multiple access scheme to the first frequency which is used in the orthogonal multiple access scheme. In this case, it is possible to execute each of the processing in FIGS. 98 and 99, for example, by exchanging between the "orthogonal multiple access" and the "non-orthogonal multiple access" and exchanging between the "first frequency" and the "second frequency".

Further, the aforementioned example is an operation example when the terminal category is identified in the base station 100. It may be possible to identify the terminal category in the terminal 200, and in this case, in place of S90 and S91, S12 to S14 in Embodiment 1-1 (for example, FIG. 72) may be used. Also, as to the handover from the non-orthogonal multiple access scheme using the second frequency to the orthogonal multiple access using the first frequency, the terminal category may be identified in the terminal 200, and S12 to S14 may be added in place of S90 and S91.

5.2 Embodiment 5-2: A Case of Handover to the same Frequency of Different Multiple Access Scheme in Different Base Station Next, a description will be given on Embodiment 5-2. Embodiment 5-2 is an example of a handover to the same frequency of a different multiple access scheme in a different base station. For example, a configuration example of a radio communication system 10 of Embodiment 5-2 is illustrated in FIG. 97, a configuration example of a base station 100 is illustrated in FIG. 46, and a configuration example of a terminal 200 is illustrated in FIG. 58, respectively.

Figure 97:
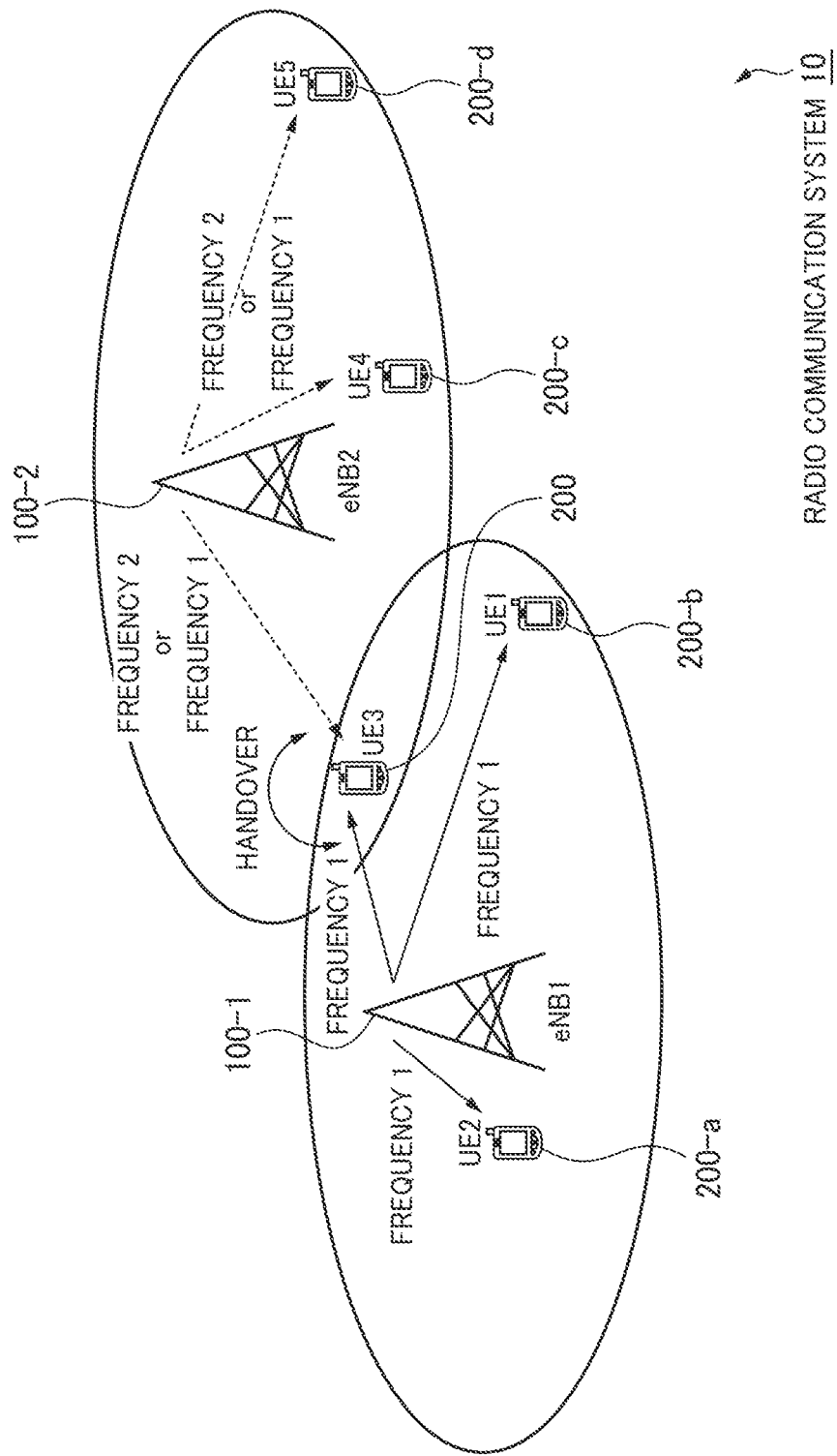
FIG. 97 is a diagram illustrating a configuration example of a radio communication system.

As depicted in FIG. 97, there is illustrated an example in which the terminal 200 (UE3) is handed over from a base station 100-1 using the orthogonal multiple access scheme to a base station 100-2 using the non-orthogonal multiple access scheme, though at the same frequency. The above example will be described in the following.

Additionally, a case when the terminal 200 is handed over from the base station 100-2 using the non-orthogonal multiple access scheme to the base station 100-1 using the orthogonal multiple access scheme, at the same frequency, may be executed in a similar manner.

Further, as to the handover, there may be cases when a handover is performed in both of the uplink and downlink directions, or when a handover is performed in either one of the uplink and downlink directions. In the present Embodiment 5-2, a case when the handover is performed in the downlink direction will be described.

Figure 100:
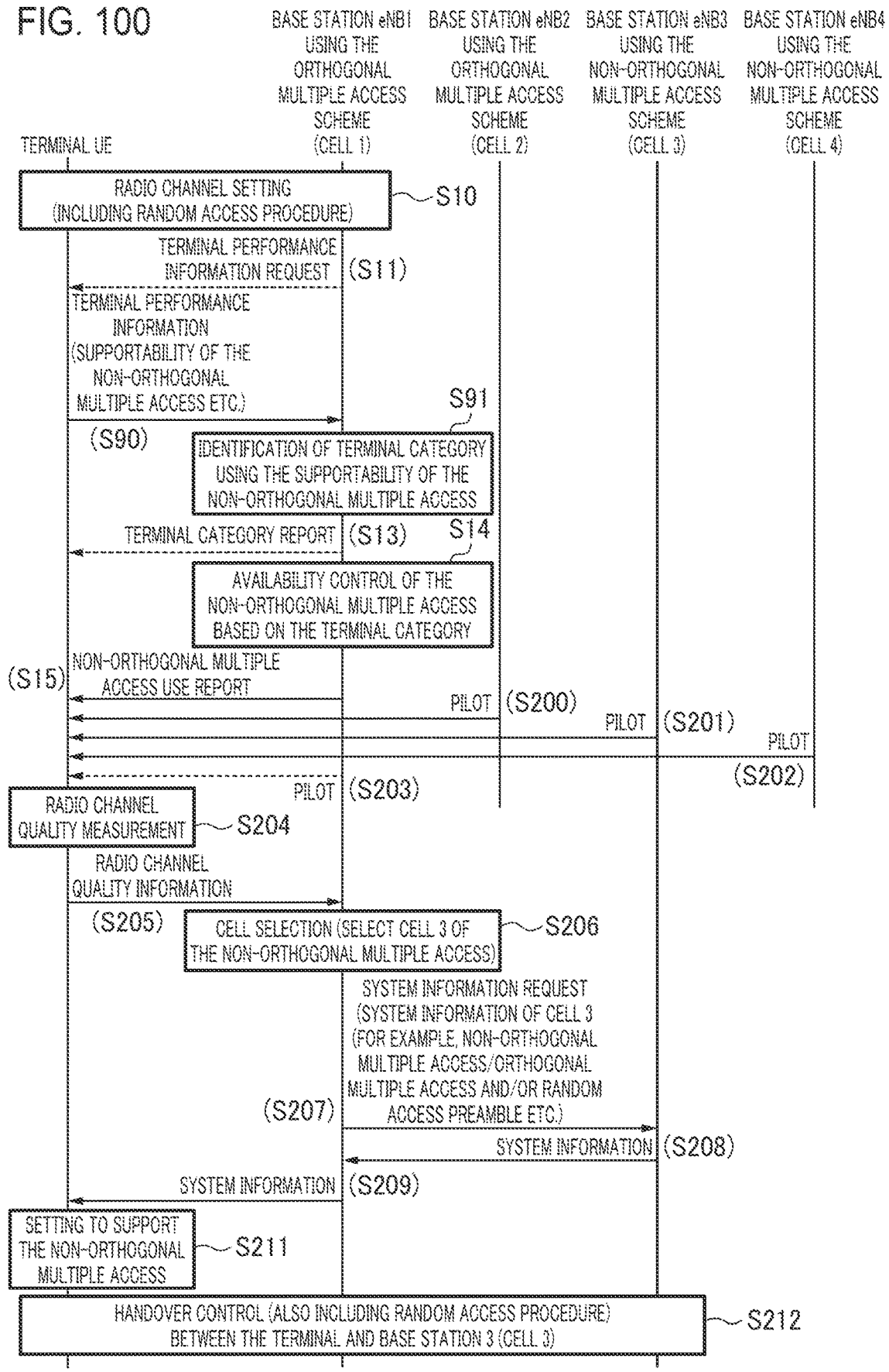
FIG. 100 is a sequence diagram when a handover is performed.
Figure 101:
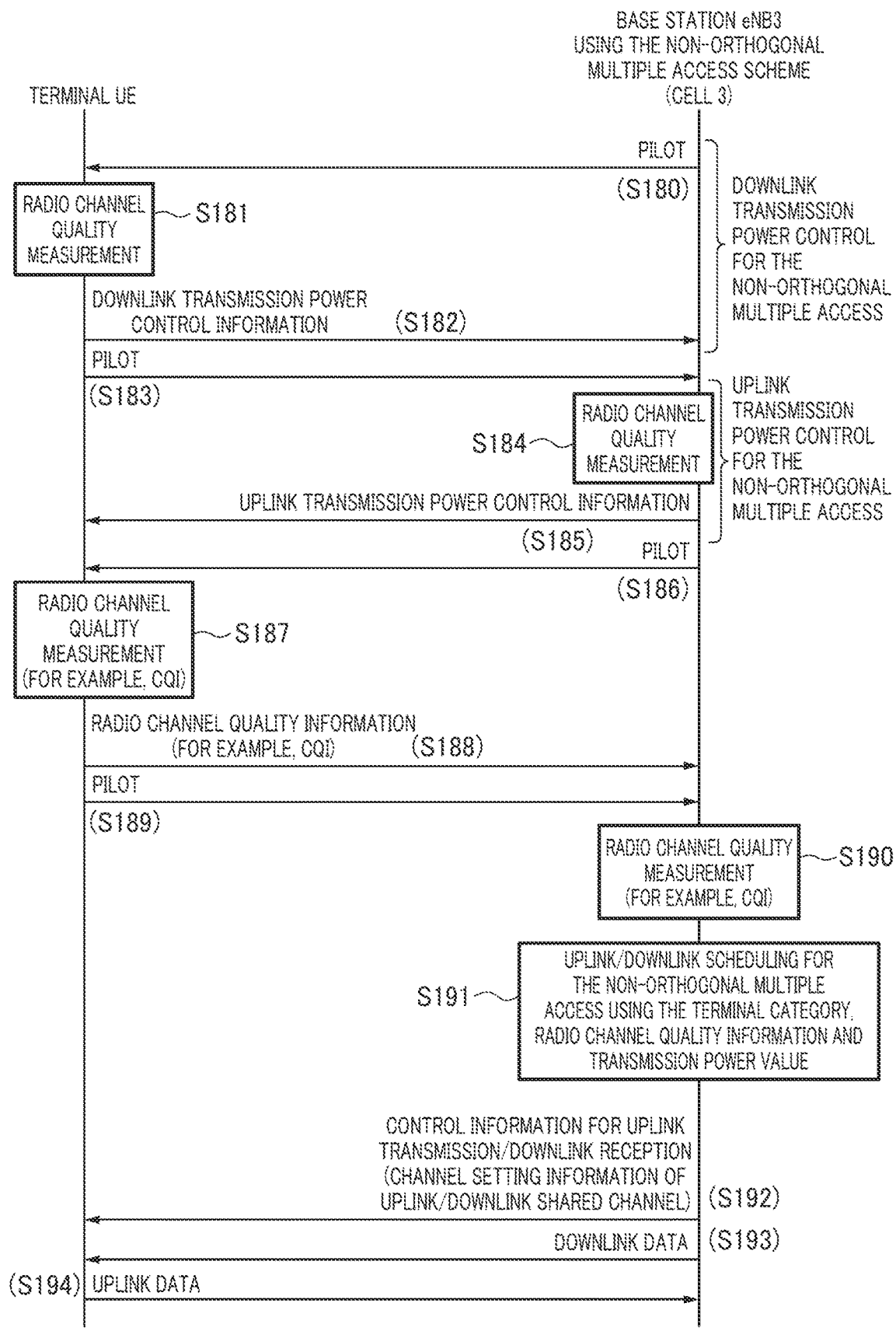
FIG. 101 is a sequence diagram when a handover is performed.

FIGS. 100 and 101 are sequence diagrams illustrating an operation example of Embodiment 5-2. As a whole, there is illustrated an example in which the terminal 200, which is connected to the base station 100-1 using the orthogonal multiple access scheme, is handed over to a base station 100-3 using the orthogonal multiple access scheme, at the same frequency.

From S10 to S15, the same as Embodiment 5-1 applies. Next, from each base station (cell 1 to cell 4) 100-1 to 100-4, each pilot signal is transmitted (S203, S201-S202). In this case, each base station 100-1, 100-2 transmits a pilot signal which is processed using the orthogonal multiple access scheme, and each base station 100-3, 100-4 transmits a pilot signal which is processed using the non-orthogonal multiple access scheme. In this case, each base station 100-1 to 100-4 may transmit each pilot signal using the same frequency (for example, first frequency).

The terminal 200 measures radio channel quality on the basis of the received pilot signal (S204), and transmits the measured radio channel quality to the base station 100-1, as radio channel quality information (S205).

The base station 100-1 selects a cell on the basis of the radio channel quality information (S206). In the present Embodiment 5-2, the radio channel quality concerning the base station 100-3 is the highest among four sets of radio channel quality. Accordingly, the base station 100-1 determines to perform a handover to the base station 100-3 using the non-orthogonal multiple access scheme (S206).

Next, the base station 100-1 requests the base station 100-3 of a handover target to transmit system information (S207), and according to the request, the base station 100-3 transmits the system information of the base station 100-3 to the base station 100-1 (S208). Here, in the system information, at least one of a random access preamble and a dedicated preamble needed to execute a random access may be included.

The base station 100-1, on receiving the system information from the base station 100-3 of the handover target, transmits the received system information to the terminal 200 (S209).

Next, based on the received system information, the terminal 200 performs setting to support the non-orthogonal multiple access scheme (S211), so that handover control is performed between the terminal 200 and the base station 100-3 (S212).

In the handover control, for example, the transmission of a handover request to the terminal 200 and also the transmission of a handover request to the base station 100-3 are included. The transmission of the handover request to the base station 100-3 enables the base station 100-3 to grasp that the terminal 200 is to be handed over to the self-station. In this case, the handover request may include a multiple access scheme before and after the switch, a use frequency before and after the switch (for example, from the first uplink frequency and the first downlink frequency from the second uplink frequency to the second downlink frequency, or vice versa, or the like), etc.

Also, in the handover control, the random access procedure described in Embodiment 5-1 is included. In Embodiment 5-1, processing is performed in the base station 100, whereas in Embodiment 5-2, there is a point of difference that system information etc. are exchanged between the base stations 100-1 and 100-3. In Embodiment 5-2 also, for example, the base station 100-1 transmits to the terminal 200, as a handover request, a control signal which instructs to hand over from the base station 100-1 using the orthogonal multiple access scheme at the first frequency to the base station 100-2 using the non-orthogonal multiple access scheme at the same first frequency.

In processing thereafter (from S180 to S190 in FIG. 101), similar to Embodiment 5-1, the base station 100 performs processing to acquire both transmission power control information and radio channel quality. In this case, processing is performed between the terminal 200 and the base station 100-3.

Based on the transmission power control information and the radio channel quality, the base station 100-3 performs scheduling in the uplink and downlink directions when using the non-orthogonal multiple access scheme (S191), and according to the result of scheduling, the base station 100-3 and the terminal 200 perform data transmission and reception (S192-S194).

In the above, the description has been given on the handover from the base station 100-1 using the orthogonal multiple access scheme to the base station 100-3 using the non-orthogonal multiple access scheme. A case of performing a handover from the base station 100-3 using the non-orthogonal multiple access scheme to the base station 100-1 using the orthogonal multiple access scheme may be executed in a similar manner to the above-mentioned example. For example, the execution can be achieved by exchanging between the "orthogonal multiple access" and the "non-orthogonal multiple access" in each processing in FIGS. 100 and 101.

Also, the above-mentioned example is the operation example when the terminal category is identified in the base station 100. It may also be possible to identify the terminal category in the terminal 200. In this case, S12 to S14 of Embodiment 1-1 (for example, FIG. 72) may be added, in place of S90 and S91. Further, also in the case of a handover from the base station 100-3 which supports the non-orthogonal multiple access scheme to the base station 100-1 which supports the orthogonal multiple access scheme, the terminal category may be identified in the terminal 200, and S12 to S14 may be added in place of S90 and S91.

5.3 Embodiment 5-3: A Case of Handover to Different Multiple Access Scheme in Different Base Station and to Different Frequency Next, a description will be given on Embodiment 5-3. Embodiment 5-3 is an example of a handover to a different multiple access scheme in a different base station and to a different frequency. For example, a configuration example of a radio communication system 10 of Embodiment 5-3 is illustrated in FIG. 97, a configuration example of a base station 100 is illustrated in FIGS. 46 and 70, and a configuration example of a terminal 200 is illustrated in FIGS. 58 and 71, respectively.

FIG. 97 illustrates an example in which a terminal 200 (UE3) is handed over from a base station 100-1 which performs radio communication by the orthogonal multiple access scheme using a first frequency, to a base station 100-2 which performs radio communication by the non-orthogonal multiple access scheme using a second frequency. The above example will be described in the following.

As to the handover, there may be cases when a handover is performed in both of the uplink and downlink directions, or when a handover is performed in either one of the uplink and downlink directions. In the present Embodiment 5-3, a case when the handover is performed in the downlink direction will be described.

FIGS. 100 and 101 are sequence diagrams illustrating an operation example of Embodiment 5-3. As a whole, there is illustrated an example in which a handover is performed from a base station 100-1 which performs radio communication by the orthogonal multiple access scheme using the first frequency, to a base station 100-2 which performs radio communication by the orthogonal multiple access scheme using a second frequency.

From S10 to S15, the same as Embodiment 5-1 applies. Next, from each base station (cell 1 to cell 4) 100-1 to 100-4, each pilot signal is transmitted (S203, S201-S202). In this case, the base station 100-1 transmits a pilot signal by the orthogonal multiple access scheme using the first frequency, and the base station 100-3 transmits a pilot signal by the non-orthogonal multiple access scheme using the second frequency.

Here, the base station 100-2 may transmit the pilot signal by the orthogonal multiple access processing which is the same as the base station 100-1, at the first frequency, or may transmit at a third frequency which is different from the first frequency and the second frequency because the base station is different. Also, as to the base station 100-4, the transmission may be performed at the second frequency, or the transmission of the pilot signal may be performed at a frequency different from the first and second frequencies.

The terminal 200 measures radio channel quality on the basis of the received pilot signal (S204), so as to transmit the measured radio channel quality to the base station 100-1, as radio channel quality information (S205).

The base station 100-1 selects a cell on the basis of the radio channel quality information (S206). In the present Embodiment 5-3, the radio channel quality concerning the base station 100-3 is the highest among four sets of radio channel quality. Accordingly, the base station 100-1 determines to perform a handover to the base station 100-3 which performs radio communication by the non-orthogonal multiple access scheme using the second frequency (S206).

S207 to S212 are similar to Embodiment 5-2. As compared with Embodiment 5-1, there is a point of difference, similar to Embodiment 5-2, that system information etc. are exchanged between the base stations 100-1, 100-3. In the case of Embodiment 5-3, the base station 100-1 may transmit to the terminal 200 a control signal which instructs to hand over from a base station 100-1 which performs radio communication by the orthogonal multiple access scheme using the first frequency, to a base station 100-3 which performs radio communication by the non-orthogonal multiple access scheme using the second frequency.

In processing thereafter (S180 to S190 in FIG. 101), similar to Embodiment 5-1, the base station 100 performs processing to acquire both transmission power control information and radio channel quality. In this case, such information acquisition processing is performed between the terminal 200 and the base station 100-3.

Based on the transmission power control information and the radio channel quality, the base station 100-3 performs scheduling in the uplink and downlink directions when using the non-orthogonal multiple access scheme (S191), and according to the result of scheduling, the base station 100-3 and the terminal 200 perform data transmission and reception (S192-S194).

In the above, the description has been given on the handover from the base station 100-1 which performs radio communication by the orthogonal multiple access scheme using the first frequency, to the base station 100-3 which performs radio communication by the non-orthogonal multiple access scheme using the second frequency. A case of performing a handover from the base station 100-3, which performs radio communication by the non-orthogonal multiple access scheme using the first frequency, to the base station 100-1, which performs radio communication by the orthogonal multiple access scheme using the second frequency, may be executed in a similar manner to the above-mentioned example. For example, the execution can be achieved by exchanging, in each processing in FIGS. 100 and 101, between the "orthogonal multiple access" and the "non-orthogonal multiple access", and by exchanging between the "first frequency" and the "second frequency".

Also, in the above-mentioned example, the description has been given on the operation example when the terminal category is identified in the base station 100. It may also be possible to identify the terminal category in the terminal 200. In this case, S12 to S14 of Embodiment 1-1 (for example, FIG. 72) may be added, in place of S90 and S91. Further, also in the case of a handover from the base station 100-3, which performs radio communication by the non-orthogonal multiple access scheme using the second frequency, to a base station 100-1 which performs radio communication by the orthogonal multiple access scheme using the first frequency, the terminal category may be identified in the terminal 200. In this case, S12 to S14 may be added, in place of S90 and S91 in FIG. 100.

5.4 Effects of Embodiment 5

According to Embodiment 5-1, for example, processing as follows is performed. Namely, the base station 100 is configured to perform a frequency switch from the first uplink frequency and the first downlink frequency, which are used in the orthogonal multiple access scheme, to the second uplink frequency and the second downlink frequency which are used in the non-orthogonal multiple access scheme. Also, the base station 100 is configured to perform a frequency switch from the second uplink frequency and the second downlink frequency, which are used in the non-orthogonal multiple access scheme, to the first uplink frequency and the first downlink frequency which are used in the orthogonal multiple access scheme.

Also, the base station 100 transmits to the terminal 200 the information of the non-orthogonal multiple access scheme after the switch, using the second downlink frequency, or the information of the orthogonal multiple access scheme after the switch, using the first downlink frequency.

Then, the base station 100 and the terminal 200 are configured to perform radio communication by the non-orthogonal multiple access scheme after the switch, using the second downlink frequency and the second uplink frequency, or by the orthogonal multiple access scheme after the switch, using the first downlink frequency and the first uplink frequency.

Also, according to Embodiment 5-2, for example, processing as follows is performed. Namely, the base station 100 is configured to perform a connection switch from the base station 100 using the orthogonal multiple access scheme to the other base station 100-1 using the non-orthogonal multiple access scheme, or from the base station 100-1 using the non-orthogonal multiple access scheme to the other base station 100-1 using the orthogonal multiple access scheme.

Further, according to Embodiment 5-3, for example, processing as follows is performed. Namely, the base station 100 is configured to perform the switch from the base station 100 which performs radio communication by the orthogonal multiple access scheme, using the first uplink frequency and the first downlink frequency, to the other base station 100-1 which performs radio communication by the non-orthogonal multiple access scheme, using the second uplink frequency and the second downlink frequency. Also, the base station 100-1 is configured to perform the connection switch from the base station 100-1 which performs radio communication by the non-orthogonal multiple access scheme, using the second uplink frequency and the second downlink frequency, to the base station 100 which performs radio communication by the orthogonal multiple access scheme, using the first uplink frequency and the first downlink frequency.

Further, the non-orthogonal multiple access scheme after the switch is transmitted to the terminal 200, using the second downlink frequency, or the orthogonal multiple access scheme after the switch is transmitted using the first downlink frequency.

Such radio communication after the switch is performed in the base station 100, by, for example, the radio channel control unit 110, the antenna 101, the reception radio unit 105, the reception non-orthogonal and orthogonal multiple access processing unit 130, the transmission non-orthogonal and orthogonal multiple access processing unit 131 and the transmission radio unit 116.

Also, in the terminal 200, such radio communication after the switch is performed by, for example, the radio channel control unit 214, the antenna 201, the reception radio unit 205, the reception non-orthogonal and orthogonal multiple access processing unit 230, the transmission non-orthogonal and orthogonal multiple access processing unit 231 and the transmission radio unit 22.

Accordingly, the terminal 200 can be handed over to the frequency or the base station 100 having different multiple access scheme. Therefore, when the terminal 200 supports the orthogonal multiple access scheme and the non-orthogonal multiple access scheme, the base station 100-1 which supports the orthogonal multiple access scheme enables handing over to the base station 100-2 which supports the non-orthogonal multiple access scheme or to the frequency which supports the non-orthogonal multiple access scheme. Thus, the base station 100-1, even if incapable of supporting the non-orthogonal multiple access scheme, can appropriately hand over the terminal 200 to the base station 100-2 which supports the non-orthogonal multiple access scheme, so that can cause the base station 100-2 to appropriately perform radio communication with the terminal 200.

Further, when the base station 100-1 is incapable of supporting the non-orthogonal multiple access scheme, it is possible to prevent such a situation that the terminal 200 tries to perform radio channel setting by the non-orthogonal multiple access scheme over multiple times, and as compared to such a case, it is possible to improve processing speed, and further, improve a transmission speed (a throughput).

6. Embodiment 6: Carrier Aggregation

Next, Embodiment 6 will be described. In the present Embodiment 6, a description will be given on the application of CA which has been introduced from LTE Release 10. Here, in the CA, a frequency band may be referred to as CC (Component Carrier). As to each individual CC, the same CC may be used in the uplink and downlink directions, or different CC may be used. Also, a first CC and a second CC may be constituted by continuous or not continuous frequencies. Further, the first CC may belong to a first frequency band (for example, an 800 MHz band) or a second frequency band (for example, a 2.5 GHz band). Further, both first and second CC may belong to the first frequency band.

Because CC can configure one independent radio communication system, the CC is different from an integral unit of a plurality of subcarriers (which may be referred to as a RB (Resource Block), a cluster, etc., for example) in OFDMA.

For example, in a base station 100, by adding a CC, a plurality of CC may be used, so that radio communication with a terminal 200 is performed simultaneously using such a plurality of CC. In this case, the base station 100 and the terminal 200 may be configured to transmit control information in the first frequency band and transmit user data in the second frequency band.

In Embodiment 6, a description will be given on the examples of adding a CC, which supports the non-orthogonal multiple access scheme, or a CC which supports the orthogonal multiple access scheme. Typically, in Embodiment 6-1, an operation example of adding, to a CC of the orthogonal multiple access scheme, a CC of the non-orthogonal multiple access scheme of the same base station 100. Also, in Embodiment 6-2, an operation example of adding, to a CC of the non-orthogonal multiple access scheme, a CC of the orthogonal multiple access scheme of the same base station 100. Further, in Embodiment 6-3, an operation example of adding, to a CC of the orthogonal multiple access scheme, a CC of the orthogonal multiple access scheme of a different base station 100.

6.1 Embodiment 6-1: Adding, to CC of the Orthogonal Multiple Access Scheme, CC of the Non-Orthogonal Multiple Access Scheme of the Same Base Station Embodiment 6-1 is an operation example when a CC of the non-orthogonal multiple access scheme of the same base station 100 is added to the CC of the orthogonal multiple access scheme.

Figure 102:
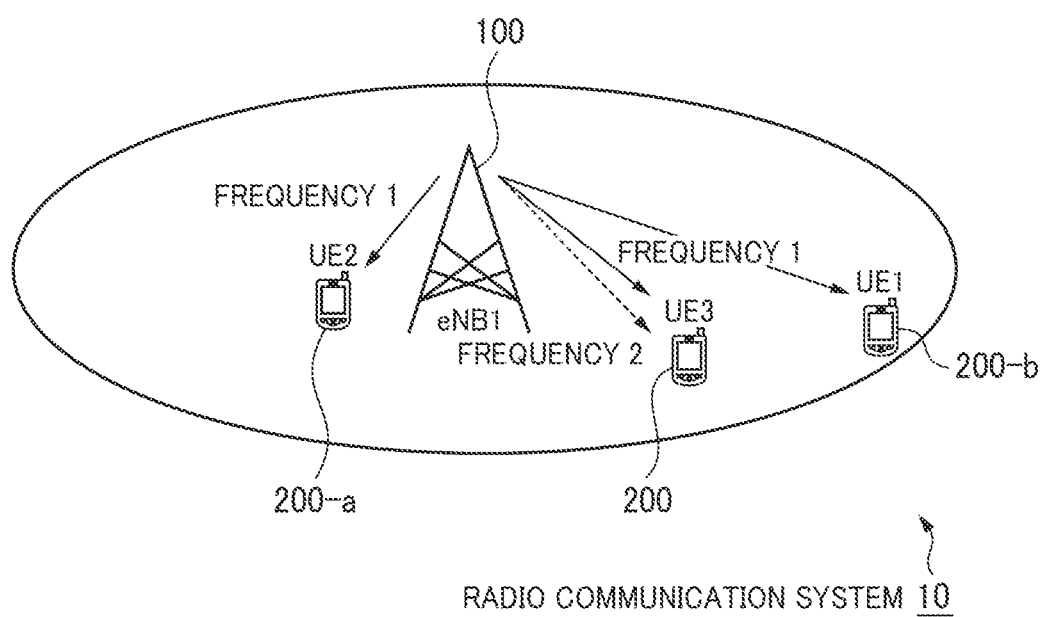
FIG. 102 is a diagram illustrating a configuration example of a radio communication system.

For example, a configuration example of the radio communication system 10 of Embodiment 6-1 is illustrated in FIG. 102, a configuration example of the base station 100 is illustrated in FIGS. 46 and 70, a configuration example of the terminal 200 is illustrated in FIGS. 58 and 71, respectively. Also, an example of relationship among cells, frequencies and base stations 100 is illustrated in FIG. 106.

As illustrated in FIG. 102, the base station 100 performs radio communication with a terminal 200 (UE3) by the orthogonal multiple access scheme, using a first frequency band (or a first frequency or a first cell). In this case, for example, the first frequency band becomes a Primary Cell (PCell) (which may be referred to as a main band, a specific band, etc.). Thereafter, the base station 100 adds a second frequency band (or a second frequency or a second cell) to be used in the non-orthogonal multiple access scheme. In this case, for example, the second frequency band becomes a Secondary Cell (SCell: which may be referred to as a subband, an extended band, etc.). The base station 100 and the terminal 200 can perform radio communication simultaneously, using the first and second frequency bands.

FIG. 106 is a diagram illustrating an example of relationship among cells, frequencies and base stations which are used in Embodiment 6-1. A base station 100-1 (eNB1) includes four cells, "Cell 1" to "Cell 4". The "Cell 1" of which frequency is "f1" supports the orthogonal multiple access scheme ("Orthogonal"), and is set to be PCell. Also, the "Cell 2" of which frequency is "f2" supports the non-orthogonal multiple access scheme ("Non-orthogonal"), and is set to be SCell.

In the following, as depicted in FIG. 106, a description will be given on an operation example of adding the frequency "f2" which is used as the non-orthogonal multiple access scheme, to the frequency "f1" which is used in the orthogonal multiple access scheme.

Figure 104:
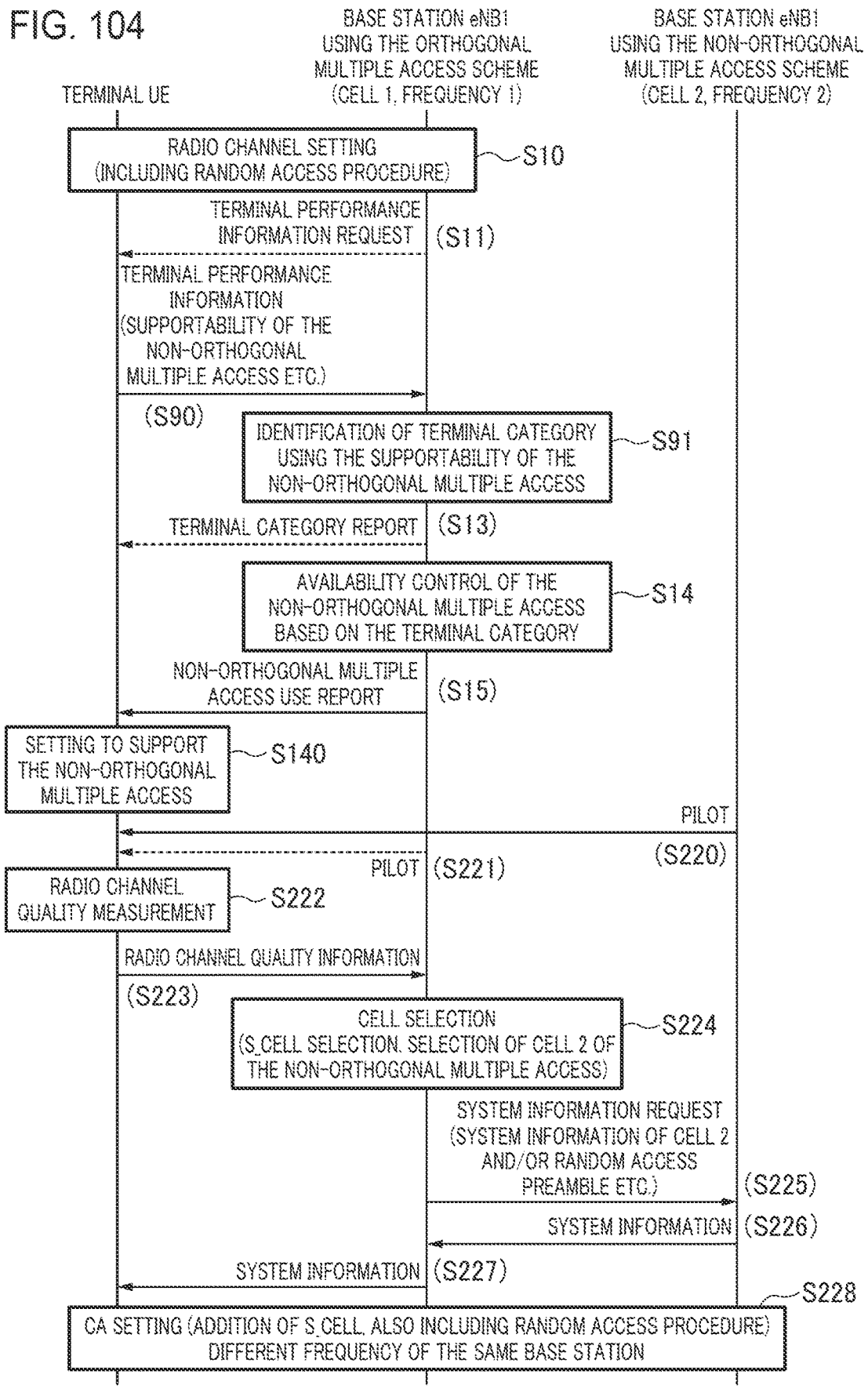
FIG. 104 is a sequence diagram illustrating an operation example when adding a secondary cell.
Figure 105:
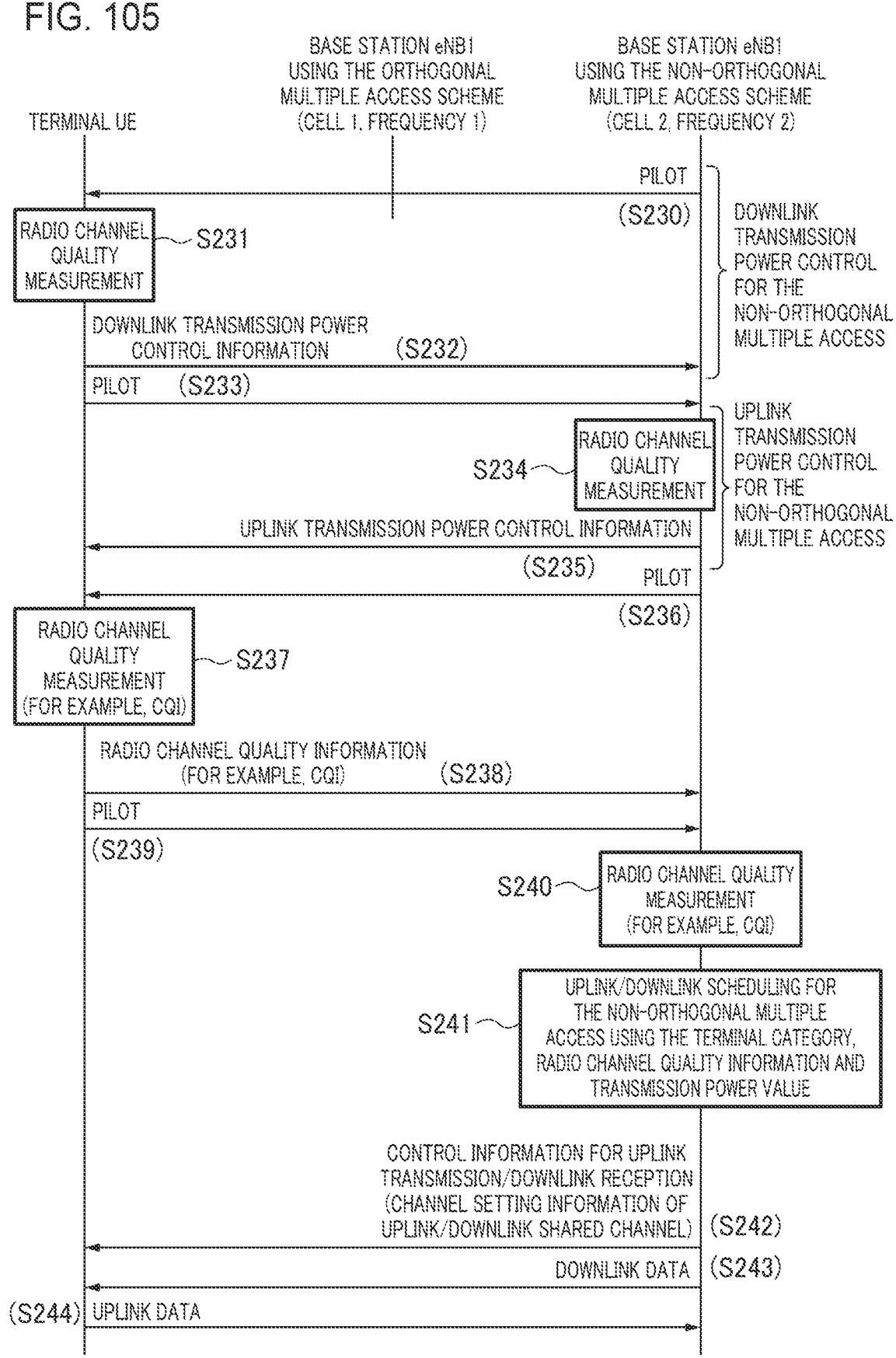
FIG. 105 is a sequence diagram illustrating an operation example when adding a secondary cell.

FIGS. 104 and 105 are sequence diagrams illustrating an operation example of Embodiment 6-1. Similar to Embodiment 4 etc., the terminal 200 measures radio channel quality concerning each base station (or a cell, or a frequency: hereinafter, "base station", "cell" and "frequency" may be used to signify the same meaning) which uses the orthogonal multiple access scheme, so as to select a base station 100 having the best radio channel quality. For example, in the example of FIG. 106, the terminal 200 measures the radio channel quality of "Cell 1", "Cell 3", "Cell 6", "Cell 7" and "Cell 8", and as a base station having the best radio channel quality, a cell 1 ("Cell 1") of the base station 100 (eNB1) is selected. The terminal 200 performs radio channel setting with the cell 1 of the base station 100 using the orthogonal multiple access scheme (S10). In this case, the base station 100 and the terminal 200 perform a random access procedure, so as to set the cell 1 (f1) of the base station 100, with which the radio channel is set, to be the first cell (PCell). Hereafter, the first cell is described as PCell. PCell is a cell which supports the orthogonal multiple access scheme.

For example, the radio channel control unit 110 of the base station 100 sets the cell 1 to be PCell by radio channel setting (S10), so as to store into a memory that the cell 1 is PCell.

Next, the terminal 200, on receiving a terminal performance information request from the base station 100 (S11), transmits terminal performance information to the base station 100 (S90). The terminal performance information includes information which indicates that the terminal 200 supports the non-orthogonal multiple access scheme.

Next, the base station 100 identifies a terminal category on the basis of the received terminal performance information (S91), so as to transmit the identified terminal category to the terminal 200 (S13).

Next, the base station 100 performs the availability control of the non-orthogonal multiple access to verify whether or not the terminal 200 supports the non-orthogonal multiple access scheme, on the basis of the received terminal performance information (S14). On verifying that the terminal 200 supports the non-orthogonal multiple access scheme, the base station 100 transmits a non-orthogonal multiple access use report to the terminal 200 (S15). In Embodiment 6-1, the terminal 200 is assumed to support the non-orthogonal multiple access scheme.

The terminal 200, on receiving the non-orthogonal multiple access use report, performs setting to support the non-orthogonal multiple access scheme (S140).

Next, each cell of the base station 100 transmits a pilot signal (S220, S221), so that the terminal 200 measures radio channel quality on the basis of the pilot signal (S222).

In this case, the terminal 200 measures the radio channel quality of each cell which uses the orthogonal multiple access scheme, other than the cell (Cell 1) of the base station 100 which is in connection, and each cell which uses the non-orthogonal multiple access scheme. For example, the terminal 200 measures the radio channel quality of a cell of the orthogonal multiple access scheme (for example, "Cell 3" (f3)) other than the frequency "f1" of the base station 100 in connection, and cells which support the orthogonal multiple access scheme in base stations (eNB2, eNB3) (for example, Cell 6 (f3) of eNB2, Cell 7 (f2) of eNB3 and Cell 8 (f3) of eNB3) other than the base station 100 in connection. Further, the terminal 200 measures the radio channel quality of cells which support the non-orthogonal multiple access scheme (for example, Cell 2 (f2) of eNB1, Cell 4 of eNB1, Cell 5 (f2) of eNB2, Cell 9 of eNB4 and Cell 10 of eNB4) in a similar manner.

Additionally, the base station 100 currently in connection can instruct or request, by a control signal, for which cell the radio channel quality is to be measured, and according to the instruction included in the control signal, the terminal 200 can measure the radio channel quality for the cell. Here, the terminal 200 may measure the radio channel quality for a cell (Cell 1) of the base station 100 in connection. Also, the measurement of the radio channel quality may be performed according to a measurement period reported from the base station 100, or may be measured at any timing, not in the measurement period, according to the measurement request from the base station 100. Such a matter of the radio channel quality measurement also applies not only to the present Embodiment 6-1, but to other embodiments.

Next, the terminal 200 transmits the measured radio channel quality to the base station 100 (S223).

Here, when receiving the radio channel quality information (S223) or at the measurement of the radio channel quality (S252), the base station 100 and the terminal 200 may decide to newly add a frequency band. For example, processing as follows is performed.

Namely, each radio channel control unit 110, 214 of the base station 100 and the terminal 200 measures data transmission speed. Typically, the radio channel control unit 110 of the base station 100 may measure an output data amount per unit time for data being output from the transmission non-orthogonal and orthogonal multiple access control unit 131, so as to measure the transmission speed. Also, the radio channel control unit 214 of the terminal 200 may measure an output data amount per unit time for data being output from the transmission non-orthogonal and orthogonal multiple access control unit 231. Alternatively, each radio channel control unit 110, 214 may be configured to measure the transmission speed when the transmission data correctly reaches, on the basis of the reception of an ACK signal. If the measured transmission speed is lower than a threshold, the radio channel control unit 110, 214 decides that a predetermined transmission speed is not satisfied only by a radio channel between the base station 100 (or Cell 1) and the terminal 200, and accordingly, decides to newly add a frequency band. In this case, the radio channel control unit 110, 214 may decide to newly add the frequency band, on the basis of other conditions such as a service transmission speed which is newly added, a maximum delay of the transmission data, and the like.

The base station 100, on receiving the radio channel quality from the terminal 200 (S223), performs cell selection (S224).

In the present Embodiment 6-1, the base station 100 selects a cell (or a frequency), having the best (or highest) radio channel quality among radio channel quality, as a cell to be added, among different cells (or frequencies) of the same base station 100. When the terminal 200 supports the orthogonal multiple access scheme whereas does not support the non-orthogonal multiple access scheme, the base station 100 selects a cell (or a frequency) which supports the orthogonal multiple access scheme, as a cell to be added. When the terminal 200 supports both multiple access schemes, the base station 100 selects a cell (or a frequency) which supports both multiple access schemes, as a cell to be added. Here, although a cell is the same frequency as the cell in connection, if the cell is of the non-orthogonal multiple access scheme, there may be cases that the base station 100 can add the cell concerned. The reason is that, as described earlier, there is a case that the orthogonal multiple access scheme can be supported if the non-orthogonal multiple access scheme is supported. The base station 100 may also select a cell of a frequency other than the same frequency.

In this case, the base station 100 selects a cell 2 ("Cell 2") having the best radio channel quality as a cell to be added. For example, processing as follows is performed. Namely, the radio channel control unit 110 (for example, the cell selection control unit 110b) receives the radio channel quality information of each cell from the radio channel quality information extraction unit 108, and selects therefrom a cell 2 having the best (or highest) radio channel quality. The radio channel control unit 110 sets the selected cell 2 to be SCell, so as to store into a memory that the cell 2 is set as SCell. In the memory, it is stored that the cell 1 is PCell and the cell 2 is SCell. Then, the radio channel control unit 110 reports to the control signal generation unit 112 that the cell 2 is SCell, so as to instruct to generate a control signal which indicates that cell 2 is SCell. The control signal generation unit 112 generates the control signal indicating that the cell 2 is SCell, to transmit to the terminal 200. Additionally, for example, the control signal may be reported together with system information (S227), or may be reported separately as a control signal.

Next, the cell 1 of the base station 100 requests of the cell 2 system information (S225). Here, though the radio channel control unit 110 which supports the cell 1 and the radio channel control unit 110 which supports the cell 2 are the same because of processing in the same base station 100, a description in the present Embodiment 6-1 will be given on assumption that the above radio channel control units 110 are different. For example, the radio channel control unit 110 which supports the cell 1 requests of the radio channel control unit 110, which supports the cell 2, the system information of the cell 2 (which may include a random access preamble [a contention based random access preamble or a dedicated non-contention based random access preamble] to perform a random access).

The cell 2 of the base station 100, on receiving the system information request, outputs system information to the cell 1 (S226). For example, processing as follows is performed. Namely, the radio channel control unit 110 which supports the cell 2 reads out system information from the system information management unit 111. Also, the radio channel control unit 110 which supports the cell 2 verifies a preamble set of either a (non-contention based) dedicated preamble or a (contention based) preamble to be used in the random access. The radio channel control unit 110 supporting the cell 2 outputs the system information to the radio channel control unit 110 supporting the cell 1.

The cell 1 of the base station 100, on receiving the system information from the cell 2 (S226), transmits the received system information to the terminal 200 (S227). For example, on receiving the system information from the radio channel control unit 110 which supports the cell 2, the radio channel control unit 110 which supports the cell 1 outputs the received system information to the control signal generation unit 112, to instruct to generate a control signal. By this, the system information is transmitted to the terminal 200 as the control signal. It may be possible, for example, that the radio channel control unit 110 outputs the system information to the system information generation unit 114, so that the system information is transmitted from the system information generation unit 114 to the terminal 200.

The terminal 200, on receiving the system information (S227), executes a random access procedure between with the cell 2, on the basis of the system information and the report that the cell 2 is SCell (S228). The random access procedure may be either the Non-contention based random access using a dedicated preamble or a contention based random access using a contention based preamble. For example, by such a random access procedure etc., when the cell 1 (frequency 1) is set as PCell, the base station 100 and the terminal 200 can add the cell 2 (frequency 2) as SCell. This enables the terminal 200 to grasp that the cell 2 is added as SCell, so as to simultaneously perform radio communication using PCell (cell 1 (f1)) and SCell (cell 2 (f2)).

Thereafter, transmission power control (S230 to S235 in FIG. 105) and radio channel quality measurement (S236 to S239) are performed.

In this case, in the cell 1 using the orthogonal multiple access scheme, scheduling may be performed based on either the radio channel quality (S237) which is measured in the terminal 200 or the radio channel quality (S240) which is measured in the base station 100. Also, in the cell 2 using the non-orthogonal multiple access scheme, scheduling may be performed based on either the transmission power value (S231) which is measured in the terminal 200 or the transmission power value (S234) which is measured in the base station 100 (S241). Alternatively, the scheduling is performed in the cell 1 and the cell 2, based on both transmission power value and radio channel quality (S241).

The cell 2 of the base station 100 and the terminal 200 perform data transmission and reception on the basis of the scheduling result (S242 to S244).

Thus, it is possible to add, as SCell, the cell using the non-orthogonal multiple access scheme to PCell using the orthogonal multiple access scheme.

Additionally, the operation example illustrated in FIG. 104 is an operation example when the terminal category is identified in the base station 100. As having been described in Embodiment 1 etc., it may also be possible to configure to identify the terminal category in the terminal 200.

6.2 Embodiment 6-2: Adding, to CC of the Non-Orthogonal Multiple Access Scheme, CC of the Orthogonal Multiple Access Scheme in the same Base Station Next, Embodiment 6-2 will be described. Embodiment 6-2 is an operation example of adding a CC of the orthogonal multiple access scheme of the same base station 100 to a CC of the non-orthogonal multiple access scheme.

For example, a configuration example of a radio communication system 10 of Embodiment 6-2 is illustrated in FIG. 102, a configuration example of a base station 100 is illustrated in FIGS. 46 and 70, and a configuration example of a terminal 200 is illustrated in FIGS. 58 and 71, respectively. Also, an example of relationship among cells, frequencies and base stations 100 is illustrated in FIG. 109.

As depicted in FIG. 102, the base station 100 performs radio communication with the terminal 200 by the non-orthogonal multiple access scheme, using a second frequency band (or a second frequency or a second cell). In this case, for example, the second frequency band becomes a primary cell (PCell). Thereafter, the base station 100 adds a first frequency band (or a first frequency or a first cell)). In this case, for example, the first frequency band becomes a secondary cell (SCell). The base station 100 and the terminal 200 can simultaneously perform radio communication using the first and second frequency bands.

FIG. 109 is a diagram illustrating an example of relationship among the cells, the frequencies and the base stations. In FIG. 109, a cell 2 ("Cell 2") of a frequency "f2" supports the non-orthogonal multiple access scheme, and is set as PCell. In contrast, a cell 3 ("Cell 3") of a frequency "f3" supports the orthogonal multiple access scheme, and is added as SCell.

In the following, as depicted in FIG. 109, a description will be given on an operation example of adding the frequency "f3", which is used as the orthogonal multiple access scheme, to the frequency "f2" which is used in the non-orthogonal multiple access scheme.

Figure 107:
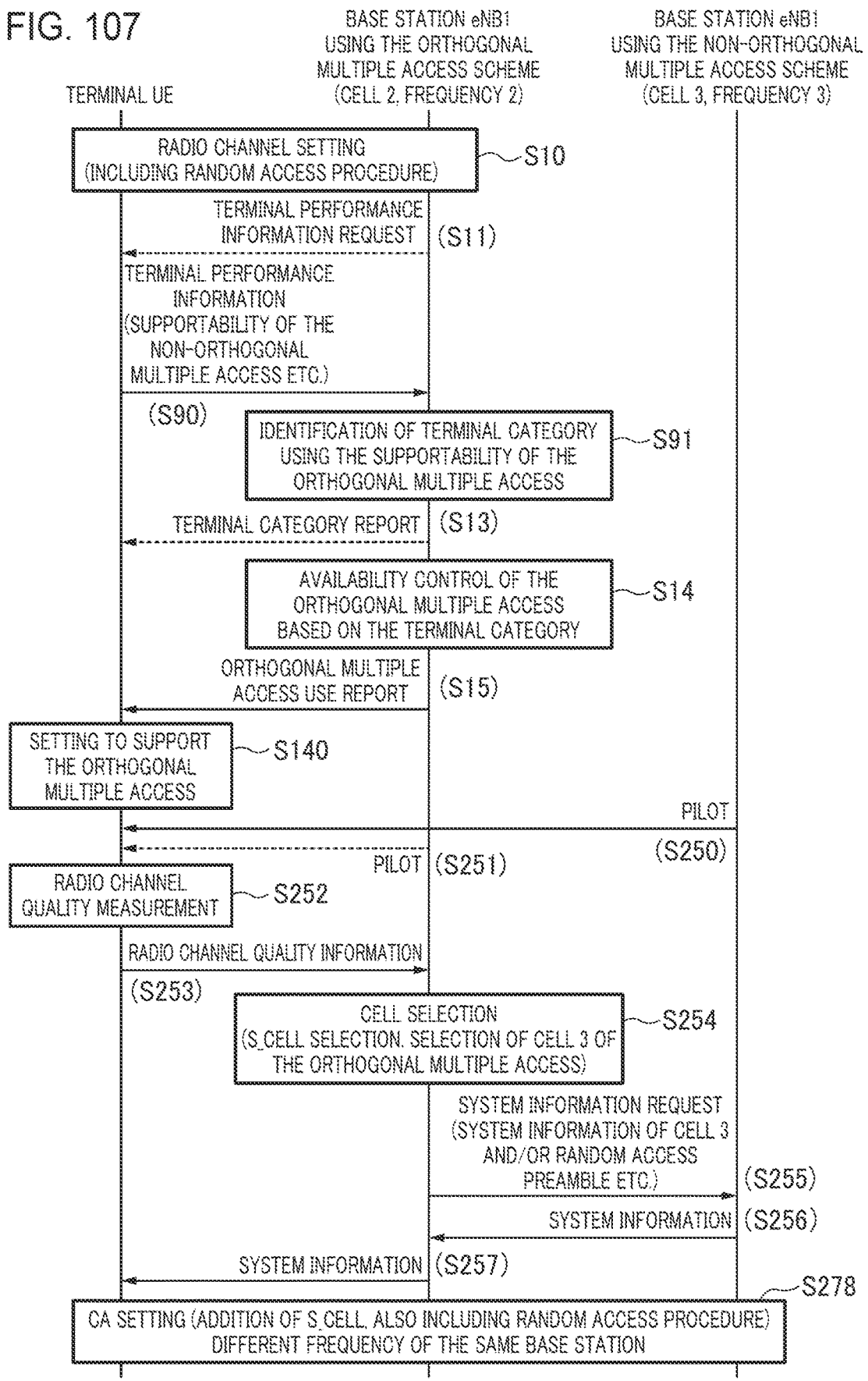
FIG. 107 is a sequence diagram illustrating an operation example when adding a secondary cell.
Figure 108:
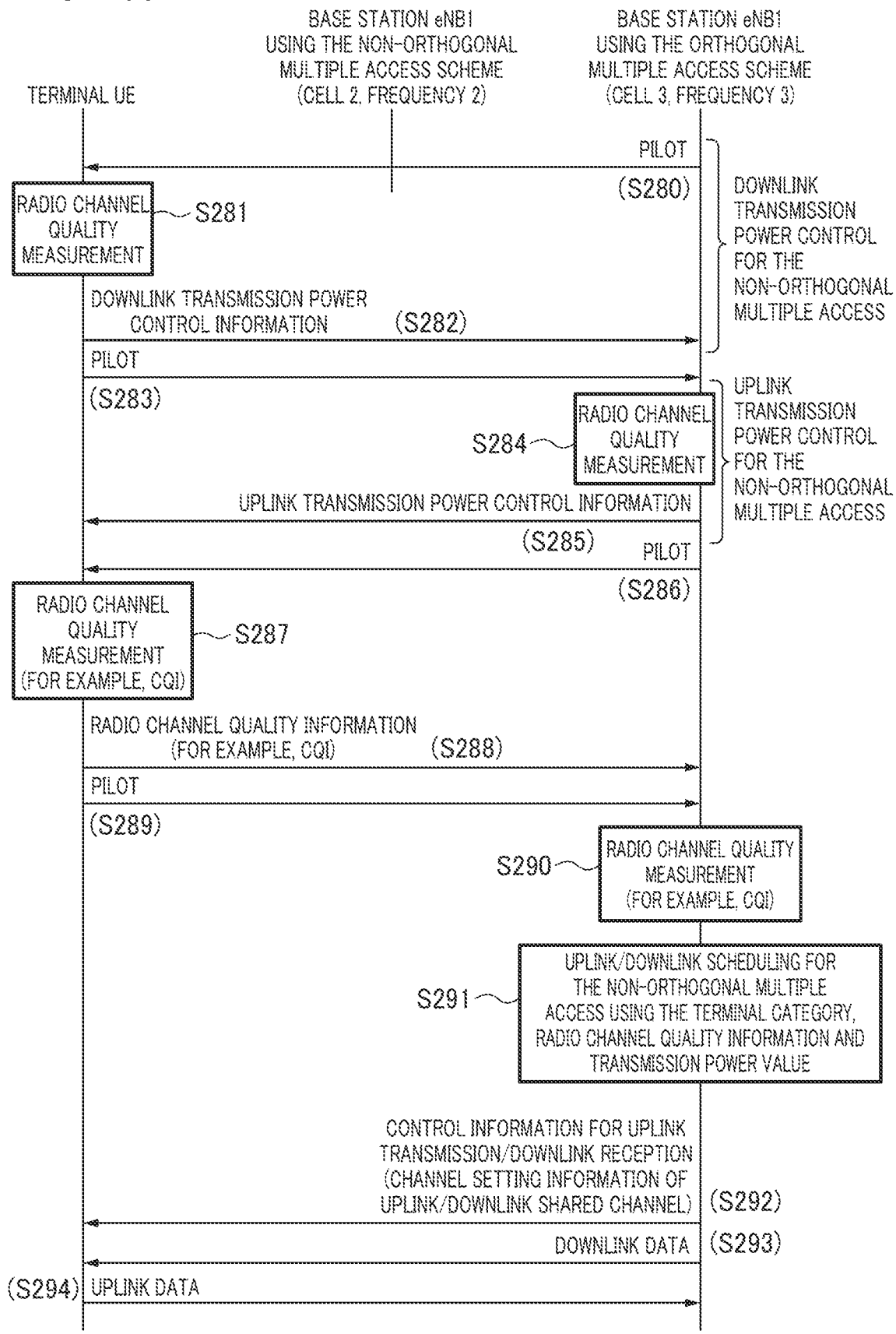
FIG. 108 is a sequence diagram illustrating an operation example when adding a secondary cell.

FIGS. 107 and 108 are sequence diagrams illustrating the operation example of Embodiment 6-2. The operation example of Embodiment 6-2 is substantially the same as the operation example of Embodiment 6-1 (for example, FIGS. 104 and 105), excluding the following case, for example. Namely, in the present Embodiment 6-2, the terminal 200 sets a radio channel to the cell 2 (f2) of the base station 100 using the non-orthogonal multiple access scheme (S10). Also, the cell 2 of the base station 100 selects the cell 3 (f3) which supports the orthogonal multiple access scheme, on the basis of radio channel quality (S254). Further, the cell 3 of the base station 100 performs the measurement of radio channel quality and transmission power control between with the terminal 200 (S280 to S290 in FIG. 108).

Thus, it becomes possible to add, as SCell, a cell using the orthogonal multiple access scheme to PCell using the non-orthogonal multiple access scheme.

The operation example illustrated in FIGS. 107 and 108 is an operation example in which the terminal category is identified in the base station 100. As having been described in Embodiment 1 etc., it may also be possible to configure to identify the terminal category in the terminal 200.

6.3 Embodiment 6-3: Adding, to CC of the Orthogonal Multiple Access Scheme, CC of the Non-Orthogonal Multiple Access Scheme of Different Base Station Next, Embodiment 6-3 will be described. Embodiment 6-3 is an operation example of adding a CC of the non-orthogonal multiple access scheme of a different base station 100-2 to a CC of the orthogonal multiple access scheme.

Figure 103:
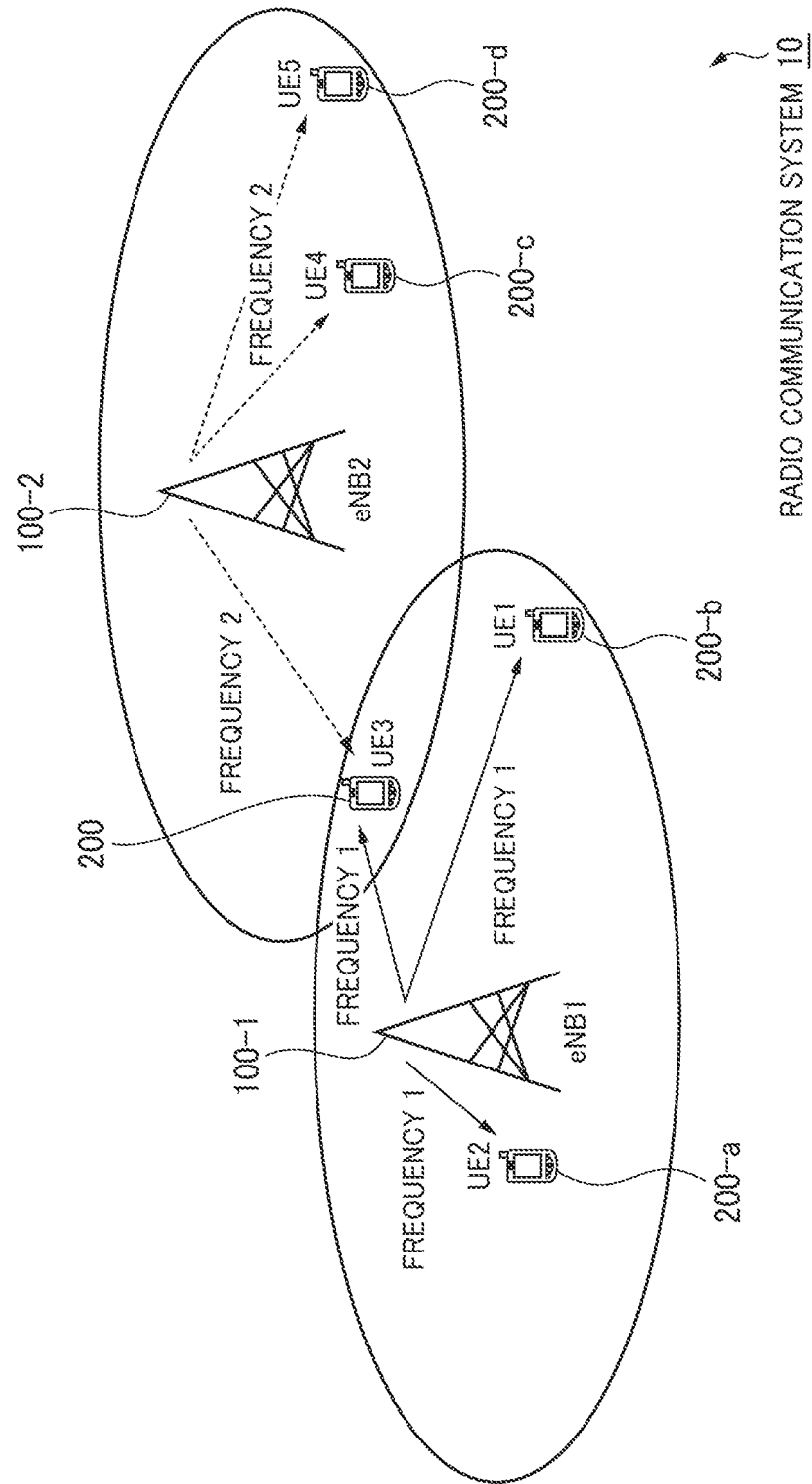
FIG. 103 is a diagram illustrating a configuration example of a radio communication system.

For example, a configuration example of a radio communication system 10 of Embodiment 6-3 is illustrated in FIG. 103, a configuration example of a base station 100 is illustrated in FIGS. 46 and 70, and a configuration example of a terminal 200 is illustrated in FIGS. 58 and 71, respectively. Also, an example of relationship among cells, frequencies and base stations 100 is illustrated in FIG. 112.

As depicted in FIG. 103, a base station 100-1 performs radio communication with the terminal 200 by the orthogonal multiple access scheme, using a first frequency band (or a first frequency or a first cell). In this case, for example, the first frequency band becomes a primary cell (PCell). Thereafter, a base station 100-2, when performing radio communication by the non-orthogonal multiple access scheme, adds a second frequency band (or a second frequency or a second cell) which is used in the above non-orthogonal multiple access scheme. In this case, for example, the second frequency band becomes a secondary cell (SCell). The base station 100 and the terminal 200 can simultaneously perform radio communication with the base station 100-1 and the base station 100-2, using the first and second frequency bands.

FIG. 112 is a diagram illustrating an example of relationship among the cells, the frequencies and the base stations to be used in Embodiment 6-3. A cell 1 ("Cell 1") of the base station 100-1 (eNB1) of a frequency "f1" supports the orthogonal multiple access scheme, and is set as PCell. In contrast, a cell 5 ("Cell 5") of the base station 100-2 (eNB2) of a frequency "f2" supports the non-orthogonal multiple access scheme, and is added as SCell.

In the following, as depicted in FIG. 112, a description is given on an operation example when adding the frequency "f2" ("Cell 5"), which is used as the non-orthogonal multiple access scheme in the base station 100-2, to the frequency "f1" (cell 1) which is used as the orthogonal multiple access scheme in the base station 100-1.

Figure 110:
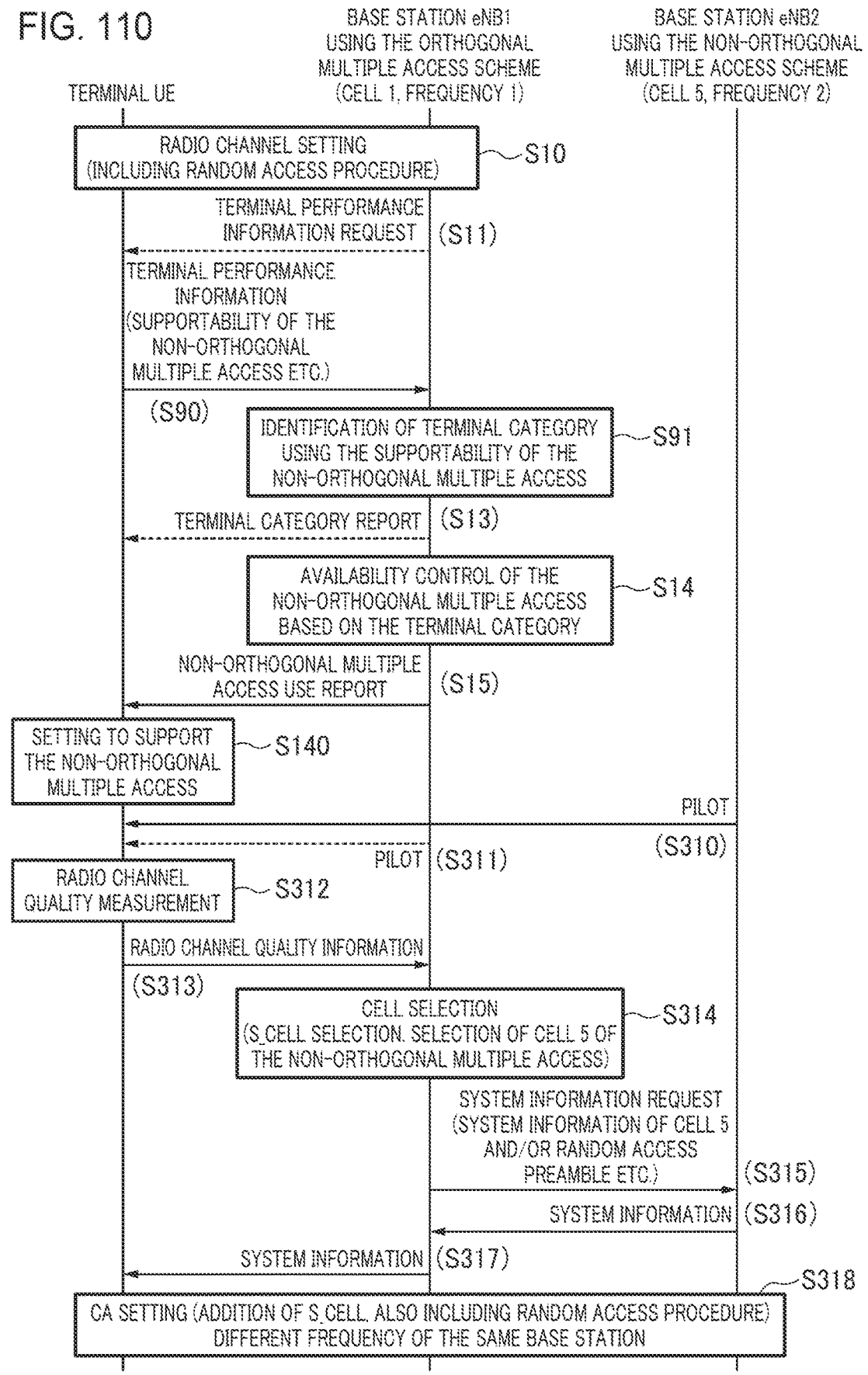
FIG. 110 is a sequence diagram illustrating an operation example when adding a secondary cell.
Figure 111:
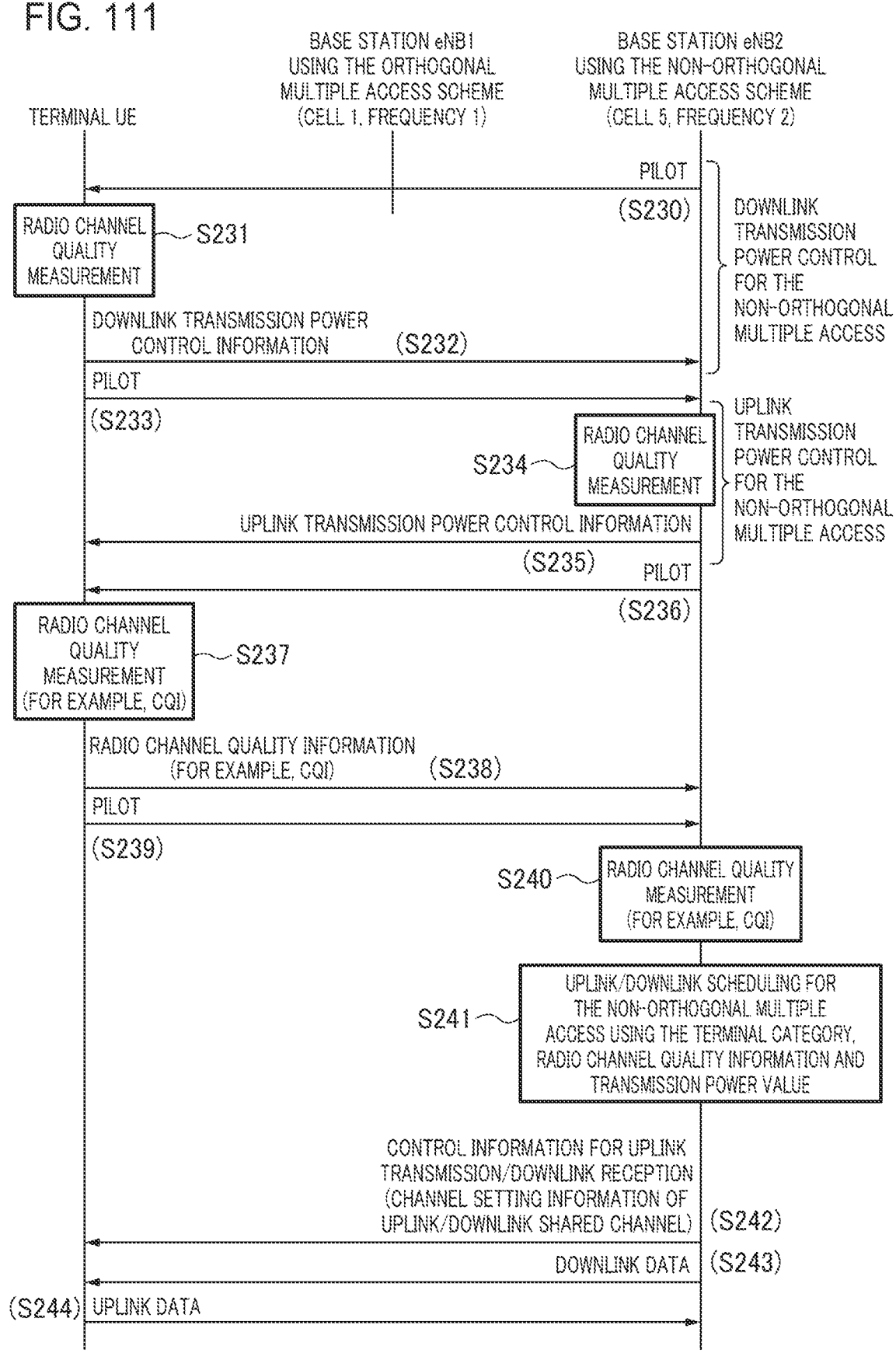
FIG. 111 is a sequence diagram illustrating an operation example when adding a secondary cell.

FIGS. 110 and 111 are sequence diagrams illustrating an operation example of Embodiment 6-3. The operation example of Embodiment 6-3 is also substantially the same as the operation example of Embodiment 6-1 (for example, FIGS. 104 and 105), excluding the following case, for example.

Namely, at cell selection (S314), the cell 1 of the base station 100 which supports the orthogonal multiple access scheme selects the cell 5 of the base station 100-2 which supports the non-orthogonal multiple access scheme. Then, between the two base stations 100-1 and 100-2 which are physically different, the request and the transmission of system information are performed (S315, S316).

For example, processing as follows is performed. Namely, the radio channel control unit 110 of the base station 100-1 transmits a system information request to the base station 100-2 through the system information management unit 111. Also, the radio channel control unit 110 of the base station 100-2, on receiving the system information request through the system information management unit 111, transmits the system information of the cell 5 etc. to the base station 100-1 through the system information management unit 111. The radio channel control unit 110 of the base station 100-1 receives the system information of the cell 5 through the system information management unit 111, to transmit to the terminal 200, as system information, a control signal, or the like (S317).

Further, the terminal 200 performs a random access procedure etc. between with the cell 5 of the base station 100-2 which performs radio communication using the non-orthogonal multiple access scheme (S318). Further, the cell 5 of the base station 100-2 measures a transmission power value and radio channel quality between with the terminal 200 (S230 to S240 in FIG. 111).

Thus, it becomes possible to add, as SCell, a cell using the non-orthogonal multiple access scheme in the different base station 100, to PCell using the orthogonal multiple access scheme.

The operation example illustrated in FIGS. 110 and 111 is an operation example in which the terminal category is identified in the base station 100. As having been described in Embodiment 1 etc., it may also be possible to configure to identify the terminal category in the terminal 200.

6.4 Effects of Embodiment 6

According to Embodiments 6-1 and 6-2, for example, operation as follows is performed. Namely, the base station 100 performs radio communication by the orthogonal multiple access scheme using the first frequency band, and performs radio communication by the non-orthogonal multiple access scheme using the second frequency band, so as to add the second frequency which is used in the non-orthogonal multiple access scheme to the first frequency which is used in the orthogonal multiple access scheme. Also, the base station 100 adds the first frequency, which is used in the orthogonal multiple access scheme, to the second frequency which is used in the non-orthogonal multiple access scheme. The base station 100 controls to perform radio communication simultaneously using the first and second frequencies.

Also, according to Embodiment 6-3, for example, operation as follows is performed. Namely, the base station 100-1 performs radio communication either by the orthogonal multiple access scheme using the first frequency band or by the non-orthogonal multiple access scheme using the second frequency band, so as to add the second frequency which is used in the non-orthogonal multiple access scheme when the other base station 100-2 performs radio communication by the non-orthogonal multiple access scheme, to the first frequency which is used in the orthogonal multiple access scheme when the base station 100-1 performs radio communication by the orthogonal multiple access scheme. Also, the base station 100-1 adds the first frequency which is used in the orthogonal multiple access scheme when the other base station 100-1 performs radio communication by the orthogonal multiple access scheme, to the second frequency which is used in the non-orthogonal multiple access scheme when the base station 100-1 performs radio communication by the non-orthogonal multiple access scheme. The base station 100-1 controls the base station 100-1 and the base station 100-2 to perform radio communication with the terminal 200 by simultaneously using the first and second frequencies.

This enables the addition of CC which supports the non-orthogonal multiple access scheme or the orthogonal multiple access scheme, in Embodiment 6. By such addition, the base station 100 and the terminal 200 can simultaneously perform radio communication using a plurality of CC, so that can obtain a high transmission speed as compared to a case when such CC is not added.

In this case, based on the terminal category and the terminal performance information, the base station 100 can verify whether or not the terminal 200 supports the non-orthogonal multiple access scheme, whether or not the terminal 200 supports the orthogonal multiple access scheme (for example, S91, S14 in FIG. 104 etc.), or the like. This enables, for example, preventing such a situation that a CC which supports the non-orthogonal multiple access scheme is added to the terminal 200 which does not support the non-orthogonal multiple access scheme, so as to enable achieving appropriate radio communication. In this case, it is possible to prevent such a situation that the base station 100 repeats a multiplicity of times of processing to add the CC, which supports the non-orthogonal multiple access scheme, to the terminal 200 which does not support the non-orthogonal multiple access scheme, and as a result, a throughput can be improved.

Also, based on the terminal category and the terminal performance information, the base station 100 can set, as a candidate for addition, a CC using the non-orthogonal multiple access scheme, not only a CC using the orthogonal multiple access scheme. This enables an increase of possibility of addition, as compared to the case when only CC of the orthogonal multiple access scheme can be added, and as a result, a transmission speed can be improved.

Other Embodiments

Figure 113:
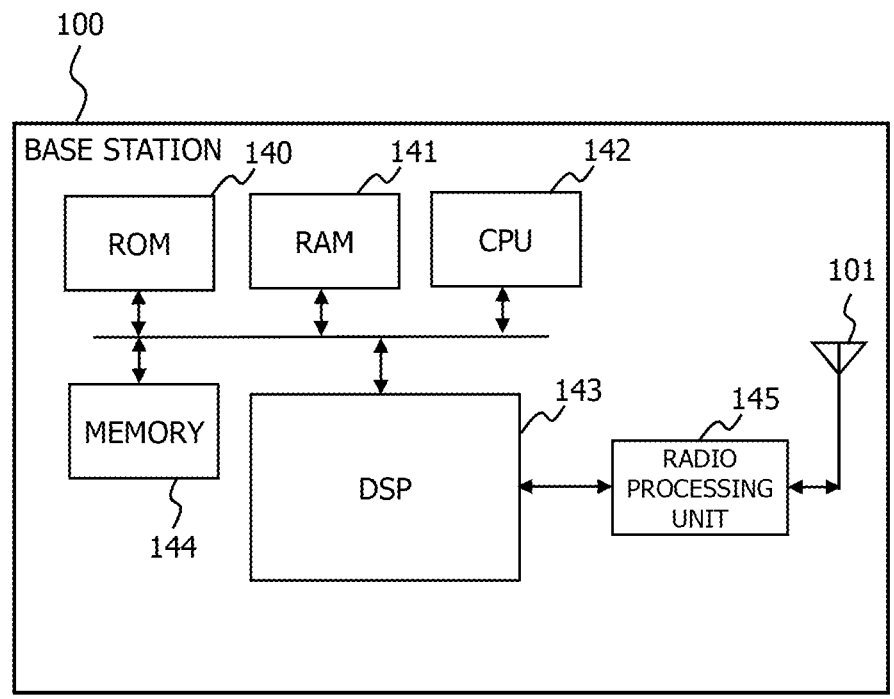
FIG. 113 is a diagram illustrating a configuration example of a base station.
Figure 114:
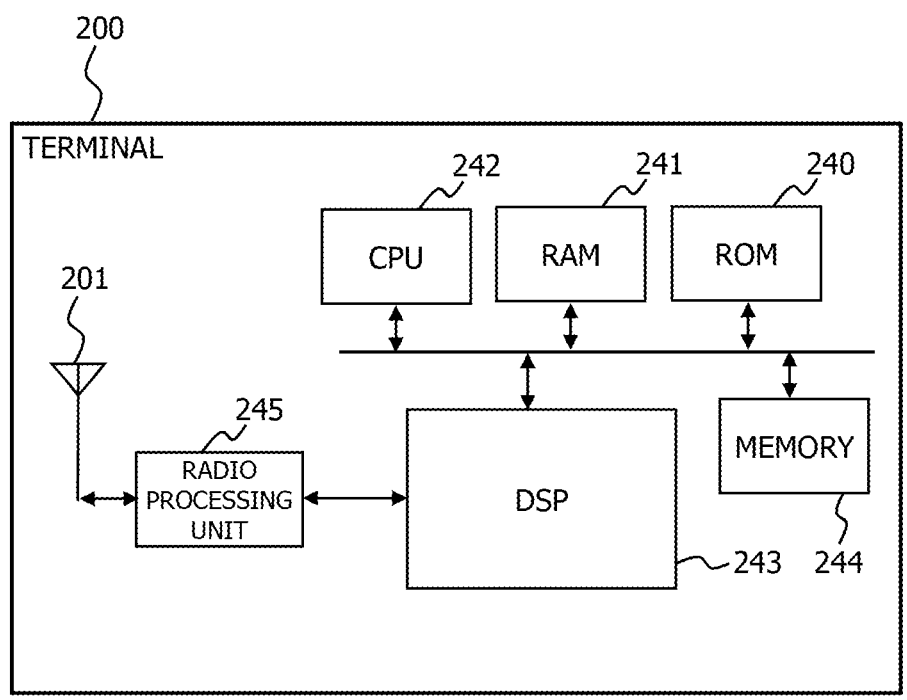
FIG. 114 is a diagram illustrating a configuration example of a terminal.

FIG. 113 and FIG. 114 are diagrams illustrating hardware configuration examples of a base station 100 and a terminal 200, respectively. The base station 100 includes an antenna 101, a ROM (Read Only Memory) 140, a RAM (Random Access Memory) 141, a CPU (Central Processing Unit) 142, a DSP (Digital Signal Processing) 143, a memory 144 and a radio processing unit 145.

The CPU 142 reads out each program stored in the ROM 140, to load into the RAM 141 and execute the loaded program. By this, for example, the CPU 142 actualizes the functions of the control unit 103, the terminal category information extraction unit 107 (107-1, 107-2), the radio channel quality information extraction unit 108 (108-1, 108-2), the control signal extraction unit 109 (109-1, 109-2), the control signal generation unit 112 (112-1, 112-2), the pilot generation unit 113 (113-1, 113-2), the system information generation unit 114 (114-1, 114-2) and the terminal performance information extraction unit 118. The CPU 142 corresponds to, for example, the control unit 103, the terminal category information extraction unit 107 (107-1, 107-2), the radio channel quality information extraction unit 108 (108-1, 108-2), the control signal extraction unit 109 (109-1, 109-2), the control signal generation unit 112 (112-1, 112-2), the pilot generation unit 113 (113-1, 113-2), the system information generation unit 114 (114-1, 114-2) and the terminal performance information extraction unit 118, for example, in the second embodiment.

The DSP 143 actualizes each function of the reception orthogonal multiple access processing unit 106, the transmission orthogonal multiple access processing unit 115, the reception non-orthogonal multiple access processing unit 121 and the transmission non-orthogonal multiple access processing unit 123, according to each instruction from the CPU 142, for example. Also, the DSP 143 actualizes the functions of the reception non-orthogonal and orthogonal multiple access processing unit 130 and the transmission non-orthogonal and orthogonal multiple access processing unit 131, for example.

Accordingly, the DSP 143 corresponds to the reception orthogonal multiple access processing unit 106, the transmission orthogonal multiple access processing unit 115, the reception non-orthogonal multiple access processing unit 121 and the transmission non-orthogonal multiple access processing unit 123 in the second embodiment, for example. Further, the DSP 143 corresponds to the reception non-orthogonal and orthogonal multiple access processing unit 130 and the transmission non-orthogonal and orthogonal multiple access processing unit 131 in the second embodiment, for example.

Also, the memory 144 corresponds to, for example, the system information management unit 111 in the second embodiment. Further, the radio processing unit 145 corresponds to the reception radio unit 105 (105-1, 105-2) and the transmission radio unit 116 (116-1, 116-2) in the second embodiment, for example.

The terminal 200 includes an antenna 201, a ROM 240, a RAM 241, a CPU, a DSP 243, a memory 244 and a radio processing unit 245.

The CPU 242 reads out each program stored in the ROM 240 to load into the RAM 241 and execute the loaded program. By this, the CPU 142 actualizes the functions of the control unit 203, the system information extraction unit 207 (207-1, 207-2), the control signal extraction unit 208 (208-1, 208-2), the pilot extraction unit 209 (209-1, 209-2) and the radio channel quality measurement unit 210 (210-1, 210-2), for example. Also, the CPU 242 actualizes the functions of the radio channel quality information generation unit 217 (217-1, 217-2), the control signal generation unit 218 (218-1, 218-2), the terminal category information generation unit 219 (219-1, 219-2) and the pilot generation unit 220 (220-1, 220-2), for example.

Accordingly, the CPU 242 corresponds to the control unit 203, the system information extraction unit 207 (207-1, 207-2), the control signal extraction unit 208 (208-1, 208-2), the pilot extraction unit 209 (209-1, 209-2) and the radio channel quality measurement unit 210 (210-1, 210-2), for example, in the second embodiment. Also, the CPU 242 corresponds to the radio channel quality information generation unit 217 (217-1, 217-2), the control signal generation unit 218 (218-1, 218-2), the terminal category information generation unit 219 (219-1, 219-2) and the pilot generation unit 220 (220-1, 220-2) in the second embodiment, for example.

Also, the memory 244 corresponds to the system information storage unit 216 and the terminal performance information storage unit 212 in the second embodiment, for example. Further, the radio processing unit 245 corresponds to the reception radio unit 205 (205-1, 205-2) and the transmission radio unit 222 (222-1, 222-2) in the second embodiment, for example.

In the base station 100 depicted in FIG. 113 and the terminal 200 depicted in FIG. 114, a processor, such as an MPU (Micro Processing Unit), or a controller may be used in place of the CPU 142, 242, for example. Also an FPGA (Field Programmable Gate Array) may be used in place of the DSP 143, 243. Further, the ROM 140, the RAM 141, the CPU 142, the memory 144 and the DSP 143 may be an integrated circuit having the integration thereof into one circuit. The ROM 240, the RAM 241, the CPU 242, the memory 244 and the DSP 243 may be an integrated circuit having the integration thereof into one circuit.

It is possible to provide a radio communication system, a base station apparatus, a terminal apparatus and a radio communication method which are configured to appropriately perform radio communication. Also, it is possible to provide a radio communication system, a base station apparatus, a terminal apparatus and a radio communication method which are configured to improve a throughput.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Radio communication system
100 (100-1 to 100-4): Base station
105: Reception radio unit
106: Reception orthogonal multiple access processing unit
106b, 106h: Orthogonal demodulation unit
107: Terminal category information extraction unit
108: Radio channel quality information extraction unit
109: Control signal extraction unit
110: Radio channel control unit
110c: Radio channel quality measurement control unit
110d: Handover control unit
110e: Terminal category request control unit
110f: Multiple access control unit 110*g*: Scheduler
110*h*: Radio channel setting control unit
110*i*, 110*j*: Radio channel setting control unit for a first and second frequency bands
110*k*: Terminal performance information request control unit
110*m*: Uplink/downlink transmission power control unit
111: System information management and storage unit
112: Control signal generation unit
113: Pilot generation unit
114: System information generation unit
115: Transmission orthogonal multiple access processing unit
115*b*, 115*f*: Orthogonal modulation unit
116: Transmission radio unit
118: Terminal performance information extraction unit
119: Terminal category identification unit
121: Reception non-orthogonal multiple access processing unit
121*b*: Non-orthogonal demodulation unit
121*b*1: Second layer demodulation unit
121*b*2: First layer demodulation unit
123: Transmission non-orthogonal multiple access processing unit
123*b*, 123*f*: Non-orthogonal modulation unit
123*b*1: Second layer modulation unit
123*b*2: First layer modulation unit
130: Reception non-orthogonal and orthogonal multiple access processing unit
130*b*, 130*h*: Orthogonal/non-orthogonal demodulation unit
130*b*1: Orthogonal/non-orthogonal control unit
130*b*2: Orthogonal demodulation unit
130*b*3: Non-orthogonal demodulation unit
131: Transmission non-orthogonal and orthogonal multiple access processing unit
131*b*, 131*f*: Orthogonal/non-orthogonal modulation unit
131*b*1: Orthogonal/non-orthogonal control unit
131*b*2: Orthogonal modulation unit
131*b*3: Non-orthogonal modulation unit
131*b*4: First layer modulation unit
131*b*5: Orthogonal/non-orthogonal control unit
131*b*6: Second layer modulation unit
200 (200*a*, 200*b*): Terminal
205: Reception radio unit
206: Reception orthogonal multiple access processing unit
207: System information extraction unit
208: Control signal extraction unit
209: Pilot extraction unit
210: Radio channel quality measurement and calculation unit
212: Terminal performance information storage unit
213: Terminal category identification unit
214: Radio channel control unit
214*e*: Terminal category control unit
214*f*: Multiple access control unit
214*m*: Uplink/downlink transmission power control unit
217: Radio channel quality information generation unit
219: Terminal category information generation unit
221: Transmission orthogonal multiple access processing unit
222: Transmission radio unit
223: Terminal performance information generation unit
225: Reception non-orthogonal multiple access processing unit
225*b*, 225*h*: Non-orthogonal demodulation unit
225*b*1: Second layer demodulation unit
225*b*2: First layer demodulation unit
226: Transmission non-orthogonal multiple access processing unit
226*b*, 226*f*: Non-orthogonal modulation unit
226*b*1: Second layer modulation unit
226*b*2: First layer modulation unit
230: Reception non-orthogonal and orthogonal multiple access processing unit
230*b*, 230*h*: Orthogonal/non-orthogonal demodulation unit
230*b*1: Orthogonal/non-orthogonal control unit
230*b*2: Orthogonal demodulation unit
230*b*3: Non-orthogonal demodulation unit
231: Transmission non-orthogonal and orthogonal multiple access processing unit
231*b*, 231*f*: Orthogonal/non-orthogonal modulation unit
231*b*1: Orthogonal/non-orthogonal control unit
231*b*2: Orthogonal modulation unit
231*b*3: Non-orthogonal modulation unit
231*b*4: First layer modulation unit
231*b*5: Orthogonal/non-orthogonal control unit
231*b*6: Second layer modulation unit

What is claimed is:

1. A radio communication system comprising:
a base station apparatus; and
a terminal apparatus, wherein
radio communication is performed between the base station apparatus and the terminal apparatus, and
the base station apparatus or the terminal apparatus includes:
a controller configured to identify a category of the terminal apparatus classified according to performance or capability of the terminal apparatus, when the base station apparatus and the terminal apparatus perform radio communication by using an orthogonal multiple access scheme, based on first information, and when the base station apparatus and the terminal apparatus perform radio communication by using a non-orthogonal multiple access scheme, based on second information, the first information indicating the performance or capability of the terminal apparatus including information with respect to the non-orthogonal multiple access scheme, the second information indicating the performance or capability of the terminal apparatus including information with respect to the orthogonal multiple access scheme.

2. The radio communication system according to claim 1, wherein
the controller of the terminal apparatus is configured to identify the category of the terminal apparatus based on the first information, when the base station apparatus and the terminal apparatus perform radio communication by using the orthogonal multiple access scheme,
the terminal apparatus includes a transmitter configured to transmit the identified category to the base station apparatus, and
the base station apparatus includes a receiver configured to receive the category transmitted from the terminal apparatus.

3. The radio communication system according to claim 1, wherein
the terminal apparatus includes a transmitter configured to transmit the first information to the base station apparatus when the base station apparatus and the terminal apparatus perform radio communication by using the orthogonal multiple access scheme, and the controller of the base station apparatus is configured to identify the category of the terminal apparatus based on the first information transmitted from the terminal apparatus.

4. The radio communication system according to claim 1, wherein
the controller of the terminal apparatus is configured to identify the category of the terminal apparatus based on the second information, when the base station apparatus and the terminal apparatus perform radio communication by using the non-orthogonal multiple access scheme,
the terminal apparatus includes a transmitter configured to transmit the identified category to the base station apparatus, and
the base station apparatus includes a receiver configured to receive the category transmitted from the terminal apparatus.

5. The radio communication system according to claim 1, wherein
a transmitter of the terminal apparatus is configured to transmit the second information, when the base station apparatus and the terminal apparatus perform radio communication by using the non-orthogonal multiple access scheme, and
the controller of the base station apparatus is configured to identify the category of the terminal apparatus based on the second information transmitted from the terminal apparatus.

6. The radio communication system according to claim 1, wherein
the controller of the terminal apparatus is configured to identify the category of the terminal apparatus based on at least either the first information or the second information, when the base station apparatus and the terminal apparatus perform radio communication by using the non-orthogonal multiple access scheme and the orthogonal multiple access scheme,
the terminal apparatus includes a transmitter configured to transmit the identified category to the base station apparatus, and
the base station apparatus includes a receiver configured to receive the category transmitted from the terminal apparatus.

7. The radio communication system according to claim 1, wherein
the terminal apparatus includes a transmitter configured to transmit at least either the first information or the second information, when the base station apparatus and the terminal apparatus perform radio communication by using the non-orthogonal multiple access scheme and the orthogonal multiple access scheme,
the controller of the base station apparatus is configured to identify the category of the terminal apparatus based on at least either the first information or the second information transmitted from the terminal apparatus.

8. The radio communication system according to claim 1, wherein
the base station apparatus includes:
the controller configured to switch a multiple access scheme from the orthogonal multiple access scheme to the non-orthogonal multiple access scheme, or from the non-orthogonal multiple access scheme to the orthogonal multiple access scheme,
a transmitter configured to transmit the switched non-orthogonal multiple access scheme or the switched orthogonal multiple access scheme to the terminal apparatus, and
a communicator configured to perform radio communication by using the switched non-orthogonal multiple access scheme or the switched orthogonal multiple access scheme.

9. The radio communication system according to claim 1, wherein
the base station apparatus includes:
the controller configured to switch a multiple access scheme from the orthogonal multiple access scheme to the non-orthogonal multiple access scheme, or from the non-orthogonal multiple access scheme to the orthogonal multiple access scheme,
a transmitter configured to transmit the switched non-orthogonal multiple access scheme or the switched orthogonal multiple access scheme to the terminal apparatus by using a first downlink frequency, and
radio communication by using the switched non-orthogonal multiple access scheme or the switched orthogonal multiple access scheme is performed by using a first uplink frequency and the first downlink frequency.

10. The radio communication system according to claim 1, wherein
the base station apparatus includes:
the controller configured to switch a frequency from a first uplink frequency and first downlink frequency used in the orthogonal multiple access scheme to a second uplink frequency and second downlink frequency used in the non-orthogonal multiple access scheme, or from the second uplink frequency and second downlink frequency used in the non-orthogonal multiple access scheme to the first uplink frequency and first downlink frequency used in the orthogonal multiple access scheme,
a transmitter configured to transmit to the terminal apparatus the switched non-orthogonal multiple access scheme by using the second downlink frequency or the switched orthogonal multiple access scheme by using first downlink frequency, and
a communicator configured to perform radio communication by the switched non-orthogonal multiple access scheme by using the second downlink frequency and second uplink frequency or the switched orthogonal multiple access scheme by using the first downlink frequency and first uplink frequency.

11. The radio communication system according to claim 10, wherein the terminal apparatus includes:
a receiver configured to receive a switch request, and
the controller configured to switch the frequency according to the switch request.

12. The radio communication system according to claim 1, wherein
the base station apparatus includes:
the controller configured to switch connection from the base station apparatus using the orthogonal multiple access scheme to another base station apparatus using the non-orthogonal multiple access scheme, or from the base station apparatus using the non-orthogonal multiple access scheme to the other base station apparatus using the orthogonal multiple access scheme, and
a transmitter configured to transmit the switched non-orthogonal multiple access scheme or the switched orthogonal multiple access scheme.

13. The radio communication system according to claim 1, wherein
the base station apparatus includes:
the controller configured to switch connection
from the base station apparatus performing radio communication by the orthogonal multiple access scheme by using a first uplink frequency and first downlink frequency to another base station apparatus performing radio communication by the non-orthogonal multiple access scheme by using a second uplink frequency and second downlink frequency, or
from the other base station apparatus performing radio communication by the non-orthogonal multiple access scheme by using the second uplink frequency and second downlink frequency to the base station apparatus performing radio communication by the orthogonal multiple access scheme by using the first uplink frequency and first downlink frequency, and
a transmitter configured to transmit to the terminal apparatus the switched non-orthogonal multiple access scheme by using the second downlink frequency or the switched orthogonal multiple access scheme by using the first downlink frequency.

14. The radio communication system according to claim 13, wherein
the controller is configured to transmit to the other base station apparatus a switch request to request a switch of the connection.

15. The radio communication system according to claim 1, wherein
the base station apparatus includes:
a first communicator configured to perform radio communication by the orthogonal multiple access scheme by using a first frequency band,
a second communicator configured to perform radio communication by the non-orthogonal multiple access scheme by using a second frequency band, and
the controller configured to control the first and second communicators to perform radio communication by using a first and second frequencies at the same time, by adding
a second frequency used in the non-orthogonal multiple access scheme to a first frequency used in the orthogonal multiple access scheme, or
the first frequency used in the orthogonal multiple access scheme to the second frequency used in the non-orthogonal multiple access scheme.

16. The radio communication system according to claim 1, wherein
the base station apparatus includes:
a first communicator configured to perform radio communication by the orthogonal multiple access scheme by using a first frequency band or by the non-orthogonal multiple access scheme by using a second frequency band, and
the controller configured to control the first communicator and another base station apparatus such that the base station apparatus and the other base station apparatus perform radio communication to the terminal apparatus by using the first and second frequencies at the same time, by adding
the second frequency used in the non-orthogonal multiple access scheme in case that the other radio base station apparatus performs radio communication by the non-orthogonal multiple access scheme to the first frequency used in the orthogonal multiple access scheme in case that the base station apparatus performs radio communication by the orthogonal multiple access scheme, or
the first frequency used in the orthogonal multiple access scheme in case that the other base station apparatus performs radio communication by the orthogonal multiple access scheme to the second frequency used in the non-orthogonal multiple access scheme in case that the radio base station apparatus performs radio communication by the non-orthogonal multiple access scheme.

17. A base station apparatus for performing radio communication with a terminal apparatus, the base station apparatus comprising:
a controller configured to identify a category of the terminal apparatus classified according to performance or capability of the terminal apparatus,
when the base station apparatus and the terminal apparatus perform radio communication by using an orthogonal multiple access scheme, based on first information, and when the base station apparatus and the terminal apparatus perform radio communication by using a non-orthogonal multiple access scheme, based on second information, the first information indicating the performance or capability of the terminal apparatus including information with respect to the non-orthogonal multiple access scheme, the second information indicating the performance or capability of the terminal apparatus including information with respect to the orthogonal multiple access scheme.

18. A terminal apparatus for performing radio communication with a base station apparatus, the terminal apparatus comprising:
a controller configured to identify a category of the terminal apparatus classified according to performance or capability of the terminal apparatus,
when the base station apparatus and the terminal apparatus perform radio communication by using and orthogonal multiple access scheme, based on first information,
when the base station apparatus and the terminal apparatus perform radio communication by using a non-orthogonal multiple access scheme, based on second information, the first information indicating the performance or capability of the terminal apparatus including information with respect to the non-orthogonal multiple access scheme, the second information indicating the performance or capability of the terminal apparatus including information with respect to the orthogonal multiple access scheme.

\* \* \* \* \*